May 11, 1954 J. E. OSTLINE 2,678,353

TELEPHONE SYSTEM

Filed Feb. 12, 1949 34 Sheets-Sheet 1

INVENTOR.
John E. Ostline
BY
Smith, Olsen & Baird
Attys.

2 6

May 11, 1954 J. E. OSTLINE 2,678,353

TELEPHONE SYSTEM

Filed Feb. 12, 1949 34 Sheets-Sheet 2

INVENTOR.
John E. Ostline

BY
Smith, Olsen & Baird

Attys.

INVENTOR.
John E. Ostline
BY
Smith, Olsen & Baird
Attys.

May 11, 1954 J. E. OSTLINE 2,678,353

TELEPHONE SYSTEM

Filed Feb. 12, 1949 34 Sheets-Sheet 4

INVENTOR.
John E. Ostline

BY
Smith, Olsen & Baird
Attys

INVENTOR.
John E. Ostline

BY
Smith, Olsen & Baird
Attys

INVENTOR.
John E. Ostline
BY
Smith, Olsen & Baird
Attys

May 11, 1954 J. E. OSTLINE 2,678,353

TELEPHONE SYSTEM

Filed Feb. 12, 1949 34 Sheets-Sheet 7

*INVENTOR.*
John E. Ostline

*BY*
Smith, Olsen & Baird

Attys.

May 11, 1954 J. E. OSTLINE 2,678,353

TELEPHONE SYSTEM

Filed Feb. 12, 1949 34 Sheets-Sheet 8

INVENTOR.
John E. Ostline

BY
Smith, Olsen & Baird
Attys.

May 11, 1954 J. E. OSTLINE 2,678,353

TELEPHONE SYSTEM

Filed Feb. 12, 1949 34 Sheets-Sheet 9

INVENTOR.
John E. Ostline
BY
Smith, Olsen & Baird
Attys.

May 11, 1954 J. E. OSTLINE 2,678,353

TELEPHONE SYSTEM

Filed Feb. 12, 1949 34 Sheets-Sheet 10

*INVENTOR.*
John E. Ostline

*BY*
Smith, Olsen & Baird

Attys.

*INVENTOR.*
John E. Ostline
*BY*
Smith, Olsen & Baird
Attys.

May 11, 1954 J. E. OSTLINE 2,678,353

TELEPHONE SYSTEM

Filed Feb. 12, 1949 34 Sheets-Sheet 12

CODE SWITCH 1100

INVENTOR.
John E. Ostline

BY

Smith, Olsen & Baird

Attys.

CODE SWITCH 1100

INVENTOR.
John E. Ostline
BY
Smith, Olsen & Baird
Attys.

May 11, 1954

J. E. OSTLINE 2,678,353

TELEPHONE SYSTEM

Filed Feb. 12, 1949

34 Sheets-Sheet 14

INVENTOR.
John E. Ostline

BY
Smith, Olsen & Baird

Attys.

May 11, 1954 J. E. OSTLINE 2,678,353

TELEPHONE SYSTEM

Filed Feb. 12, 1949 34 Sheets-Sheet 15

INVENTOR.
John E. Ostline
BY
Smith, Olsen & Baird
Attys.

May 11, 1954 J. E. OSTLINE 2,678,353

TELEPHONE SYSTEM

Filed Feb. 12, 1949 34 Sheets-Sheet 16

INVENTOR.
John E. Ostline
BY
Smith, Olsen & Baird
Attys.

May 11, 1954 J. E. OSTLINE 2,678,353

TELEPHONE SYSTEM

Filed Feb. 12, 1949 34 Sheets-Sheet 17

INVENTOR.
John E. Ostline
BY
Smith, Olsen & Baird
Attys.

INVENTOR.
John E. Ostline
BY
Smith, Olsen & Baird
Attys.

*INVENTOR.*
John E. Ostline
*BY*
Smith, Olsen & Baird
Attys.

May 11, 1954 J. E. OSTLINE 2,678,353

TELEPHONE SYSTEM

Filed Feb. 12, 1949 34 Sheets-Sheet 20

INVENTOR.
John E. Ostline
BY
Smith, Olsen & Baird
Attys.

May 11, 1954 J. E. OSTLINE 2,678,353

TELEPHONE SYSTEM

Filed Feb. 12, 1949 34 Sheets-Sheet 21

CALL RECORDER 2000

INVENTOR.
John E. Ostline
BY
Smith, Olsen & Baird
Attys.

May 11, 1954 J. E. OSTLINE 2,678,353

TELEPHONE SYSTEM

Filed Feb. 12, 1949 34 Sheets-Sheet 22

INVENTOR.
John E. Ostline
BY
Smith, Olsen & Baird
Attys.

May 11, 1954 J. E. OSTLINE 2,678,353

TELEPHONE SYSTEM

Filed Feb. 12, 1949 34 Sheets-Sheet 23

INVENTOR.
John E. Ostline
BY
Smith, Olsen & Baird
Attys.

May 11, 1954 J. E. OSTLINE 2,678,353

TELEPHONE SYSTEM

Filed Feb. 12, 1949 34 Sheets-Sheet 24

INVENTOR.
John E. Ostline
BY
Smith, Olsen & Baird
Attys.

INVENTOR.
John E. Ostline
BY
Smith, Olsen & Baird
Attys

May 11, 1954 J. E. OSTLINE 2,678,353

TELEPHONE SYSTEM

Filed Feb. 12, 1949 34 Sheets-Sheet 26

TOLL TICKET REPEATER 2300

INVENTOR.
John E. Ostline
BY
Smith, Olsen & Baird
Attys

May 11, 1954 J. E. OSTLINE 2,678,353

TELEPHONE SYSTEM

Filed Feb. 12, 1949 34 Sheets-Sheet 27

INVENTOR.
John E. Ostline
BY
Smith, Olsen & Baird
Attys.

May 11, 1954 J. E. OSTLINE 2,678,353

TELEPHONE SYSTEM

Filed Feb. 12, 1949 34 Sheets-Sheet 28

INVENTOR.
John E. Ostline
BY
Smith, Olsen & Baird
Attys.

May 11, 1954 J. E. OSTLINE 2,678,353

TELEPHONE SYSTEM

Filed Feb. 12, 1949 34 Sheets-Sheet 29

*INVENTOR.*

John E. Ostline

BY

Smith, Olsen & Baird

Attys.

INVENTOR.
John E. Ostline
BY
Smith, Olsen & Baird
Attys.

INVENTOR.
John E. Ostline
BY
Smith, Olsen & Baird
Attys.

May 11, 1954 J. E. OSTLINE 2,678,353

TELEPHONE SYSTEM

Filed Feb. 12, 1949 34 Sheets-Sheet 32

INVENTOR.
John E. Ostline

BY
Smith, Olsen & Baird
Attys.

INVENTOR.
John E. Ostline
BY
Smith, Olsen & Baird
Attys.

INVENTOR.
John E. Ostline
BY
Smith, Olsen & Baird
Attys.

Patented May 11, 1954 2,678,353

UNITED STATES PATENT OFFICE 2,678,353

TELEPHONE SYSTEM

John E. Ostline, Chicago, Ill., assignor to Automatic Electric Laboratories, Inc., Chicago, Ill., a corporation of Delaware Application February 12, 1949, Serial No. 75,985

35 Claims. (Cl. 179—18)

Figure 32:
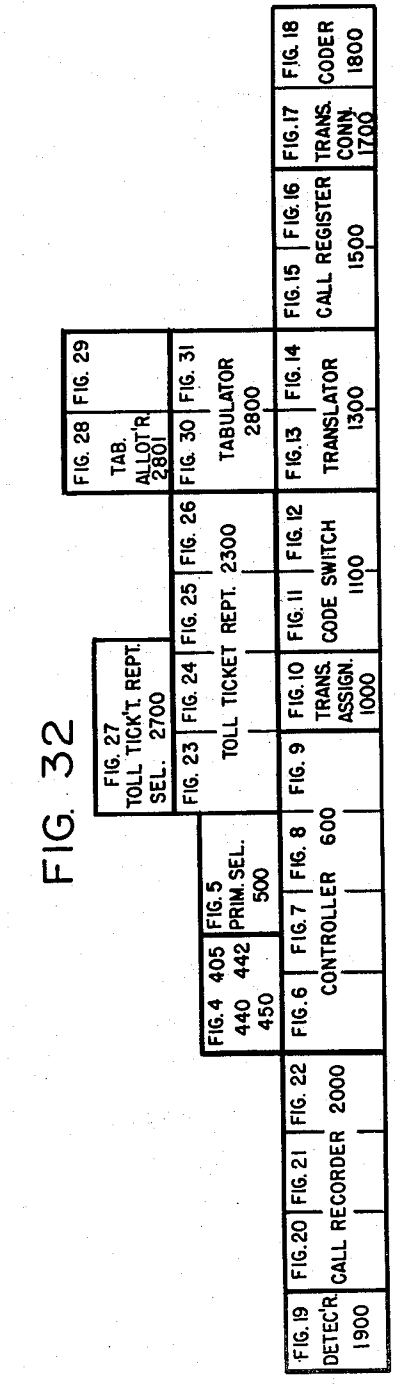

The present invention relates to automatic telephone systems and more particularly to automatic recording apparatus operative to record given particulars of certain calls in the system. More particularly, the present invention relates to improvements in telephone systems of the character disclosed in the copending application of John E. Ostline, Ser. No. 649,583, filed February 23, 1946, now Patent No. 2,581,287, granted January 1, 1952.

In a telephone system serving a large metropolitan area and the adjacent suburban areas, it is usually desirable to divide the system into a plurality of zones and to handle calls between the exchanges in different zones and between certain of the exchanges in the same zones as toll calls, for which charges are made, depending upon the distance between the zones or the distances between the exchanges in the same zone, and the time duration of the call. In accordance with conventional practice, the connections for calls of this type are set up with the aid of an operator, which operator supervises the call and manually records upon a toll ticket certain particulars pertaining to the call, including the identity of the calling and called zones, the identity of calling and called exchanges, the line terminal number of the calling and called lines, the rate applicable to the call, the time duration of the connection, and possibly the total cost of the call.

While systems of the type described are satisfactory in operation, they require the services of a large number of operators and necessitate some delay in extending calls of the type mentioned while the information concerning the calling and called subscriber substations is being transferred from the calling subscriber to the operator.

In the system of the Ostline application noted above, an idle primary register is associated with a calling line as soon as a call is initiated. In response to the dialing of the called zone and called exchange digits, indicative of a call to a nearby toll zone, a primary register in the exchange will register these dialed digits and will then cause an idle register translator to be associated with the primary register. The remaining digits of the called subscriber number, dialed by the calling subscriber, will be registered in the register translator and the primary register will transfer the digits registered therein to the register translator. In this manner all of the digits dialed by the calling subscriber will be registered in the register translator if the primary register determines that the call is to be completed under control of the register translator. The register translator will then transmit switch setting impulses corresponding either to the value of the digits registered therein or to a translation of a certain portion of the registered digits, followed by impulses corresponding to the value of the remaining registered digits depending upon the routing path over which the connection is to be completed to the called exchange. A translation is usually made of the first three digits registered in a register translator whereby one or more routing digits may be transmitted by the register translator for the purpose of setting up the connection. Facilities are also provided in the register translator for transmitting, as registered, one or more of the first three registered digits and each of the four remaining registered digits of the called subscriber number. As a further result of the association of an idle register translator with the primary register, a detector is associated with the register translator. The detector proceeds to identify the four digits identifying the terminal number of the calling subscriber line and registers these digits in the register translator.

During the setting up of a connection to the called subscriber line under the control of the register translator, an idle toll ticket repeater will be selected and included in the connection for the purpose of registering and storing various items of record information which are temporarily registered in the register translator. The inclusion of a toll ticket repeater in a connection will signal the register translator and thus cause the register translator to transmit to the toll ticket repeater, in code form, the various items of information registered therein including the calling subscriber number, the called office code digits, the called subscriber number, the class of service, the rate, and the identity of the register translator involved in the connection. As soon as a connection is completed between the calling and the called subscribers, the toll ticket repeater will time the call and in response to the release of the connection, the toll ticket repeater will have registered therein the above-mentioned items of information plus the duration of the call. Following the release of the connection, the toll ticket repeater will cause an idler printer controller to be associated therewith and it will transfer all of the items of information as noted above, including the identity of the toll ticketing repeater to the associated printer controller. The printer controller, in turn, will calculate the cost of the call in accordance with the rate and the duration of the connection, and the class of the calling line. Finally, the printer controller will control a record printer and a ticketing printer to produce two records of the completed call. The record printer and the ticket printer will print the month, day, hour and minute of the time of termination of the call, the complete directory number of the calling line and the called line, the time duration of the call, the rate applicable to the call, and the class of service of the calling line. In addition to the foregoing, the ticket printer will print the cost of the call as calculated by the printer controller and the record printer will print the identity of the register translator, the toll ticket repeater, and the printer controller involved in the connection.

In an exchange requiring a large number of register translators to handle the telephone traffic, it is not economical to include, in each of the register translators, the apparatus required for translating called office code digits into appropriate routing digits whereby the register translator operates to control the automatic switching apparatus to extend a connection to a called exchange.

Accordingly, it is an object of the present invention to further improve an automatic toll ticketing system of the type above-described, whereby the translating functions of the registering and sending apparatus, commonly referred to either as a register sender, a register translator, or a director, are performed by apparatus which is common to the registering and sending apparatus.

It is a further object of the present invention to provide in a system of the type noted, a single translator and a means for assigning the translator for the exclusive use of any one of a plurality of directors. It should be understood, that in the present system the term "director" is synonymous with the term "register sender" and the term "register translator."

It is a still further object of the invention to provide facilities for forceably disconnecting the single translator from a director after the elapse of a predetermined time interval in the event the translator has not been automatically disconnected within said elapsed time interval, thereby to prevent any unnecessary delay in rendering the translator available for use by another director.

A still further object of the invention is to provide a new and improved director which is adapted to be used in telephone exchanges provided with toll ticketing facilities as well as in exchanges in which toll ticketing facilities are not required. More specifically, in exchanges requiring toll ticketing facilities a call recorder may be associated with the director and functions to alter the operating characteristics of the director whereby the identity of the calling subscriber line is automatically obtained under control of the detector and the call recorder apparatus, and the director, in conjunction with the call recorder, will function to transmit various items of information pertaining to the call to a toll ticketing repeater for subsequent recording. The translator which is associated with the director provides the means for determining whether or not the call recorder will be associated with the director. In exchanges which do not require toll ticketing facilities, the call recorder and detector apparatus is omitted, and the director and translator cooperate to register the directory number of the called subscriber line, to translate the code digits of the called exchange for routing purposes, and to control the switching apparatus to set up the connection between the calling subscriber line and the desired called subscriber line.

A still further object of the invention is to provide a new and improved arrangement in a toll ticketing system whereby the failure of the detector to identify the calling line terminates further operation of the director before it has completed the setting up of the connection, releases the director and the detector, and connects the calling line to an intercepting operator position over a path including the toll ticket repeater of the incomplete connection.

Figure 1:
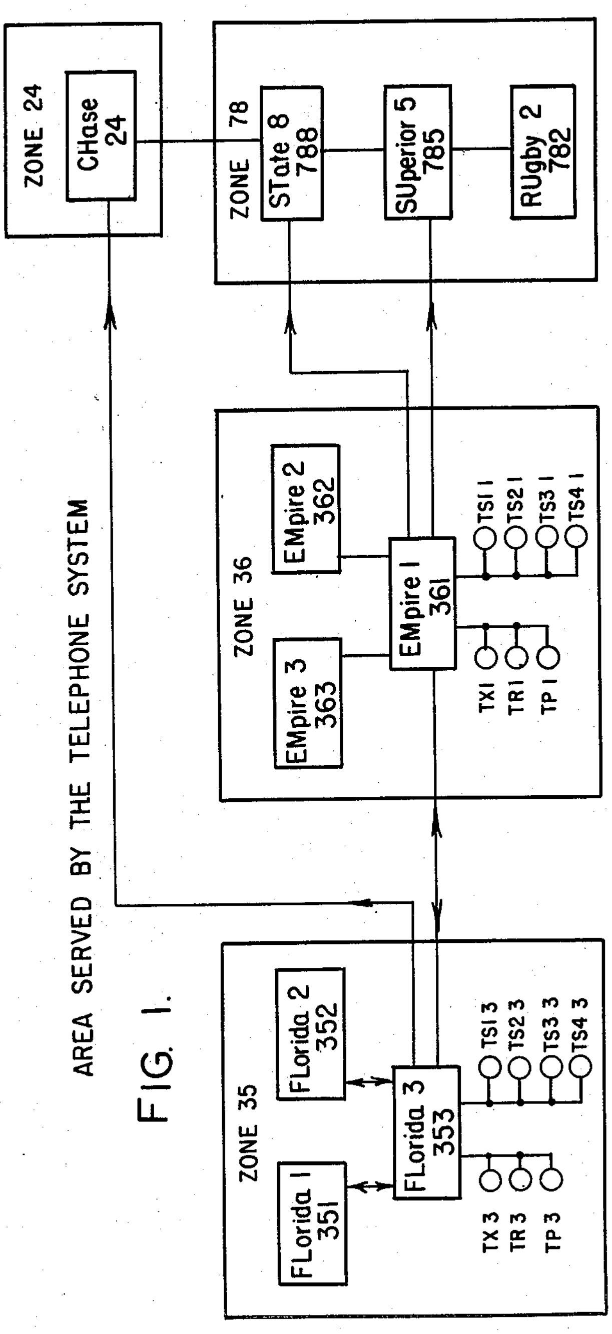
Figure 2:
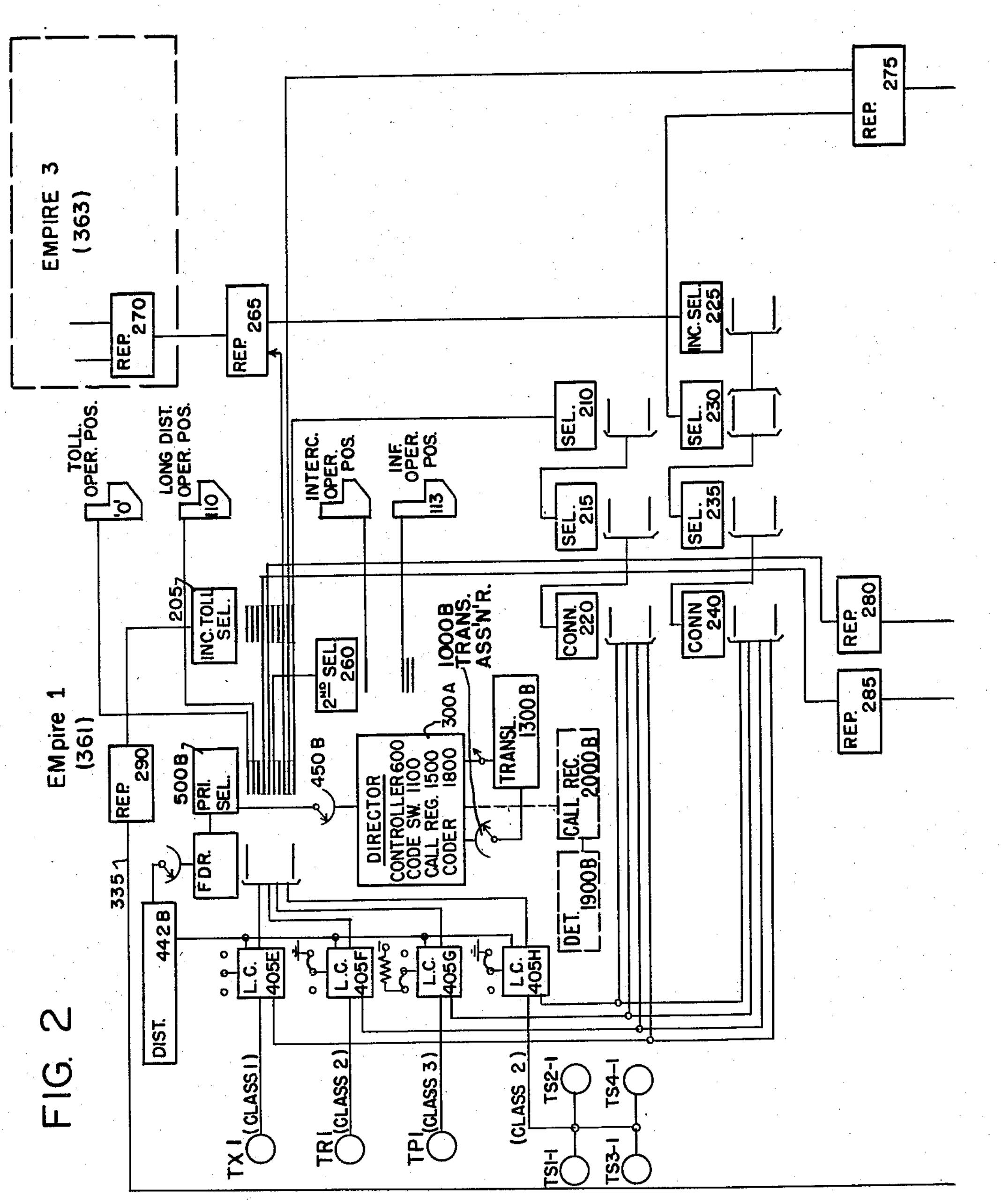
Figure 3A:
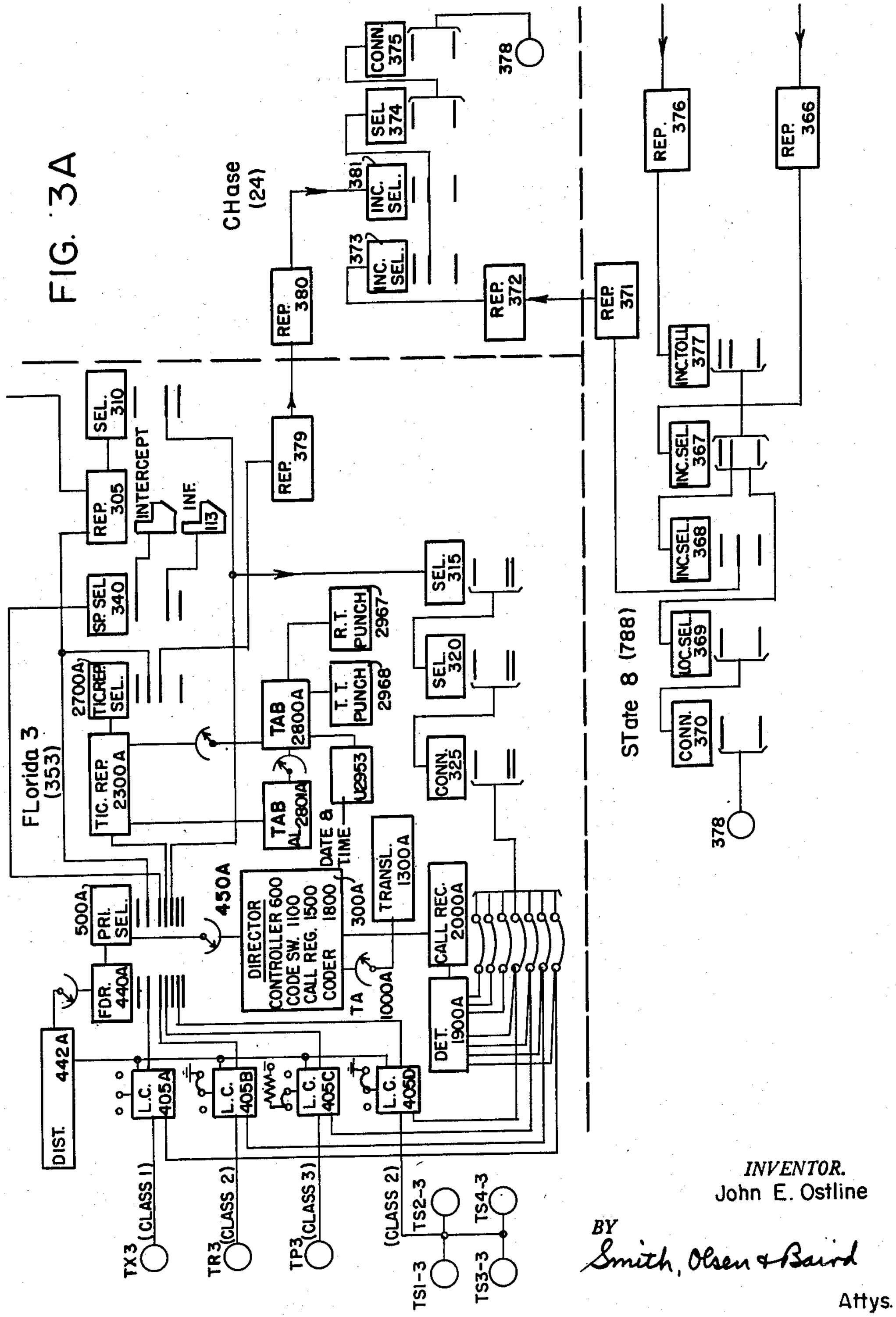
Figure 3B:
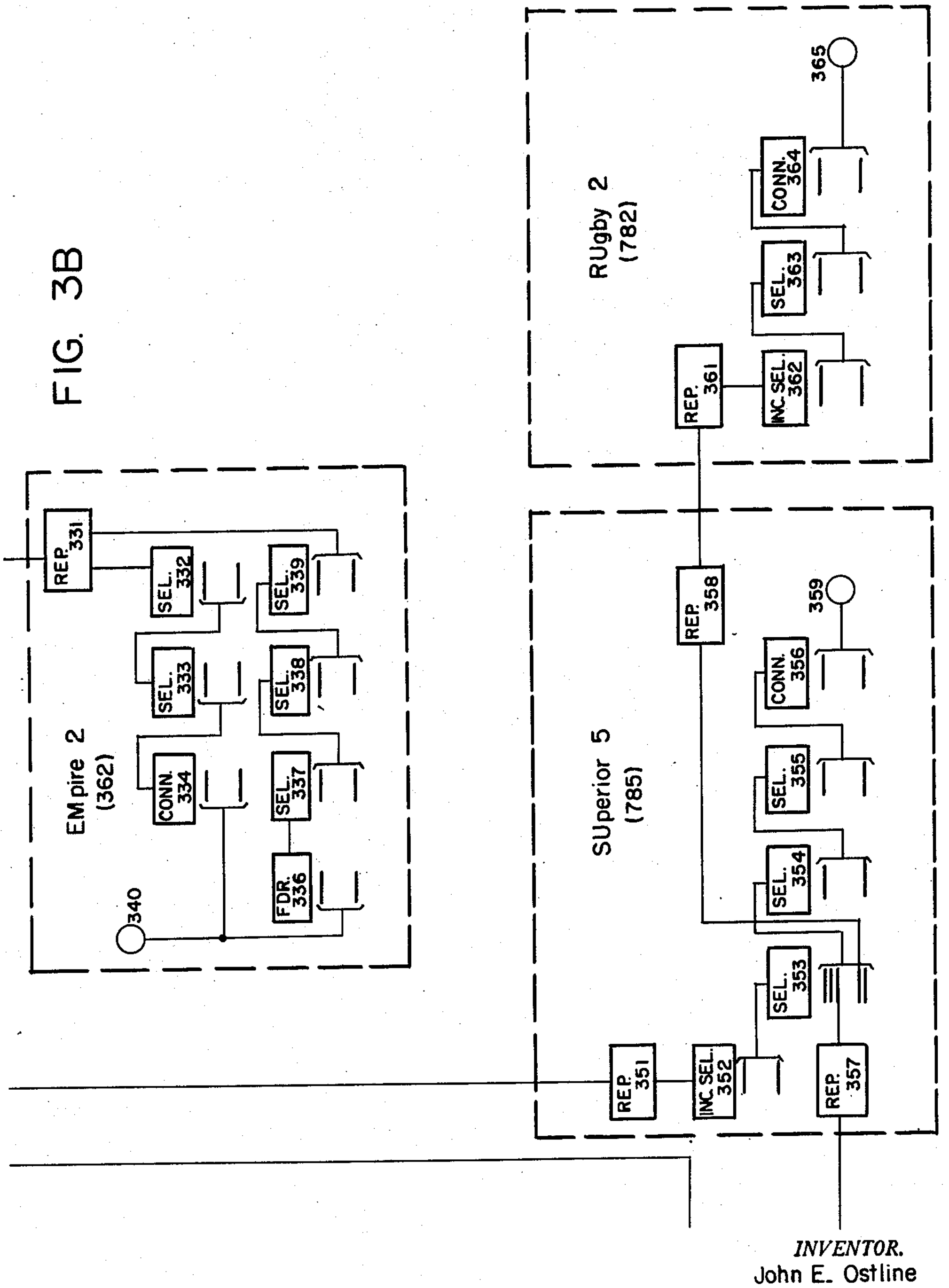
Figures 33, 34:
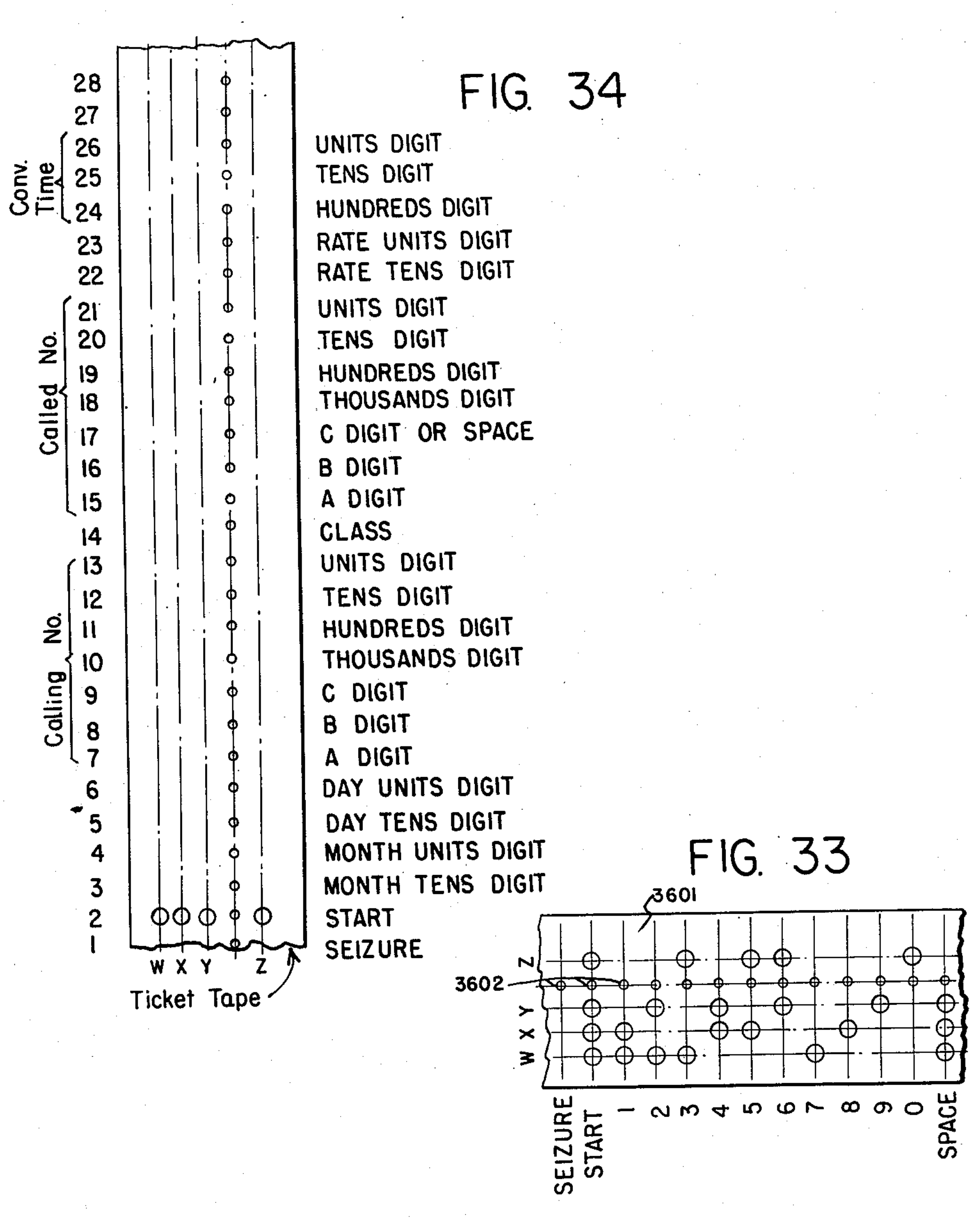
Figure 35:
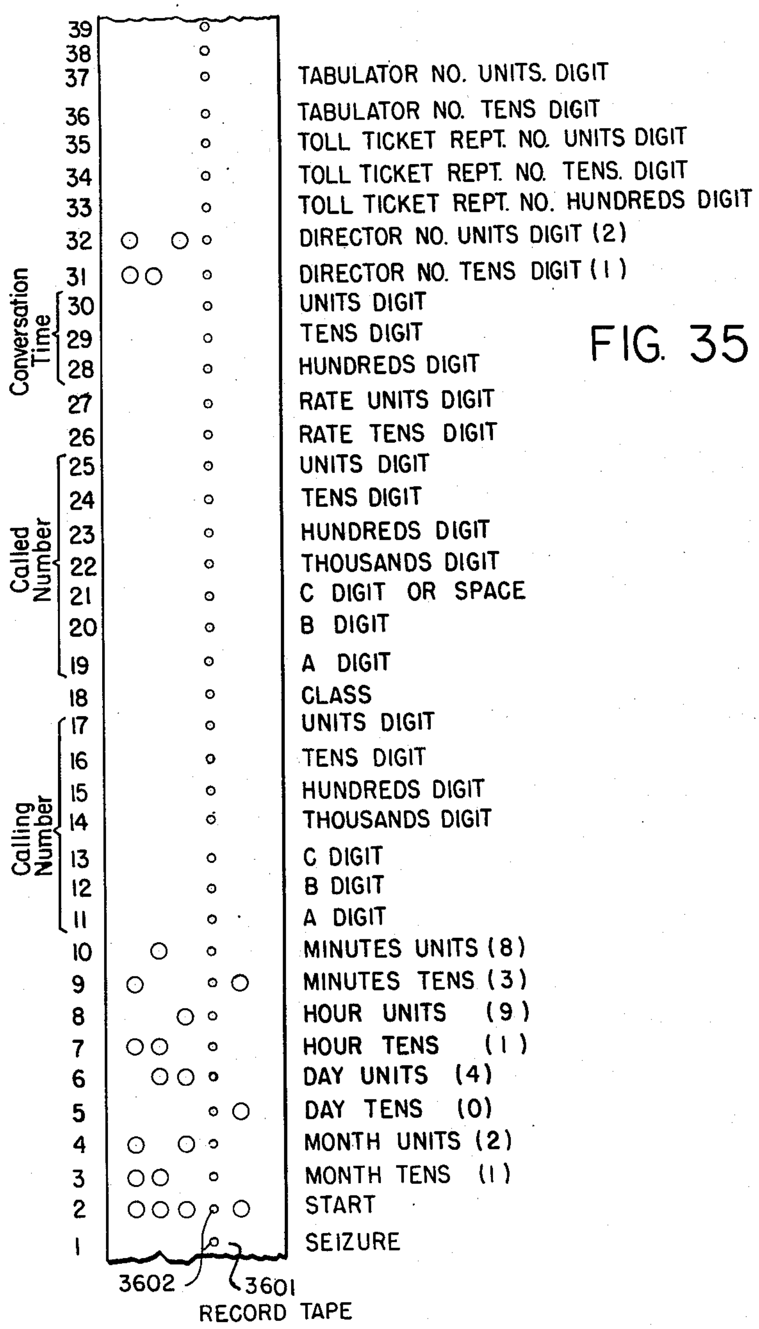

The invention both as to its organization and method of operation together with further objects and advantages thereof will best be understood by reference to the following specification taken in connection with the accompanying drawings in which Figure 1 is a schematic diagram of the area served by a telephone system embodying the present invention; Figs. 2, 3A and 3B, taken together, illustrate the general arrangement of the apparatus incorporated in the various exchanges included in the telephone system and the interconnecting trunk and toll lines; Figs. 4 to 31, inclusive, taken together, illustrate the details of the apparatus incorporated in the FLorida 3 exchange in zone 35 of the telephone system, which apparatus has incorporated therein the features of the invention, as briefly outlined above; Fig. 32 illustrates the mode of combining Figs. 4 to 31, inclusive, to form a unified system; Fig. 33 illustrates a fragmentary portion of a tape bearing all of the code hole designations of the combinational four-hole code employed in the present system. Fig. 34 illustrates a fragmentary portion of a ticket tape produced by the ticket tape punch mechanism 2968; and Fig. 35 illustrates a fragmentary portion of a record tape produced by the record tape punch mechanism 2967.

Figure 4:
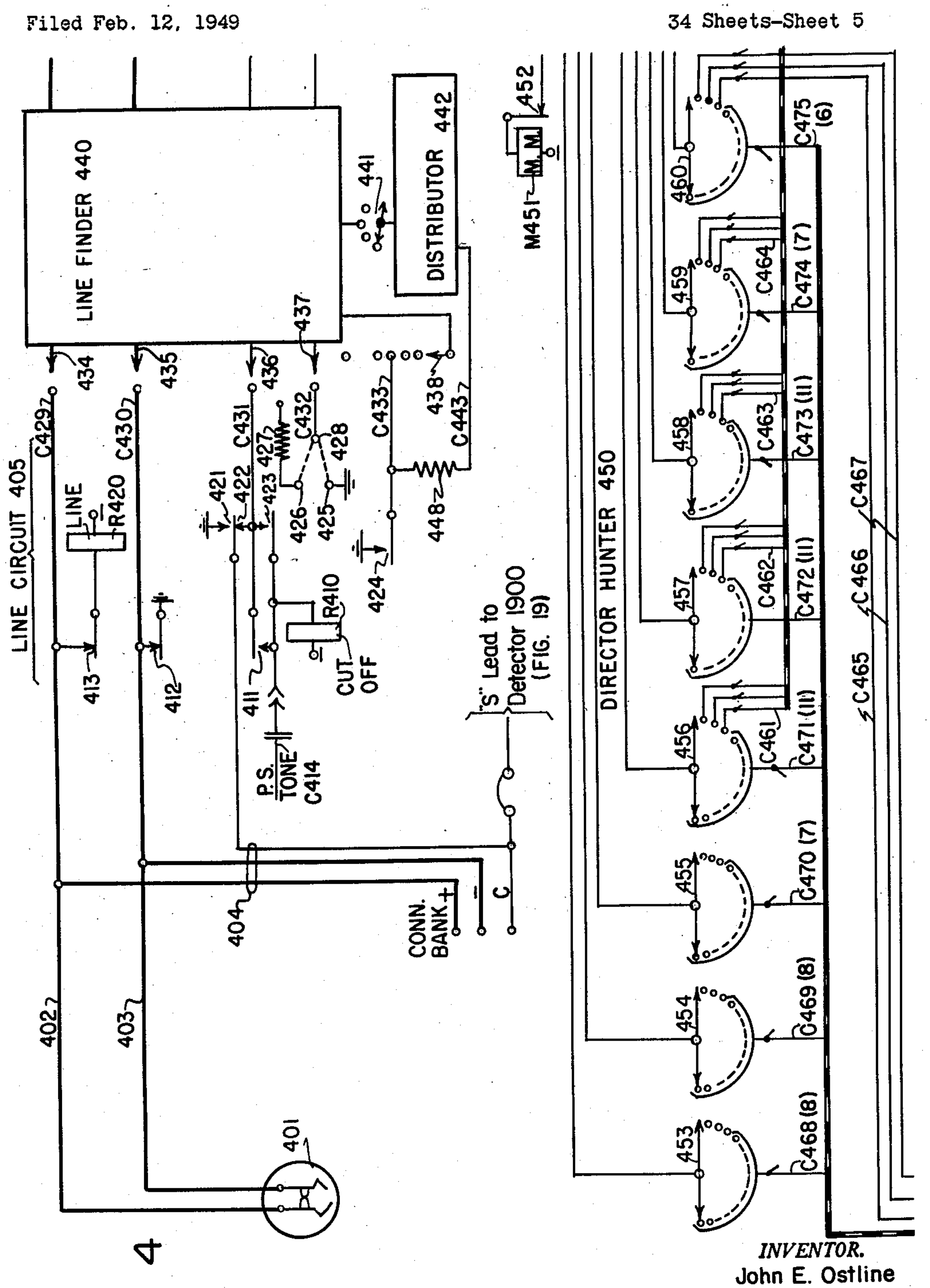
Figure 5:
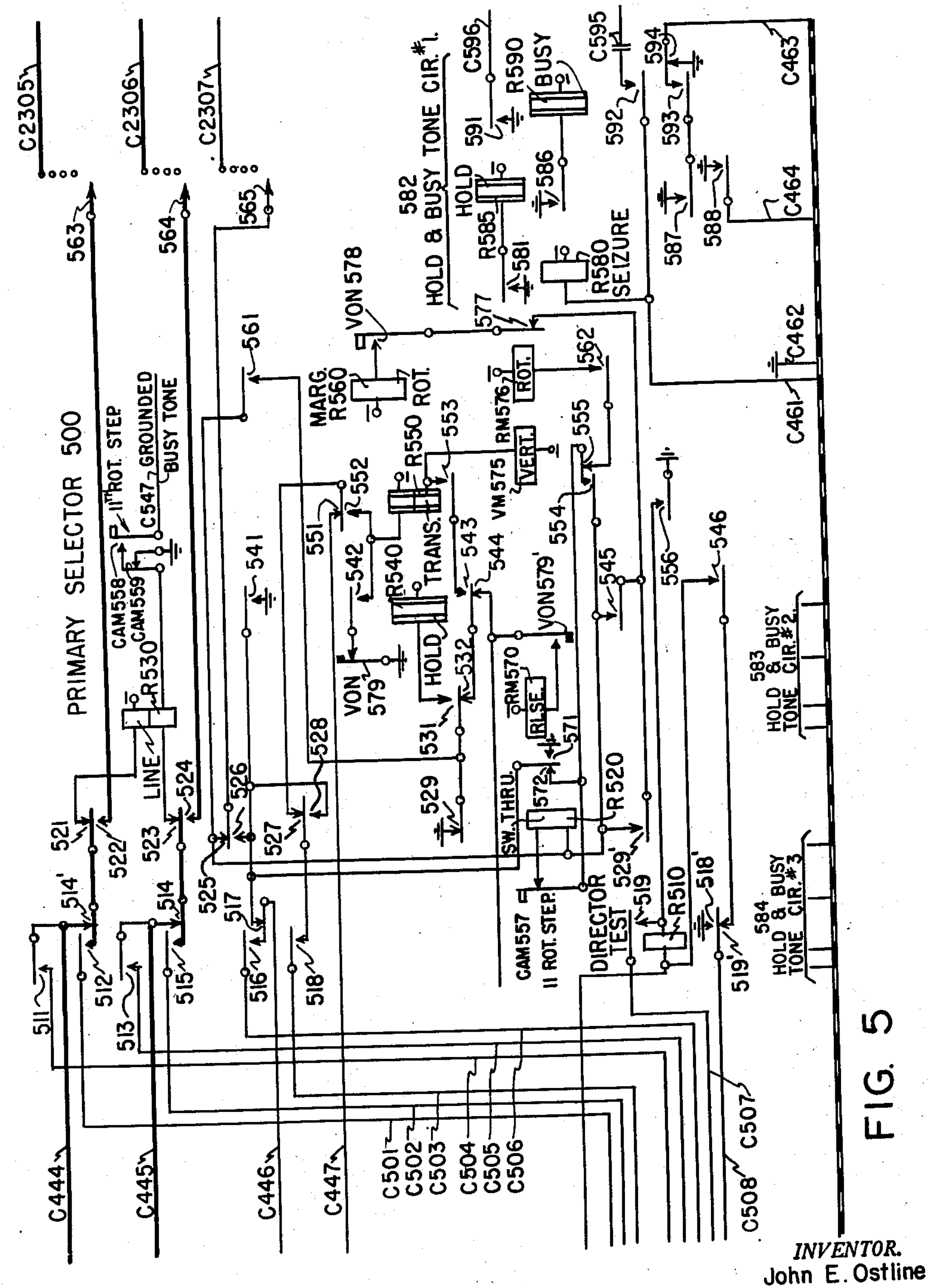
Figure 9:
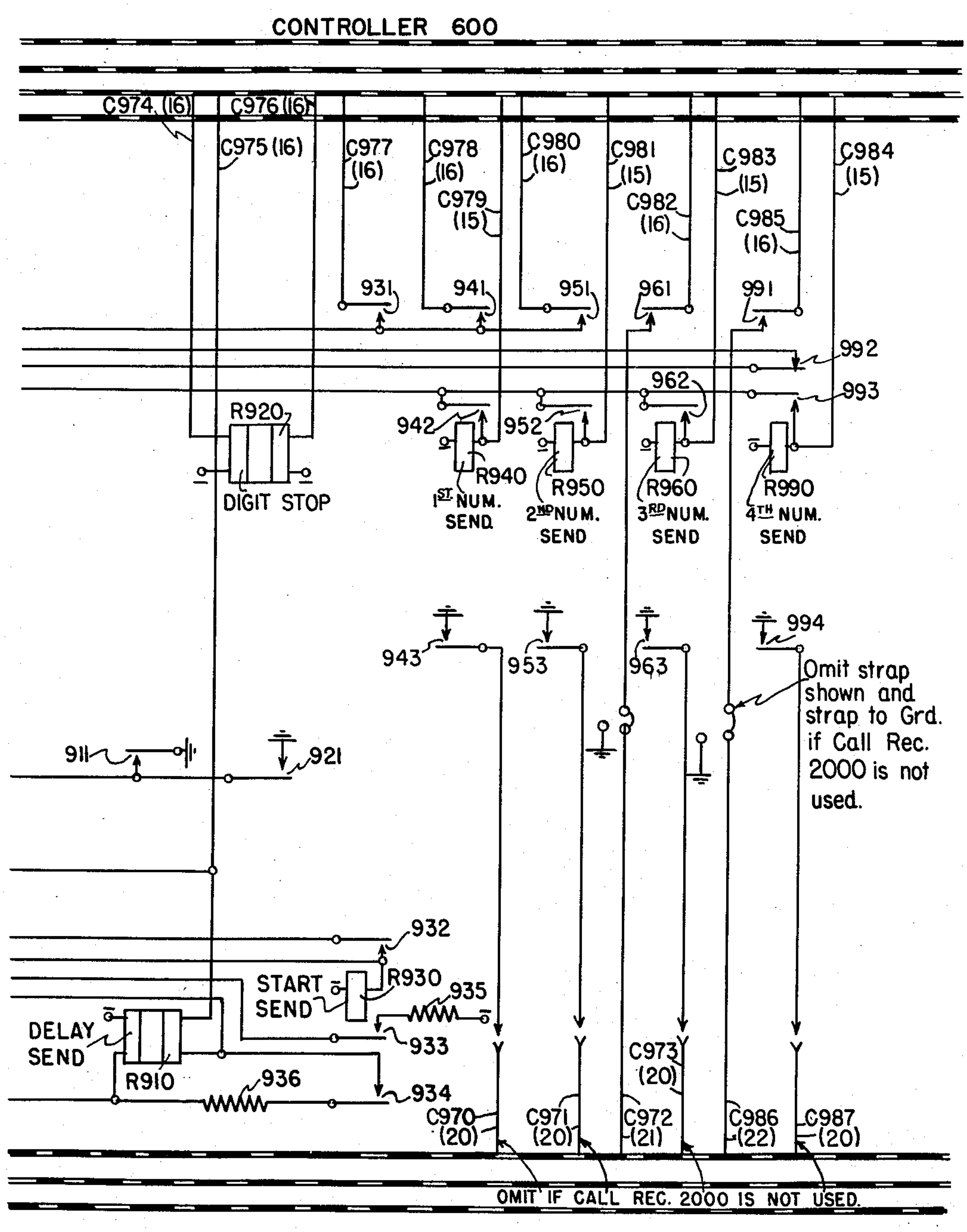
Figure 10:
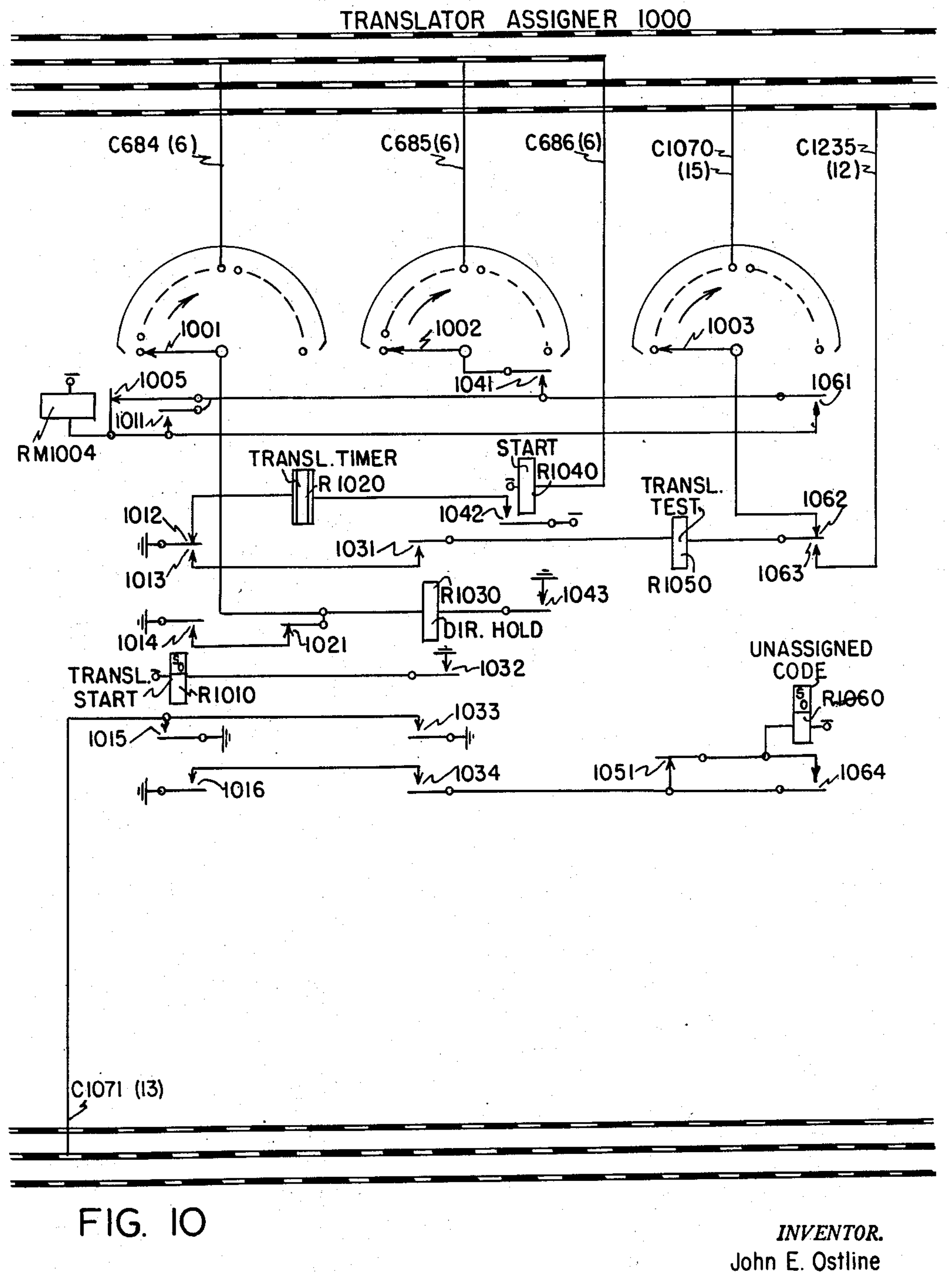
Figure 11:
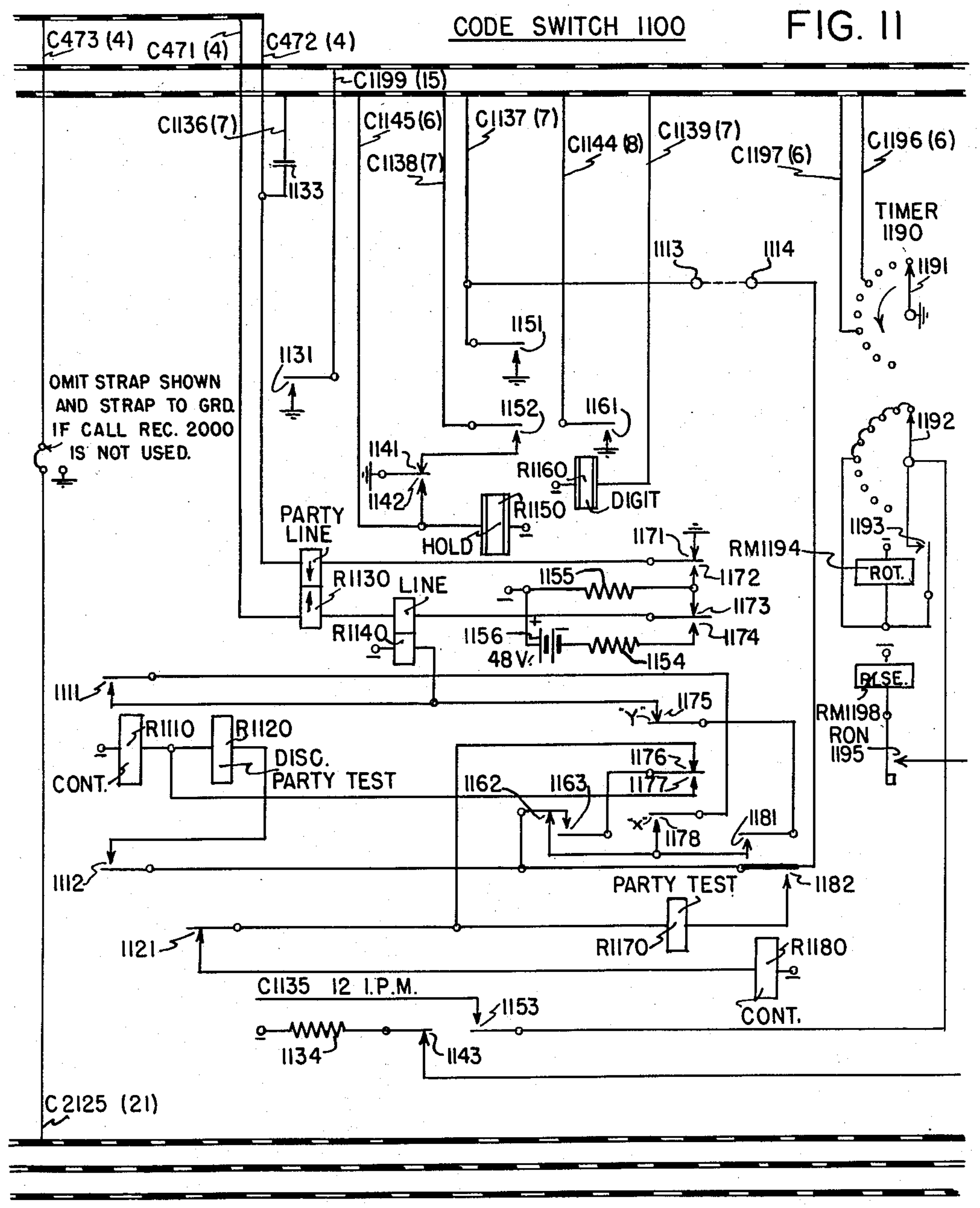
Figure 12:
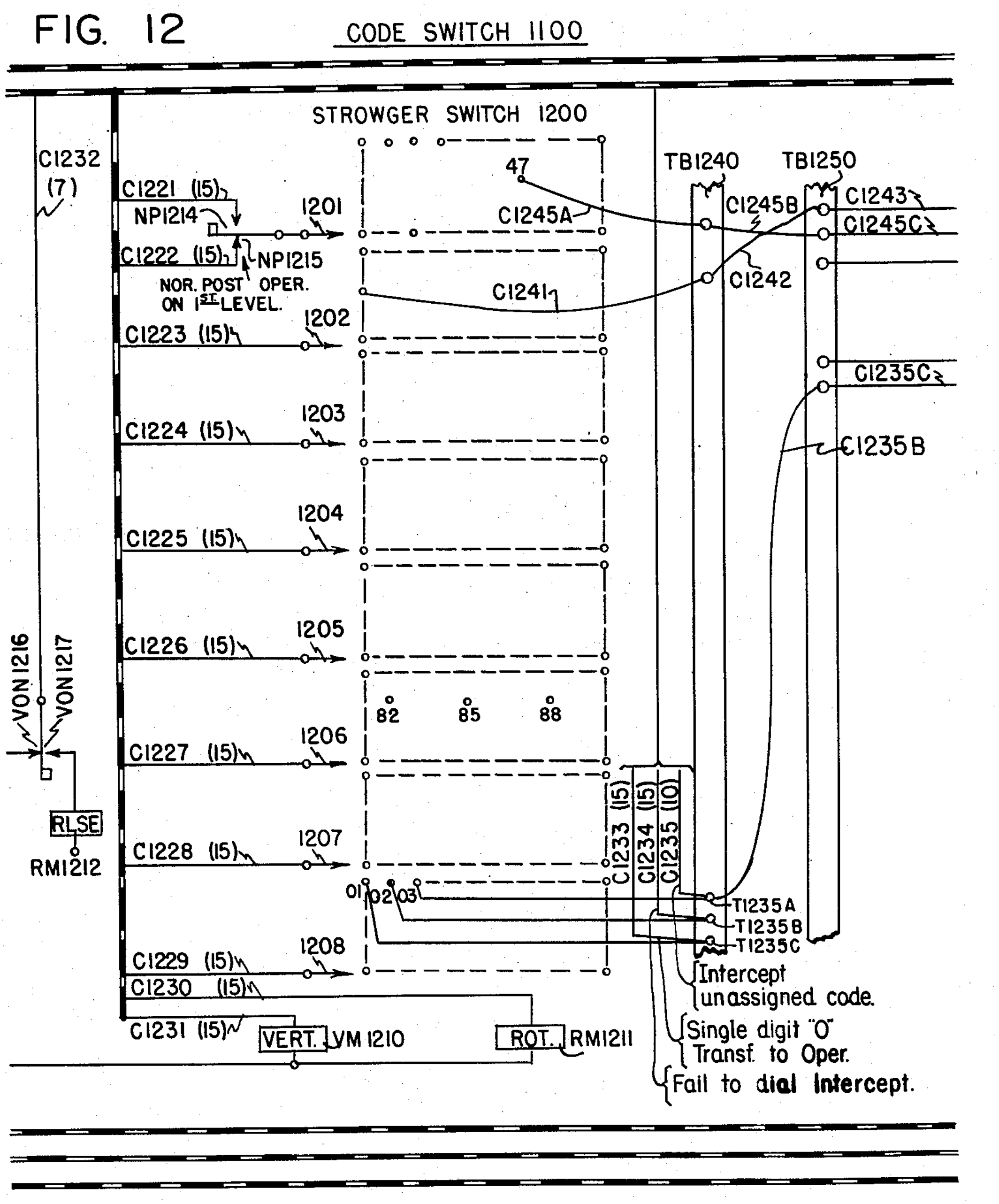
Figure 13:
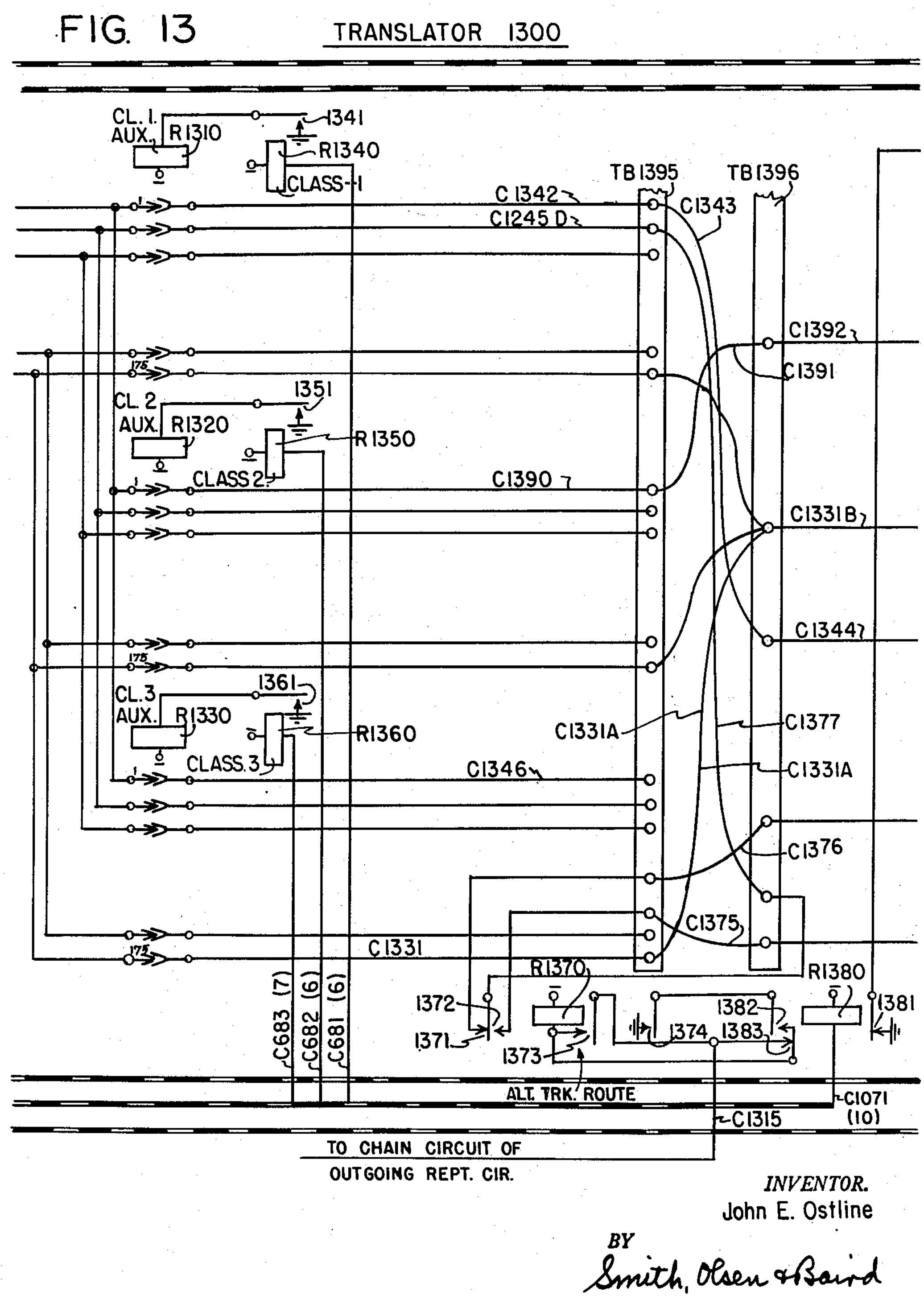
Figure 14:
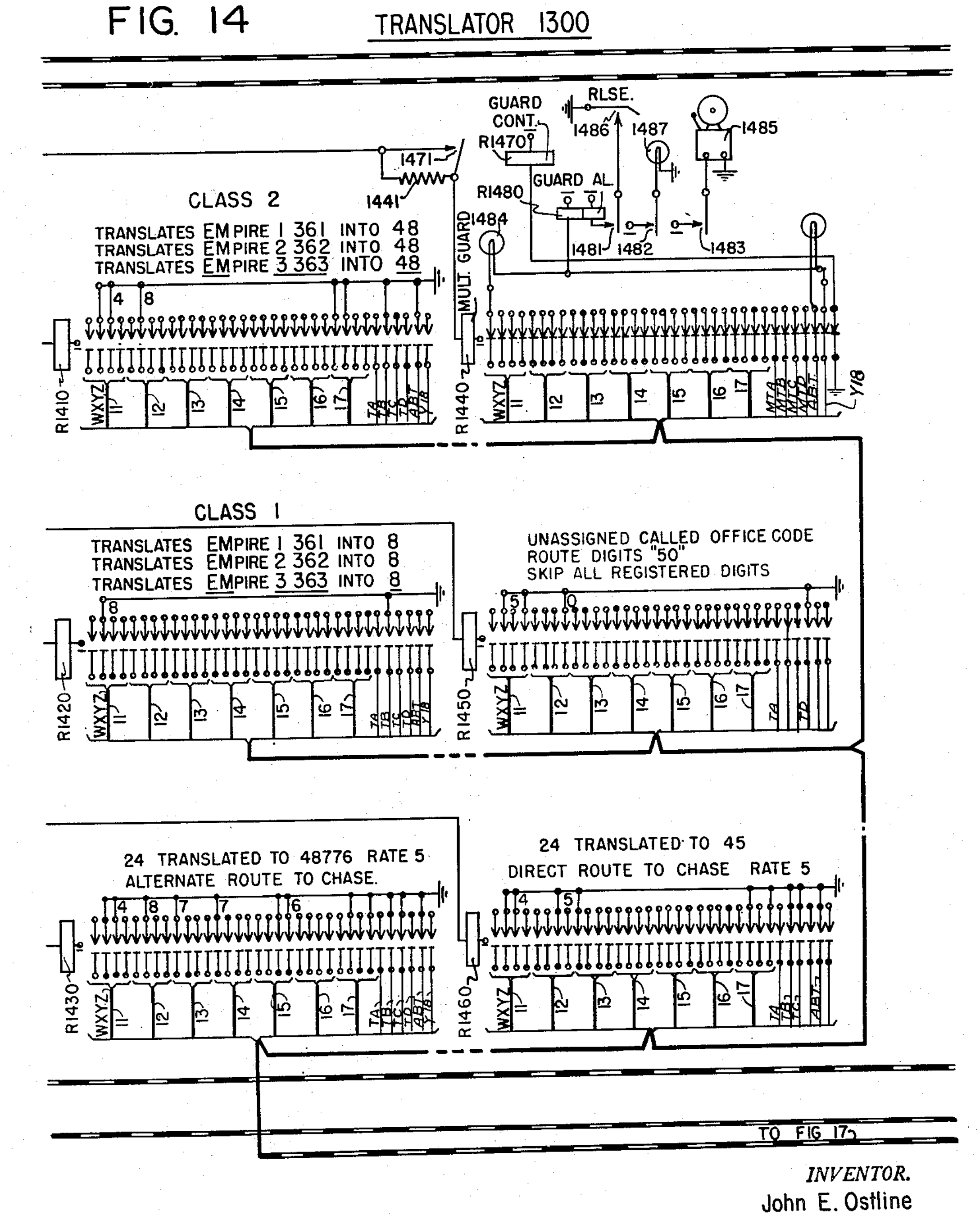
Figure 15:
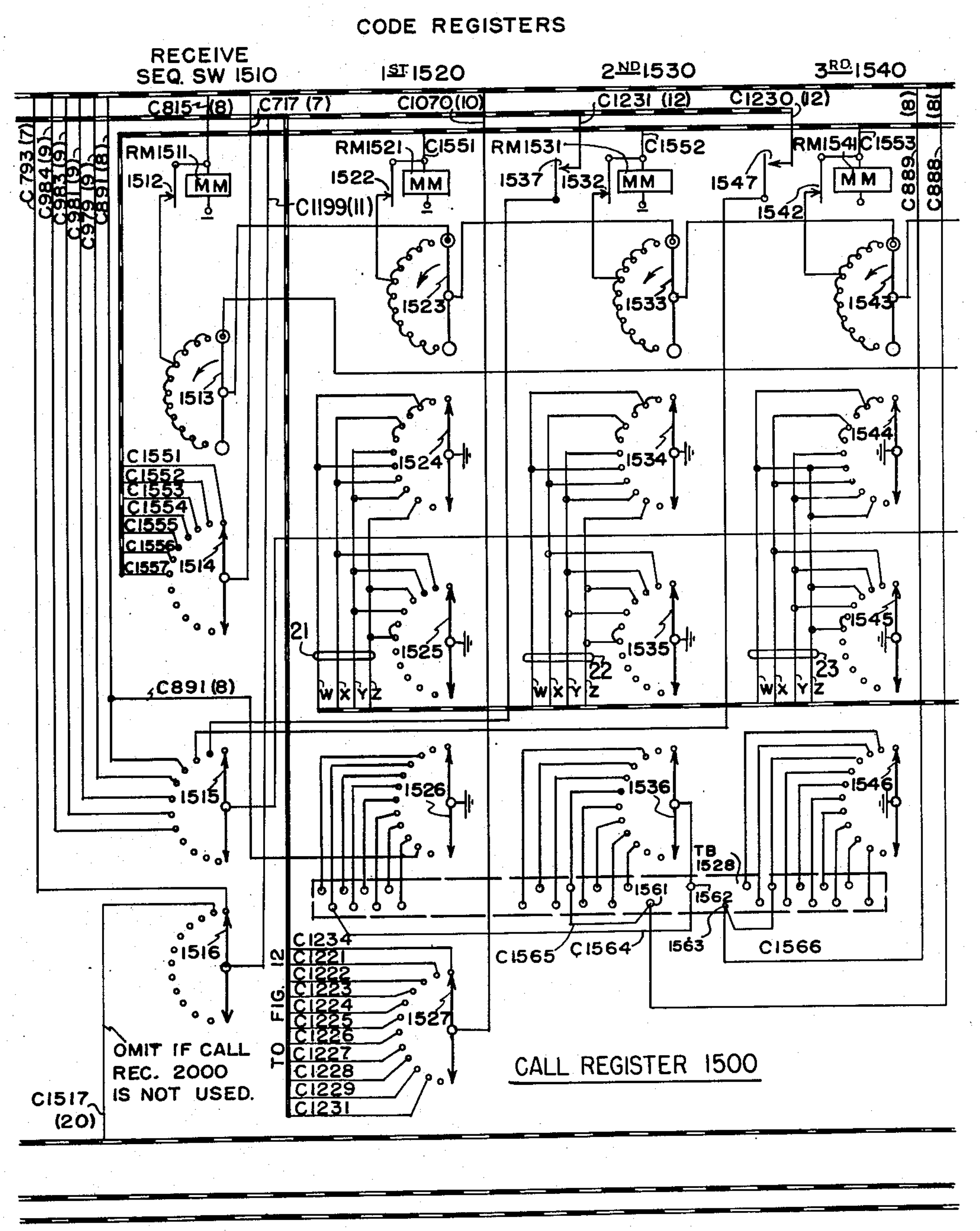
Figure 16:
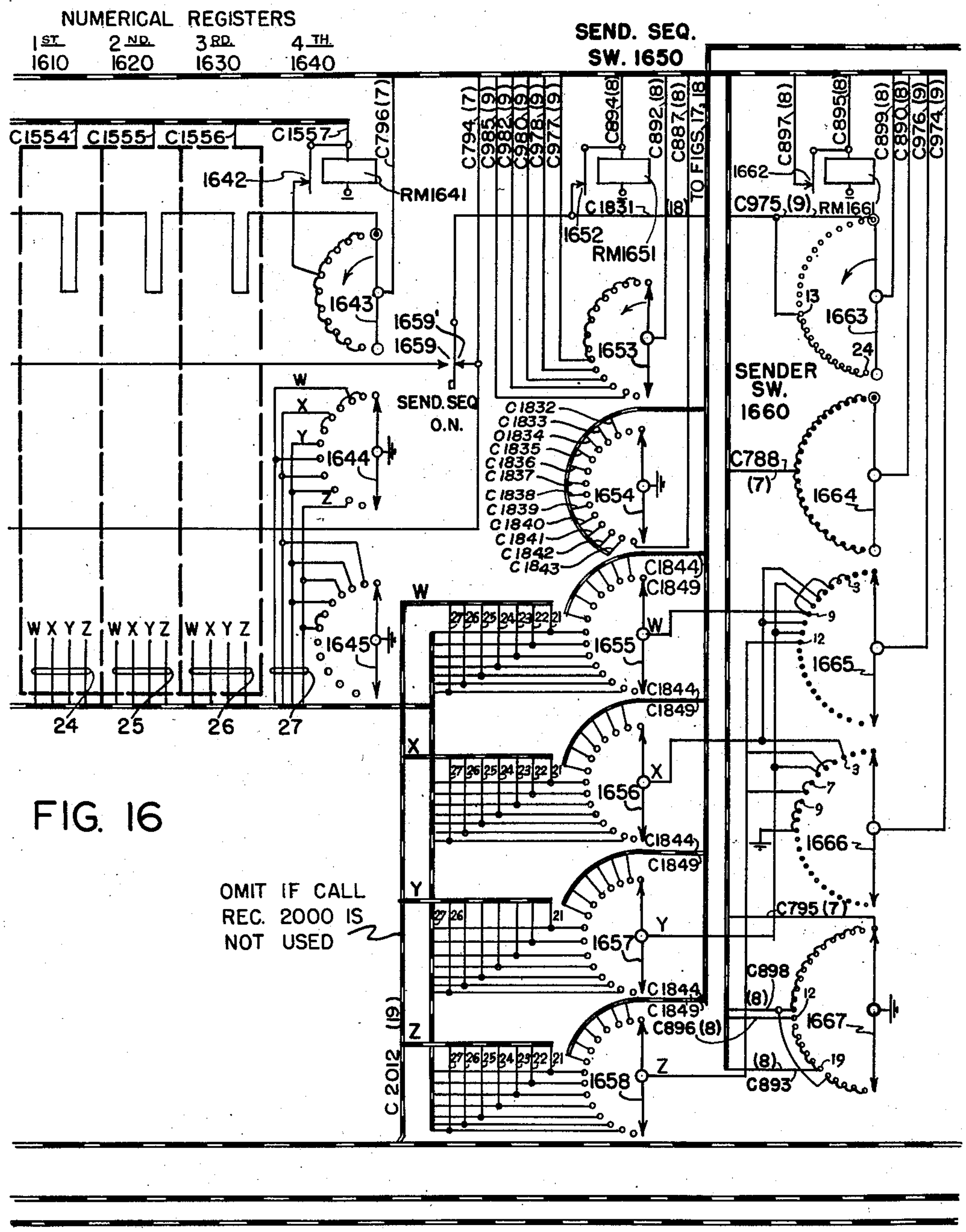
Figure 27:
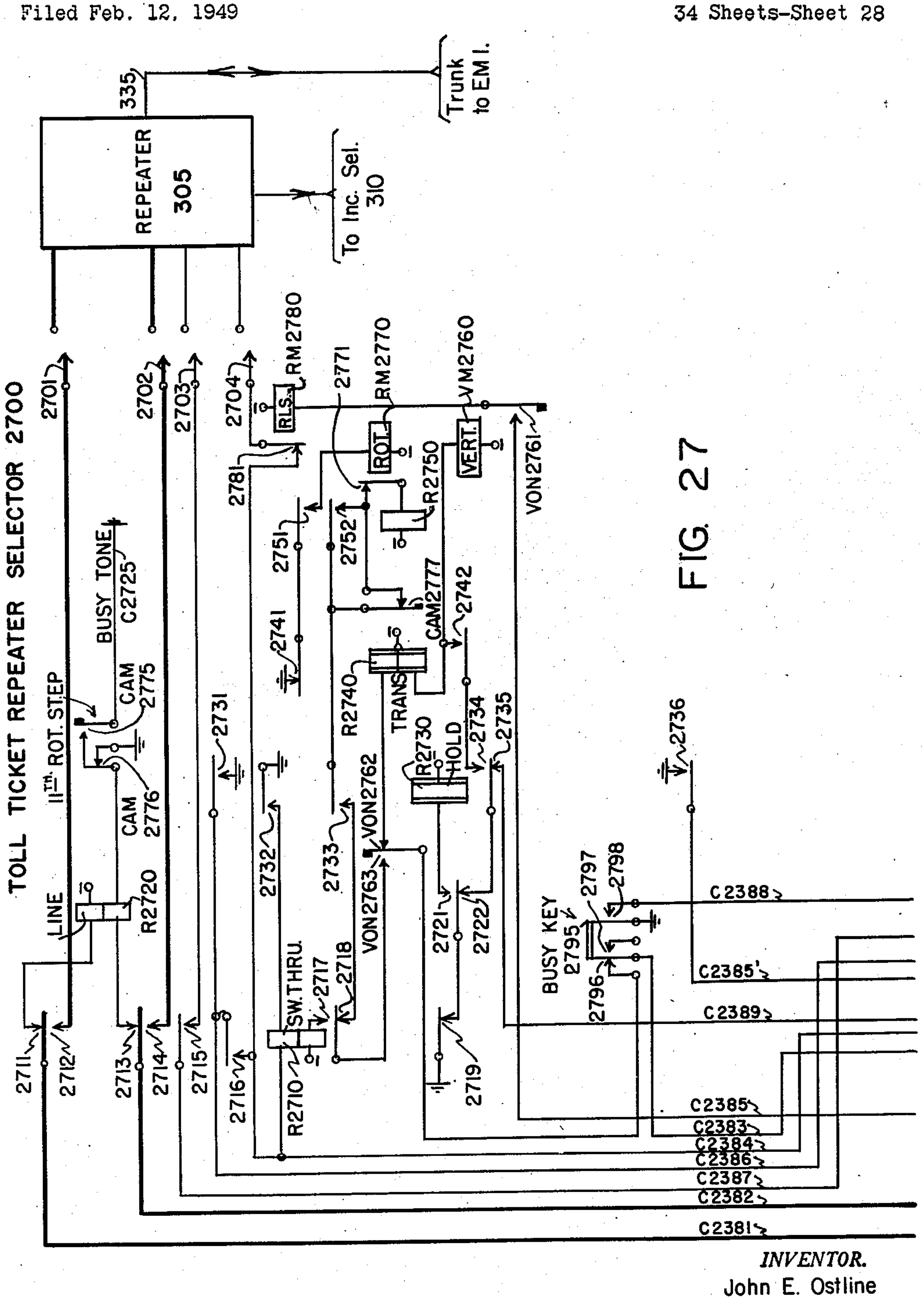

More particularly, Figs. 4 and 5, taken together, illustrate a calling subscriber substation 401, a line circuit 495, a line finder 440, a distributor 442, a primary selector 500 and a director hunter 450. The above apparatus, except the line finder 440 and the distributor 442, are shown in detail and for the details of the line finder and distributor reference may be had to Saunders Patent No. 1,849,694, granted March 15, 1932. Figs. 6 to 9, 11, 12 and 15 to 18 illustrate the details of one of the directors provided in the FLorida 3 exchange. The individual units of a director are as follows: Figs. 6 to 9, inclusive, disclose the details of the controller 600 portion of the director and it is used primarily for controlling the operation of the various units of apparatus comprising the director including the transmission of switch setting impulses; Figs. 11 and 12 disclose the details of the code switch 1100 portion of the director which is employed primarily to receive the digits dialed by a calling subscriber and to selectively control the operation of the exchange translator for the purpose of determining the routing digits to be employed by the director in setting up the connection; Figs. 15 and 16 disclose the details of the call register 1500 portion of the director which is used primarily for registering the digits of the called subscriber directory number as dialed by the calling subscriber and to determine the order in which the routing digits and the registered dialed digits are to be transmitted by the director; and Figs. 17 and 18 disclose the details of the coder 1800 portion of the director which is used primarily to receive and register the routing digits determined by the translator, to register the rate of the call, and to register the various control operations to be performed by the director as determined by the translator. Fig. 10 discloses the details of the translator assigner 1000 which is used primarily to associate the exchange translator with a calling one of a plurality of directors and for limiting the time that the translator is associated with any calling director. Figs. 13 and 14 disclose the details of the exchange translator 1300 which is common to all of the directors provided in the FLorida 3 exchange and which is temporarily associated with a calling director to register, in the coder 1800 portion of the director, the routing digits, the rate applicable to the call, and certain controls, and to call in a call recorder, all in accordance with the code of the called exchange and the class of the calling line. The translator 1300 is provided with as many translator relays as there are trunking points to which calls may be extended from the FLorida 3 exchange and each of the translator relays is permanently wired in accordance with one or more routing digits necessary to route a call from the FLorida 3 exchange to a particular one of the trunking points. Furthermore, alternate trunk route facilities are provided between the Florida 3 exchange and certain of the trunking points and in order to route calls over such alternate trunk routes, additional translator relays are provided which will be automatically selected in the event that all of the direct trunks to the called trunking points are busy. Fig. 19 schematically illustrates the detector 1900 which corresponds to the detector illustrated in detail in Figs. 29 to 38, inclusive, of the Ostline application, Serial No. 453,799, filed August 6, 1942, now Patent No. 2,586,704, granted February 19, 1952. Figs. 19 to 22, inclusive, illustrate, the details of the call recorder 2000 provided in the FLorida 3 exchange which is called into use and associated with the director only in the event that the translator has determined that a record is to be produced of a call. Figs. 23 to 26, inclusive, illustrate the details of the toll ticket repeater 2300 provided in the FLorida 3 exchange and which is utilized to time a call and to temporarily store various items of record information pertaining to a telephone connection which are to be recorded upon the termination of the connection. Fig. 27 illustrates the details of the toll ticket repeater selector 2700 which is individual to the toll ticket repeater 2300 and which is utilized to extend a ticketed call from the FLorida 3 exchange to other exchanges in the telephone network. Figs. 28 to 31, inclusive, disclose the details of the tabulator allotter 2801 and the tabulator 2800. The tabulator allotter 2801 functions to associate a tabulator, such as the tabulator 2800, with a toll ticketing repeater, such as the toll ticket repeater 2300, whereby the repeater will transfer to the tabulator all of the items of information pertaining to a telephone connection which are to be recorded. The tabulator 2800 is provided with facilities for registering the various items of information transmitted thereto and to control a record tape punch mechanism 2967 and a ticket tape punch mechanism 2968 thereby to produce two perforated tapes, each containing a record of certain of the items of information pertaining to a telephone connection.

*The general arrangement of the telephone system*

Referring now more particularly to Fig. 1 of the drawings, it will be observed that the automatic telephone system serves a large metropolitan area and the adjacent suburban areas which are divided into a number of zones, each of which includes one or more exchanges. More specifically, the area served by the telephone system comprises zones 24, 35, 36 and 78; the zone 24 includes the single CHase exchange; the zone 35 includes the FLorida 1, FLorida 2 and FLorida 3 exchanges; the zone 36 includes the EMpire 1, EMpire 2 and EMpire 3 exchanges; and the zone 78 includes the STate 8, SUperior 5 and RUgby 2 exchanges. It should be noted that in some of the zones including three exchanges, the exchanges may be housed in the same building and they may each serve 10,000 line terminals. For example, in zone 35 the FLorida 1, FLorida 2 and FLorida 3 exchanges may be housed in the same building and this same arrangement may be employed in the exchange building housing the EMpire 1, EMpire 2 and EMpire 3 exchanges. Each of the exchanges in zone 78, however, will be housed in separate buildings serving different portions of the area included in zone 78. Each exchange in each of the zones comprises a 10,000 line unit although the ultimate capacity of 10,000 lines may not be initially installed. The CHase exchange which is initially installed as a 1,000 line unit may at some future date be increased to the ultimate capacity of 10,000 lines. The lines terminating in each exchange in each zone comprise private subscriber lines, party subscriber lines and paystation lines; the private subscriber lines including regular local subscriber lines, and extended service subscriber lines. The party subscriber lines are of the four-party type and may be arranged for local service and are wired on a terminal-per-station basis so that each of the substations on the party line have different directory numbers.

The various exchanges in each zone are interconnected by suitable groups of trunk lines and at least one exchange in each zone is interconnected with at least certain of the exchanges in the other zones by suitable groups of toll lines as is clearly indicated.

In the automatic telephone the various local, trunk and toll calls are set up by automatic switching apparatus under the control of the subscriber substation equipment including the usual calling device or dial. In order to facilitate the setting up of various connections, a universal numbering scheme is utilized in the automatic telephone system whereby all called subscriber substations in the various exchanges, except the CHase exchange, are dialed in accordance with a seven-digit directory number comprising two digits corresponding to the first two letters of the exchange name, a third digit corresponding to the numerical identification of the exchange and a four-digit number corresponding to the numerical portion of the directory number. In the CHase exchange the subscriber directory numbers are six digits comprising two-digits corresponding to the first two letters of the exchange name and a four-digit number corresponding to the numerical portion of the directory number. Accordingly, the directory number of each subscriber substation in the telephone system comprises a code portion, including either two or three digits, and a numerical portion including four digits. In view of the above, it will be understood that the directory numbers of all of the subscriber stations in the telephone system are provided on a universal seven-digit numbering scheme except for the CHase exchange which is based on a six-digit numbering scheme. It should be understood, however, that the CHase exchange numbering scheme may be increased to the universal seven-digit system when an additional exchange is required in the zone 24.

At this point it may be well to note that each of the subscriber dials are arranged in the usual manner in accordance with ten finger holes corresponding to the digits "1" to "9" and "0" and that each of the digits have corresponding letters which may be dialed in accordance with the first two letters of the called exchange name. The ten digits of the dial and the corresponding letters applicable to each of the digits are as follows:

| Digits | Letters |
|---|---|
| 1 | |
| 2 | ABC |
| 3 | DEF |
| 4 | GHI |
| 5 | JKL |
| 6 | MNO |
| 7 | PRS |
| 8 | TUV |
| 9 | WXY |
| 0 | Z (operator) |

*The apparatus incorporated in the FLorida 3 exchange*

Preferably, each exchange of the telephone system comprises apparatus substantially identical to that provided in the FLorida 3 exchange which apparatus, as best shown in Fig. 3A, includes automatic switching apparatus, serving a maximum of 10,000 terminals, three of the terminals respectively terminating the private subscriber lines TX3 and TR3, the paystation line TP3 and the terminals commonly terminating the party subscriber line serving the substations TS1-3, TS2-3, TS3-3 and TS4-3. The switching equipment comprises a number of line circuits individually associated with the above identified subscriber lines terminating in the FLorida 3 exchange, the line circuits 405A, 405B, 405C and 405D being respectively associated with the above-named subscriber substations as is illustrated. At this point it is noted that the private subscriber substation TX3 is rendered extended service facilities and is, therefore, of the class 1 type. The private subscriber substation TR3 is rendered free local service and is of the class 2 type. The substation TP3 is a paystation and is of the class 3 type which is denied toll service. The four-party line subscriber substations are of the class 2 type.

More particularly, the ordinary private subscriber substations TR3 of the class 2 type and the party subscriber substations of the class 2 type are rendered free automatic local service to all subscriber substations terminating in the FLorida 1, FLorida 2 and FLorida 3 exchanges in zone 35. These subscriber substations are also rendered automatic toll service to all of the other exchanges in the various zones in the metropolitan area for which charges are automatically established by the toll ticketing apparatus and they are render long distance toll service, in the conventional manner, under control of a manual toll operator position. The extended service subscriber substation TX3 of the class 1 type are rendered free automatic local service, free automatic toll service to certain exchanges in adjacent zones in the metropolitan area, automatic toll service to other exchanges in the various zones in the metropolitan area for which charges are automatically made by means of the toll ticketing apparatus, and they are rendered long distance toll service via a manual toll operator position. Finally, the paystation subscriber substation TP3 of the class 3 type are rendered automatic local service provided the necessary coin has been deposited in the paystation telephone instrument, toll service to exchanges in the metropolitan area via a manual operator position, and long distance toll service via a manual toll operator position.

The various line circuits individual to the above-mentioned substations may be arranged in a common group and each line circuit may be individually strapped to provide the specific class of service of the associated subscriber substation. The switching equipment in the telephone exchange also includes a line finder 440A and the distributor 442A, schematically illustrated, and a group of primary selectors, including the primary selector 500A. As illustrated in the drawings, the primary selector 500A may be utilized by any one of the subscriber lines regardless of its class of service. It should be understood, however, that the class of service of a calling subscriber which is shown individual to the line circuit may be provided in the primary selector thereby eliminating the fourth conductor interconnecting the individual line circuit and the primary selector through the medium of the associated line finder. In the event the class of service is to be determined by the strapping of the primary selector instead of the line circuit then it will be necessary to divide the subscriber lines into three different groups and provide three different groups of primary selectors, each selector being individually wired in accordance with the service supplied to the subscribers included in the group of lines having access thereto. In the present disclosure, however, it will be assumed that the class of service is individually indicated by the strapping of the line circuit individual to the subscriber substation and that each of the primary selectors, such as the selector 500A, is individually associated with a line finder, such as the line finder 440A having access to the subscriber line circuits.

Further, the FLorida 3 exchange is provided with a group of directors, including the director 300A, which are accessible to the various primary selectors by means of a director hunter, such as the director hunter 450A, which is individual to the primary selector 500A. Each of the directors, such as the director 300A, comprises a controller 600, a code switch 1100, a call register 1500, and a coder 1800, and each of the above-named portions of the director function to provide all the operating facilities of the director.

Also, the FLorida 3 exchange is provided with a translator 1300A which may be associated with any calling director under control of the translator assigner 1000A for the purpose of registering in the director, certain control operations which must be performed by the director depending upon the called office code digits registered therein.

Further, the FLorida 3 exchange is provided with a plurality of call recorders, such as the call recorder 2000A, each of which is individual to its associated director and is called into operation in the event that the call is to be recorded.

Further, the FLorida 3 exchange is provided with a detector 1900A for identifying the directory number of a calling subscriber substation in the event a record is to be made of a call and for registering the identified directory number in the call recorder involved in the connection. Due to the short interval of time that the translator 1300A and the detector 1900A are required for use in a connection, only one of each of said units of equipment is provided to handle all of the toll ticketed calls originating in the FLorida 3 exchange.

Also, the FLorida 3 exchange is provided with a local switch train comprising a number of groups of local selectors, including the selectors 315 and 320, a number of groups of individual connectors, including the connector 325, a number of special service selectors, such as the selector 340, a number of groups of incoming selectors, including the selector 310 and a number of groups of repeaters, including the repeaters 305 and 379. It should be understood that some of the groups of connectors are of the party type and, in the system illustrated, four of such groups respectively terminate the four party subscriber substation lines. A switchboard is also provided in the FLorida 3 exchange which includes toll operator position "0," the long distance operator position "110," the information operator position "113" and an intercepting operator position.

Further, the FLorida 3 exchange is provided with a plurality of groups of toll ticket repeaters, one of the groups including the toll ticket repeater 2300. Each of the toll ticket repeaters is individually associated with a ticket repeater selector, such as the ticket repeater selector 2700, having access to a plurality of trunks or toll lines interconnecting the FLorida 3 exchange and certain other exchanges in the telephone network.

Also, a plurality of tabulators, such as the tabulator 2800, are provided in the FLorida 3 exchange and a tabulator allotter 2801 is provided for the purpose of associating an idle one of the tabulators with a calling one of the toll ticket repeaters, thereby to register various items of record information pertaining to a telephone connection transmitted from the associated toll ticket repeater. Each of the tabulators is individually associated with a record tape punch mechanism, such as the record tape punch mechanism 2967 and a ticket tape punch mechanism, such as the ticket tape punch 2968. The tabulator controls the associated punch mechanisms to produce two perforated tapes containing a record of the various items of record information pertaining to a telephone connection.

Further, the FLorida 3 exchange is provided with a number of groups of ordinary repeaters, one of the groups including the two-way repeater 305 and another of the groups including the one-way repeater 379. These repeaters are accessible to the ticket repeater selectors and to the primary selectors in the FLorida 3 exchange. Each of the repeaters, such as the two-way repeater 305, is individually associated with an incoming selector, such as the incoming selector 310, over which calls from other exchanges in the telephone network may be extended to the subscriber substations in the FLorida 3 exchange.

Each subscriber substation in the FLorida 3 exchange is provided with substation apparatus including a telephone substation instrument, a ringer and a calling device or dial. The calling device disposed at each ordinary private subscriber substation, at each extended service subscriber substation, at each paystation subscriber substation and at each first party subscriber substation are of conventional construction and arrangement; while the calling device disposed at each second, third and fourth party subscriber substation is of the construction and arrangement of that disclosed in the John E. Ostline Patent No. 2,410,520, granted November 5, 1946.

The calling devices respectively disposed at the second party subscriber substation TS2-3, at the third party subscriber substation TS3-3 and at the fourth party subscriber substation TS4-3 are of the special construction and arrangement of that disclosed in the Ostline Patent No. 2,410,520 mentioned above. These calling devices, in addition to a set of impulse springs, include a set of cam springs. In each of these calling devices the set of impulse springs is operated in accordance with the return movement of the associated finger wheel in order to transmit a variable number of series of switch control impulses in accordance with the finger hole selected on the pull of the finger wheel. Each of these calling devices also include a set of cam springs which is operated by an associated cam in accordance with the return movement of the finger wheel in order to transmit a number of substation identifying ground impulses just prior to the restoration of the finger wheel to its normal position. More specifically, when the finger wheel of the calling device at the second party subscriber substation TS2-3 is pulled in accordance with a digit 2 or more, the associated cam operates the set of cam springs to transmit one substation identifying ground impulse over the associated party subscriber line after all of the switch control impulses have been transmitted. Similarly, when the finger wheel of the calling device at the third party subscriber substation TS3-3 is pulled in accordance with a digit 2 or more, the associated cam operates the set of cam springs to transmit two substation identifying ground impulses over the associated party subscriber line after all of the switch control impulses have been transmitted. Finally, when the finger wheel of the calling device at the fourth party subscriber substation TS4-3 is pulled in accordance with a digit 2 or more, the associated cam operates the set of cam springs to transmit three substation identifying ground impulses over the associated party subscriber line during the last portion of the return of the finger wheel to normal. In the last-mentioned case the first of the series of three ground impulses is transmitted just prior to the transmission of the last switch control impulse and the remaining two ground impulses are transmitted after the transmission of the last switch control impulse.

It should be noted that in the present telephone system code storage registering apparatus and code marking conductors are employed for the purpose of registering various digits and for transferring such registered digits from one unit of equipment to another. The combinational code employed is generally referred to as a WXYZ code and is of the type wherein any digit from 1 to 9, inclusive, and 0 may be registered and transmitted by operating any one or any two of four WXYZ register relays or by marking any one or any two of four WXYZ marking conductors in accordance with the following code:

| Digit | Code |
|---|---|
| 1 | WX |
| 2 | WY |
| 3 | WZ |
| 4 | XY |
| 5 | XZ |
| 6 | YZ |
| 7 | W |
| 8 | X |
| 9 | Y |
| 0 | Z |

*The selection of an idle primary selector and an idle director*

Referring to Fig. 4 of the drawings, it will be seen that the substation 401 is connected by way of the line conductors 402 and 403 to the line circuit 405. The line circuit 405 is accessible to the line finder 440, which is schematically illustrated by means of a block diagram, and the line finder 440 is individually associated with the primary selector 500 (Fig. 5) over the conductors C444, C445, C446 and C447. The distributor 442, associated with the line finder 440, is utilized to assign each line finder, for use by a calling subscriber.

More specifically, when the subscriber at substation 401 initiates a call by removing the receiver of the telephone instrument from the associated switch hook, a loop circuit is completed at the substation instrument for operating the line relay R420 in the line circuit 405. This circuit may be traced from ground by way of the contacts 412, the line conductor 403, the telephone instrument at substation 401 and then by way of the conductor 402, the contacts 413, and the winding of the line relay R420, to battery. The line relay R420, upon operating, at its contacts 421, applies ground potential to the C conductor included in the cable 404, thereby to mark the calling subscriber line busy in the banks of the connectors having access thereto. At contacts 423, the relay R420 prepares a circuit for the cut-off relay R410 and at its contacts 424 it completes a circuit by way of the resistor 448 and the conductor C443 for initiating the operation of the distributor 442. The operation of the distributor 442, the rotary distributor switch 441, and the line finder 440 is well-known and need not be described in detail. It should be understood that the operation of the distributor 442, the rotary switch 441 and the line finder 440 is described in detail in the Saunders Patent 1,849,694, filed March 15, 1932. Briefly stated, the distributor 442 will select an idle line finder, such as the line finder 440, for use and it will cause the selected line finder 440 to operate its associated wipers 434 to 438, inclusive, step-by-step in a vertical direction until the vertical wiper 438 encounters the grounded conductor C433. When this occurs, the line finder is controlled to rotate the wipers 434 to 437, inclusive, over the contacts in the selected level of the bank until wiper 436 encounters the bank contact terminating the conductor C431. The conductor C431 has battery potential applied thereto by way of the winding of the cut-off relay R410 and the contacts 423. The battery potential, when found by the wiper 436, causes the line finder to terminate the rotary stepping action of the wipers 434 to 437, inclusive, with the wipers in engagement with the contacts terminating the conductors C429 to C432, inclusive. Furthermore, the line finder 440 applies ground potential to the wiper 436 and causes the cut-off relay R410 to operate and lock itself, by way of the contacts 411, to the grounded conductor C431. As a further result of the operation of the cut-off relay R410, at its contacts 412 and 413, it disconnects the previously traced loop circuit from the circuit of the line relay R420 which now restores to normal. Upon restoring, the relay R420, at its contacts 421 and 422 transfers the C conductor in the cable 404 to the grounded conductor C431. Finally, at its contacts 423, the line relay R420 opens a point in the energizing circuit for the cut-off relay R410 and, at its contacts 424, it disconnects the starting ground from the distributor 442. The latter operation enables the distributor to be utilized in distributing additional line finders, such as the line finder 440, for use in other calls.

As a further result of the line finder positioning its wipers 434 to 437, inclusive, into engagement with the bank contacts terminating conductors C429 to C432, inclusive, the calling subscriber line conductors 402 and 403 are connected by way of the conductors C429 and C430, the wipers 434 and 435, through the line finder 440, to the conductors C444 and C445 of the associated primary selector 500. As a result of the above mentioned operation of the line finder 440, the line relay R530 in the primary selector 500 is operated over a circuit which may be traced from ground by way of the 11th rotary step cam contacts CAM559, the lower winding of the line relay R530, the contacts 523 and 514, the conductor C445 and then over the previously traced circuit, including the line finder 440, and returning by way of the conductor C444, the contacts 514 and 521 and the upper winding of the line relay R530, to battery. The line relay R530 operates and, at its contacts 531, it completes a circuit for operating the hold relay R540 from ground at contacts 529. The hold relay R540, upon operating, at its contacts 541, returns ground potential by way of the contacts 517 and the conductor C446 in order to retain the line finder 440 in its operated position and also returns ground potential by way of the wiper 436, the conductor C431, the contacts 423, and the winding of the cut-off relay R410 in order to maintain the cut-off relay R410 in its operated position. It should be noted that the ground potential applied to the conductor C431 is also connected by way of the contacts 422 to the C conductor in the cable 404 in order to continue to mark the contact busy in the bank of the connectors having access to the calling subscriber line. Also, at its contacts 546, the hold relay R540 completes a circuit for initiating the hunting operation of the director hunter 450.

The director hunter 450 is provided to search for an idle director and it should be noted that the system, as disclosed, is provided with 22 directors which respectively terminate in the bank contacts 1 to 22, inclusive, associated with the wipers 453 to 460, inclusive. When a director is marked busy, ground potential is applied to the associated contact accessible to the wiper 460.

For the purpose of this description it will be assumed that the director terminating in the first contact is busy and, therefore, ground potential is applied thereto. This ground potential is further extended by way of the wiper 460, the conductor C508, the contacts 519' and 546, the self-interrupting contacts 452, and the winding of the rotary stepping magnet M451, to battery. When the above-mentioned circuit is completed, the magnet M451 operates and interrupts its circuit at the contacts 452, whereupon the magnet restores to normal and in restoring causes the wipers 453 to 460, inclusive, of the director hunter 450 to be advanced one step into engagement with the second contacts in the associated contact banks. If the director terminating in the second set of contacts is also busy, ground potential will again be extended to the winding of the rotary stepping magnet M451 which will re-operate, in the manner previously described, and cause the wipers to be advanced into engagement with the third set of bank contacts.

The magnet M451 will continue to advance the wipers 453 to 460, inclusive, in the manner described above, until the wipers engage the contacts terminating an idle director. Returning now to the operation of the hold relay R540 it will be noted that at the time it closed the contacts 546, in order to initiate the hunting operation of the director hunter 450, it also completed, at its contacts 542, a circuit for the upper winding of the transfer relay R550. This circuit may be traced from ground at the vertical-off-normal contacts VON579, contacts 542 and the upper winding of relay R550, to battery. The transfer relay R550 upon operating, at its contacts 556, applies ground potential to one terminal of the winding of the director test relay R510. The other terminal of the winding of the test relay R510 is connected to battery through the winding of the rotary stepping magnet M451. However, as soon as the ground potential is encountered by the wiper 460 indicating that a busy director is connected, the director test relay R510 is shunted and thus prevented from being operated. However, as soon as the director hunter 450 engages contacts in the banks terminating an idle director, ground potential will no longer be encountered by the wiper R460, thus enabling the director test relay R510 to operate a series with the rotary stepping magnet M451, from ground at contacts 556. The rotary magnet M451, however, will not operate in series with the test relay R510.

Upon operating the test relay R510 interrupts, at its contacts 519′, a point in the previously traced circuit for advancing the wipers 453 to 460, inclusive, and simultaneously therewith, at its contacts 518′, it applies ground potential by way of the conductor C508 to the wiper 460 in order to apply a busy marking ground potential to the bank contact upon which the wiper 460 is standing. This busy marking ground potential will prevent another director hunter switch, such as the director hunter 450, from seizing the director which is now associated with the line of the calling subscriber at substation 401. As a further result of the operation of the test relay R510, at its contacts 519, it completes a locking circuit by way of the conductor C507 and the wiper 459 to ground potential which is now applied to the wiper 459 by the seized director. The manner in which the associated director is seized by the director hunter 450 will be explained hereinafter. At its contacts 514′ and 514, the relay R510 disconnects the calling line circuit, including the conductor C444 and C445, from the line relay R530 and connects these conductors, at contacts 511 and 513, by way of the conductors C504 and C505 and the wiper 456 and 457, to the code switch 1100 included in the associated director. Furthermore, at its contacts 516, it connects the C conductor C446, by way of the conductor C506 and the wiper 458 to the controller 600 included in the associated director. At contacts 518, it prepares a point in the circuit for connecting the EC conductor C447, by way of the conductor C503 and the wiper 455, to the controller 600 included in the director. Finally, at the contacts 512 and 515, the relay R510 connects the circuit including the windings of the line relay R530 by way of the conductors C501 and C502 and the wipers 453 and 454 to the controller 600 included in the director. The purpose of the transfer of circuit of the line relay R530 from the calling subscriber's line to the controller 600 will be apparent from the detailed description of the operation of the director.

As explained above, the operation of the test relay R510 disconnected the line relays R530 from the calling subscriber line and transferred the circuit of the line relay R530 to the controller 600 circuit included in the director. At the time this transfer is made the line relay R530 restores to normal inasmuch as its initial operating circuit has been disconnected. Upon restoring the line relay R530, at its contacts 531, interrupts the previously traced circuit for the hold relay R540 thereby causing the latter relay to slowly restore to normal. Upon restoring to normal, the relay R540, at its contacts 542, interrupts the previously traced energizing circuit for the upper winding of the transfer relay R550 which also slowly restores to normal. As soon as the transfer relay R550 restores to normal, at its contacts 556, it removes ground potential from the multiple circuit which maintains the test relay R510 in its operated position. However, the test relay R510 remains in its operated position over the locking circuit, including the conductor C507, the contacts 519, the winding of the relay R510, the interrupter contacts 452, and the winding of the stepping magnet M451, and battery.

As a result of the foregoing operations the calling subscriber line is now connected through the line circuit 405, the line finder 440, the primary selector 500 and the director hunter 450, to the director that was found to be idle at the time the director hunter 450 searched for an idle director.

*Operation of the director hunter 450 and the primary selector 500 in the event all of the associated directors are busy*

In the foregoing description of operation it was assumed that when the subscriber at substation 401 initiates a call the line circuit 405, the line finder 440, the primary selector 500 and the director hunter 450 operated to associate an idle director, in an available group of 22 directors, with the calling subscriber's line. It should be noted that during the hunting operation of the director hunter 450 contacts 23, 24 and 25 of the bank contacts associated with the wiper 460 are normally grounded when an idle director is available in the group of 22 directors terminating in the contacts 1 to 22, inclusive. Consequently, in the event the wiper 460 is advanced step-by-step beyond contact 22 and an idle director is available in the group of 22 directors, ground potential will be encountered on the contact 23 by the wipers 460 over a circuit including ground, contacts 604 (Fig. 6), conductor C465, contact 23 associated with the wiper 460, conductor C508, contacts 519′, 546 and 452, and the winding of the stepping magnet M451, to battery. The same ground potential will be encountered on contacts 24 and 25 over the circuit including the conductors C466 and C467. Consequently, when the wiper 460 encounters contacts 23, 24 and 25 at a time when an idle director is available, the stepping magnet M451 will cause the wipers 453 to 460, inclusive, to be advanced automatically step-by-step over the contacts 23, 24 and 25 and thus stepping the wipers into engagement with the contact 1. From the above description, it will be understood that the director hunter 450 will step the wipers over the contacts 1 to 22, inclusive, to search for an idle director and it will also automatically step the wipers over the contacts 23 to 25, inclusive, and continue the stepping of the wipers until an idle director is found.

In order to prevent the director hunter 450 from continuously stepping its wipers, in the event all of the 22 directors in the group are busy, three hold and busy tone circuits are provided which terminate respectively on the contacts 23, 24 and 25 associated with the wipers 456 to 459, inclusive. The first hold and busy tone circuit 582 is shown in the lower right hand corner of Fig. 5 and includes the three relays R580, R585 and R590 and four conductors C461 to C464, inclusive. The four conductors mentioned above terminate respectively in contact 23 associated with the wipers 456, 457, 458 and 459. As is indicated above, the wipers just mentioned are automatically advanced over the 23rd contact due to the ground potential applied to the conductor C465 terminating in the 23rd contact accessible to wiper 460. This prevents the director hunter 450 from seizing the hold and busy tone circuit 582.

When a director is in use, the controller portion of the director, such as the controller 600 illustrated in Figs. 6 to 9, inclusive, applies ground potential to the conductor C475 (Fig. 6) due to the operation of the director busy relay R610. The manner in which the director busy relay R610 is operated will be described in connection with the detailed description of the operation of the controller 600. It should be noted, however, that the contacts 612 of the operated director busy relay R610 will complete an obvious circuit for the director busy relay R606. The relay R606 upon operating, at its contacts 607, removes ground potential from the holding circuit for the operated all-director busy relay R601. Each of the 22 directors terminating in the bank contacts accessible to the director hunter 450 is provided with a director busy relay, such as the director busy relay R606. The contacts corresponding to the contacts 607 of the 22 directors are connected through the jumper terminals of the terminal block TB605A and TB605B to the winding of the all-director busy relay R601. From the foregoing it will be understood that as each director becomes busy it removes a further point in the holding circuit for the all-director busy relay R601. When the last director in the group of 22 directors becomes busy, the last holding ground potential is removed from the holding circuit for relay R601. Relay R601 now restores to normal and at its contacts 602, 603 and 604 it removes the busy marking ground potential from the conductors C467, C466 and C465 thereby to render the contacts 23, 24 and 25 accessible to the wipers 456 to 460, inclusive, of the director hunter 450. By providing the all-director busy relay R601 and rendering the contacts 23, 24 and 25 accessible to the director hunter 450 when all the directors are busy, the director hunter will advance its wipers into engagement with the contact 23 in the associated contact bank.

When the wipers 456 to 459, inclusive, engage contact 23, the hold and busy tone circuit 582 is seized. The first operation that occurs is that the director test relay R510 is operated over the previously traced circuit to prevent further operation of the stepping magnet M451. Upon operating, the relay R510, at its contacts 511 to 518, inclusive, provides circuits for transferring the calling line conductors from the primary selector 500 to the wipers of the director hunter 450. At its contacts 519, the director test relay R510 a locking circuit for itself which includes the conductor C507 and the wiper 459, and at its contacts 518' it applies ground potential by way of the conductor C503 and the wiper 460 to the contact 23 in order to mark the contact 23 busy in the banks of all of the other director hunters, such as the director hunter 450, having access to the hold and busy tone circuit 582.

When the wipers 456 and 457 engage the conductors C461 and C462 terminating in the contacts 23 of the associated contact bank, a circuit is completed for energizing the seizure relay R580 of the hold and busy tone circuit 582. This circuit may be traced from ground by way of the conductor C462, the contact 23 engaged by the wiper 457, the contacts 513, the conductor C445 and then through the line finder 440, the wiper 435, the conductor C430, the line conductor 403, the loop circuit including the calling subscriber substation 401, the line conductor 402, the conductor C429, the wiper 434 and then through the line finder 440, the conductor C444, the contacts 511, the conductor C504, the wiper 456 and the engaged contact 23, the conductor C461 and the winding of the seizure relay R580, to battery. The seizure relay R580 now operates, and at its contact 581, completes a circuit for the slow-to-release hold relay R585 which, upon operating, completes a circuit, at its contacts 586, for operating the slow-to-release busy relay R590 which also operates. In response to the operation of the hold relay R585, at its contacts 588, it applies ground potential to the conductor C464 in order to complete the previously described locking circuit for the director test relay R510. In response to the operation of the busy relay R590, at its contacts 593 and 594, it transfers the holding ground potential for the conductor C463, from the control of busy relay R590 to the control of the hold relay R585. It should be noted that the ground potential applied to the conductor C463 is extended by way of the contact 23 and the engaged wiper 458, the conductor C506, the contacts 516 and the conductor C446 in order to hold the line finder 440 in its operated position, in order to hold the cut-off relay R410 of the line circuit 405 in its operated position, and in order to apply a busy marking ground potential to the C conductor of the cable 404, in order to maintain a busy marking ground potential in the banks of the connectors having access to the calling subscriber line.

As a further result of the operation of the busy relay R590, at its contacts 591, ground potential is applied to the conductor C596 in order to operate an all-director busy meter (not shown). This meter is operated each time the hold and busy tone circuit 582 is seized and thus indicates the number of times a call has been made during a period of time when all of the directors in the group are busy. Finally, the busy relay R590, at its contacts 592, connects the conductor C595 to the calling subscriber line in order to transmit a busy tone signal to the calling subscriber. More specifically, the busy tone conductor C595 normally has a busy tone signal applied thereto and when the contacts 592 are closed the busy tone signal is transmitted, via the conductor C461 and the previously traced circuit including the calling subscriber substation 401 and returning to the ground potential applied to conductor C462, to the calling subscriber substation in order to indicate to the calling subscriber that the connection should be released and that the call should be attempted at a later time.

When the subscriber replaces his receiver upon the switch-hook of his associated instrument, the previously traced circuit for the seizure relay R580 is interrupted and the relay restores to normal. When the relay R580 restores to normal it interrupts the circuit for the holding relay R585, which also restores to normal, and the latter relay interrupts the circuit for the busy relay R590, which also restores to normal. The restoration of the busy relay R590 interrupts the previously traced circuit for transmitting the busy tone signal to the calling line and it interrupts the circuit for operating the all-director busy meter over the conductor C596. The restoration of the hold relay R585, at its contacts 588, interrupts at a point in the previously described holding circuit for the director test relay R510, which now restores to normal, and causes the release of the primary selector 500, the line finder 440 and the line circuit 405.

In the event that an additional call is made at a time when all the directors are busy and the hold and busy tone circuit 582 is being utilized, it should be understood that such an additional call will cause the director hunter 450 to advance its wipers into engagement with the contacts 24 in the associated contacts banks, and that the contact 23 accessible to the wiper 460 is marked busy by the director test relay included in the primary selector utilized in the call that has been extended to the hold and busy tone circuit 582. Consequently, when the director hunter 450 engages the contacts 24 in the associated contact banks, the circuits are completed for terminating the stepping of the magnet M451 for operating the director test relay R510, and for controlling the operation of the hold and busy tone circuit 583 (not shown) which is identical to the hold and busy tone circuit 582. Also the hold and busy tone circuit 583 will operate in the same manner as the hold and busy tone circuit 582 to transmit a busy tone signal to the calling subscriber and to operate an all-director busy meter to indicate the number of times the second hold and busy tone circuit 583 is seized.

A third hold and busy tone circuit 584 is also provided which terminates in contacts 25 associated with the wipers 456 to 459, inclusive, of the director hunter 450. The hold and busy tone circuit 584 will be seized in the event that the 22 directors of the group are busy and the hold and busy tone circuits 582 and 583 are also utilized by a calling line attempting to establish connections with idle directors. The operation of the equipment in extending a connection from a calling subscriber line to the third hold and busy tone circuit 584 is exactly the same as previously described in connection with the operation of the hold and busy tone circuit 582.

In conclusion, it should be noted that as soon as a director becomes idle, the associated controller, such as the controller 600, will function to cause the reoperation of the director busy relay R601. The relay R601 will again apply ground potential to the conductors C465 to C467, inclusive, and thus mark the contacts 23, 24 and 25, accessible to the wiper 460 of the director hunter 450, busy. This will cause an additional call from a calling subscriber line to operate a director hunter into engagement with the particular director that is again available for a new call.

*Seizure of an idle director*

In the previous description it was pointed out that the director hunter 450 seizes an idle director in response to the initiation of a call by the subscriber at substation 401. For the purpose of this description it will be assumed that the wipers 453 to 460, inclusive, of the director hunter 450 seized the idle director accessible over conductors C468 to C475, inclusive. When the wipers 456 and 457 of the director hunter 450 engage the conductors C471 and C472 the calling subscriber loop circuit is extended to the code switch 1100 (Fig. 11) and then by way of the upper winding of the party line relay R1130, to ground at contacts 1171 and by way of the lower winding of the party line relay R1130, the upper winding of the line relay R1140, the contacts 1173 and the resistor 1155, to battery. The terminal shown to the left of the resistor 1155 is marked with a negative (−) sign to indicate the 48 volt exchange battery. When the above traced circuit is completed, the line relay R1140 operates but the party line relay R1130 does not operate due to the fact that the windings of the relay are differentially wound and oppose each other to prevent operation. Upon operating, the line relay R1140, at its contacts 1142, completes an obvious circuit for operating the hold relay R1150. The relay R1150 upon operating, at its contacts 1151, applies ground potential to the conductor C1137 extending to the controller 600 (Fig. 7) and then through the winding of the seizure relay R750, to battery. The seizure relay R750 in the controller 600 operates and prepares the controller 600 for further operation. Also, at the contacts 1152, the relay R1150 prepares a point in the impulsing circuit, including the conductor C1138 extending to the controller 600 (Fig. 7) and then by way of the contacts 771 to the conductor C1139 extending to the code switch 1100 (Fig. 11), and also to the conductor C717 extending to the call register 1500 (Fig. 15). The pulsing circuit including the conductor C1139 extends by way of the winding of the digit relay R1160 (Fig. 11), to battery and it also extends by way of the conductor C717 to the wiper 1514 of the receiving sequence switch 1510 in the call register 1500. Finally the hold relay R1150, at its contacts 1153, connects the impulse conductor C1135 to the wiper 1192 of the timer 1190. The conductor C1135 is connected to a time pulse generator which transmits 12 grounded impulses per minute to the timer 1190. The operations incident to the stepping of the timer 1190 will be described hereinafter.

Returning now to the controller 600 (Figs. 6–9) it should be noted that when the seizure relay R750 operates, at its contacts 751, it applied a locking ground potential to the conductor C787 extending to the coder 1800 (Fig. 18) and it also applied ground potential to the conductor C788 extending to the call register 1500 (Fig. 16) in order to ground the bank contacts accessible to the wiper 1664 of the sender switch 1600. At its contacts 757, the seizure relay R750 applies ground potential to the conductor C794 extending to the call register 1500 (Fig. 16) in order to prepare the call register 1500 for further operation and it also grounds the conductor C725 extending to the call recorder 2000 (Fig. 22) in order to provide a locking ground for the start relay in the call recorder. At the contacts 755, the relay R750 completes a circuit for holding operated the director test relay in the primary selector 500 (Fig. 5). This circuit may be traced from ground by way of the winding of the hold relay R820, the contacts 782 and 755, the conductor C474 extending to the contact engaged by the wiper 459 of the director hunter 450 (Fig. 4) and then by way of the contacts 519, the winding of the relay R510, the contacts 452 and the winding of the stepping magnet M451, to battery. When the above traced circuit is completed, the hold relay R820 operates, the director test relay R510 is locked in its operated position, and the stepping magnet M451 is prevented from operating. At its contacts 753, the relay R750 completes a circuit, including the resister 615 and the winding of the director busy relay R610, to battery, thus causing the latter relay to operate and mark the director busy in the banks of the director hunters having access thereto. At the contacts 751′ and 752′, the relay R750 interrupts points in the releasing circuits for the director and, at the contacts 753′, it completes a circuit for the left hand winding of the delay send relay R910 in order to bias the winding of the relay for subsequent operation. Finally, at the contacts 759, the relay R750 completes a starting circuit for the pulse generator 700. The pulse generator operates and generates pulses, at the contacts 706, at the rate of approximately ten pulses per second. In this connection it should be noted that the ground potential applied at contacts 759 for starting the operation of the pulse generator 700 is also extended by way of the impulsing contacts 706 to the winding of the pulse relay R880. Consequently, the pulse relay R880 will operate at the rate of ten pulses per second for the purpose to be described hereinafter.

The pulse generator 700 is of the type disclosed and claimed in the copending Ostline application Serial No. 36,371, filed July 1, 1948, now Patent No. 2,492,435, granted December 27, 1949. It should be understood that the armature 702, the serrated permanent magnet 703 and the cam 704 are secured to a common shaft and the armature 702 is rotated in the field created by the field structure 701. The left hand end of the armature spring of the contacts 705 is provided with a permanent magnet and constitutes a pendulum having a natural frequency of vibration that is determined by the mass of the magnet on the left hand end of the armature and the mass and stiffness of the armature itself. Thus the pulse generator 700 constitutes an electric motor which is started when the control circuit is closed, regardless of the position in which the electric motor was previously stopped. The control circuit for the motor is connected and arranged so that the motor will always be stopped in a fixed restarting position. The principal function of the pulse generator 700 is to transmit pulses, at the contacts 706, at the rate of ten pulses per second in order to control the pulsing rate at which the pulse relay R880 operates.

The director busy relay R610, in addition to applying ground potential to the conductor C475 to mark the director busy in the bank contacts of the director hunters, at its contacts 612, completes the previously described operating circuit for the director busy relay R606. Relay R605, upon operating, removes a point in the multiple holding ground circuit for maintaining the all-director busy relay R606 in its operated position.

When the hold relay R820 operated, at its contacts 821, it completed a circuit via the contacts 764 and 734 for operating the class test relay R720. The relay R720 upon operating, at its contacts 722, completes a test circuit for the class 2 test relay R670.

It may be well to mention at this time that the calling subscriber line may be provided with any one of three classes of service. More specifically, the line circuit 405 individual to the calling line is provided with a terminal 428 which may be jumpered to the grounded terminal 425 or the resistance battery terminal 426 or the jumpers may be omitted so that no potential is applied to the terminal 428. The calling line may be classified as a class 1 line arranged for extended service facilities by an absence of any potential on the terminal 428. The call line may, on the other hand, be classified as a class 2 line arranged for local service by jumpering the grounded terminal 425 and the terminal 428. Also, it is possible to classify the calling subscriber line as a class 3 line by jumpering the terminal 426 having the resistance battery potential applied thereto to the terminal 428 to indicate that the class of the calling line is a pay-station line.

With the foregoing three classes of service in mind it will be seen that when the class test relay R720 is operated, a circuit is completed for testing the line circuit 405 to determine whether the calling line is of the class 2 type. The test circuit mentioned may be traced from battery by way of the winding of the class 2 test relay R670, the contacts 722, the conductor C470 extending to the bank contact engaged by the wiper 455 of the director hunter 450 (Fig. 4) and then by way of the conductor C593, contacts 518, 527 and 551, the conductor C447 and then through the line finder 440 to the wiper 437, the conductor C432 and the terminal 428. If the calling line is arranged for class 2 service, direct ground potential will be connected to the terminal 428 by means of a jumper connected to the terminal 425. With the terminals 425 and 428 jumpered in the above described manner the direct ground potential will cause the operation of the class 2 test relay R670 to indicate that the calling line is a class 2 line. The relay R670 upon operating, at its contacts 671, completes a locking circuit for itself by way of the contacts 752. Furthermore, at the contacts 672 and 674, the class 2 test relay R670 prepares points in circuits to be described hereinafter for indicating that the calling line is a class 2 line.

In the event that the calling line is not a class 2 line and no ground potential is applied to terminal 428, the class 2 test relay R670 will remain in its unoperated position at the time it is connected to conductor C470.

As a further result of the operation of the class test relay R720, at its contacts 724, it completes an obvious circuit for operating the slow-to-operate control relay R730. After a slight delay, the relay R730 operates and, at its contacts 734, it interrupts the previously traced circuit for operating the class test relay R720 which now restores to normal. Also at its contacts 732, the relay R730 prepares a point in the test circuit for the class 3 test relay R710. Finally, at its contacts 733, the relay R730 prepares a point in the circuit for the class control relay R760. As a result of the restoration of the relay R720, at its contacts 721, it connects the class test conductor C470 by way of the contacts 721, 732 and 711 to the winding of the class 3 test relay R710 and then to ground at contacts 752. At this time the class 3 test relay is connected via the class test conductor C470 over the previously traced circuit to the terminal 428 in the line circuit 405. If the calling line is a class 3 line, the terminal 428 will be jumpered to the terminal 426 which has battery potential applied thereto through the resistor 427. With the calling line wired as a class 3 line, the class 3 test relay will operate and, at its contacts 711 and 712, it will interrupt its initial operating circuit and complete a locking circuit for itself including the resistor 709, and battery. Consequently, the class 3 test relay R710 will indicate that the calling line is a class 3 line by closing its contacts 713 and 715. It should be noted, however, that in the event that the class 2 test relay R670 is not operated and the class 3 test relay R710 is not operated during the cycle when these relays are successively connected to the class test conductor C470 it will indicate that the class terminal 428 in the line circuit 405 has no potential applied thereto and thus indicate that the calling line is a class 1 line.

As a further result of the operation of the control relay R730, at its contacts 733, it prepares a point in a circuit for operating the class control relay R760. This circuit, however, is not completed until the class test relay R720 restores. When the relay R720 restores, at its contacts 723, it completes a circuit by way of the contacts 733 for operating the class control relay R760. Upon operating relay R760, at its contacts 762, locks itself in its operated position from ground at contacts 752 of the operated seizure relay R750. It should be noted at this time that when the relay R720 restores, to complete the above-mentioned circuit for operating the relay R760, it also interrupts, at its contacts 724, the circuit for the control relay R730 which slowly restores to normal. However, the relay R730 does not restore until after the circuit has been completed for operating and locking the class control relay R760. The remaining contacts on the control relay R730 perform no important function in the operation of the circuit at this time.

As a further result of the operation of relay R760, at its contacts 764, it interrupts a point in the initial operating circuit for the class test relay R720 thus preventing reoperation of the last-mentioned relay. Also, at its contacts 765, the relay R760 completes a circuit for illuminating the particular class indication lamp corresponding to the class of the calling line, it being recalled that if no potential is found on the corresponding terminal 428 in the calling line circuit 405 neither the class 2 test relay R670 nor the class 3 test relay R710 will have been operated. Assuming that the calling line is a class one line and the relays R670 and R710 are in their restored positions, ground potential will then be applied by way of the contacts 765, 714 and 673 for illuminating the class 1 lamp 676. On the other hand, if the class 2 test relay R670 had been operated at this time the ground potential at contacts 765 will be extended by way of the contacts 714 and 672 for illuminating the class 2 lamp 677; a branch of the above described circuit is also extended by way of the conductor C708 to the call recorder portion of the director, provided the system is arranged for toll ticketing facilities. The conductor C708 extends to the call recorder 2000 (Fig. 20) where it terminates in a contact in a bank of the code send switch 1950 accessible to the wiper 1954. The purpose of marking the class 2 in the bank of the code send switch 1950 will be described in connection with the operation of the call recorder 2000.

In the event that the class 3 test relay R710 instead of the class 2 test relay R670 had been operated when the class test was made, then the ground at contacts 765 will be extended by way of the contacts 713 in order to illuminate the class 3 lamp 678. From the foregoing it will be understood that in response to each call extended from a calling subscriber line, a test is made by the controller 600 portion of the director to determine the class of the calling line and to cause the particular class indication lamp to be illuminated corresponding to the class test.

The above described operations all take place prior to the time that the dial tone signal is transmitted to the calling subscriber to indicate that the dialing of the called number may be commenced.

The final control exercised by the class control relay R760 is accomplished, at its contacts 763, which contacts upon closing, extend the dial tone signal applied to the conductor C797, by way of the contacts 624 and 775, the conductor C1136, extending to the code switch 1100 (Fig. 11), and then by way of the condenser 1133 to the calling subscriber line over the previously described loop circuit including the conductors C472 and C471, in the well-known manner.

*Dialing called number*

When the calling subscriber at substation 401 hears the dial tone signal, he may then manipulate the dial at his substation in accordance with the code portion and the numerical portion of the called subscriber number. More specifically, the calling subscriber will dial the first two letters of the desired called exchange and then the numerical digit of the particular called exchange. The two letters and the digit designating the called exchange are normally referred to as the ABC digits of the called office code. The calling subscriber then dials the four numerical digits designating the particular subscriber in the called exchange. From the above, it will be understood that each subscriber number comprises seven digits. In the event the telephone exchange system has a mixed numbering scheme whereby certain exchanges in the system are designated by a two digit code instead of by a three digit code, then the first two digits dialed by the calling subscriber will be the A and B digits designating the exchange name followed by the four digit numerical portion of the called subscriber number. In other words, the called subscriber will be designated by a six digit number instead of by a seven digit number.

For the purpose of this description, however, it will be assumed that the called subscriber is designated by a seven digit number. When the first digit is dialed by the calling subscriber at substation 401, the line relay R1140 in the code switch 1100 (Fig. 11) follows the pulses of the digit in the well-known manner to register in the call register 1500 (Fig. 15) the digit dialed. In response to the first pulse of the first digit dialed, the line relay R1140 restores to normal and, at its contacts 1141, applies a ground potential by way of the contacts 1152 to the conductor C1138 extending to the controller 800 (Fig. 7) and then by way of the contacts 771 to the conductor C1138 extending to the code switch 1100 (Fig. 11) to operate the digit relay R1160. The latter relay upon operating, at its contacts 1161, applies ground potential to the conductor C1144 extending to the controller 600 (Fig. 8) in order to operate the sequence control relay R830. Since the digit relay R1160 is of the slow-to-release type, it remains in its operated position during the time the line relay R1140 is pulsing under control of the calling subscriber dial. In addition to the above described circuit for maintaining the digit relay R1160 operated during the impulsing period of the first digit, the impulsing ground potential applied to the conductor C1138 is extended, by way of the contacts 771 of the controller 600 (Fig. 7), to the conductor C717, extending to the call register 1500 (Fig. 15), and then by way of the wiper 1514 of the receiving sequence switch 1510 and the engaged contact 1 of its associated bank and then by way of the conductor C1551 to the winding of the rotary magnet RM1521 of the first code register 1520, to battery.

In view of the foregoing circuit for controlling the rotary magnet RM1521 and the digit relay R1160, it will be seen that upon each restoration of the line relay R1140 the circuit is completed for the digit relay R1160 whereby the latter relay is operated at the first restoration of relay R1140 and due to its slow-to-release characteristics the relay R1160 is maintained in its operated position until the end of the impulse series constituting the first dial digit, at which time the relay R1160 restores to normal. The magnet RM1521, however, will operate upon each restoration of the line relay R1140 and it will restore to normal upon each energization of the relay R1140. Furthermore, in order to maintain the impulsing circuit over the conductor C1138 in condition to transmit the pulses to the digit relay R1160 and the rotary magnet RM1521, the line relay R1140 recompletes the energizing circuit for the hold relay R1150 in order to maintain the latter relay in its operated position during dialing of each digit. From the foregoing it should be understood that the line relay R1140 intermittently restores and reoperates in response to each impulse transmitted from the calling subscriber dial in order to repeat the impulses constituting a single digit to the magnet RM1521 of the first code register 1520 in the call register 1500.

Each time the line relay R1140 reoperates at the termination of an impulse, it interrupts, at contacts 1141, the previously traced circuit for energizing the magnet RM1521. As a result of each interruption of its circuit, the magnet RM1521 restores and causes the wipers 1523, to 1527, inclusive, to be advanced to the next set of contacts in the associated contact banks. More specifically, the magnet RM1521 will advance the wipers noted above into engagement with the contacts in the associated contact banks corresponding numerically to the number of impulses of the first digits dialed by the calling subscriber.

At the end of the first digit dialed by the calling subscriber, the wipers of the first code register 1520 engage the contacts in the associated contact banks corresponding to the value of the digit dialed by the calling subscriber. More particularly, at this time, the wipers 1524 and 1525 mark the code conductors WXYZ21 terminating in the associated contact banks to register the first digit dialed. The wiper 1526 also marks a particular conductor in its associated contact bank for the purpose of determining whether or not the first digit dialed corresponds to the first digit of the local exchange. The operation of the director in the event a local exchange code is dialed will be described hereinafter. The wiper 1527 of the first code register 1520 will mark one of the conductors in its associated contact banks extending to the code switch 1100 (Fig. 12) in order to select one of the 8 wipers in the associated wiper set individual to the code switch.

Figure 8:
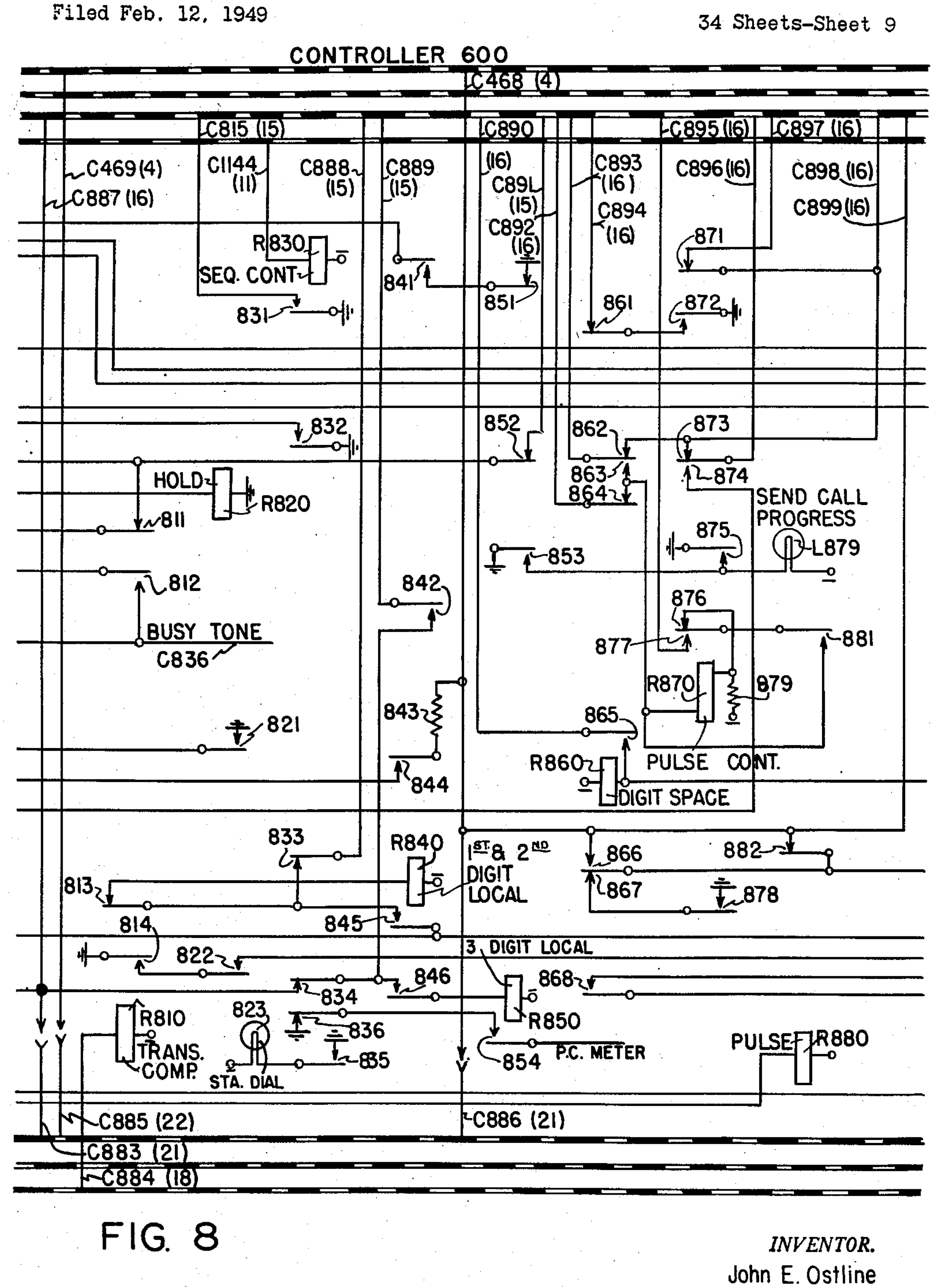

Shortly following the conclusion of the first digit dialed by the calling subscriber, the digit relay R1160 will restore to normal and, at its contacts 1161, it will remove ground potential from the conductor C1144 in order to interrupt the circuit for the sequence control relay R830 (Fig. 8). Before describing the operations which result from the restoration of the sequence control relay R830, it should be noted that when the relay initially operated, at its contacts 831, it completed a circuit by way of the conductor C815 extending to the call register 1500 (Fig. 15) for operating the magnet RM1511 of the receiving sequence switch 1510. The operation of the magnet RM1511 prepares the switch 1510 to step the wipers 1513 to 1516, inclusive, in a counterclockwise direction as soon as the relay R830 restores to normal and interrupts the above described circuit. Consequently, when the relay R830 restores, at the end of the first digit, the rotary magnet RM1511 restores to normal and causes the wipers 1513 to 1516, inclusive, to be advanced into engagement with the second set of contacts in the associated contact banks. This will transfer the impulsing circuit, previously described, from the first code register 1520 to the second code register 1530 so that the second dialed digit will be registered in the second code register. As a further result of the initial operation of the sequence control relay R830, at its contacts 835, it completes a circuit for illuminating the station dial lamp 823 to indicate that the subscriber has started to dial a desired number. Finally, at the contacts 832, the relay R830 completes a circuit for operating the tone control relay R620, which relay, at its contacts 622, locks itself independently of its initial energized circuit to ground at contacts 756. As a further result of the operation of the relay R620, at its contacts 624, it interrupts the previously traced circuit for transmitting the dial tone signal to the calling subscriber, and finally, at its contacts 621, it interrupts a point in the fifteen second control conductor C1196, which circuit is only effective in the event that the subscriber fails to dial within fifteen seconds after the director is seized.

Returning now to the code switch 1100 (Fig. 11), it will be noted that the digit relay R1160 and the hold relay R1150 are maintained in their operated positions during the dialing of the first digit; consequently the ground at contacts 1151 of the hold relay R1150 is extended by way of a jumper interconnecting terminals 1113 and 1114, the contacts 1163, 1176 and 1121 for operating the control relay R1180.

The purpose of providing the terminals 1113 and 1114 in this circuit is to utilize or omit the functions of the relays R1110, R1120, R1170 and R1180, which relays are only necessary in the event that toll ticketing facilities are provided in the telephone system and in the event that some of the calling subscribers having access to the director are party line subscribers. It should be understood, however, that the calling device provided at each of the subscriber substations of the system which are of the private type, pay station type, extended service type and first subscribers on four party lines is of conventional construction. The calling device provided at each second, third and fourth party subscriber substation is of the construction and arrangement of that disclosed in the John E. Ostline Patent No. 2,410,520, granted November 5, 1946. For the purpose of the present description, however, it will be assumed that the calling subscriber is provided with a conventional calling device or dial. The operation of the circuit under control of the special calling device of the type disclosed in the above-mentioned Ostline Patent 2,410,520 will be described in connection with the operation resulting from calls from party subscriber substations.

Continuing with the operation of relay R1180, it should be noted that, at its contacts 1182, it short-circuits the winding of the party test relay R1170. Accordingly, at the end of the dialing of the first digit the relay R1160 restores to normal as has been described above but the relay R1150 is retained in its operated position. When relay R1160 restores, at its contacts 1163, it removes the short circuit from relay R1170 and thereby permits the relay R1170 to operate in series with the relay R1180.

This circuit may be traced from ground, by way of the contacts 1151, the inter-connected terminals 1113 and 1114, the contacts 1182, the winding of the party test relay R1170, the contacts 1121, and the winding of the control relay R1180, to battery.

Relays R1170 and R1180 will be retained in their operated positions from ground at contacts 1151 during the dialing of the second digit of the called subscriber number. In operating the relay R1170 closes its contacts 1178 first and breaks the contacts 1175 last. In other words, shortly after the armature of the relay R1170 begins to move due to its energization, the contacts 1178 will close. As the armature continues to move, the remaining contacts on the relay will either be opened or closed, as the case may be, and finally during the last portion of the movement of the armature of the relay R1170 the contacts 1175 will open. The main purpose of operating relay R1170 at the end of the dialing of the first digit into the code switch portion 1100 of the director is to transfer the connection of battery and ground potentials to the calling subscriber line. More specifically, at the contacts 1171 and 1172, the relay R1170 disconnects the ground potential applied through the upper winding of the party line relay R1130 and then to the conductor C472 extending to the calling subscriber line over the previously traced circuit and connects thereto, the negative exchange battery through the resistor 1155. At the contacts 1173 and 1174, the relay R1170 disconnects the negative main exchange battery through resistor 1155, from the circuit including the upper winding of the line relay R1140, the lower winding of the party line relay R1130 and the conductor C471 extending to the calling subscriber line, and connects to this circuit the auxiliary negative 48 volt battery 1156 and the exchange battery by way of the resistor 1154, to the calling subscriber line. When the above described transfer takes place, the line relay R1140 will remain in its operated position over the loop circuit including the auxiliary negative 48 volt battery 1156. The party line relay R1130, however, remains in its unoperated position due to differential action of the windings of the relay.

If the calling subscriber substation is provided with a conventional calling device, the line relay R1140 will follow the impulses transmitted by the dial in the same manner as has been described above in connection with the dialing of the first digit of the called subscriber number. The party line relay R1130 will remain in its unoperated position during the dialing of all digits, if the digits are transmitted from a conventional dial. However, if the calling substation is provided with the special dial referred to above, then the party line relay R1130 will respond to either one, two or three ground impulses, depending upon whether the calling substation is the second, third or fourth station on a calling party line.

More specifically, the special dial is arranged to transmit regular loop pulses corresponding in number to the digit dialed and during the closed portions of the loop impulses the special dial is arranged to transmit identifying ground pulses which cause the party line relay R1130 to follow the ground pulses and transmit a corresponding number of pulses, at its contacts 1131, over the conductor C1199 extending to Fig. 15.

Each time a ground pulse is applied to the conductors of the calling line a circuit will be completed through the upper winding of the party line relay R1130 and then by way of the contacts 1172 and the resistor 1155 to the regular exchange battery. Simultaneously therewith ground pulses will be extended through the lower winding of the party line relay R1130, the upper winding of the line relay R1140, the contacts 1174, the resistor 1154 and then to the auxiliary negative 48 volt battery 1156. When these circuits are completed for the party line relay R1130, the circuits are such that the two windings of the relay will aid each other and cause operation of the relay R1130. In this manner the party line relay R1130 grounds the conductor C1199 one, two or three times in order to transmit the identity of the second, third or fourth subscriber substation on the four party line.

It will be assumed in this description, however, that the calling station is provided with a conventional dial and while the transfer of the connections of the auxiliary 48 volt battery and the exchange battery to the calling line takes place in the manner described above, the party line relay R1130 remains in its unoperated position during the dialing of all pulses from the subscriber line. The line relay R1140, however, follows the pulses of the second digit dialed by the calling subscriber and again causes the digit relay R1160 to operate and to remain operated during the dialing of the second digit. Upon operating the relay R1160 again applies ground potential to the conductor C1144 extending to Fig. 8 and, at its contacts 1163, it completes a circuit for the control relay R1110, since the party test relay R1170 is in its operated position. The circuit for operating the control relay R1110 may be traced from ground at contacts 1151, the jumpered terminals 1113 and 1114, the contacts 1163 and 1177 and the winding of the relay R1110, to battery. This relay operates and, at its contacts 1112, prepares a point in the circuit for the disconnect party test relay R1120, the latter relay being short-circuited during the dialing of the second digit. The line relay R1140 repeats the pulses of the second digit over the conductor C1138 extending to Fig. 7 at its contacts 1141, and, at its contacts 1142, it retains the hold relay R1150 in its operated position. After the pulses constituting the second digit of the called subscriber number have been received and repeated by the line relay R1140 the relay remains in its operated position. As previously described, the digit relay R1160 slowly restores to normal and upon restoring removes ground potential from the conductor C1144 extending to Fig. 8. Also upon restoring to normal the relay R1160, at its contacts 1163, opens the short circuit around the winding of the disconnect party test relay R1120 which now operates in series with the control relay R1110 from ground at contacts 1151 of the operated hold relay R1150. At the contacts 1162, the relay R1160 extends ground from contacts 1151 by way of the contacts 1178 and 1111 to the lower winding of the line relay R1140 in order to complete a hold circuit for the last-mentioned relay.

Incident to the above described operation of the disconnect party test relay R1120, at its contacts 1121, it interrupts the previously described series circuit for the party test relay R1170 and the control relay R1180 thereby to cause these relays to restore to normal. Upon restoring, the relay R1180 opens a further point in the series circuit for the relays R1170 and R1180 and, at its contacts 1181, it opens a point in an alternate hold circuit for the lower winding of the line relay R1140. In response to the restoration of the party test relay R1170, at its contacts 1171 to 1174, inclusive, it reconnects the ground potential by way of the upper winding of the party line relay R1130 to one conductor of the calling subscriber line, and it reconnects the exchange battery by way of the resistor 1155 and the upper and lower windings of the relays R1140 and R1130 to the other conductor of the calling subscriber line, thereby to complete the previously traced loop circuit for the upper winding of the line relay R1140 in order to maintain the latter relay in its operated position. At its contacts 1178, the relay R1170, upon restoring, also interrupts a point in the previously mentioned holding circuit for the lower winding of the line relay R1140.

The remaining digits of the called subscriber number which are dialed by the calling subscriber are received and repeated by the line relay R1140 in the same manner as has been described above in connection with the dialing of the first digit of the called subscriber number. It should be noted that during the dialing of the remaining digits of the called subscriber number, the control relay R1110 and the disconnect party test relay R1120 are maintained in their operated positions over a series circuit including the contacts 1112, the terminals 1113 and 1114, and ground at contacts 1151. Furthermore, it should be noted that the relay R1120 in its operated position prevents the recompletion of the circuits for operating the relays R1170 and R1180.

*Registration of the called number in the call register 1500*

It will be recalled that when the code switch 1100 was first seized by the calling subscriber the relays R1140 and R1150 were operated. It will also be recalled that upon each restoration of the line relay R1140 under control of the impulses of the digit dialed by the calling subscriber ground pulses were transmitted over the conductor C1138 to Fig. 7 and then by way of the contacts 771 over two paths; one path extending by way of the conductor C1139 to Fig. 11 in order to operate the digit relay R1160 and to maintain that relay operated during the dialing of the digit; and the other path extending by way of the conductor C717 to Fig. 15 and then to the wiper 1514 of the receiving sequence switch 1510. It will also be recalled that during each digit the digit relay R1160 is retained in its operated position and, at its contacts 1161, it extends ground potential over conductor C1144 to Fig. 8 in order to operate the sequence control relay R830 and the latter relay, at its contacts 831, extends ground potential by way of the conductor C815 to Fig. 15 in order to operate the rotary magnet RM1511 of the receiving sequence switch 1510.

Referring now to the call register 1500 (Figs. 15 and 16) it will be seen that the impulses repeated by the line relay R1140 over the conductor C717 are extended by way of the wiper 1514 in engagement with its first bank contact, over the conductor C1551 to the winding of the rotary magnet RM1521 of the first code register 1520. The magnet RM1521 operates when the above-described circuit is closed responsive to the first impulse and at the end of the impulses the magnet RM1521 restores thereby to advance its wipers 1523 to 1527, inclusive, one step in a counterclockwise direction from its home contact position into engagement with the contacts 1 in the associated contact banks. The next pulse of the dialed digit will control the magnet RM1521 in the same manner in order to advance the wipers an additional step in a counterclockwise direction into engagement with the contacts 2 in the associated contacts banks. Thus it will be seen that in response to the dialing of the first digit of the called subscriber number the wipers 1523 to 1527, inclusive, of the first code register 1520 will be advanced a number of steps corresponding to the number of impulses in the digit dialed. The first code register 1520 will register the first digit of the called subscriber number.

After the last impulse of the first digit of the called subscriber's number has been received and repeated by the line relay R1140, the digit relay R1160 restores to normal and removes ground potential from the conductor C1144 extending to Fig. 8, thereby to restore the sequence control relay R830 to normaal. The latter relay in turn, at its contacts 831, removes ground potential from the conductor C815 extending to Fig. 15, thereby to interrupt the previously described circuit for operating the rotary magnet RM1511 of the receiving sequence switch 1510. The rotary magnet RM1511 now restores to normal and as a result thereof it causes its wipers 1513 to 1516, inclusive, to be advanced in a counterclockwise direction from engagement with the home contacts in the associated contact banks into engagement with the contacts 1. The wiper 1514 thereby transfers the impulsing circuit (conductor C717) from the first code register 1520 to the second code register 1530. More specifically, the wiper 1514 disconnects the impulsing circuit including the conductor C717, from the conductor C1551 extending to the rotary magnet RM1521 to the conductor C1552 extending to the rotary magnet RM1531. This prepares the call register 1500 to receive and register the second digit dialed by the calling subscriber. It should also be noted that at the contact 1, engaged by the wiper 1515, the receiving sequence switch 1510 prepares a point in a circuit including the contacts 1537 of the rotary magnet RM1531 for controlling the vertical magnet VM1210 of the code switch 1100. This circuit for controlling the code switch 1100 in a vertical direction is completed incident to the intermittent operation of the rotary magnet RM1531 under control of the impulses of the second digit dialed by the calling subscriber.

Figure 7:
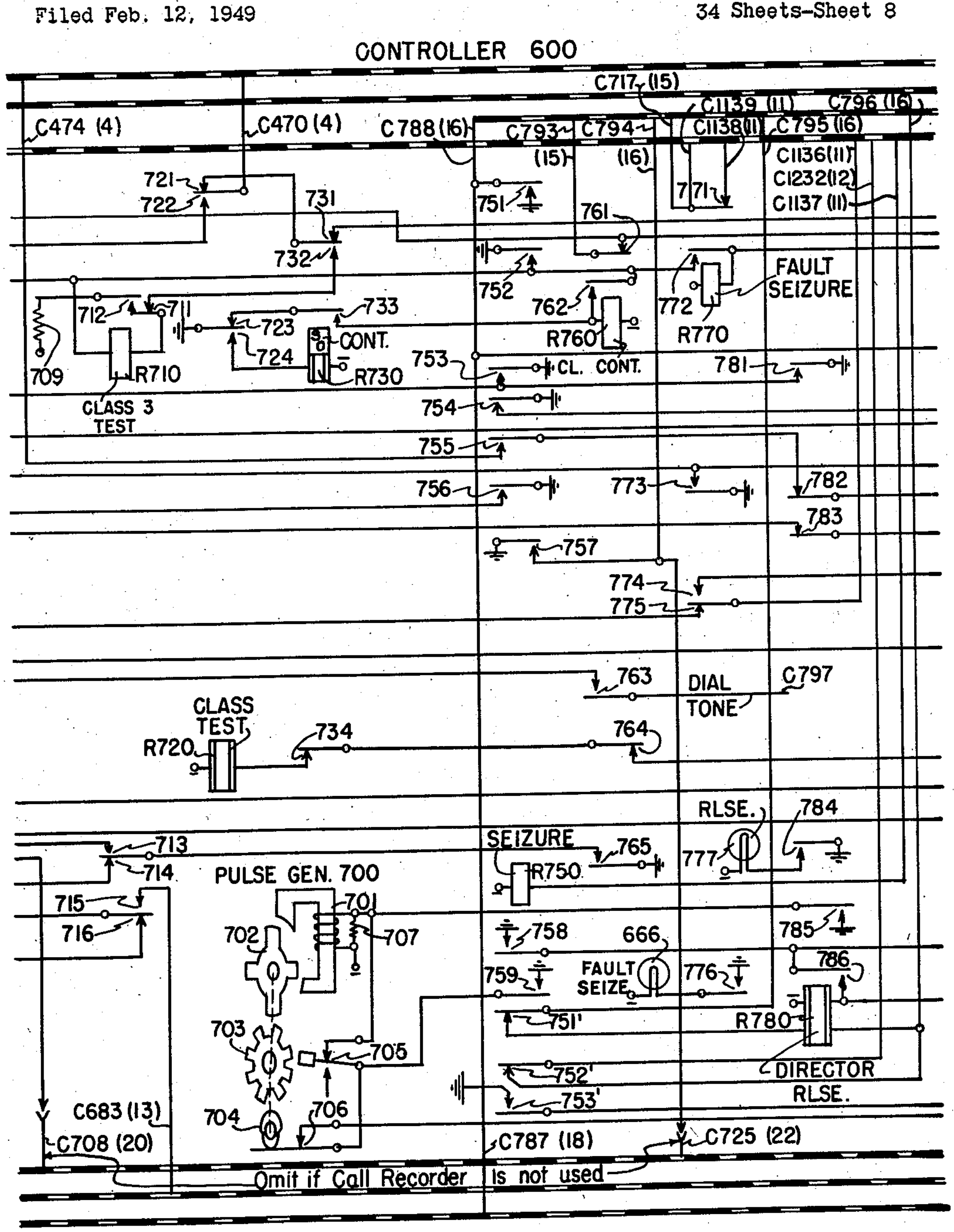

When the calling subscriber dials the second digit, the line relay R1140 will repeat the impulses over the conductor C1138 to Fig. 7 and then by way of the contacts 771 and the conductor C717 to the wiper 1514 in engagement with contact 1 in its associated contact bank and then by way of the conductor C1552 to the winding of the rotary magnet RM1531 of the second code register 1530. Also the pulses transmitted over this circuit will cause the operation of the digit relay R1160 and the sequence control relay R830 and the rotary magnet RM1511, in the manner previously described, in order to prepare the last-mentioned switch to advance its wipers from the contact 1 into engagement with the contact 2 in the associated contact banks at the termination of the dialing of the second digit. The second code register 1530 will advance its wipers in a counterclockwise direction a number of steps corresponding to the number of impulses comprising the second digit dialed by the calling subscriber. In this manner the second digit dialed by the calling subscriber is registered in the second code register 1530 in the same manner as the first digit was registered in the first code register 1520. However, in addition to the registration of the second digit, the magnet RM1531 of the second code register 1530, upon each operation, closes, at its contacts 1537, a circuit for operating the vertical magnet VM1210 of the code switch 1100. The circuit for operating the vertical magnet VM1210 may be traced from ground at contacts 757 of the operated seizure relay R750 in the controller 600 (Fig. 7), and then by way of the conductor C794 extending to Fig. 16, the wiper 1515 of the receiving sequence switch 1510, contact 1 in its associated contact bank, contacts 1537, conductor C1231 extending to Fig. 12, the winding of the vertical magnet VM1210, the contacts 1143, and the resistor 1134, to battery. Since the rotary magnet RM1531 closes the contacts 1537 upon each restoration of the line relay R1140 during pulsing, the contacts 1143 of the last-mentioned relay will be closed at the time the rotary magnet RM1531 operates and consequently the vertical magnet VM1210 will respond to each impulse and advance the associated wipers 1201 to 1208, inclusive, step-by-step in a vertical direction, a number of steps corresponding to the number of impulses in the digit dialed by the calling subscriber. From the foregoing explanation of the operation resulting from the dialing of the second digit of the called subscriber number it will be seen that the second code register 1530 and the code switch 1100 are substantially simultaneously operated to register the second digit of the called subscriber number.

During the interdigital pause between the dialing of the second and the third digit, the line relay R1140 and the hold relay R1150 remain in their operated positions and the digit relay R1160 and the sequence control relay R830 restore to normal in the manner previously described. The latter relay, at its contacts 831, interrupts the previously traced circuit for the rotary magnet RM1511 of the receiving sequence switch 1510 thereby to cause the wipers 1513 to 1516, inclusive, to be advanced in a counterclockwise direction one step from contacts 1 into engagement with contacts 2 in the associated contact banks. This transfers the impulsing circuit from the second code register 1530, over conductor C1552, to the third code register 1540 over the conductor C1553. In addition to the transferring of the impulsing circuit at the wiper 1514 as described above, the wiper 1515 interrupts the previously described impulsing circuit for the vertical magnet VM1210 at the contact 1 of its associated contact bank and, at the contact 2, it prepares a circuit for controlling the rotary magnet RM1211 of the code switch 1100 which includes contacts 1547 of the rotary magnet RM1541.

Figure 20:
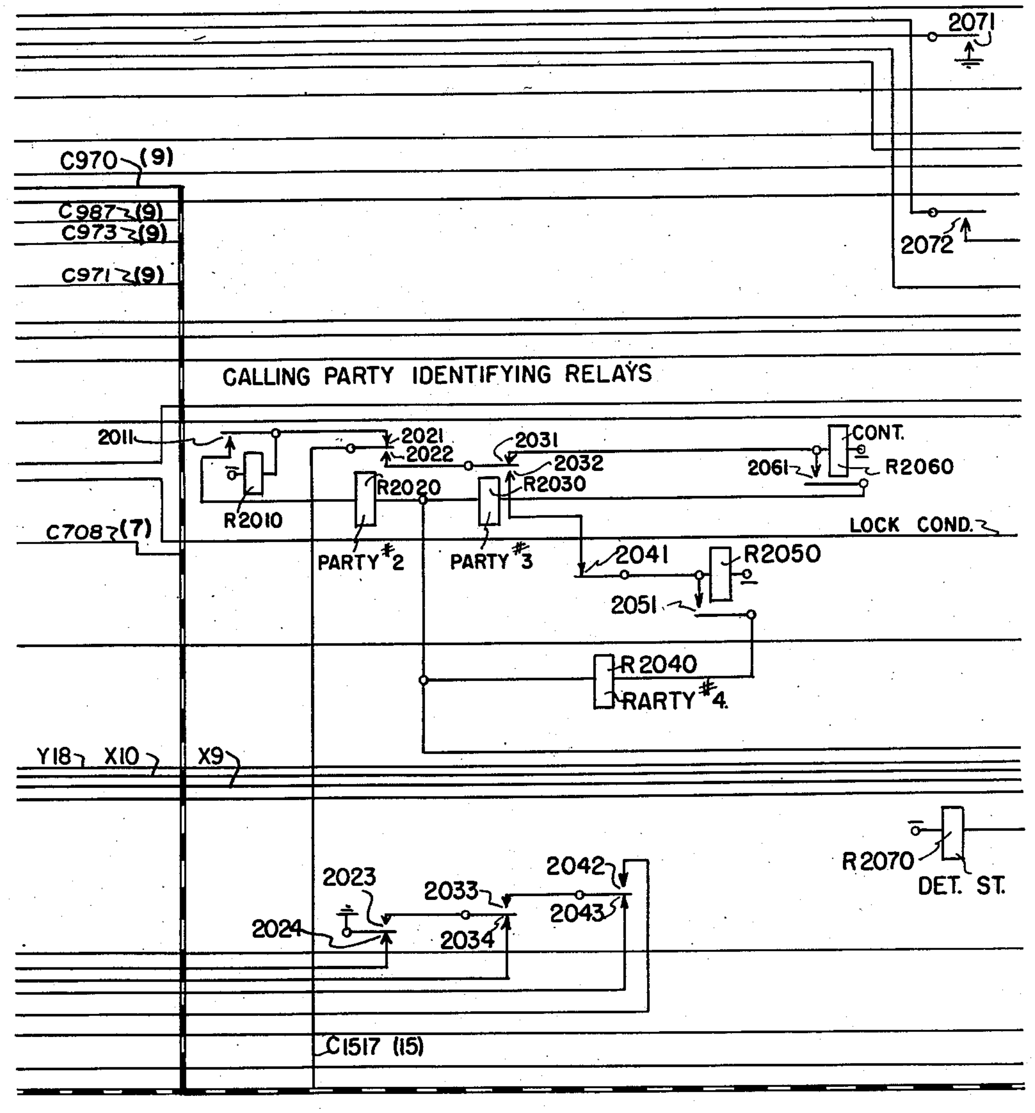
Figure 21:
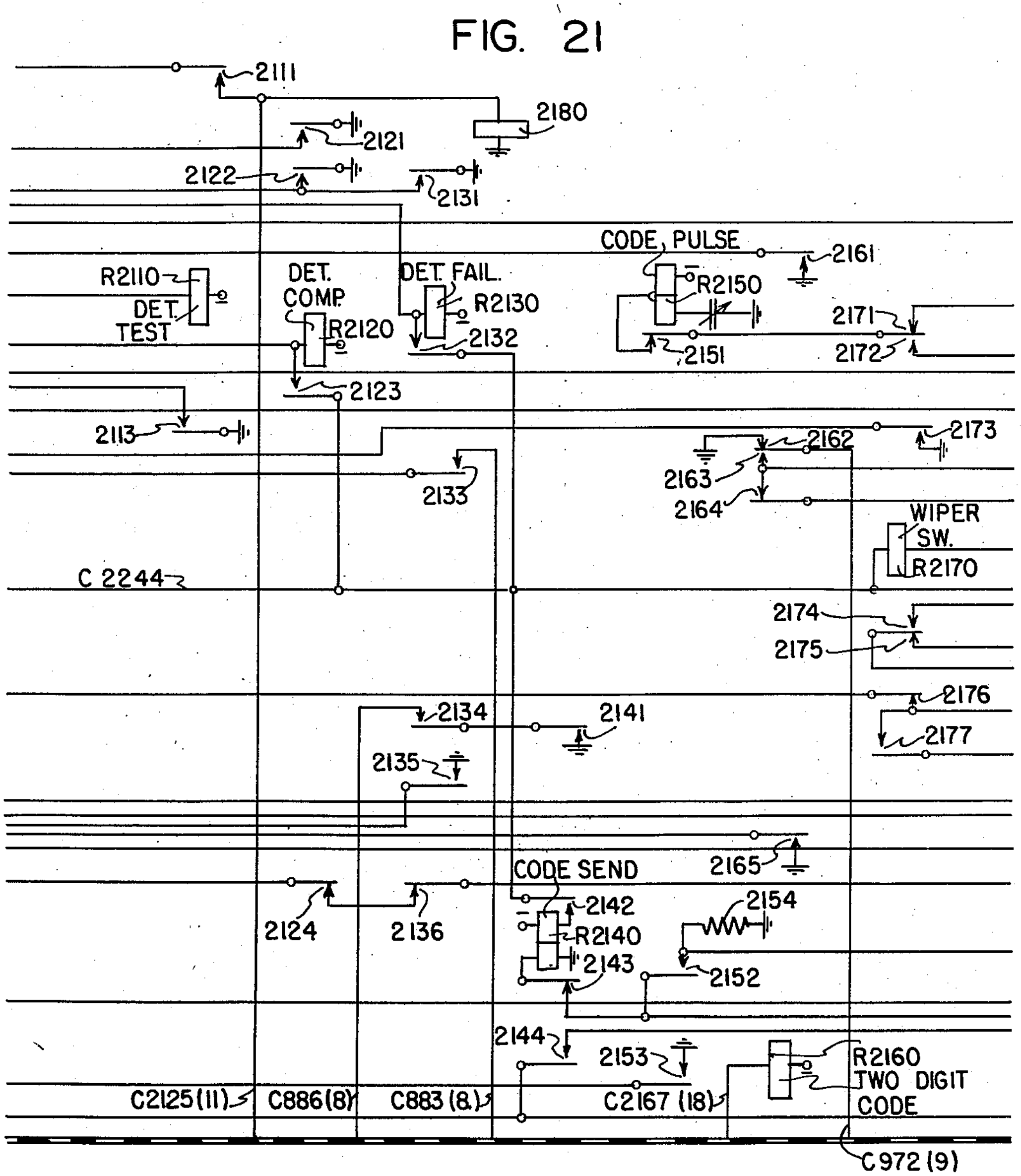

Before describing the transmission and registration of the third digit dialed by the calling subscriber it should be noted that during the time the wiper 1516 is in engagement with contact 1 in its associated contact bank, the conductor C1199, which is intermittently grounded under control of the party line relay R1130, is extended over conductor C1517 to Fig. 20 of the call recorder 2000. One, two or three impulses are transmitted over this conductor depending upon whether the calling subscriber is the second, third or fourth station on a calling subscriber line and assuming that such party line subscriber substations are provided with the special Ostline dial. The pulse or pulses transmitted over the conductor C1517 will control the relays R2010 to R2060, inclusive, in the call recorder 2000, in a manner to be described hereinafter, in order to register the identity of the particular calling substation on a calling four party line.

The impulses of the third digit dialed by the calling subscriber will be repeated by the line relay R1140 in the manner previously described and will now cause the intermittent operation of the rotary magnet RM1541 of the third code register 1540, to advance its wipers 1543 to 1546, inclusive, in a counterclockwise direction from the home contacts into engagement with the contacts in the associated contact banks corresponding in number to the number of impulses in the third digit dialed. Each time the rotary magnet RM1541 operates, it completes, at its contacts 1547 a circuit which may be traced from the grounded wiper 1515 (grounded from contacts 757), contact 2 of the associated contact bank, contacts 1547, and then by way of the conductor C1230 extending to Fig. 12, the winding of the rotary magnet RM1211 of the code switch 1100, contacts 1143, resistor 1134, and battery. Consequently, each time the above-traced circuit is closed at contacts 1547 the rotary magnet RM1211 is operated in order to rotate the wipers 1201 to 1208, inclusive, step-by-step in a rotary direction a number of steps corresponding to the number of impulses comprising the third digit dialed by the calling subscriber. In view of the foregoing description, it will be understood that the third code register 1540 registers the third digit dialed by the calling subscriber and the code switch 1100 registers, in accordance with the rotary position of the associated wipers, the third digit dialed by the calling subscriber.

From the operations described above, it will be understood that the first, second and third code registers 1520, 1530 and 1540 are successively operated, and during the operation of the second and third code registers 1530 and 1540 the code switch 1100 is operated first in a vertical direction in accordance with the second dialed digit and then in a rotary direction in accordance with the third dialed digit. It will also be recalled that the code switch 1100 is provided with a wiper set comprising the wipers 1201 to 1208, inclusive, and therefore, it is necessary to select one of the wipers in the wiper set in order to complete a marking circuit over the particular contact which has been selected by the vertical and rotary operation of the code switch 1100. In order to accomplish this result, the first code register 1520 is provided with the wiper 1527 and the associated contact bank. Referring now to the wiper 1527 it will be seen that the contacts 1 to 9, inclusive, respectively terminate the conductors C1221 to C1229 inclusive. These conductors extend to the code switch 1100 (Fig. 12) at which point they terminate in the wipers 1201 to 1208, inclusive. Particular attention is called to the fact that the conductors C1221 and C1222 which respectively terminate in the contacts 1 and 2 of the first code register bank contacts accessible to the wiper 1527 may be selectively connected to the wiper 1201 depending upon the position of contacts NP1214 and NP1215. More specifically, in the event the code switch 1100 is stepped only one step in a vertical direction, the normal post contacts NP1214 are closed and the normal post contacts NP1215 are opened. However, on all other vertical levels of the code switch 1100 the normal post contacts referred to above remain in the position shown on the drawing (Fig. 12). The remaining conductors C1223 to C1229, inclusive, are respectively connected at all times to the wipers 1202 to 1208, inclusive. In view of the foregoing it will be understood that the position of the wiper 1527 of the first code register 1520 at the termination of the first dialed digit, will correspond in numerical value to the numerical value of the digit dialed. Therefore the particular conductors C1221 to C1229, inclusive, will be selected to determine the particular wiper 1201 to 1208, inclusive, which will be utilized in performing a translation operation in the event such an operation is necessary in order to set up a connection to a called subscriber substation.

Before continuing with the various operations which may result from the operation of the first, second and third code registers 1520, 1530 and 1540 to register the first, second and third digits dialed by a calling subscriber, it is convenient at the present time to understand the manner in which the last four digits dialed by the calling subscriber are registered in the call register 1500. The last four digits dialed by the calling subscriber are the numerical digits constituting the line number of the desired called subscriber, bearing in mind that the first three digits are the code digits identifying the particular called exchange. It should be understood, however, that the subsequent described operations result only in the event that the director is to be utilized in controlling the setting up of the connection to a called subscriber line. By way of explanation it will be understood from operations which will be described hereinafter that in the case of local calls the director will be released from the calling subscriber line and the last four digits dialed by the calling subscriber will control the switches in the local switch train directly from the calling subscriber dial.

Assuming that the director is to be utilized in the setting up of the connection, the fourth digit dialed by the calling subscriber will be repeated by the line relay R1140 in the code switch 1100, in the manner previously described, over the circuit including the wiper 1514 of the receiving sequence switch 1510 which is now in engagement with the contact 3 in its associated contact bank. This contact terminates conductor C1554 which completes the connection with the rotary magnet (not shown) of the first numerical register 1610 (Fig. 16). Consequently, the fourth digit dialed by the calling subscriber, that is the first numerical digit of the directory number of the called subscriber, will be registered in the first numerical register 1610 in the same manner and for the same purpose as the digits were registered in the first, second, and third code registers 1520, 1530 and 1540. At the end of the digit, the receiving sequence switch 1510 will be advanced in a counterclockwise direction from engagement with the contact 3 into engagement with the contact 4 at which point a pulsing circuit is completed over the conductor C1555 to the rotary magnet of the second numerical register 1620. The calling subscriber now dials the fifth digit of the called number, that is the second digit of the numerical portion of the directory number, and this digit is registered in the second numerical register 1620 in the same manner as the digits were registered in the registers 1520, 1530, 1540 and 1610. After the registration of the fifth digit dialed by the calling subscriber, the receiving sequence switch 1510 is advanced in a counterclockwise direction from engagement with the contacts 4 into engagement with the contact 5, at which point a circuit is completed over the wiper 1514 and the conductor C1556 to the rotary magnet (not shown) of the third numerical register 1630. The calling subscriber now dials the sixth digit of the called subscriber number, that is the third numerical digit of the directory number, and this digit is registered in the third numerical register 1630, in the manner previously described. At the end of this digit the receiving sequence switch 1510 is advanced in a counterclockwise direction from the contact 5 to the contact 6 in the associated contact banks, at which point the wiper 1514 completes an impulsing circuit over the conductor C1557 to the rotary magnet RM1641 of the fourth numerical register 1640. The rotary magnet RM1641 responds to the seventh digit dialed by the calling subscriber to advance its wipers 1643 to 1645 in a counterclockwise direction in order to register in the bank contacts associated with the wipers 1644 and 1645, the digit dialed by the calling subscriber. When the last digit of the called subscriber number has been registered in the fourth numerical register 1640, the receiving sequence switch 1510 advances its wipers in a counterclockwise direction from the contact 6 to the contact 7 in the associated contact banks. In this manner the calling subscriber registers seven digits of the directory number of the called subscriber in the call register 1500. The manner in which the registered digits are utilized in the setting up of the connection will be described hereinafter.

*Local call*

For the purpose of describing a local call it will be assumed that the calling subscriber at substation 401 is a subscriber located in the FLorida 3 exchange, such as the subscriber TR3 illustrated in Fig. 3, and that the call is to be extended to another subscriber in the FLorida 3 exchange.

In order for the calling subscriber at substation 401 to extend a call to another subscriber located in the area served by the FLorida 3 exchange the subscriber dials FL3 followed by the numerical portion of the directory number of the called subscriber; for example, the subscriber will dial FL3-1234. When the calling subscriber actuates the calling device at this substation in accordance with the letter F, impulses corresponding to the digit 3 are transmitted over the previously described circuits to the line relay R1140 (Fig. 11) and repeated therefrom to the first code register 1520. The first code register 1520 (Fig. 15) will respond to the three impulses of the letter F (digit 3) and rotate its wipers 1523 to 1527, inclusive, into engagement with the contact 3 in the associated contact banks. The wiper 1524 in engagement with the contact 3 in the associated contact bank places a ground potential upon the W21 code marking conductor and the wiper 1525 will place a ground potential upon the Z21 code marking conductor. The application of ground potential to the W21 and Z21 conductors marks in code form the digit 3 in the four marking conductors WXYZ21. In this manner the digit 3 will be registered in the first code register 1520 and the WXYZ21 conductors, terminating in the bank contacts associated with the wipers 1655 to 1658, inclusive, of the send sequence switch 1650, will also be marked in accordance with the digit 3. Furthermore, the first code register 1520, at its wiper 1526, will apply ground potential via the contact 3 to the terminal 3 of the left hand section of the terminal block TB1528. Finally at the wiper 1527 the first code register 1520 extends the conductor C1070 to the conductor C1223 extending to the wiper 1202 of the code switch 1100.

The calling subscriber at substation 401 will now dial the letter L, thereby to transmit impulses corresponding to the digit 5 to the second code register 1530. The second code register 1530 will respond to the impulses of the digit 5 in the manner previously described to advance its wipers 1533 to 1536, inclusive, in a counterclockwise direction into engagement with the contact 5 in the associated contact bank. The wipers 1534 and 1535 will respectively apply ground potential to the X22 and Z22 conductors thereby to register in code form the digit 5. The wiper 1536 connects the terminal 1562 of the terminal block TB1528 to the terminal 5, shown in the middle section of the terminal block TB1528. As a result of the latter connection the ground potential at the wiper 1526 is now extended via the contact 3 in the associated contact bank, the terminal 3 in the left-hand section of the terminal block TB1528, the conductor C1564, the terminal 1562, the wiper 1536 and the engaged contact 5, the terminal 5 in the middle section of the terminal block TB1528, the conductor C1565, the terminal 1561 and the conductor C888 extending to Fig. 8, the contacts 833 and 813, and the winding of the first and second digit local relay R840, to battery. In view of the above it will be understood that, by means of the strapping on the terminal block TB1528, it is possible to jumper the left hand section and the middle section of the terminal block to complete a circuit to the relay R840. For the purposes of this description the terminals have been jumpered to indicate that each time the letters FL (digits 35) are dialed by a subscriber in the FL3 exchange a circuit will be completed for the first and second digit local relay R840 as soon as the sequence control relay R830 restores to normal at the end of the dialing of the second digit.

In response to the operation of the relay R840, at its contacts 845, it completes a locking circuit for itself from ground at contacts 753 of the operated seizure relay R750, which locking circuit is independent of the initial energizing circuit over conductor C888. At the contact 844, the relay R840 completes a circuit for operating the line relay R530 of the primary selector 500 which may be traced from ground at contacts 1142 of the operated line relay R1140 in the code switch 1100 (Fig. 11) and then by way of the conductor C1145 extending to Fig. 6, contacts 646 and 844, the resistor 843, the conductor C468 extending to Fig. 4, the wiper 453, the contacts 512 and 521, and the upper winding of the line relay R530 to battery. The line relay R530 operates over the above-traced circuit and, at its contacts 531, completes the previously traced circuit for operating the hold relay R540, and the latter relay, at its contact 542, completes an obvious operating circuit for the upper winding of the transfer relay R550.

Also, at its contact 841, the relay R840 completes a circuit from ground via contacts 851, 841, 731, and 721, the conductor C470 extending to Fig. 4, the wiper 455, the contacts 518, 527, and 552, and the upper winding of the transfer relay R550, to battery. This circuit provides a locking circuit for the transfer relay R550 under control of the controller 600 of the connected director.

From the foregoing explanation it will be seen that when the calling subscriber dials the first two digits of a local number, the first and second code registers will function to cause the primary selector 500 to be seized for further operations. In other words, the primary selector 500 is prepared to respond to the third digit dialed by the calling subscriber and registered in the third code register 1540.

In the present example it has been assumed that the third digit dialed by the calling subscriber is the digit 3. The digit 3 will be registered in the third code register 1540 in the manner previously described. More specifically, the rotary magnet RM1541 advances the wipers 1543 to 1546, inclusive, in a counterclockwise direction into engagement with the contact 3 in the associated contact banks. The wipers 1544 and 1545 respectively apply ground potential to the W23 and Z23 conductors in order to register in code form the third digit 3. The wiper 1546 in engagement with the contact 3 applies ground potential to the terminal 3 in the right hand section of the terminal block TB1528. This ground potential is further extended by way of the jumper C1566 to the terminal 1563 and then over the conductor C889 extending to Fig. 8, the contacts 842 and 846, and the winding of the third digit local relay R850, to battery.

The above-traced circuit for operating the third digit local relay R850 is completed after the wiper 1546 has been positioned into engagement with the contact 3 of the associated contact bank. However, during the time the line relay R1140 is being controlled under the influence of the impulses constituting the third digit 3, dialed by the calling subscriber, at its contacts 1142, it interrupts the previously traced circuit including the conductor C1145 and the upper winding of the line relay R530, whereby the line relay R530 of the primary selector 500 is restored a number of times corresponding to the number of impulses in the third digit dialed by the calling subscriber. More specifically, the line relay R1140, at its contacts 1141, repeats the digit 3, to the third code register 1540 in order to register therein the digit 3, and the third code register 1540, at the contacts 1547 of the rotary magnet RM1541 repeats the third digit to the code switch 1100 in order to rotate the wipers 1201 to 1208, inclusive, into engagement with the third contacts in the fifth level of the associated contact banks. Also the relay R1140, at its contacts 1142, controls the line relay R530, in the manner previously described, and the latter relay, at its contacts 532, repeats the three impulses constituting the third dialed digit 3 to the vertical magnet VM575 of the primary selector 500. The last-mentioned circuit may be traced from the ground via contacts 529, 532, 543 and 553, one path extending through the vertical magnet VM575 to battery, and the other path extending through the lower winding of the transfer relay R550, to battery. Each time the above-traced circuit is completed at contacts 532 the vertical magnet VM575 is controlled in the well-known manner to raise the wipers 563, 564, and 565 three steps in a vertical direction to a position opposite the third level in the associated contact bank.

At the end of the dialing of the third digit 3 the line relay R1140 in the code switch 1100 remains in its operated position over the previously traced loop circuit including the calling subscriber substation. In its operated position the line relay R1140, at its contacts 1142, maintains a holding circuit for retaining the line relay R530 of the primary selector 500 in its operated position. Also at the end of the dialing of the third digit 3 the previously mentioned circuit including the wiper 1546 of the third code register 1540 is completed for operating the third digit local relay R850.

Shortly after the last impulse of the digit 3, the digit relay R1160 and the sequence control relay R830 restore to normal in the manner previously described. At its contacts 831, the relay R830 causes the receiving sequence switch 1510 to advance its wipers 1513 to 1516, inclusive, one step in a counterclockwise direction thereby to associate the above-named wipers with the contact 4 in the associated contacts banks. This operation is of no consequence at the present time inasmuch as the first three digits dialed by the calling subscriber indicate that the call is to a subscriber within the originating local exchange area and therefore the director will be released from the connection. As a further result of the restoration of the relay R830, at its contacts 834, it completes a circuit for operating the director release relay R780. The circuit for operating the relay R780 is substantially the same as the circuit previously described for operating the third digit local relay R850 and is in multiple with the last-mentioned circuit. Finally, at its contacts 836, the relay R830 completes a circuit via the contacts 854 for operating a peg count meter to indicate the number of times that the director has been utilized in absorbing the first three digits of a code indicative of a call to the local exchange area.

Referring now to the primary selector 500 (Fig. 5) it will be noted that when the transfer relay R550 operates, at its contacts 554, it completes a circuit for operating the rotary relay R560 as soon as the selector advances its wipers 563 to 565, inclusive, one step in a vertical direction. More specifically, as soon as the wipers of the selector are stepped one step in a vertical direction, the vertical off-normal contacts VON578 and VON579' are closed and the contacts VON579 are opened. Consequently, the contacts VON578 close the final point in the circuit for operating the rotary relay R560. The last-mentioned circuit may be traced from ground at the contacts 541, and then over a circuit including the contacts 572, 554, 545, 577, VON578, and the winding of the rotary relay R560, to battery. The relay R560 operates when the above-traced circuit is completed and prepares, at its contacts 562, a point in the circuit for controlling the rotary magnet RM576. Finally, at its contacts 561, the relay R560 completes a locking circuit for itself which may be traced from ground by way of the contacts 529, 561, 545, 577 and VON578, and the winding of the relay R560, to battery.

Consequently, the relay R560 remains locked in an operated position until the transfer relay R550 is restored to normal under control of the associated director.

Before describing the release of the director in response to the operation of the relay R780 it should be noted that when the relay R850 operated and opened its contacts 851 it removed the ground potential from the conductor C470 extending over the previously traced circuit to the upper winding of the transfer relay R550 in the primary selector 500. This will cause the transfer relay R550 to restore to normal and cause the primary selector 500 to rotate its wipers 563 to 565, inclusive, to search for an idle trunk to the succeeding local switch train.

As soon as the transfer relay R550 restores to normal, at its contacts 554, it interrupts a point in the initial energizing circuit for the relay R560 but the last-mentioned relay is held in its operated position over the previously described locking circuit. At its contacts 555, the relay R550 completes a circuit for operating the rotary magnet RM576. This circuit may be traced from ground by way of the contacts 541, 572, 555 and 562, and the winding of the rotary magnet RM576, to battery. Upon operating magnet RM576 interrupts, at its contacts 577, the locking circuit for the relay R560 thus causing the latter relay to restore, and the magnet RM576 rotates the wipers 563 to 565, inclusive, into engagement with the first set of contacts in the third level of the primary selector 500. Incident to the restoration of the relay R560, at its contacts 562, it interrupts the circuit for the rotary magnet RM576 and thus causes the latter magnet to restore to normal and recomplete, at its contacts 577, a point in the previously traced circuit for operating the rotary relay R560.

If the trunk terminating in the first set of contacts in the third level of the primary selector 500 is busy a ground potential will be encountered by the wiper 565 and will be extended via the contacts 525, 545, 577 and VON578, and the winding of the rotary relay R560, to battery. Consequently the relay R560 will reoperate when a busy trunk is encountered by the wiper 565, and, at its contacts 562, will recomplete the previously traced circuit for operating the rotary magnet RM576. The rotary magnet RM576 upon operating interrupts the circuit for the relay R560 which, upon restoring, will interrupt the circuit for the rotary magnet RM576. In this manner the rotary relay R560 and the rotary magnet RM576, cooperate in order to rotate the wipers of the selector 500 step-by-step in search of a trunk terminating in the third level of the associated contact bank which is indicated to be idle by an absence of ground potential on the wiper 565.

When an idle trunk is encountered, no potential will be found by the wiper 565 and, consequently, the rotary relay R560 will not be reoperated and, furthermore, the test relay R520 will not be short-circuited. The test relay R520 now operates in series with the rotary relay R560 but due to the high resistance of the relay R520, the rotary relay R560 does not operate. This circuit for operating the test relay R520 may be traced from ground at the contacts 541 and then by way of the contacts 572, the 11th rotary step cam springs CAM557, the winding of the relay R520, the contacts 545, 577, and VON578, and the winding of the rotary relay R560, to battery. Upon operating the test relay R520, at its contacts 529', completes a locking circuit for itself over the previously traced circuit which is independent of the contacts 545. Furthermore, at its contacts 521 and 523, it disconnects the line relay R530 from the calling subscriber line, assuming that the director test relay R510 has, by this time, been released. Also, at its contacts 522 and 524, the relay R520 connects the calling line to the succeeding switch via the wipers 563 and 564. At its contacts 525 and 526, the relay R520 disconnects the wiper 565 from the circuit extending to the test relay R520, and connects it to the conductor C446. Finally, at its contacts 529, the relay R520 interrupts the circuit for the hold relay R540 which now restores to normal. It will be seen from the following description of the release of the director that the director test relay R510 will be restored to normal in order to connect the calling subscriber line, and in particular, the conductors C444 to 446, inclusive, directly through the primary selector 500 to the wipers 563 to 565, inclusive, and then to the selected idle switch in the local exchange switch train.

*Release of the director on a local call*

It will be recalled that as a result of the dialing of the three digits of the code indicative of the originating local exchange area, the director release relay R780 operated. In response to the operation of the relay R780, at its contacts 786, a locking circuit is completed for itself from ground at contacts 758 of the operated seizure relay R750. At its contacts 781, the relay R780 places an additional holding ground on the circuit for maintaining the director busy relay R610 in its operated condition; at its contacts 784, it completes a circuit for illuminating the release lamp 777; at its contacts 785, it places a locking ground on the winding of the pulse generator 700; and finally, at its contacts 782, it interrupts a point in the previously traced circuit for the hold relay R820 and the director test relay R510. When the circuit for the director test relay R510 and the hold relay R820 is interrupted, the relay R510 will restore to normal and, at its contacts 511 to 518, inclusive, it will disconnect the conductors C501 to 506, inclusive, extending to the associated director and it will connect the conductors C444 to C446, inclusive, through to the subsequent switch which has been seized by the primary selector 500 in the manner previously described. In other words, when a calling subscriber registers, in the associated director, the code digits corresponding to the originating local exchange area, the selector will seize an idle switch in the local switch train, the director will be released from the connection and the calling line will be extended through the primary selector 500 to the seized switch in the local switch train so that the remaining four digits of the local subscriber number will be transmitted directly from the calling subscriber dial to the switches in the local switch train in the well-known manner.

When the conductors C501 to 506, inclusive, are disconnected in response to the restoration of the director test relay R510, the previously traced loop circuit, including the calling subscriber line, is interrupted and the circuit for the line relay R1140 of the code switch 1100 is interrupted. The line relay R1140 restores to normal and, at its contacts 1142, interrupts the circuit for the hold relay R1150 which slowly restores to normal. As soon as the relay R1150 restores to normal, at its contact 1151, it removes ground potential from the conductor C1137 extending to Fig. 7, thereby to cause the restoration of the seizure relay R750. Also the removal of ground at contacts 1151, causes the restoration of any of the operated relays in the code switch 1100 (Fig. 11).

Incident to the release of the seizure relay R750 in the manner described above, at its contacts 751', it completes a circuit through the winding of the director release relay R780 and the conductors C795 and C796 extending to Fig. 16. The conductor C795 is grounded at the home contact position of the wiper 1667 of the sender switch 1660. Consequently the ground potential is forwarded through the lower winding of the relay R780 to the conductor C796 and then to the wiper 1643 of the fourth numerical register 1640. If the fourth numerical register 1640 had been in an operated position, the ground potential would be extended by way of the multiply connected contacts associated with the wiper 1643 and then by way of the interrupting contacts 1642 and the winding of the rotary magnet RM1641, to battery. This interrupting circuit for the fourth numerical register 1640 will cause the rotary magnet RM1641 to advance the associated wipers step-by-step in a counterclockwise direction until the wiper 1643 engages its home contact position. When this occurs, the automatic restoring circuit would be interrupted and the ground potential would be fed to the third numerical register 1630 in order to cause the associated rotary magnet to step its associated wipers to the home contact position. Each of the registers of Figs. 15 and 16 is sequentially operated in the reverse order to restore its associated wipers to normal in the same manner explained above in connection with the fourth numerical register 1640. As soon as the first code register 1520 has restored its associated wipers into engagement with the home contact, the releasing circuit will be extended to the receiving sequence switch 1510 in order to cause the rotary magnet RM1511 to restore the associated wipers into engagement with the home contact positions. The wiper 1513 in its home contact position will extend the releasing ground potential to the send sequence switch off-normal contacts 1659. However, since the send sequence switch 1650 has not been operated on the local call, the off-normal contacts are in the position illustrated in the drawings and no circuit will be completed for restoring the send sequence switch 1650 to normal. It is convenient, however, at the present time to assume that the send sequence switch 1650 has operated its wipers from the home contact position and that the off-normal contacts 1659 are closed and that the interrupting circuit is completed to the rotary magnet RM1651, thereby to cause the magnet to advance the wipers 1653 to 1658, inclusive, in a counterclockwise direction to the home contact position, at which point the off-normal contacts 1659 are opened to interrupt the circuit for operating the magnet RM1651.

Simultaneously with the application of the releasing ground potential to the conductor C796, a multiple releasing ground circuit is closed by way of the contacts 752′, the conductor C1232 extending to Fig. 12, and then by way of the vertical off-normal contacts VON1217, to the winding of the release magnet RM1212. The release magnet RM1212 of the code switch 1100 will operate when the above-traced circuit is completed and thus cause the code switch 1100 to restore the wipers 1201 to 1208, inclusive, to their normal resting positions. As soon as the wipers are restored to their normal resting position, the vertical off-normal contacts VON1217 interrupt the previously traced circuit for the release magnet RM1212 and close, at the contacts VON1216, a circuit for the release magnet RM1198 of the timer 1190, in the event the timer 1190 has operated to advance its wipers from the normal home contact positions. If the wipers 1191 and 1192 have been advanced from the home contact positions the rotary off-normal contacts RON1195 will have been closed and the circuit for the release magnet RM1198 will be completed. The release magnet RM1198 upon operating will cause the wipers 1191 and 1192 to be restored to the normal resting positions shown on the drawings and in response thereto the rotary off-normal contacts RON1195 will be opened to interrupt the circuit for the release magnet RM1198.

As a further result of the restoration of the seizure relay R750, at its contacts 752, 753, 754, 756 and 758, it interrupts various circuits to remove holding grounds from various operated relays in the controller 600 thus causing all of such operated relays to restore to normal. At its contacts 759, the relay R750 removes the starting ground potential from the pulse generator 700 and since ground is applied at the contacts 785 to the winding of the pulse generator 700 the generator will select a proper stopping position required to insure subsequent self-starting in the manner described in the previously mentioned Ostline application.

When all of the rotary switches, the Strowger switch, and the minor switch of the timer 1190 have been restored to normal, the multiple circuit including the lower winding of the director release relay R780 will be interrupted, thus permitting the director release relay R780 to restore to normal. At its contacts 785, the relay R780 interrupts the circuit for the pulse generator 700; at its contacts 784 it extinguishes the release lamp 777; at its contacts 782 and 783 it prepares points in circuits for reseizing the controller 600 portion of the director; and finally, at its contacts 781 it removes the final holding ground potential from the director busy relay R610 which now restores to normal. The director busy relay R610, upon restoring to normal, at its contacts 611, removes the busy marking ground potential from the conductor C475, thereby to render the associated director available for additional calls.

*Local call (six digit)*

From the foregoing description of a local call it should be understood that the director is held during the dialing of the first three digits of the called number regardless of whether the local exchange code is a three digit code, such as 353 (FLorida 3), or a two digit exchange code, such as 24 (CHase) followed by the first digit of the four numerical digits of the called number. The net effect of the registration of the first three digits of an originating exchange local code number is to absorb the first two digits and to repeat the third digit to the primary selector. The primary selector, in response to the third digit, operates like a regular selector to select an idle trunk extending to an idle switch in the local switch train. The director in this type of call is automatically released from a connection and the remaining digits transmitted from the dial at the calling subscriber substation directly control the switches in the local switch train in order to complete the connection to the desired called local subscriber substation.

If more than one exchange is provided in the local exchange area, such as FLorida 1, 2 and 3, the strapping provided at the right hand section of the terminal block TB1528 should be arranged so that the wiper 1546 of the third code register 1540 in engagement with the contact 1, 2 and 3 in the associated contact bank, will ground the conductor C889 to cause the operation of the third digit local relay R850 and the director release relay R780 in the manner previously described. In this manner the director will be released whenever any one of the three local area exchange codes are dialed.

In the case of six-digit calls, that is calls in local areas identified by an exchange having a corresponding two-digit code, such as 24 (CHase), the first and second code registers 1520 and 1530 will register respectively the digits 2 and 4 dialed by the calling subscriber. The directors in the originating local exchange will be wired and arranged so that the strapping on the terminal block TB1528 will ground the conductor C888 after the digits 2 and 4 have been registered. The thousand digit of the numerical portion of the called subscriber number will then be registered in the third code switch 1540 in place of a third code digit which is omitted in the case of local exchanges identified by a two-digit code. The registration of the thousand digit, that is the first numerical digit, will ground the conductor C889 and cause the director to be released from the connection and the associated primary selector will operate to a level corresponding to the value of the third digit dialed and it will automatically rotate to select an idle trunk to an idle switch in the local switch train. The remaining three digits, that is the hundred, ten and unit digits, of the numerical portion of the six-digit called number will be transmitted directly from the calling subscriber dial to the local switch train in order to complete the connection between the calling subscriber substation and the desired called subscriber substation.

*Calls to exchanges outside the originating exchange local area*

In view of the previous explanation of the mode of operation of the line circuit 405, the line finder 440, the primary selector 500, the director hunter 450, and the units of equipment of the director, including the controller 600, the code switch 1100 and the call register 1500, insofar as this equipment functions to extend a connection from the calling subscriber at substation 401 to the director and to register the code and numerical digits of the called subscriber number, it will be understood that this equipment is operative, in a substantially identical manner, to extend a call from a calling subscriber substation to the director and to register the code and numerical digits of the telephone number of any called subscriber substation in the telephone system. In describing the operation of the portion of the director referred to as the call register 1500, an explanation was given of the manner in which the three code registers 1520, 1530 and 1540 and the four numerical registers 1610, 1620, 1630 and 1640 operated to register the three code and four numerical digits of a seven-digit directory number. Also, in the case of a local call, a description was given to illustrate the fact that the registration of the three code digits cause the primary selector 500 to operate in response to the third dialed code digit to select an idle trunk extending to an idle switch in the local switch train and cause the disconnect and release of the various units of equipment comprising the director.

It will now be assumed that the calling subscriber at substation 401 has initiated a call, has seized the director and has dialed into the director the seven digits of the directory number of a desired called subscriber EMpire 1 exchange. For the purpose of this description it will be assumed that the desired called subscriber is the subscriber at substation TR1 whose directory number is EMpire 1–1234. In response to the dialing of the digits corresponding to the called office code EM1 the code digits 361 are registered respectively in the first, second and third code registers 1520, 1530 and 1540, in the manner previously described. Also, as a result of the dialing of the digits of the numerical portion of the called subscriber number, the digits 1, 2, 3 and 4 are registered respectively in the first, second, third and fourth numerical registers 1610, 1620, 1630 and 1640, all in the manner previously described.

In response to the registration of the digit 3 in the first code register 1520 the wipers 1523 to 1527, inclusive, will be stepped into engagement with the contacts 3 in the associated contact banks, the wipers 1524 and 1525 marking the code conductors WXYZ21 in accordance with the digit 3, and the wiper 1527 selecting the conductor C1223 terminating in the wiper 1202 of the code switch 1100. The second and third code registers 1530 and 1540 advance their associated wipers into engagement with their respective sixth and first bank contacts. The wipers 1534 and 1535 marking the code conductors WXYZ22 in accordance with the digit 6 and the wipers 1544 and 1545 marking the WXYZ23 conductors in accordance with the digit 1. It will be recalled that at the time the first code register 1520 is operated in accordance with the first code digit 3 the wipers 1513 to 1516, inclusive, of the receiving sequence switch 1510 are in engagement with the home contacts of the associated contact banks, and that the wipers are in engagement with contact 1 in the associated contact banks during the dialing of the second code digit 6 which is registered in the second code register 1530. This digit is repeated to the code switch 1100 over the conductor C1231 and causes the switch 1100 to raise its wipers 1201 to 1208, inclusive, step-by-step in a vertical direction to a position opposite the sixth level of the associated contact bank. During the dialing of the third code digit 1, the wipers of the receiving sequence switch 1510 are in engagement with the contacts 2 in the associated contact banks, whereby the third code register 1540 registers the third code digit 1 and the digit 1 is repeated over the conductor C1230 to the rotary magnet RM1211 of the code switch 1100 thereby to rotate the wipers 1201 to 1208, inclusive, into engagement with the first contact in the sixth level of the associated contact bank.

During the dialing of the first numerical digit of the called subscriber number, that is the thousand digit 1, the wipers 1513 to 1516, inclusive, of the receiving sequence switch 1510 are in engagement with contacts 3 in the associated contact bank. When the wiper 1515 engages contact 3 it completes a circuit for operating the assigner start relay R640, thereby to cause the translator assigner 1000 (Fig. 10) to find the particular director being utilized in the instant call and to associate the translator 1300 with the said director.

Before proceeding with the description of the operation of assigning the translator to the particular calling director, it should be noted that the originating exchange is provided with a plurality of directors, each comprising a plurality of individual units, previously noted, and that the originating exchange is provided with a single translator 1300 which will be called into use by a calling director when it becomes necessary to translate the code digits dialed by a calling subscriber into one or more routing digits, which may be of the same value and same number as the three code digits dialed, or they may be of different values and different numbers of digits than the three code digits dialed. The translator 1300 is provided with a number of individual translator relays, each of which is permanently wired in accordance with routing digits and other controlling information for setting up connections between the originating exchange and a particular called exchange over a predetermined route. The route is predetermined by jumpering the contacts of the individual translator relays so that the call will be set up over a direct trunk route to the particular called exchange, or by way of one or more tandem exchanges, and in some cases provisions are made for selecting an alternate trunk route to a desired called exchange in the event all of the direct trunk routes are busy at the time the particular translator relay is to be selected.

Referring again to the previously mentioned circuit for controlling the operation of the assigner start relay R640 as a result of the positioning of the wiper 1515 into engagement with the contact 3 in the associated contact bank, it will be seen that the circuit for operating the assigner start relay R640 may be traced from ground by way of contact 757 of the operated seizure relay R750, and then via the conductor C794 extending to Fig. 16, the wiper 1515 and the engaged contact 3, the conductor C891 extending to Fig. 8, contacts 852, 811, 783 and 662, and the winding of the assigner start relay R640, to battery. Upon operating, the assigner start relay R640 completes a locking circuit for itself, which is independent of a portion of the circuit above-described including the wiper 1515. This locking circuit may be traced from ground at contacts 756, and then via the contacts 645, 811, 783 and 662, and the winding of the relay R640, to battery. It may be well to mention at this time that the circuit for operating the assigner start relay R640 is completed when the wiper 1515 engages contact 3 in the associated contact bank due to the fact that the third digit local relay R850 and the director release relay R780 have not been operated. In other words, the fact that called office code digits, other than the code digits indicative of the originating local exchange have been registered prevents operation of the relays R850 and R780 and this, in turn, permits the completion of the circuit for the relay R640 in order to assign the translator 1300 to the particular calling director.

As a further result of the operation of the assigner start relay R640, at its contacts 646, it removes the ground potential, applied to the conductor C1145, from the conductor C468 extending to the upper winding of the line relay R530 in the primary selector 500. It should be noted, however, that no ground potential is applied to the conductor C468 because the relay R840 is not operated in the present call. The last-mentioned relay is only operated in the event that the first two called office code digits dialed by the calling subscriber correspond to the first two digits identifying the exchange code of one or more local exchanges. In the present example, the relay R840 will not be in its operated position and, therefore, the removal of ground at the contacts 646 has no function to perform at the present time.

As a further result of the operation of relay R640, at its contacts 647, it illuminates the translator assigner lamp 635; and at its contacts 648, it completes an obvious circuit for operating the peg count meter 654 which is provided to count the number of times the controller 600 portion of the director is utilized in a connection requiring translation. At its contacts 641 and 643, the relay R640 removes a direct ground potential from the conductor C685 extending to the translator assigner 1000 (Fig. 10), thereby to remove a busy marking ground potential from a contact bank associated with the wiper 1002 of the translator assigner 1000. Finally, at its contacts 642, the relay R640 connects the assigner test relay R650 to the conductor C685 and, at its contacts 644, it applies ground potential to the conductor C686 extending to Fig. 10 thereby to initiate the operation of the translator assigner 1000 to find the particular director that has been marked by the removal of direct ground potential from the conductor C685. It should be noted that since each of the directors is provided with a controller portion, such as the controller 600, the conductors corresponding to the conductor C685 normally have direct ground potential applied thereto when the directors are not in a condition to require use of the translator assigner 1000 and the translator 1300. However, as soon as a controller portion of a director is in condition to call for the use of a translator, the start conductor C686 is grounded and the hold conductor C685 substitutes a ground through the winding of the relay R650 for the direct ground potential.

*Operation of the translator assigner 1000*

When the start conductor C686 of the translator assigner 1000 is grounded by a director requiring access to the translator 1300, the start relay R1040 is operated. At its contacts 1043, the relay R1040 applied ground potential through the winding of the director hold relay R1030 to the wiper 1001 and, at its contacts 1042, it completes an obvious circuit for operating the translator timer relay R1020. Finally, at its contacts 1041, it connects the wiper 1002 to the winding of the rotary magnet RM1004 through the rotary magnet interrupter contacts 1005. The operation of the translator timer relay R1020 performs no function on a normal call. An idle director or directors, not requiring the use of a translator, maintain a busy marking ground potential on their respective hold conductors, such as the hold conductor C685 and, therefore, the wiper 1002 will find ground potential upon the associated bank contact engaged by the wiper. This ground potential is extended by way of the contacts 1041 and 1005 and the winding of the rotary magnet RM1004, to battery. This will cause the operation of the rotary magnet RM1004 and incident to its operation it will advance its wipers 1001 to 1003, inclusive, one step in a clockwise direction and, at its self-interrupting contacts 1005, it interrupts its operating circuit thereby to cause the rotary magnet RM1004 to restore to normal. If the next contact engaged by the wiper 1002 also has a direct ground potential applied thereto, the rotary magnet RM1004 will again complete its cycle of operation to advance the associated wipers an additional step in a clockwise direction. Since the director requiring use of a translator has substituted a resistance ground for the direct ground applied to the conductor C685, it will be seen that when the wiper 1002 engages the contact terminating the conductor C685 having the resistance ground applied thereto, through the winding of the relay R650, the rotary magnet RM1004 will not operate, due to the resistance of the relay R650, but the relay R650 operates. In this manner the wipers 1001 to 1003, inclusive, of the translator assigner 1000 automatically rotate, when the start relay R1040 is operated, to search for and find the particular contacts in the associated contact banks terminating the director requiring the use of a translator.

Figure 6:
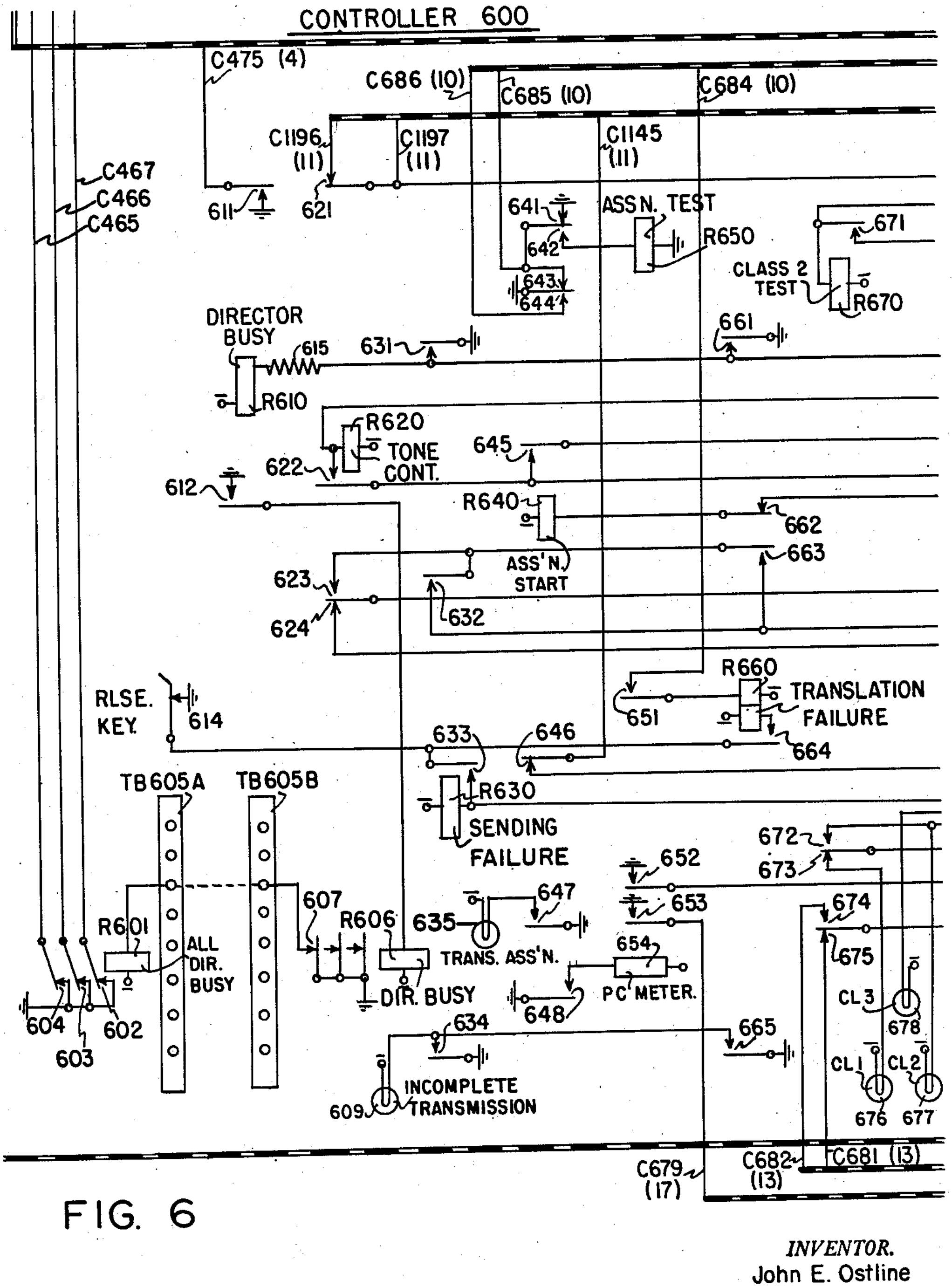

At substantially the same time that the assigner test relay R650 is operated in series with the rotary magnet RM1004, a circuit is completed from ground, at contacts 1043, via the winding of the director hold relay R1030, the wiper 1001, the conductor C684 extending to Fig. 6, the contact 651 of the operated assigner test relay R650, and the upper winding of the translation failure relay R660, to battery. Due to the resistance of the winding of the director hold relay R1030, the translation failure relay R660 does not operate over this circuit but the director hold relay R1030 operates to close the circuits over its associated contacts 1031 to 1034, inclusive. At the contacts 1032, the relay R1030 completes an obvious circuit for operating the slow-to-operate translator start relay R1010 and, at its contacts 1033, it applies ground potential to the conductor C1071 extending to Fig. 13, thereby to operate the translator start relay R1380. The relay R1380 operates when the above-traced circuit is completed and, at its contacts 1383, it interrupts a point in the circuit for controlling the alternate trunk route relay R1370 and, at its contacts 1381, it interrupts the locking circuit for the multiple guard relay R1440. The last-mentioned circuit is normally completed when the translator is in an idle condition so that the multiple guard relay R1440 at its multiple contacts 1 to 35, inclusive, connects the lamps, such as the lamp 1484 to each of the conductors terminating in the associated contacts. The 34 individual conductors terminating in the contacts 1 to 34, inclusive, of the relay R1440 are multiply connected to the corresponding contacts associated with each translator relay in the translator, such as the relays R1410, R1420, R1430, R1450 and R1460. With the multiple guard relay R1440 operated to associate a signal lamp with each of the above-mentioned 34 conductors a permanent test circuit is closed to the multiply connected conductors to determine whether or not a false ground is encountered; if any one of the conductors is falsely grounded a lamp, such as the lamp 1484, will be illuminated and the left hand winding of the common guard alarm relay R1480 will be energized. The relay R1480 operates and locks itself over its right hand winding over a circuit including the contacts 1481, and the contacts 1486 of the release key. At its contacts 1482 and 1483, the relay R1480 will complete circuits for illuminating the alarm lamp 1487 and the alarm signal 1485. These alarm signals will remain locked in until the release key contacts 1486 are opened to release the relay R1480. This operation, however, will not be made until the exchange attendant has checked the particular multiple conductor that is falsely grounded and indicated by the illumination of a lamp, such as the lamp 1484.

It will be assumed, however, for the purpose of this description that the translator 1300 is operating satisfactorily and that no signals have been given to indicate that any of the multiply connected conductors have been falsely grounded. Consequently, the multiple guard relay R1440 will restore to normal when the relay R1380 is operated thereby to disconnect all of the 34 individual lamps connected to the multiply connected conductors 1 to 34, inclusive, and ground potential will be removed, at its contact 35 from the guard control relay B1470. The last-mentioned relay will now restore to normal and prepare, at its contacts 1471, a point in the circuit for reoperating the multiple guard relay R1440 as soon as the translator 1300 is restored to an idle condition.

Shortly after the above-traced circuit is completed for the translator start relay R1010 the relay operates and, at its contacts 1011, short-circuits the self-interrupting contacts 1005 of the rotary magnet RM1004 and it completes, at its contacts 1013, a point in the circuit for operating the translator test relay R1050 in the series with the particular translator relay in the translator 1300 which has been selected in accordance with the position of the code switch 1100 in response to the dialing of the first three digits of the called office code, as will subsequently be described. Also, the relay R1010, at its contacts 1014, prepares a point in a circuit for applying direct ground potential to the conductor C684, but this circuit is not completed immediately due to the fact that the translator timer relay R1020, although its circuit is opened at the present time, is somewhat slow to release. Finally, at its contacts 1016, the relay R1010 prepares a point in the circuit for operating the unassigned code relay R1060. However, the last-mentioned relay, due to its slow-to-operate characteristics and due to the fact that its circuit will normally be interrupted, at the contacts 1051, prior to the time that the relay R1060 can fully operate, the relay R1060 does not operate when the remaining circuits function in the proper manner.

Figure 17:
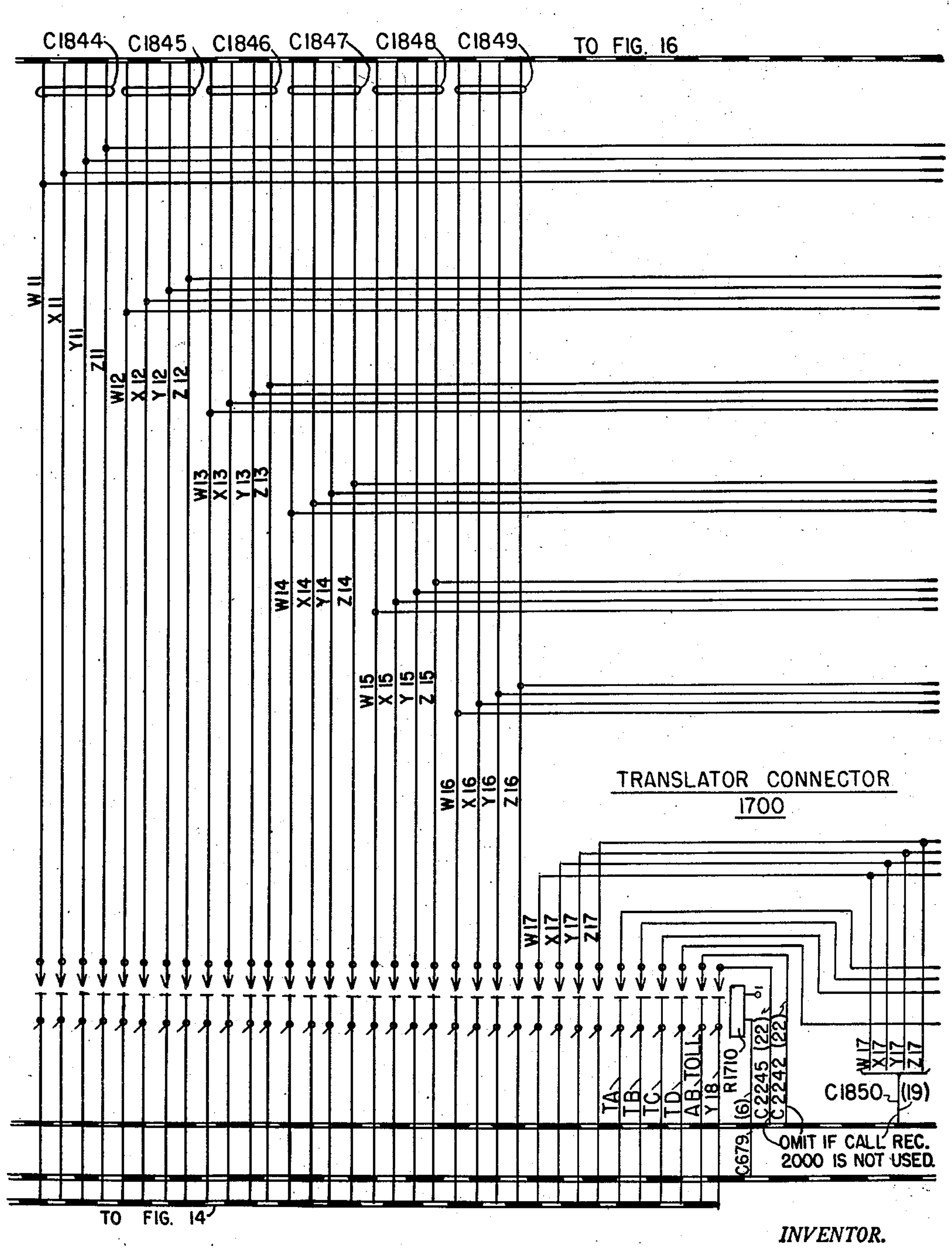

Referring again to the assigner test relay R650 it will be recalled that this relay operated in series with the rotary magnet RM1004 as soon as the translator assigner 1000 found the calling director. The relay R650, at its contact 652, applies ground potential to either the class 1 conductor C681, the class 2 conductor C682, or the class 3 conductor C683, depending upon the operated or non-operated positions of the relays R670 and R710 in accordance with the class of a particular calling line. Also, at its contacts 653, the relay R650 applies ground potential to the conductor C679 extending to Fig. 17. Referring now to Fig. 17, it will be seen that when ground potential is applied to the conductor C679 the multi-contact translator connector relay R1710 is operated. This relay, at its contacts 1 to 34, inclusive, connects the various registers in the coder 1800 and other marking conductors, to the 34 conductors extending to 34 corresponding contacts in each of the translator relays, such as the translator relays R1410, R1420, R1430,etc. in the translator 1300. The 34 conductors terminating in the lower contacts of the multiple contact relay R1710 are also multipled to each of the translator connector relays, such as the relay R1710, in each of the directors provided in the system. Since only one director and its associated coder can be connected to the translator 1300, as has been determined by the operation of the translator assigner 1000, the route digits corresponding to a particular operated translator relay such as the relays R1410, R1420, etc., are transferred to the coder 1800 in a manner to be described hereinafter.

From the foregoing description it will be understood that when a director requires the use of a translator the translator assigner 1000 is operated to find the calling director and, when the calling director is found, the coder 1800 portion of the director is connected to the common translator 1300 through the medium of the translator connector relay R1710. It is now necessary to control the particular translator relay, such as R1410, R1420, etc. in the translator 1300 which corresponds to the class of the particular calling line and which also corresponds to the called office code digits which have been registered in the code registers 1520, 1530 and 1540 of the call register 1500.

It may be well to mention at this time that each of the translator relays in the translator 1300 is permanently wired in code to register in the coder 1800 one or more of the necessary routing digits to extend a connection from the originating exchange over a pre-selected route or routes to extend a call in the direction of the desired called exchange. Also these translator relays are permanently wired to register in the coder 1800, all of such route digits and, in addition thereto, various control markings for controlling the sender portion of the director to send out the registered routing digits in a predetermined order and to select one or more of the dialed digits registered in the call register 1500 which are necessary to complete the connection to the desired called subscriber. The translator relays in the translator 1300 also register in the coder 1800 certain items of information which are required to determine the rate at which the call being extended should be charged and other information which will be described in connection with the operation of the detail circuits.

The manner in which a particular translator relay in the translator 1300 is operated will now be described. When the translator start relay R1010 operated and closed its contacts 1013, ground potential was extended by way of the contacts 1031, the winding of the translator test relay R1050, contacts 1062, the wiper 1003, conductor C1070 extending to Fig. 15, the wiper 1527 and the engaged contact 3, the conductor C1223 extending to Fig. 12, the wiper 1202 in engagement with the contacts 61 in its associated contact bank. It will be recalled that the code switch 1100 has positioned all of its wipers into engagement with the first contact in the sixth level in response to the registration of the second and third digits 61 in the second and third code registers 1530 and 1540. Consequently, the ground potential applied to the wiper 1202 is further extended by way of the conductor C1241 to a terminal on the terminal block TB1240, and then by way of the jumper C1242 to a terminal of the terminal block TB1250, and then over conductor C1243 to contact 1 of the relay R1310, contact 1 of the relay R1320, and contact 1 of the relay R1330. The further extension of this circuit to control the operation of a particular translator relay, such as the relays R1410, R1420, etc., depends upon the class of the calling line as determined by the operated or non-operated conditions of the relays R670 and R710 in the controller 600.

However, before describing the circuits for operating the class relays R1340 to R1360 in the translator 1300 it may be well to explain the fact that each of the contacts in the code switch 1100 is jumpered to terminals on the terminal block TB1240. More specifically, each bank associated with each of the wipers 1201 to 1208, inclusive, of the Strowger switch 1200 is provided with ten rows of ten contacts constituting a bank of 100 separate contacts. Since there are eight banks, each provided with 100 contacts, 800 separate conductors, such as the conductor C1241, are jumpered from the 800 terminals in the Strowger switch bank to the terminal block TB1240. Thus it will be seen that any one of 800 contacts may be selected depending upon the wiper of the Strowger switch 1200 selected in accordance with the first digit registered in the first code register 1520, and in accordance with the particular contact in the Strowger switch 1200 which is selected in accordance with the second and third digits registered in the second and third code registers 1530 and 1540. The number of translator relays, such as relays R1410, R1420, etc., which are to be provided in an originating exchange depends upon the number of code translations which are necessary in extending a call from an originating calling subscriber line to any other called subscriber in any exchange in the system. In the system being described it may be assumed that 175 separate translator relays, such as the relay R1410, have been provided, but only five such relays have been shown, namely, the relays R1410, R1420, R1430, R1450 and R1460. Each of the windings of the 175 relays terminate on terminals in the terminal block TB1396 and they may be jumpered individually to various terminals on the terminal block TB1395 as is required. The particular translator relay which is selected is determined by the class of the calling line and the first 3 digits dialed by the calling subscriber as previously noted. Since there are three separate classes of service provided, it is necessary to provide facilities by means of the terminal blocks TB1240 and TB1250 for jumpering any particular contact of the 800 contacts in the Strowger switch 1200 to one contact in each of the three sets of 175 contacts provided for each of the three classes of service. These three sets of 175 contacts may, in turn, be jumpered to one or more of the 175 translator relays, such as the relay R1410, by means of jumpers, between the terminal block TB1395 and the terminal block TB1396. Although this particular system is provided with 175 translator relays, it should be understood that with the jumpering arrangements that have been provided and illustrated, any number of translator relays may be provided as determined by the number of different possible codes which may be dialed by the calling subscriber and the number of possible routes over which the different connections may be completed.

In the previous description it was pointed out that the assigner test relay R650 operated responsive to the association of the translator assigner 1000 with the calling director. A description was also given of the operation of the equipment in response to the operation of relay R650 and that the conductor C679 was grounded to cause the operation of the translator connector relay R1710 in order to associate the coder 1800 with all of the translator relays in the translator 1300. A description will now be given of the manner in which the class relays in the translator 1300 are operated in order ot complete the selection of the particular translator relay in the translator 1300.

Referring now to the operated assigner test relay R650 in addition to grounding the conductor C679 for the purpose previously described, at its contacts 652, it applies ground potential by way of the contacts 716 and 674 to the conductor C682 extending to Fig. 13. In the above described circuit for grounding the conductor C682 it is assumed that the class 2 test relay R670 has been operated and that it is locked in its operated position via the contacts 671 and 752. It should be understood, however, that the ground potential at contacts 652 may be connected with the conductor C683 in the event that the class 3 test relay R710 is operated or to the conductor C681 in the event that the class 2 test relay R670 and the class 3 test relay R710 are not operated.

Referring now to Fig. 13 it will be understood that when ground potential is applied to the conductor C682, as noted above, the class 2 relay R1350 in the translator 1300 will operate. At its contacts 1351, the relay R1350 completes an obvious circuit for operating the class 2 auxiliary relay R1320. This relay is provided with 175 separate make contacts which are closed in response to the operation of the relay. Although a single relay provided with 175 make contacts is illustrated, it should be understood that any number of relays having a total of 175 contacts may be provided. These relays would then be simultaneously operated to close all of their associated contacts and thus complete circuits to the 175 conductors, such as the conductor C1390. In the previous description it was pointed out that the conductor C1243 was grounded from contacts 1013 of the operated translator start relay R1010. Since the class 2 relay R1350 and the class 2 auxiliary relay R1320 have been operated, the ground potential applied to the conductor C1243 is extended via the contact 1 of the operated relay R1320 to the conductor C1390 terminating in a terminal on the terminal block TB1395 and then via the jumper C1391 to a terminal on the terminal block TB1396. The last-mentioned terminal also terminates the conductor C1392 extending through the winding of the translator relay R1410, to battery. When the above-mentioned circuit is completed the relay R1410 operates and, at its contacts 1 to 34, inclusive, it connects ground potential to certain of the 34 conductors extending to the coder 1800. The lower contacts 1 to 28, inclusive, of the relay R1410 respectively terminate seven sets of four marking conductors designated WXYZ11 to WXYZ17, inclusive. The last six contacts 29 to 34, inclusive, respectively terminate six conductors designated TA, TB, TC, TD, ABT and Y18. The above-mentioned 34 conductors, are multiply connected to the corresponding 34 contacts in all of the remaining translator relays, such as the translator relay R1410, and are connected respectively to the corresponding 34 contacts of the translator connect relays, such as relay R1710, in all of the coders, such as the coder 1800. Associated with the upper contacts of the relay R1410, a terminal arrangement is provided whereby a common ground busbar may provide ground potential on any one of the 34 upper contacts by merely soldering any one of the 34 contacts to the associated ground busbar. In this manner each of the four WXYZ code marking conductors in the seven groups designated 11 to 17, inclusive, may be grounded in accordance with a four conductor code to register any one of ten digits 1 to 9 and 0. The last six conductors TA to TD, inclusive, and ABT and Y18 may be grounded individually or in combinations to provide certain specific controls in the director.

For the purpose of this description it will be assumed that the routing digits required to extend a connection from a subscriber in the FLorida 3 exchange to a subscriber in the EMpire 1 exchange are the digits 4 and 8. Consequently, the X11 and Y11 conductors should be grounded via contacts 2 and 3 respectively when the relay R1410 is operated. The grounding of the X11 and Y11 conductors will mark these conductors in code form in accordance with the digit 4. In order to mark the second group of four conductors, that is the WXYZ12 conductors, in accordance with the digit 8, the X12 conductor is grounded via the contacts 6 when the relay R1410 is operated. Consequently, the upper contact portion of the contacts 2, 3 and 6 of the relay R1410 are soldered to the grounded busbar in the manner described above.

It should be pointed out at this time that if more than two routing digits, and up to six routing digits, are required to extend a connection to a desired called exchange, the additional WXYZ13 to 16, inclusive, marking conductors may be grounded in accordance with any one of the ten digits 1 to 9 and 0. The four WXYZ17 marking conductors are provided to indicate the units digit of the rate of charge for a call completed between a subscriber in the FLorida 3 exchange and a called subscriber in the EMpire 1 exchange. For the purpose of this description it will be assumed that this rate is the rate 1. Therefore, the W17 and X17 code marking conductors will be grounded when the R1410 relay is operated. Finally, the TB conductor and the ABT conductor will be grounded in this class of call in order to control the director to transmit the last five digits of the called subscriber number as registered in the call register 1500 and to indicate that the particular call is an AB toll call requiring a toll ticket. The Y18 code marking conductor will not be grounded in the present call because the tens digit of the rate will be the digit 0.

Before proceeding with the description of operation of the circuits whereby the information permanently wired in the translator relay R1410 is transferred to the coder 1800, it should be noted at this time that the information permanently wired on the translator relay R1410 may be used when calls are completed between the FLorida 3 exchange and the EMpire 2 and the EMpire 3 exchanges serving called subscribers located in the same local exchange area as the subscribers served by the EMpire 1 exchange. Consequently, in the case of a call being extended to a subscriber in the EMpire 2 exchange the calling subscriber at substation 401 dials the digits 362 instead of the digits 361. These digits will be registered in the first, second and third code registers 1520, 1530 and 1540 in the manner previously described and the wiper 1202 of the Strowger switch 1200 will be positioned into engagement with the second contact in the sixth level of its associated contact bank, instead of into engagement with the first contact in the sixth level as is the case when the digits 361 designating the EMpire 1 exchange, are dialed. In this case the jumper, such as the jumper C1241, will terminate in the contact 62 of the Strowger switch 1200 and it will be connected to the conductor C1243 by means of a jumper C1242. The translator 1300 will operate in the same manner as described in connection with the call being extended to the EMpire 1 exchange.

The same operations described above will take place when the EMpire 3 exchange is called by the registration of the digits 363 in the code registers 1520, 1530 and 1540, and the wiper 1202 of the Strowger switch 1200 will be positioned into engagement with the third contact in the sixth level of the Strowger switch 1200. This contact will also be jumpered in the manner previously described to the conductor C1243. Since the calling subscriber at substation 401 is a class 2 subscriber, the translator 1300 will operate in the manner previously described and will cause the operation of the translator relay R1410. From the foregoing it will be understood that when any class 2 subscriber in the FLorida 3 exchange desires to extend a connection to a subscriber in the EMpire 1, EMpire 2 or EMpire 3 exchanges the same translator relay R1410 may be operated to register the routing digits 48 in the coder 1800, to register the rate 1 in the coder 1800, to select the last five digits dialed by the calling subscriber and registered in the call register 1500 for transmission to complete the extension of the connection to the called subscriber line, and to indicate that the call is an AB toll call requiring ticketing information.

It has been assumed in the above description that calls from class 2 subscribers in the FLorida exchange to subscribers in the EMpire 1, EMpire 2 and EMpire 3 exchanges are charged at the same rate, that is rate 1. It should be understood, however, that if one of the EMpire exchanges is situated at a more remote point in the EMpire area, it may be advisable to apply a larger charge rate for a call to the last-mentioned exchange. In that event the translator relay R1410 will be used for calls to the EMpire 1 and EMpire 2 exchange and the rate 1 will be applied to such calls. However, another translator relay will be selected in the manner understood from the above description which translator relay will be permanently wired in the same manner as the relay R1410 except that the W17 and Y17 code marking conductors will be grounded instead of the W17 and X17 conductors, thereby applying the rate 2 to a call to the EMpire 3 exchange instead of the rate 1.

When the translator relay R1410 operates, the marking ground potentials are applied to certain of the various conductors WXYZ11 to 17, inclusive, the TA, TB, TC, TD, ABT and Y18 conductors, in the manner noted above. The ground potentials applied to the X11 and Y11 conductors completes circuits by way of the contacts 2 and 3 of the operated translator connect relay R1710 and the windings of the X and Y relays R1802 and R1803 of the first route digit registers, to battery. The relays R1802 and R1803 operate and at the inner left-hand contacts, these relays complete locking circuits for themselves to ground potential applied to the locking ground conductor C787 extending to Fig. 7. In this manner the digit 4 is registered in code form in the X and Y relays R1802 and R1803 in the first route digit registers of the coder 1800.

The ground potential applied to the X12 conductor by the translator relay R1410 is extended by way of the contact 6 of the translator connector relay R1710 to the winding of the X12 relay R1806 of the second route digit register, thereby to register the second route digit 8 in the coder 1800. The relay R1806, upon operating, completes a locking circuit, at its inner left-hand contacts, to the locking ground conductor C787. Since the WXYZ13 to WXYZ16 code marking conductors terminating in the contacts of the translator relay R1410 are not grounded when the last-mentioned relay operates, the corresponding third to sixth route digit registers in the coder 1800 are not operated.

W17 and X17 conductors are grounded when the translator relay R1410 operates and cause the operation of the W17 and X17 relays R1825 and R1826 of the rate register relays in the coder 1800. The relays also lock to the locking ground conductor C787. When the relay R1410 operates, it also applied ground potential to the TB conductor to complete a circuit then by way of the contact 30 of the operated translator connector relay R1710 and the winding of the relay R1885, to battery. The relay R1885 upon operating, at its left-hand contacts, completes a locking circuit for itself to the grounded conductor C787. Finally at the contact 33, the relay R1410 applies ground potential to the ABT conductor to complete a circuit by way of the contacts 33 of the translator connector relay R1710 and then by way of the conductor C2242 extending to Fig. 22 and the winding of the start relay R2230, to battery. The relay R2230 operates when the above-mentioned circuit is completed to start the operation of the call recorder 2000 shown on Figs. 19 to 22, inclusive. The description of operation of the call recorder 2000 will be described hereinafter.

Referring again to coder 1800 (Fig. 18) it will be seen that when the translator relay R1410 operated, it registered the route digits 4 and 8, and the rate digit 1, in the coder 1800, and it caused the operation of the relay R1885. The foregoing operations occurred simultaneously, inasmuch as they resulted from the closure of the contacts 1 to 34 by the operation of relay R1410. Referring now to the first route digit register relays, which register and store the first route digit 4, it will be seen that at the left-hand outer contacts, the relays R1802 and R1803 apply ground potential to the conductor C884 extending to Fig. 8, and then by way of the winding of the translation complete relay R810, to battery. In other words, as soon as a route digit is registered in one or more of the first WXYZ11 route digit register relays R1801 to R1804, inclusive, a ground potential is applied to the conductor C884 to operate the translation complete relay R810, in the controller 600 portion of the director to indicate that the translator 1300 has translated the called office code portion of the called subscriber directory number and has registered the translation in the coder 1800. The translator 1300 may now be disconnected from the particular calling director so that the translator 1300 may be used by other directors requiring the translation of the called office code dialed by a calling subscriber.

As noted above, the translation complete relay R810 operates as soon as a route digit is registered in the WXYZ11 first route digit registers in the coder 1800. Upon operating, the relay R810, at its contacts 811, interrupts a point in the previously traced locking circuit for the assigner start relay R640, which now restores to normal. At its contacts 641 and 642, the relay R640 transfers the hold conductor C685 from the circuit including the winding of the relay R650, which now restores to normal, to direct ground. Referring now to the translator assigner 1000 (Fig. 10) it will be seen that when the direct ground potential is substituted for the resistance ground potential on the conductor C685, a circuit will be completed via the wiper 1002, contacts 1041 and 1011 and the winding of the rotary magnet RM1004, to battery. As soon as the direct ground potential is applied to this circuit the rotary magnet RM1004 operates thereby to prepare the rotary magnet to advance the wipers 1001 to 1003, inclusive, an additional step under de-energization of the magnet RM1004. Also upon the restoration of the relay R640, at its contacts 644, it removes ground potential from the start conductor C686 extending to Fig. 10, thereby to interrupt the circuit for the start relay R1040. If no other director requires the use of a translator, the start relay, which is multiply connected to all of the directors in the system, is not grounded and the start relay R1040 will now restore to normal. It is immaterial, as far as the translator assigner 1000 is concerned, whether the start relay R1040 restores to normal at the present time, inasmuch as the rotary magnet RM1004 will be automatically controlled to advance the wipers 1001 to 1003, inclusive, to contacts in the associated contact banks terminating a director which may be calling for a translator, or to the contacts of a director which is in an idle position.

The manner in which the start circuit is bypassed upon the completion of the translation operation is controlled responsive to the restoration of the relay R650. More specifically, at the contacts 651, the relay R650 interrupts the previously traced circuit over the conductor C684 for energizing the director hold relay R1030, which relay now restores to normal. Upon restoring, the relay R1030, at its contacts 1032, interrupts the circuit for the translator start relay R1010 which also restores to normal. Upon restoring, the relay R1010, at its contacts 1013, interrupts a point in the previously traced circuit for controlling, in series, the relay R1050 and the translator relay R1410 in the translator 1300. The relays R1050 and R1410 now restore to normal and the latter relay, at its associated contacts 1 to 34, inclusive, removes the marking ground potentials from the associated conductors, since the information, permanently stored in the translator relay R1410, has now been transferred to the coder 1800 in the manner previously described. Also at the contacts 1011, the relay R1010 interrupts a point in the circuit for energizing the rotary magnet RM1004 thereby to deenergize this magnet and cause it to restore to normal and thus advance the wipers one step in a clockwise direction. Inasmuch as the relays R1030 and R1010 have restored to normal and opened their respective contacts 1033 and 1015, ground potential is removed from the conductor C1071 extending to Fig. 13, thereby to cause the restoration of the relay R1380 in the translator 1300.

If no other director is maintaining a starting ground on the start conductor C686 after ground potential has been removed therefrom by the particular calling director, the relay R1040 will restore to normal and the translator assigner 1000 will be in a restored condition so that it may respond and again perform the previously described cycle of operation, the next time a calling director applies a starting ground potential to the conductor C686.

In the event that the translator 1300 has functioned properly to transfer information to the coder 1800 within a predetermined elapsed time interval, which is controlled by the slow-to-operate characteristics of the relays R1010, R1020 and R1060, the relay R1020 will release after the restoration of the start relay R1040. The slow-to-release action of the translator timer relay R1020 serves as a timing means to prevent excessive holding of the translator assigner 1000 and to automatically give an alarm in the case of irregular calls.

In the case of an irregular call, that is, a call in which the director hold relay R1030 is not released prior to the time that the slow-to-release translator timer relay R1020 has released, the translator assigner 1000 is automatically disconnected from the particular calling director and is made available for other calling directors. Since the time required for passing information stored in a translator relay, such as the relay R1410 in the translator 1300, to the coder 1800 is very short, the holding time of the translator assigner 1000 must not exceed the releasing time of the relay R1020, after the operation of the relay R1010. In other words, the relay R1030 must be released prior to the time that the relay R1020 releases. If it is assumed that the translator timer relay R1020 releases prior to the restoration of the relay R1030, at its contacts 1021, the relay R1020 short-circuits the relay R1030 to forceably restore the relay R1030. The ground potential which short-circuits the relay R1030 is also applied to the conductor C684 and causes the operation of the translator failure relay R660. It should be understood that the assigner test relay R650 would be in its operated position inasmuch as the translation has not been completed. The relay R660 upon operating completes a locking circuit for itself over a circuit including its lower winding, the contacts 664, and the release key contacts 614. The relay R660 will remain in its operated position until an attendant in the exchange manually actuates the release key. In its operated position, the relay R660, at its contacts 661, maintains the director busy relay R610 in its operated position; at its contacts 662, it interrupts the circuit for the assigner start relay R640 and causes the cycle of operations described above to be restarted; at its contacts 663, it extends the busy tone signal, applied to the conductor C836, by way of the contacts 663, 623 and 775, and then over the conductor C1136 to the calling subscriber; and finally, at its contacts 665, it closes a circuit for illuminating the incomplete transmission lamp 609. The calling subscriber upon hearing the busy tone signal will replace the receiver upon the switchhook of his associated telephone instrument thereby to release the incomplete telephone connection. The lamp 609 provides a signal to indicate to the attendant in the telephone exchange that a troubled condition exists in the particular calling director and when the trouble has been cleared, the attendant will operate a release key and interrupt the contact 614 to cause the restoration of the translation failure relay R660. In this manner the director which has been locked out of service will again be made available for additional calls.

Continuing again with the normal operation of the translator assigner 1000, which is based upon the assumption that the translation was made by the translator 1300 and stored in the coder 1800 within the predetermined elapsed time interval, it will be understood that when the relay R650 restores, at its contacts 652, it removes ground potential from any one of the selected class conductors C681 to C683, inclusive. In the present call it has been assumed that the class 2 test relay R670 is in its operated position and therefore, ground potential is removed from the class 2 conductor C682 extending to Fig. 13, thereby to cause the restoration of the class 2 relay R1350 in the translator 1300. The relay R1350, upon restoring, interrupts, at its contacts 1351, the circuit for the relay R1320, which upon restoring, opens its contacts 1 to 175, inclusive. Finally at the contacts 653, the relay R650 removes ground potential from the conductor C679 extending to Fig. 17, thereby to interrupt the previously traced circuit for the translator connector relay R1710. This relay now restores to normal and, at its contacts 1 to 34, inclusive, disconnects the coder 1800 portion of the particular calling director from the corresponding 34 conductors.

From the foregoing description of operation it will be understood that the translator 1300 was assigned for the exclusive use of the calling director for a very short period of time, during which time, the information which is permanently stored in the translator 1300 is transferred to and registered in the coder 1800. The particular translator relay, such as the relay R1410, which has been operated to transfer its information is selected in accordance with the first three called office code digits dialed by the calling subscriber and in accordance with the class of service of the particular calling subscriber substation.

*Sending of the digits by the director to control the setting of the switches*

It will be recalled that when the coder 1800 was operated to register the first route digit in the WXYZ11 register relays R1801 to R1804, inclusive, the translation complete relay R810, in the controller 600 portion of the director, was operated to indicate that the translation of the code digits of the call in question has been completed. The relay R810, in addition to causing the release of the assigner start relay R640 and the subsequent disconnection of the translator 1300 from the calling director, also completes a circuit, at its contacts 814, for operating the start-send relay R930. This relay, upon operating, at its contacts 932, completes a locking circuit for itself from ground at contacts 758.

The operation of the start send relay R930 initiates the operation of the director to send out the routing digits, which have been stored in the coder 1800, and certain of the dialed digits, which are stored in the code and numerical registers of the call register 1500. Also, upon operating, the relay R930, at its contacts 931, applies ground at the contacts 751 to the conductor C977 extending to Fig. 16. This ground potential is applied to contacts 1 to 8, inclusive, in the bank associated with the wiper 1653 of the sending sequence switch 1650 in order to permit the last-mentioned switch to start sending, and to continue sending, all of the digits registered in the route digit registers of the coder 1800, without regard to the speed at which the calling subscriber may dial, into the call register 1500, the last four digits of the called number. In other words, after the calling subscriber has registered the first three digits of the called office code in the first, second and third code registers 1520, 1530 and 1540, the director then immediately functions to cause the translator 1300 to transfer to the coder 1800, the required routing digits, and when the translation is completed, the sender portion of the director is operated to send out of all of the routing digits during the time that the calling subscriber registers, in the call register 1500, the remaining four digits of the numerical portion of the called subscriber directory number.

As a further result of the operation of the relay R930, at its contacts 933, it connects battery through the resistor 935, the contacts 933, the contacts 868 (as soon as the relay R860 is operated) to the right-hand winding of the relay R910. Finally, at its contacts 934, it extends ground potential from the contacts 753' through the resistor 936, the contacts 934, to the right-hand winding of the relay R910. At the present time the resistance battery mentioned above is not applied to the right-hand winding of the relay R910 since the relay R860 is not operated. Consequently, the resistance ground potential is further extended through the right-hand winding of the relay R910, the contacts 882, the conductor C468 extending to Fig. 4, the wiper 453 of the director hunter 450, the conductor C501, the contacts 512 and 521, and the upper winding of the line relay R530 of the primary selector 500, to battery. The line relay R530 in the primary selector 500 now operates and prepares the primary selector 500 to respond to the first routing digit which is to be transmitted by the sender portion of the director.

The send sequence switch 1650 has all of its wipers 1653 to 1658, inclusive, positioned into engagement with the contacts 1 in the associated banks because upon seizure of the director the relay R750, at its contacts 757, applied ground potential to the conductor C794 extending to Fig. 16, and then by way of the normally closed contacts of the sender sequence switch off-normal contacts 1659, the self-interrupting contacts 1652, and the winding of the rotary magnet RM1651, to battery. The rotary magnet RM1651 operated and interrupted its operating circuit, at its contacts 1652, and thereby advanced the wipers 1653 to 1658, inclusive, in a counterclockwise direction from the home contact positions into engagement with the contacts 1. Consequently, when the relay R930 applies ground potential to the conductor C977, as noted above, a circuit is completed by way of the wipers 1653 in engagement with the contact 1, the conductor C892 extending to Fig. 8, the contacts 864, the winding of the pulse control relay R870, and the resistor 879, to battery. The relay R870 operates over the above-traced circuit and, at its contacts 877, it further extends the ground, on the conductor C892, via the contacts 864, 881, and 877, to the conductor C895 extending to Fig. 16, and the winding of the rotary magnet RM1661 of the sender switch 1660, to battery. Since the pulse relay R880 is intermittently operated at the rate of ten pulses per second under control of the pulse generator 700, the ground potential applied to the conductor C895 is intermittently interrupted, at the contacts 881, whereby the magnet RM1661 of the sender switch 1660 is intermittently operated at the rate of ten pulses per second.

Before describing further operations of the sender switch 1660 and the send sequence switch 1650, it should be understood that the sender switch 1660 is controlled by the pulsing relay R880 to advance its wipers 1663 to 1667, inclusive, so that the wipers 1665 and 1666 may simultaneously test corresponding contacts in the associated contact banks for code marking potentials which are applied to the respective contacts in accordance with the code of the digit registered in the particular register selected by the wipers 1655 to 1658, inclusive, of the send sequence switch 1650. Referring to the contacts in the banks associated with the wipers 1665 and 1666 it will be seen that the home contact and the contacts 1 and 2 are vacant and that contacts 3 to 12, inclusive, are either directly grounded or are connected to the WXYZ wipers 1655 to 1658, inclusive, of the sender sequence switch 1650. The last-mentioned wipers, as they are advanced step-by-step over their associated contact banks, selectively connect the WXYZ11 conductors C1844, to WXYZ16 conductors C1849 of the corresponding route digit registers in the coder 1800 to the contacts of the sender switch switch 1660. The last-mentioned six groups of WXYZ11 to WXYZ16 conductors terminate respectively in contacts 1 to 6 of the banks associated with the wipers 1655 to 1658, inclusive. The remaining contacts 7 to 13, inclusive, terminate respectively the WXYZ21 to WXYZ27 conductors which extend to the first, second and third code registers 1520, 1530 and 1540 and to the first, second, third and fourth numerical registers 1610, 1620, 1630 and 1640. Consequently, the sender sequence switch 1650 may, during successive steps of the associated wipers, test the various WXYZ11 to 16 and the WXYZ21 to 27 groups of conductors to determine the digit registered in code in the registers associated with the respective conductors. Furthermore, the sender switch 1660 in advancing its wipers over the associated contacts 3 to 12, inclusive, will upon each cycle of rotation test the WXYZ conductors to determine the digit that is registered in the particular register which is connected thereto by the sender sequence switch 1650. When a particular code digit has been found and a corresponding number of pulses have been transmitted simultaneously with the step-by-step action of the sender switch 1660, the sending out of the pulses corresponding to the registered digit will be terminated and the sender switch 1660 will be controlled first to advance its wipers step-by-step in a rapid manner under control of the self-interrupting contacts on the rotary magnet; secondly, to advance its wipers step-by-step over the associated contacts 14 to 19, inclusive, at the rate of ten pulses per second; and finally, to advance its wipers to the home contact at a rapid rate, again under control of the self-interrupting contacts on the magnet. The slow rate of stepping which occurs while the wipers are advancing over the contacts 14 to 19, inclusive, provides a digit spacing interval between the transmission of successive impulse trains constituting successive digits. This interdigital delay is accomplished under the joint cooperation of the sender switch 1660 and the digit space relay R860. After each digit has been sent out by the sender switch 1660 the sender sequence switch 1650 is advanced an additional step in order to select the WXYZ conductors of the next digit register and to extend the code markings of the registered digit to the bank contacts of the sender switch 1660. In this manner the sender sequence switch 1650 and the sender switch 1660 cooperate to successively transmit the routing digits registered in the coder 1300 and the digits constituting the directory number of the called subscriber substation registered in the call register 1500.

The first time the pulse relay R880 operates, after the operation of the relay R870, it completes a circuit for energizing the rotary magnet RM1661 of the sender switch 1660. This circuit may be traced from the grounded conductor C977 terminating in contacts 1 to 9, inclusive, associated with the wiper 1653, the wiper 1653 in engagement with contact 1, conductor C892 extending to Fig. 8, contacts 864, 881 and 877, conductor C895 extending to Fig. 16, and the winding of the magnet RM1661, to battery. The magnet RM1661 operates when the above-traced circuit is completed, thereby to prepare the sender switch 1660 to advance its wipers from engagement with the home contact into engagement with contact 1 in the associated contact banks. At the end of the first pulse, that is when the relay R880 restores to normal, the contacts 881 are opened thereby to interrupt the circuit for the rotary magnet RM1661 which now restores to normal and advances the wipers 1663 to 1667, inclusive, into engagement with the contacts 1 in the associated contact banks.

The next operation of the pulsing relay R880 reoperates the magnet RM1661 and at the end of the pulse, that is when the relay R880 restores, the magnet RM1661 restores to normal and advances its wipers into engagement with contacts 2 in the associated contact banks. During the time that the wiper 1663 is in engagement with the home contact and contact 1, no pulses are transmitted over the conductor C468 to the winding of line relay R530 in the primary selector 500, due to the fact that a short-circuit is placed around the impulsing contacts 882. This short-circuit includes the conductor C899 extending to Fig. 16, the wiper 1663, the conductor C975 multiply connected to the home contact and contact 1, and 13 to 24, inclusive, and extending to Fig. 9 and returning to contacts 882. In other words, whenever the wiper 1663 of the sender switch 1660 is in engagement with the home contact and contacts 1, and 13 to 24, inclusive, the impulsing contacts 882 of the impulsing relay R880 are short-circuited so that interruptions of the pulsing circuit over the conductor C468 by the pulsing relay R880 are ineffective.

The next time the pulse relay R880 operates, after the wiper 1663 is in engagement with contact 2, an impulse is transmitted at the contacts 882 over the conductor C468 at the same time an impulse is transmitted at contacts 881 over the conductor C895 to the rotary magnet RM1661. When the pulse relay R880 restores, the impulse transmitted over the conductor C468 is terminated and the impulse transmitted over the conductor C895 is terminated to cause the sender switch magnet RM1661 to advance its wipers into engagement with the contacts 3 in the associated contact banks. Each step that the wipers of the sender switch 1660 take, after contact 2 in the associated contact banks have been reached, corresponds to the number of pulses transmitted by the pulse relay R880 over the pulsing conductor C468. It is after the wipers 1665 and 1666 reach the contact 3 in the associated contact banks that the testing begins to determine the digit that has been registered in the register selected by the sequence switch 1650.

In the present example it has been assumed that the digit 4 has been registered by the translator 1300 in the WXYZ11 relays R1801 to R1804, inclusive, of the first route digit register. Therefore, the XY11 relays R1802 and R1803 have been operated and the ground potential applied to the locking ground conductor C787 is extended by way of the left-hand inner make contact of the operated X11 relay R1802, over the X11 conductor of the group C1844 to the contact 1 engaged by the X wiper 1656 of the sender sequence switch 1650. Also the ground potential applied to the locking ground conductor C787 is extended by way of the left-hand inner make contact of the Y11 relay R1803, over the Y11 conductor of the group C1844 to the contact 1 engaged by the Y wiper 1657 of the send sequence switch 1650. Although the W11 and Z11 conductors C1844 terminate in contact 1 engaged by the W wiper 1655 and the Z wiper 1658, no marking ground potential is applied thereto when the digit 4 is registered in the WXYZ11 relays R1801 to R1804, inclusive. Since the digit 4 has been registered, it is necessary to transmit four impulses corresponding to four steps of the sender switch 1660 to advance the wipers 1665 and 1666 from the contacts 2 to the contacts 6 in the associated contact banks. When the wipers 1665 and 1666 engage the contacts 6 in the associated contact banks, a circuit should be completed for energizing simultaneously both the left-hand and the right-hand windings of the digit stop relay R920.

At the end of the fourth impulse transmitted over the conductor C468 by the pulse relay R880 the wipers of the sender switch 1660 will be advanced into engagement with the contact 6 in the associated contact banks. As soon as the wipers engage these contacts the ground potential applied to the X wiper 1656 is extended over the wiper 1665 and the engaged contact 6 to the conductor C976 extended to Fig. 19 and the right-hand winding of the digit stop relay R920, to battery. The right-hand winding of the relay will energize when the above-traced circuit is completed and it should be noted at this time that this relay is constructed so that it will not operate its associated contacts 921 unless the two windings of the relay are simultaneously energized. In the present example the left-hand winding of the relay will be simultaneously energized with the right-hand winding because the ground potential applied to the Y wiper 1657 in engagement with contact 1, is extended over the wiper 1666 and the engaged contact 6 the conductor C974 extending to Fig. 9, and the left-hand winding of the digit stop relay R920, to battery. The digit stop relay R920 now operates and, at its contacts 921, completes a circuit for operating the digit space relay R860. The last-mentioned relay, at its contacts 865, completes a locking circuit for itself which is independent of its initial energizing circuit. This circuit may be traced from ground at the contacts 751 of the operated seizure relay R750 and then by way of the conductor C788 extending to Fig. 16, the contacts 1 to 24, inclusive, associated with the wiper 1664 of the sender switch 1660, the conductor C890 extending to Fig. 8, the contacts 865, and the winding of the digit space relay R860, to battery.

From the foregoing it will be understood that whenever the digit space relay R860 is operated, it will lock itself over a circuit including any one of the contacts 1 to 24, inclusive, of the wiper 1664 in the sender switch 1660 and it will remain in its operated position until the sender switch 1660 has again positioned its wipers into engagement with the home contacts in the associated contact banks in the manner to be described hereinafter. As a further result of the operation of the digit space relay R860, at its contacts 866, it places a short-circuit around the impulsing contacts 882, and, at contacts 868, it prepares a testing circuit for the right-hand winding of the delay send relay R910. The last-mentioned relay is provided to prevent the sending out of the next digit over the conductor C468 in the event that the next impulse receiving switch in the switch train over which the connection is to be set up is not in a condition to receive the impulses of the next digit transmitted by the director. The operation of the delay send relay R910 is controlled by the application of a ground potential to the conductor C468 which causes the operation of the relay R910. This relay in operating, at its contacts 911, maintains the digit space relay R860 operated even though its locking circuit had been interrupted by the return of the wipers of the sender switch 1660 to home contacts in the associated contact banks. However, as soon as the next switch in the switch train is in condition to receive the impulses of the next digit, the ground potential will be removed from the conductor C468 and will cause the delay send relay R910 to restore to normal, thereby to permit the digit space relay R860 to restore to normal.

For the purpose of this description, however, it will be assumed that the delay send relay R910 is not operated. As a further result of the operation of the relay R860, at its contacts 864, it interrupts a circuit for the pulse control relay R870 which also restores to normal and, at its contacts 863, it prepares a point in a circuit, including the conductor C893, for operating the pulse control relay R870 at a predetermined point during the automatic stepping of the sender switch 1660. As a further result of the operation of the relay R860, at its contacts 867, it removes the direct pulsing ground from the conductor C468 and substitutes in place thereof, the resistance ground extended through the resistor 936, the contacts 934, the right-hand winding of the delay send relay R910, the contacts 866 to the conductor C468, and the resistance battery through the resistor 935, the contacts 933 and 868 and over the previously mentioned circuit to the conductor C468. This transfer from a direct ground to a resistance battery and resistance ground, in multiple, provides the test circuit for the delay send relay R910 whereby the sending of the next digit is delayed when a direct ground is encountered on the conductor C468.

When the relay R870 restores to normal, as noted above, at its contacts 872, it opens an additional point in the circuit for the send sequence switch magnet RM1651 whereby the last-mentioned magnet restores and advances its wipers 1653 to 1658, inclusive, from engagement with contacts 1 into engagement with contacts 2 in the associated contact banks. As a further result of the restoration of the relay R870, at its contacts 871 and 873, it completes points in the circuits for controlling the sender switch magnet RM1661 so that the last-mentioned magnet will automatically advance its wipers at a high rate of speed from the contacts over which the digit stop relay R920 was operated to the contact 14 in the associated contact banks. The circuit for self-interruptedly operating the sender switch magnet RM1661 may be traced from ground at the wiper 1667 the engaged contact 6 in the associated contact bank, the conductor C898 extending to Fig. 8, the contacts 871, the conductor C897 extending to Fig. 16, the self-interrupting contacts 1662, and the winding of the rotary magnet R1661, to battery. When this circuit is completed, the rotary magnet RM1661 operates and when the magnet is fully operated, the contacts 1662 are opened, thereby to cause the rotary magnet RM1661 to restore to normal and advance its wipers 1663 to 1667, inclusive, an additional step in a counterclockwise direction from engagement with the contacts 6 into engagement with the contacts 7 in the associated contact banks. The above-mentioned cycle of operation is completed after each step of the wipers of the sender switch 1660. Consequently, the wipers are self-interruptedly advanced step-by-step over the contacts 6 to 12, inclusive, of the associated contact banks and when the wiper 1667 completes the above-traced circuit over the contact 12 the wipers are advanced one step into engagement with contact 13 in the associated contact banks. In this position the grounded wiper 1667 completes a circuit over the conductor C896 extending to Fig. 8, the contacts 873 and 871, the conductor C897 extending to Fig. 8, the self-interrupting contacts 1662, and the winding of the rotary magnet RM1661, to battery. The magnet RM1661 again operates and restores in the manner previously described and advances its wipers into engagement with the contacts 14 in the associated contact banks.

At this point in the circuit for restoring the wipers of the sender switch 1660 to their normal positions, the circuit for stepping the wipers step-by-step is transferred from the automatic self-interrupting circuit, whereby the wipers are advanced at a rapid rate, to a circuit which steps the wipers step-by-step at the rate of ten pulses per second over the contacts 14 to 19, inclusive. This stepping circuit is under control of the pulsing relay R880 and provides the interdigital pause by the transmission of successive pulses to the magnet RM1661. Consequently when the wiper 1667 engages the contact 14 in its associated contact bank, ground potential is extended over the conductor C893 extending to Fig. 8, the contacts 863, the winding of the pulse control relay R870, and the resistor 879, to battery. The relay R870 operates when the above-traced circuit is completed and, at its contacts 877, recompletes the circuit for pulsing the rotary magnet RM1661 under control of the contacts 881 of the pulse relay R880. Each time the pulse relay R880 operates, after the contacts 877 of the pulse relay R870 are closed, the ground potential applied to the winding of the pulse relay R870 is further extended by way of the contacts 881 and 877 to the conductor C895 extending to Fig. 16, and then through the winding of the rotary magnet RM1661, to battery. The magnet RM1661 operates and when the pulse is terminated, at contacts 881 upon the restoration of pulse relay R880, the rotary magnet RM1661 restores to normal and advances its wipers from engagement with contacts 14 in the associated contact banks into engagement with the contacts 15. Since the circuit for operating the relay R870 is maintained when the wiper 1667 is in engagement with the contacts 14 to 19, inclusive, the pulse relay R880 will directively control the rotary magnet RM1661 to step the wipers of the sender switch 1660 step-by-step over the contacts 14 to 19, inclusive, at the rate of ten pulses per second. When the wiper 1667 steps from the contact 19 in the associated contact bank, the above-traced circuit for operating, and maintaining operated, the pulse control relay R870 is interrupted, and the relay restores to normal thereby interrupting the previously described pulsing circuit for directively pulsing the rotary magnet RM1661. When the wiper 1667 engages contact 20 in its associated contact bank, the previously traced self-interrupting circuit for the magnet RM1661 is recompleted whereby the magnet RM1661 self-interruptedly advanced its wipers over the contacts 20 to 24, inclusive. When the wiper 1664 again engages the home contact in the associated contact bank, the locking ground potential applied to the conductor C788, for locking the digit space relay R860 in its operated position, is interrupted and the relay R860 restores to normal.

In view of the foregoing description of operation of sending out the first route digit registered in the coder 1800 it will be understood that the sender switch 1660 is controlled to advance its wipers step-by-step over the contacts of the associated contact banks to transmit a number of impulses corresponding to the digit registered in the register selected by the sender sequence switch 1650 and to return the wipers back to the home contacts in the associated contact bank; first by repeatedly advancing the wipers at a rapid rate; then by stepping the wipers at the rate of ten pulses per second to provide interdigital pause; and then again to repeatedly advance the wipers, at a rapid rate, to the normal home contact position. When the digit space relay R860 restores to normal at the end of the above-mentioned cycle of operation, the circuits are again in condition to repeat the cycle of operation in order to transmit the second route digit registered in the WXYZ12 relays R1805 to R1808, inclusive, in the coder 1800.

It will be recalled that after the sender switch 1660 found the contacts in the associated contact bank which were marked in accordance with the code markings of the first route digit 4 the magnet RM1651 of the send sequence switch 1650 restored to normal. When the wiper 1654 engages the contact 2 ground potential is applied to the conductor C1832 extending to Fig. 18, the left-hand break contacts of each of the WXYZ12 relays R1805 to R1808, inclusive, the skip common conductor C1831 extending to Fig. 16, the self-interrupting contact 1652, and the winding of the rotary magnet RM1651, to battery. This circuit is provided for each of the WXYZ12 to WXYZ16 inclusive second, third, fourth, fifth and sixth route digit register relays as the wiper 1654, of the send sequence switch 1650 is advanced step-by-step over the contacts 2 to 6, inclusive, and is only completed in the event a digit has not been registered in any one of the corresponding register relays of the second, third, fourth, fifth and sixth route digit registers. In the present example, the digit 8 has been stored in the X12 relay R1806 of the second route digit register. Since the last-mentioned relay is operated, the above traced series circuit through the left-hand break contacts of the WXYZ12 relays R1805 to R1808, inclusive, is interrupted and prevents the send sequence switch 1650 from advancing its wipers automatically at the present time. Therefore, the WXYZ wipers 1655 to 1658, inclusive, engage the contacts 2 in the associated contact banks respectively terminating the WXYZ12 conductors C1845 extending to the windings of the WXYZ12 relays R1805 to R1808, inclusive. Since the digit 8 has been stored in code in the second route digit registers, only the X12 relay R1806 is locked in its operated position to the locking ground on the conductor C787. This locking ground is also extended over the X12 conductor of the group C1845 extending to Fig. 16 and applies ground potential to the X wiper 1656.

With the wiper 1653 in engagement with contact 2 ground potential applied to the conductor C977 is extended over the conductor C892 in order to recomplete the previously traced circuit for operating the pulsing control relay R870, and in order to provide the pulsing ground for controlling the magnet RM1661 to advance its wipers 1663 to 1667, inclusive, step-by-step to search for the WXYZ wipers 1655, 1656, 1657 or 1658 having a code marking ground potential applied thereto corresponding to the digit stored in the second route digit register of the coder 1800. The operations of the sender switch 1660, the pulse control relay R870, and the pulse relay R880 are the same as has been previously described and it will be understood that when the wiper 1665 engages the contact 10 in the associated contact bank, the ground potential applied thereto is further extended over the conductor C976 to energize the right-hand winding of the digit stop relay R920. Simultaneously therewith the ground potential applied directly to the contact 10 engaged by the wiper 1666 is extended over the conductor C974 to energize the left-hand winding of the digit stop relay R920. When the two circuits described above are simultaneously closed, the relay R920 operates and, at its contacts 921, recompletes the previously traced circuit for operating the digit space relay R860 which locks itself in its operated position.

When the wipers 1665 and 1666 are being advanced step-by-step from the contacts 2 to the contacts 10, eight impulses are transmitted over the conductor C468 by the pulse relay R880 in order to control the setting of the next switch in the switch train in accordance with the second routing digit 8. During the stepping of the wipers 1665 and 1666 over the contacts 2 to 10, inclusive, circuits may be completed at different times for either the right-hand or left-hand windings of the relay R920. However, it is not until the wipers reach the contact 10 that circuits are completed for simultaneously energizing both windings of the relay R920 to terminate impulse transmission over the conductor C468.

The operations which now take place are substantially the same as those previously described whereby the sender switch magnet RM1661 is self-interruptedly controlled to advance its wipers step-by-step to the contacts 14, and whereby the wipers are advanced step-by-step under control of the pulse relay R880 over the contacts 14 to 19, inclusive, at ten pulses per second and back into engagement with the contact 1 under control of the self-interrupting circuit of the rotary magnet RM1661. In this manner the sender switch 1660 completes the second cycle of operation to provide the impulse transmission of the second route digit registered in the WXYZ relays R1805 to R1808, inclusive, in the coder 1800 and to provide the interdigital pause after the transmission of the second route digit 8.

Since no additional route digits are registered in the WXYZ13 to WXYZ16 third, fourth, fifth and sixth route digit registers in the coder 1800 the ground potential on the chain circuits including the left-hand break contacts of each of the WXYZ 13, 14, 15 and 16 route digit registers (not shown) are closed so that the skip conductor C1831 is successively grounded by the wipers 1654 of the send sequence switch 1650 as the last-mentioned wiper steps over the contacts 3, 4, 5 and 6.

More specifically, at the end of the transmission of the second route digit 8 the operation of the digit space relay R860 interrupts, at its contacts 861, the energizing circuit for the rotary magnet RM1651 thereby to cause the rotary magnet to advance the wipers 1653 to 1658, inclusive, from engagement with the contacts 2 in the associated contact bank into engagement with contacts 3 thereof. In this position the wiper 1654 applies ground potential to the conductor C1833 extending to Fig. 18, and then through the left-hand break contacts (not shown) of the four unoperated WXYZ13 relays, the skip conductor C1831 extending to Fig. 16, the self-interrupting contacts 1652, and the winding of the magnet RM1651, to battery. The magnet RM1651 operates over this circuit and when it is fully operated it interrupts its operating circuit, at its contacts 1652, whereupon the magnet restores to normal and causes the wipers 1653 to 1658, inclusive, to be advanced from engagement with the contacts 3 into engagement with the contacts 4. When the wiper 1654 engages contact 4, it applies ground potential through the conductor C1834 whereby a similar self-interrupting circuit is completed for the magnet RM1651 which circuit includes the closed left-hand break contacts of the WXYZ14 relays (not shown) of the fourth route digit register and the skip conductor C1831. The self-interrupting circuit is again completed for the rotary magnet RM1651 to cause it to operate and restore and to step the wipers from engagement with the contacts 4 into engagement with the contacts 5. When the wiper 1654 engages contact 5, it applies ground potential to the conductor C1835 whereby the above-traced circuit is now completed through the left-hand break contact of the unoperated WXYZ15 relays (not shown) and the skip conductor C1831. When this circuit is completed the rotary magnet RM1651 again operates and restores to advance its wipers from engagement with the contacts 5 into engagement with the contacts 6. In this position the wiper 1654 applies ground potential to the conductor C1836 and then by way of the closed left-hand break contacts of the WXYZ16 relays (not shown) of the sixth route digit register and the skip conductor C1831, in order to cause the rotary magnet RM1651 to operate and restore and thus advance its wipers from engagement with the contacts 6 into engagement with the contacts 7. The above-described operations whereby the wipers 1653 to 1658, inclusive, of the send sequence switch 1650 are advanced step-by-step in a self-interrupting circuit including the rotary magnet RM1651 are started as soon as the digit space relay R860 operates and are completed within a very short interval of time and will be completed before the wipers of the sender switch 1660 have been returned to the home contacts.

The operations which now take place depend upon the operated conditions of the TA, TB, TC and TD control relays R1890, R1885, R1880 and R1875 in the coder 1800. It will be recalled that these relays store certain controlling information determined by the selected translator relay R1410 in the translator 1300. In the present example the TB control relay R1885 has been operated and it is locked in its operated position to the locking ground conductor C787. By referring to Fig. 18 it will be seen that the conductors C1837, C1838 and C1839 may be connected to the skip conductor C1831 depending upon the operated or restored positions of the TA and TB control relays R1890 and R1885. Since the relay R1885 is in its operated position in the present call, at its contacts 1887, it disconnects the conductor C1839 from the skip conductor C1831, but the conductors C1837 and C1838 remain connected to the skip conductor C1831 by way of the contacts 1894 and 1893 respectively of the unoperated TA control relay R1890. Therefore, when the wiper 1654 of the send sequence switch 1650 engages the contact 7 it applies ground potential to the conductor C1837 extending to Fig. 18 and this ground potential is applied by way of the contacts 1894, to the skip conductor C1831 in order to again complete the self-interrupting circuit for the rotary magnet RM1651. The rotary magnet RM1651 now advances its wipers from engagement with the contacts 7 into engagement with the contacts 8. In this manner the send sequence switch 1650 will skip the digit registered in the first code register 1520 and marked on the WXYZ21 conductors.

Figure 18:
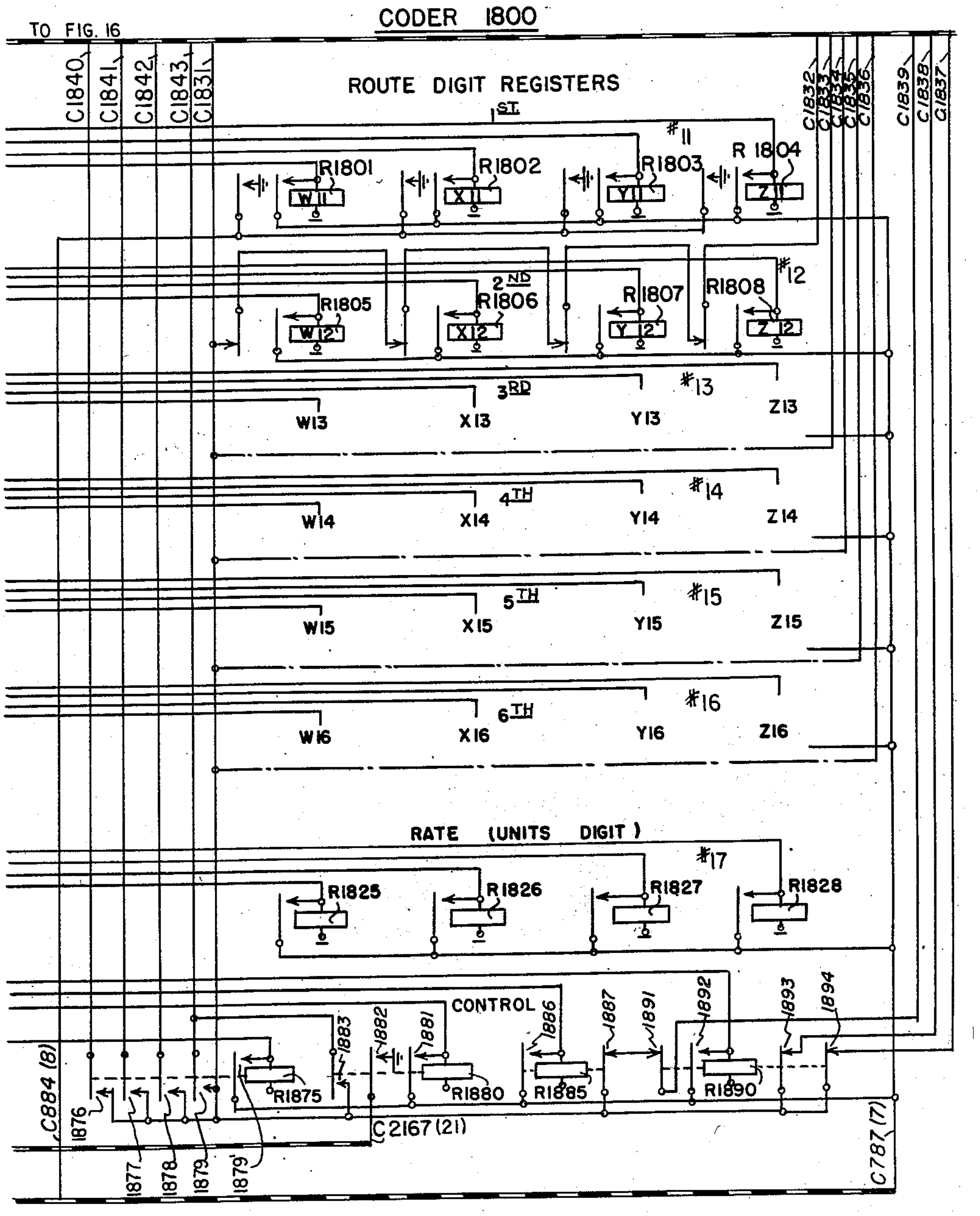
Figure 19:
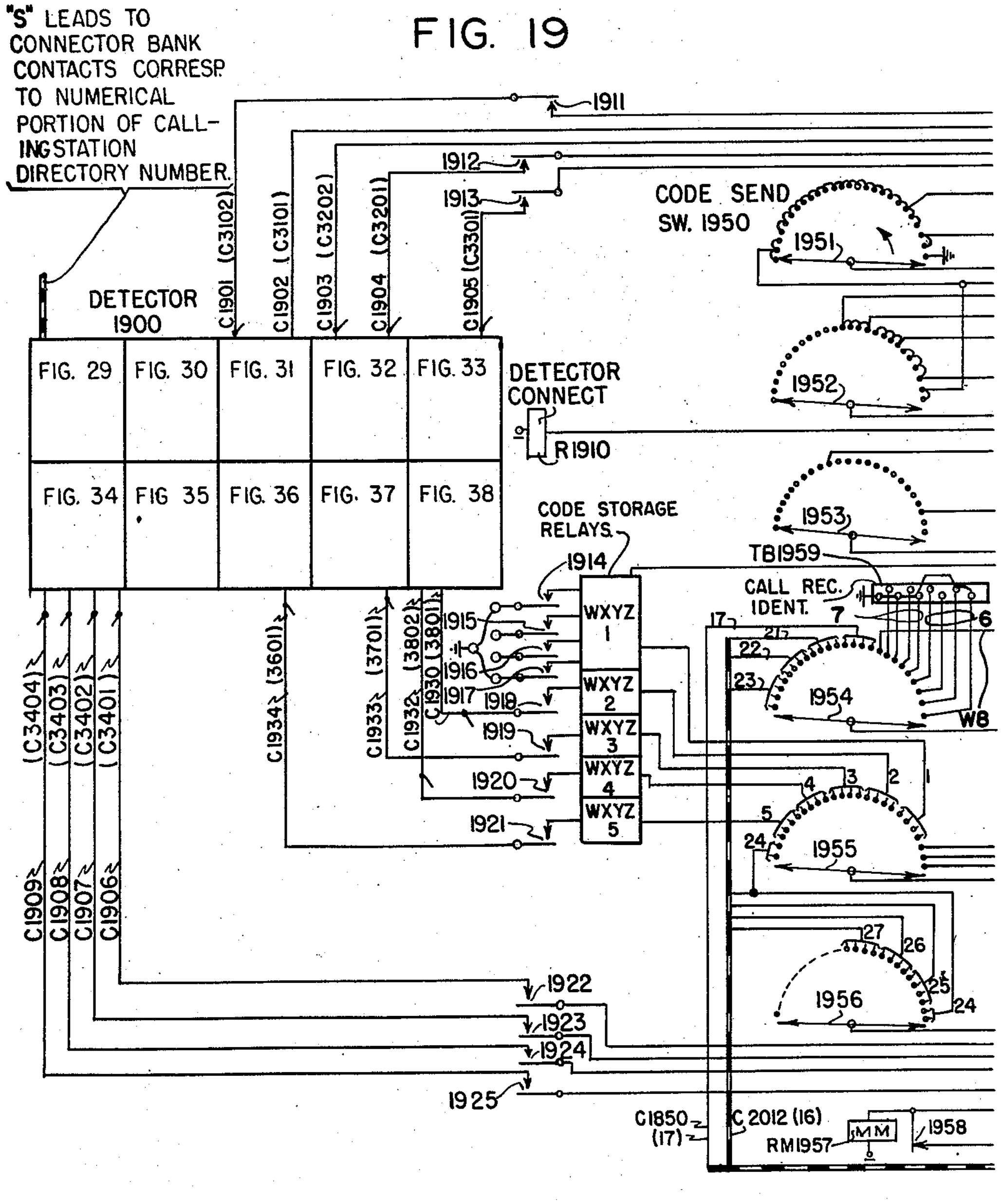

The wiper 1654 now applies ground potential to the conductor C1838 extending to Fig. 18, and then through the contacts 1893 to the skip conductor C1831, whereby the magnet RM1651 self-interruptedly operates to advance the wipers 1653 to 1658, inclusive, from engagement with the contacts 8 into engagement with the contacts 9. In this manner the send sequence switch 1650 skips the digit registered in the second code register 1530 and marked on the WXYZ22 conductors. The ground potential applied to the wiper 1654 is now extended over the engaged contact 9 to the conductor C1839 extending to Fig. 18. However, this ground potential is not applied to the skip conductor C1831 inasmuch as the circuit is opened at the contacts 1887 of the operated TB control relay R1885. In other words, the operation of the TB control relay R1885 has determined that the sender switch 1660 should send out the digit registered in the third code register 1540 and marked on the WXYZ23 conductors.

The advancement of the sender sequence switch wipers from the contacts 2 to the contacts 9 and the tests performed over the corresponding contacts of the wiper 1654, are all completed during the interdigital pause which is provided after the transmission of the second route digit 8. Consequently, when the wipers of the sender switch 1660 have completed the second cycle of operation and returned to engage the home contacts, the locking ground potential applied to the conductor C890 by the wiper 1664 is removed from this conductor and causes the digit space relay R860 to restore to normal.

Upon the restoration of the digit space relay R860, the contacts 864 are again closed to complete a circuit for the pulse control relay R870. This circuit may be traced from the grounded conductor C977 (Fig. 16) by way of the contact 9 engaged by wiper 1653, conductor C892 extending to Fig. 8, contacts 864, the winding of the relay R870, and resistor 879, to battery. The digit pulse relay R870 operates and again initiates the cycle of operation whereby the sender switch 1660 advances its wipers over the associated bank contacts to transmit impulses in accordance with the value of the digit stored in the third code register 1540. In the present example it is assumed that the digit 1 is stored in the third code register 1540 and consequently the wipers 1544 and 1545 are in engagement with contacts 1 in the associated contact banks. The wiper 1544 in engagement with contact 1 applies ground potential to the W23 conductor, and the wiper 1545 applies ground potential to the X23 conductor in order to mark the conductors WXYZ23 in code form in accordance with the digit 1. The conductors WXYZ23 terminate respectively on the contacts 9 engaged by the WXYZ wipers 1655 to 1658, inclusive. Therefore, when the wipers 1665 and 1666 of the sender switch 1660 engage contacts 3, the ground potential applied to the W and X wipers 1655 and 1656 is extended over the conductors C976 and C974 through the right-hand and left-hand windings of the digit stop relay R920. The relay R920 now operates and, at its contacts 921, recompletes the circuit for the digit space relay R860 which operates and locks itself to the grounded conductor C890. During the stepping of the wipers of the sender switch 1660 from contacts 2 to contacts 3 one impulse constituting the digit 1 is transmitted over the conductor C468 to the next impulse receiving switch in the switch train, under control of the pulse relay R880.

In response to the operation of the digit space relay R860, at its contacts 861, it again interrupts the circuit for the magnet RM1651 of the sender sequence switch 1650, thereby to cause the wipers of the switch to be advanced from engagement with the contacts 9 into engagement with the contacts 10. The pulse control relay R870 restores to normal thereby to control the sender switch 1660 to advance the wipers over the remaining contacts in the associated contact bank to return the wipers back to home contacts. During the return stepping of the sender switch 1660 the interdigital pause is again provided by the ten pulse per second stepping of the wipers over the contacts 14 to 19, inclusive. As soon as the wipers of the sender switch 1660 are again returned to engage the home contact the digit space relay R860 is restored to normal and the circuit for operating the pulse control relay R870 is again prepared, at the contacts 864.

Since the relay R870 must operate to initiate the subsequent cycle of operation of the sender switch 1660, circuits have been provided whereby a test is made to determine whether or not the sender switch 1660 has reached a point in the sending out of the digits registered in the call register 1500, which corresponds to a numerical register which is being controlled from a calling subscriber dial. In other words, if the calling subscriber should register the first three digits of the called office code portion of a called subscriber number and should then delay in sending the thousands digit of the numerical portion of the called subscriber number, it is possible for the sender switch 1660 to transmit all of the route digits and all of the digits registered in the code registers 1520, 1530 and 1540 and then attempt to send out a digit registered in the first numerical register 1610 at a time when the first numerical register has not been operated to register a digit. When this condition exists, the send sequence switch 1650 will prevent the operation of the pulse control relay R870 until the subscriber dials and registers in the first numerical register 1610 the thousands digit of the called subscriber number. It may be well to point out, however, that if the subscriber delays in the dialing of any of the digits for more than a predetermined length of time the director is arranged to automatically time out and disconnect itself from the call line.

The relay R940 is provided to indicate when the first numerical digit has been registered in the first numerical register 1610. This relay is operated only in the event that the subscriber has dialed the first numerical digit and the digit has been registered. During the time the subscriber is dialing the first numerical digit the receiving sequence switch 1510 has its wipers in engagement with contacts 3 in the associated contact bank. At the end of the digit the receiving sequence switch 1510 advances its wiper from engagement with contacts 3 into engagement with the contacts 4 whereby the circuits are prepared to register the second numerical register 1620. When the wiper 1515 of the receiving sequence switch 1510 engages contact 4, a circuit is completed for operating the first numerical send relay R940 which may be traced from ground at contact 757 of the operated relay R750, conductor C794 extending to Fig. 16, wiper 1515 and the engaged contact 4, conductor C979 extending to Fig. 9 and the winding of the first numerical send relay R940, to battery. The relay R940 operates and, at its contacts 942, it completes a locking circuit for itself from ground at contacts 754. In other words, as soon as the first numerical digit has been registered in the numerical register 1610 the receiving sequence switch 1510 prepares the circuits for registering the second numerical digit in the second numerical register 1620 and it completes the above-traced circuit for operating the first numerical send relay R940 to indicate that the first numerical digit has been registered and may now be sent out by the sender switch 1660. As a further result of the operation of the relay R940, at its contacts 941, it completes a circuit for operating the relay R870 from ground, at contacts 751, the contacts 941, the conductor C978 extending to Fig. 16, the contact 10 engaged by the wiper 1653, the conductor C892 extending to Fig. 8, the contacts 864, the winding of the pulse control relay R870, and the resistor 879, to battery.

Before proceeding with the description of operation which occurs to send out the digit registered in the first numerical register 1610, it should be understood at this time that the second numerical send relay R950, the third numerical send relay R960 and the fourth numerical send relay R990 are successively operated over circuits similar to the circuit described for operating the first numerical send relay R940 as the digits are registered in the second, third and fourth numerical registers 1620, 1630 and 1640. These relays R950, R960 and R990 are successively operated over the wiper 1515 of the receiving sequence switch 1510 when the wiper engages the contacts 5, 6 and 7 in the associated contact bank. At the contacts 951, 961 and 991 the conductors C980, C982 and C985 terminating in the contacts 11, 12 and 13 associated with the wiper 1653 are grounded as the respective relays are successively operated after the registration of the corresponding second, third and fourth numerical digits.

When the pulse control relay R870 operates over the circuit including the wiper 1653 and the engaged contact 10, the WXYZ wipers 1655 to 1658, inclusive, will engage the contacts 10 terminating the code marking conductors WXYZ24 which are marked in code form in accordance with the first numerical digit registered in the first numerical register 1610. Incident to the engagement of the contact 10 by the wiper 1654, ground potential is applied to the conductor C1840 extending to Fig. 18 to determine whether the sender sequence switch 1650 should skip the digit registered on the first numerical register 1610. The circuit including the conductor C1840, however, is open at the contacts 1876 due to the fact that the TD control relay R1875 is in its normal unoperated position and, therefore, the digit will be sent.

Upon operating the pulse control relay R870 again initiates the cycle of operation of the sender switch 1660 whereby a number of pulses corresponding to the digit registered in the first numerical register 1610 is transmitted by the pulse relay R880 over the conductor C468 to the next digit receiving switch in the switch train over which the connection is to be extended. When the number of impulses correspond to the digit registered, the previously described test circuit including the WXYZ wipers 1655 to 1658, the wipers 1665 and 1666, and the two windings of the digit stop relay R920 is completed whereby the digit space relay R860 is again operated to terminate the transmission of pulses over the conductor C468. The digit space relay R860 upon operating causes the send sequence switch 1650 to advance its wipers into engagement with the contacts 11; it restores the pulse control relay R870 to normal; and it locks itself under control of the wiper 1664 of the sender switch 1660. The sender switch 1660 is now controlled, in the manner previously described, to introduce the interdigital pause after the transmission of the impulses comprising the digit registered in the first numerical register 1610 and at the end of the cycle of operation the sender switch 1660 returns its wipers into engagement with the home contacts.

Assuming that the remaining three digits dialed by the calling subscriber have been registered in the second, third and fourth numerical registers, 1620, 1630 and 1640 whereby the digits registered are marked in code form on the respective WXYZ25, WXYZ26 and WXYZ27 code conductors terminating respectively in the contacts 11, 12 and 13 associated with the respective WXYZ wipers 1655 to 1658, inclusive. It will be understood that the send sequence switch 1650, the sender switch 1660, the pulse relay R880, the pulse control relay R870, and the digit space relay R860, will cyclically operate in the manner previously described to cause impulses corresponding to the digits registered to be transmitted over the conductor C468 to control the subsequent digit receiving switches in the switch train to complete the connection to the called subscriber's line. It may be well to mention at this time that the sender switch 1660 is prevented from sending out the last two digits of a called subscriber directory number in the event that the call recorder 2000 (Figs. 19 to 22) has not performed all of its operations at the time the sender switch 1660 is ready to transmit the said last digits. Referring to Fig. 9 it will be seen that the terminals shown below the relays R960 and R990 are normally jumpered to connect the contacts 961 and 991 to the conductors C972 and C986 extending to the call recorder 2000. If the system does not require the use of a call recorder for toll ticketing purposes a direct ground jumper is provided to ground the contacts 961 and 991 and the jumpers shown on the drawing are omitted.

After the sender switch 1660 has sent out the last digit registered on the fourth numerical register 1640, the sender sequence switch magnet RM1651 is operated in the manner previously described to cause it to advance its wipers from engagement with the contacts 13 into engagement with the contacts 14. When the wiper 1654 engages contact 14, ground potential is applied to the conductor C887 extending to Fig. 8, and then through the winding of the director release relay R780, to battery. The director release relay R780, upon operating, releases the director from the calling subscriber line in the manner previously described and connects the calling subscriber line through to the connection which has been set up over the various switches to the called subscriber line. Before the director release relay R780 can operate in the manner noted above, it should be understood that the call recorder 2000 must have performed all of its operations including the identification of the directory number of the calling subscriber substation.

*Operation of the call recorder 2000*

A description will now be given of the mode of operation of the call recorder 2000 illustrated in Figs. 19 to 22, inclusive. Before proceeding with the description it should be noted that in Fig. 19, the detector 1900 has been illustrated by means of a block diagram and that the leads extending from the block diagram have been designated with two designations. The plural designations applied on the various leads extending from the block diagram detector 1900 are provided to correlate the operation of the system disclosed in the present application with the detector shown and described in the Ostline application, Serial No. 453,799 filed August 6, 1942, now Patent No. 2,586,704, granted February 19, 1952. In the above-mentioned Ostline application the detector therein disclosed is designated 2900 and it comprises Figs. 29 to 38, inclusive. These figure numbers have been included in the present application and each of the leads which correspond to the leads or conductors shown in the above-mentioned Ostline application are enclosed with parenthesis. The detail operation of the detector 1900 is identical with the operation of the detector 2900 illustrated in the above-mentioned Ostline application and it will be understood that the detector, upon seizure, will associate itself with the call recorder 2000, it will identify the numerical portion of the directory number of the calling subscriber substation on a terminal per station basis, and it will store the identification of the calling subscriber number in the code storage relays WXYZ2 to WXYZ5, inclusive. The call recorder 2000 is also provided with a code send switch 1950 which is arranged to transmit in code form to the toll ticketing repeater 2300, included in the connection, various items of information which have been stored either in the call recorder 2000, or which have been stored in the call register 1500. The call recorder 2000 is also provided with the six relays designated R2010, R2020, R2030, R2040, R2050 and R2060 for the purpose of marking the calling party identifying conductors C1906 to C1909, inclusive, in accordance with the particular calling substation on a party line. Briefly stated, the conductor C1906 is marked in the event that the calling subscriber is at a first subscriber substation on a four-party line or is a calling subscriber on an individual subscriber line. The second conductor C1907 is marked in the event the calling substation is the second station on a four-party line; the third conductor C1908 is marked if the calling substation is the third station on a four party line, and the fourth conductor C1909 is marked in the event that the calling station is the fourth station on a four-party line.

In order to describe the manner in which the party identifying the relays R2010 to R2060 operate, it will be recalled that when a call is made from a second, third or fourth subscriber substation on a four-party line, 1, 2 or 3, station identifying impulses are transmitted over the calling line to control the party line relay R1130 in the code switch 1100, during the dialing of the second digit of a called subscriber directory number. It will also be recalled that individual calling subscriber substations and first subscriber substations on a four-party line are equipped with regular dials and therefore no party station identifying impulses are transmitted during the dialing of the second digit of the called subscriber number when a call is extended from stations equipped with regular dials.

Returning now to the call register 1500 (Fig. 15) it will be recalled that during the dialing of the second digit of a called subscriber number the receiving sequence switch 1510 has its wipers in engagement with the contacts 1 in the associated contact banks. With the wipers of the receiving sequence switch 1510 in this position, the line relay R1140 repeats the impulses constituting the second digit over the conductor C1138, thereby to register the digit in the second code register 1530 in the manner previously described. Also during the dialing of the second digit, assuming that the calling subscriber is the second party subscriber on a four-party line, the party line relay R1130 operates and restores once to transmit a single ground pulse over the conductor C1199 extending to Fig. 15, and then by way of the wiper 1516, the engaged contact 1, the conductor C1517 extending to Fig. 20, the contacts 2021, and the winding of the control relay R2010, to battery. This relay operates when the contacts 1131 on the party line relay R1130 close and when the contacts 1131 are opened, upon the restoration of the party line relay R1130, a locking circuit is completed for the control relay R2010 which includes the contacts 2011, the winding of the party 2 relay R2020 and the grounded conductor C725 extending to Fig. 7. When this locking circuit is completed, the relay R2010 remains in its operated position and the party 2 relay R2020 operates in series therewith. Upon operating, the relay R2020 interrupts the initial circuit for relay R2010, at its contacts 2021, and, at its contacts 2022, it prepares a point in the circuit for operating the control relay R2060. The last-mentioned circuit is prepared at this time for the purpose of responding to a second party identifying pulse which is transmitted in the event that the call being described has been extended from the third party subscriber on a four-party line.

It should be noted that at its contacts 2023, the relay R2020 upon operating, extends the ground potential by way of the contacts 2034 and 1923 (when the detector connect relay R1910 is operated) to the second party identifying conductor C1907 extending to the detector 1900. In this manner, the fact that the calling subscriber substation is the second station on a four-party line is marked by the conductor C1907 in the detector 1900 to control the detector to search for the identification of the directory number of the calling second party on the four-party line in the manner described in detail in the above-mentioned Ostline Patent No. 2,586,704.

It should also be noted at this time that if the calling statiin is an individual line station or the first subscriber station of a four-party line, no ground pulses would have been received over the conductor C1517 and, therefore, the relay R2020 would not have been operated. Consequently, at its normally closed contacts 2024, the relay R2020 extends ground potential by way of the contacts 1922 to the conductor C1906, in order to control the detector 1900 to search for the identification of the calling subscriber in the group of lines constituting individual lines and first party subscriber lines.

From the above description it will be understood that if no pulses are received over the conductor C1517, the conductor C1906 is marked; and that if one pulse is received over the conductor C1517, the relays R2010 and R2020 are operated to mark the conductors C1907. If a second ground pulse is received over the conductor C1517, the control relay R2060 operates and upon the termination of the second pulse, the relay R2060 locks itself in its operated position, in series with the party 3 relay R2030. Upon operating, the relay R2030, at its contacts 2032, prepares a point in the circuit for operating the control relay R2050 and, at its contacts 2033 and 2034, it transfers the marking ground potential from the second marking conductor C1907 to the third marking conductor C1908. Finally, if a third ground pulse is received over the conductor C1517, the relay R2050 operates, and at the termination of the third pulse, the relay R2050 locks itself in its operated condition in series with the party 4 relay R2040. The relay R2040 operates and, at its contacts 2042 and 2043, it disconnects the marking ground from the party 3 marking conductor C1908 and connects marking ground potential to the party 4 marking conductor C1909. From the foregoing description it will be understood that the marking conductors C1906 to C1909, inclusive, may be individually marked in accordance with the individual line or first party substation on a party line; and in accordance with the second, third and fourth party subscriber substations on a four-party line. It will also be understood that the identification of the calling party substation on a four-party line will be registered in the call recorder 2000 simultaneously with the registration in the call register 1500 of a second digit of a called subscriber's directory number.

In the previous description of the mode of operation of the translator 1300 it was pointed out that in response to a call from a calling subscriber at substation TR–3 in FLorida 3 exchange to a called subscriber TR–1 in the EMpire 1 exchange, the translator relay R1410 operated to ground the ABT lead and thus operate the start relay R2230 in the call recorder 2000. In other words, the operation of the call recorder 2000 is, for all practical purposes, initiated under the control of the translator 1300 only if the translator has been permanently wired to indicate that a call recorder is required in the connection. The call recorder will function, as will be described hereinafter, to control the detector 1900 to indicate the numerical portion of the directory number of the calling subscriber and it will also function to transmit certain items of record information to the toll ticket repeater included in the connection.

When the start relay R2230 operates, in the manner previously described, it applies a hold ground potential to the locking ground conductor C2244, at its contacts 2234; at its contacts 2232, it removes ground potential from the conductor C986 extending to Fig. 9 in order to prevent the sender switch 1660 from sending out the last digit registered in the numerical register 1640; and, at its contacts 2231, it completes a circuit for illuminating the A. B. toll lamp 2227 to indicate that the call recorder 2000 is in operation in the setting up of an A. B. toll connection. As a further result of the operation of relay R2230, at its contacts 2237, it locks itself in its operated condition to the grounded conductor C725 extending to Fig. 7; at its contacts 2238, it prepares a point in the circuit for the pulse start relay R2260; at its contacts 2236, it connects the T conductor C885 extending to Fig. 8 to the lower winding of the code send relay R2140; and finally, at its contacts 2235, it completes a circuit including the contacts 2136 and 2124 for operating the detector start relay R2070. The operation of the last-mentioned relay controls the association of the detector 1900 with the particular calling call recorder 2000.

It should be understood that the call recorder 2000 is one of a plurality of call recorders, each of which is individual to a particular director, and that the detector 1900 is common to all of the call recorders provided in the exchange. Consequently, when the relay R2070 operates, at its contacts 2071, it applies ground potential to the start conductor C1903 extending to the detector 1900; and, at its contacts 2072, it connects the winding of the detector test relay R2110 to the hold conductor C1902 extending to the detector 1900. In response to the grounding of the start conductor C1903, the detector 1900 operates in the manner described in detail in the Ostline application Ser. No. 453,799, first to associate the detector 1900 with the calling call recorder 2000, and then to identify the number of the calling line.

In response to the grounding of the start conductor C1903 the detector 1900 operates to associate itself with the calling recorder 2000. In other words, the detector 1900 searches for and finds the particular conductor C1902 individual to the call recorder 2000 and when this conductor is found by the detector 1900 a circuit is completed for operating the detector test relay R2110. Upon operating, the detector test relay R2110, at its contacts 2113, completes an operating circuit for the detector connect relay R1910 whereby the conductors of the detector 1900 which are common to all call recorders are individually connected to the call recorder 2000 over the contacts 1911 to 1925, inclusive. At its contacts 2111, the relay R2110 connects the conductor C1901, extending from the detector 1900, by way of the contacts 1911, to the conductor C2125 extending to Fig. 11. The impedance ground multiply connected to the conductor C2125 by way of the impedance 2180 provides a holding ground potential for maintaining the line finder 440, and the cut-off relay R410 in the line circuit 405, in their operating position and to apply a busy marking ground potential on the bank terminal of the connector having access to the calling subscriber substation.

The detector 1900 now functions in the manner described in the Ostline Patent No. 2,586,704 and applies a 2000 cycle tone signal to the conductor C1901, which signal will be transmitted over the connection extended by the calling subscriber to the call recorder 2000 whereby the detector will search for and find the tone signal, to identify the particular terminal number in the banks of the connector which is individual to the particular calling subscriber. More specifically, the 2000 cycle identifying tone signal is transmitted from the detector 1900 over the circuit which includes the conductor C1901, contacts 1911 and 2111, conductor C2125 extending to Fig. 11, conductor C473 extending to Fig. 4, wiper 458 of the director hunter 450, contacts 516, conductor C446, through the line finder 440 to the wiper 436, conductor C431, contacts 422, the C conductor in the cable 404 extending to the connector bank terminal individual to the calling subscriber substation, and then back to the detector 1900 over an S lead (Fig. 19) which is individual to the particular calling subscriber substation. At the time the tone signal is transmitted over the above-traced circuit, the detector 1900 will have been preselectively operated in accordance with the marking ground applied to one of the conductors C1906 to 1909, inclusive. Consequently, the detector 1900 will operate, in the manner described in the above-mentioned Ostline Patent No. 2,586,704, to search for the particular sleeve conductor having the 2000 cycle tone signal applied thereto.

When the detector has determined the digital value of the thousands digit of the numerical portion of the calling subscriber directory number, the four WXYZ conductors, schematically illustrated and designated C1930, will be marked in code form in accordance with the identifying digit and the digit will be registered in the code storage relays WXYZ2. In this manner the thousands digit of the calling subscriber directory number will be registered in code form in the WXYZ2 code storage relays. The hundreds, tens and units digits of the calling subscriber directory number, as detected by the detector 1900, will be transferred to and stored respectively in the WXYZ3, WXYZ4 and WXYZ5 code storage relays. It should be noted at this time that the call recorder 2000 includes code storage relays designated WXYZ1 which have been provided to register the third digit of the calling exchange code. This digit is permanently wired by grounding one or more of the contacts 1914 to 1917, inclusive, in accordance with the WXYZ code markings. In the present example ground potential has been applied to the W1 and Z1 conductors by way of the contacts 1914 and 1917 thereby to register the third digit 3 of the calling exchange code designation in the WXYZ1 code storage relays.

When the detector 1900 has completed the identification of the numerical portion of the calling subscriber directory number the conductor C1904 will be grounded whereupon the detection complete relay R2120 will operate to indicate that the detection operation of the detector 1900 has been completed. Upon operating, the relay R2120 locks itself via its contacts 2123, to the locking conductor C2244. At its contacts 2121 and 2122, it applies ground potential to certain of the bank contacts in the code send switch 1950 associated with the wiper 1951. Finally, at its contacts 2124, it interrupts the circuit of the detector start relay R2170, which now restores. Upon restoring relay R2170 removes the starting ground potential for the detector 1900, at its contacts 2071, and it interrupts the circuit for the detector test relay R2110, at its contacts 2072. The relay R2110 now restores and interrupts, at its contacts 2111, the circuit over which the 2000 cycle tone signal was transmitted, and at its contacts 2113, it interrupts the circuit for the detector connect relay R1910. The relay R1910 now restores to normal and, at its contacts 1911 to 1925, inclusive, it disconnects the call recorder 2000 from the common detector 1900.

Before leaving the description of operation of the detector 1900, it should be noted that the conductor C1905 is provided to signal the call recorder 2000 whenever the detector 1900 fails to detect the number of the calling subscriber. This operation is described in detail in the previously mentioned Ostline Patent No. 2,586,704 and for the purpose of this description it should be understood that upon failure to detect a calling subscriber number, the detector 1900 applies ground potential to the conductor C1905 thereby to cause the operation of the detector failure relay R2130 in the call recorder 2000. The detector failure relay R2130, upon operating, at its contacts 2132, locks itself to the locking conductor C2244. In this manner the fact that the detector 1900 has failed to identify a calling subscriber number is registered in the call recorder 2000 by the operation of relay R2130. Further operations of the call recorder 2000 and other portions of the director as a result of the operation of the detector failure relay R2130 will be described hereinafter.

Referring now to Fig. 3 it will be seen that the switching apparatus involved in the connection being described is schematically illustrated. For example, assuming that the calling subscriber is the subscriber at substation TR-3 the connection will be extended over the line circuit 405B, the finder 440A, the primary selector 500A and the director hunter 450A to the director 300A. The director, in turn, individually includes the call recorder 2000A. The digits of the called subscriber number transmitted at substation TR-3 are registered with director 300A, in the manner previously described, the translator 1300A, common to all the directors in the exchange, has registered in the director 300A the routing digits and other information for extending the connection to the called line. Also, the call recorder 2000A has registered therein the number of the calling subscriber at substation TR-3 as indicated by the detector 1900A. During the time that the detector 1900A has been operating to detect the calling subscriber directory number, the director has been setting up the connection under control of the sender switch 1660, in the manner previously described. The first digit 4 transmitted by the director controls the primary selector 500A to raise its wipers to the fourth level and to extend a connection to an idle toll ticket repeater. The next digit 8 transmitted by the sender switch 1660 in the director controls the ticket repeater selector individually associated with the selected toll ticket repeater to advance its wipers to the eighth level whereby the connection is further extended to the switch apparatus in the EMpire 1 exchange via a regular repeater, such as repeater 305A.

As soon as the connection has been extended to an idle toll ticket repeater, the toll ticket repeater functions to connect a battery potential to one of the conductors of the connection whereby the call recorder 2000 is controlled to initiate the code sending operation to be described hereinafter. When the toll ticket repeater is included in the connection the battery potential is returned to the wiper 564 of the primary selector shown in Fig. 5. Referring to Fig. 5 it will be seen that when battery potential is applied to wiper 564, this potential is further extended by way of the contacts 524 and 515, the conductor C502, the wiper 454 of the director hunter 450, the conductor C469 extending to Fig. 8, the T conductor C885 extending to Fig. 22, the contacts 2236 and 2143, and the lower winding of the code send relay R2140, to ground. The code send relay R2140 now operates to initiate the code sending operation of the call recorder 2000 whereby certain items of record information including the number of the calling subscriber substation and the directory number of the called subscriber substation are transferred from the call recorder 2000 to the selected toll ticket repeater. The information which is transferred to the toll ticket repeater is registered therein and made available, at the termination of the connection, for making a record of various items of information required in ticketing an A. B. toll call.

Referring now to the call recorder 2000 it will be seen that when the code send relay R2140 operates, it locks itself in its operated position over a circuit including its upper winding, the contacts 2142 and the locking conductor C2244. Also, at its contacts 2143, the relay R2140 disconnects its lower winding from the T conductor C885. Finally, at its contacts 2144, the relay R2140 completes a circuit for operating the rotary magnet RM1957 of the code send switch 1950. The circuit for operating the magnet RM1957 may be traced from ground by way of the code send switch off-normal contacts 2273, contacts 2262, 2144, and 1958, and the winding of the rotary magnet RM1957, to battery. The magnet RM1957 operates and, in operating, it interrupts its energizing circuit, at its contacts 1958, whereupon the magnet restores to normal and advances its wipers 1951 to 1956, inclusive, from the normal resting position 26 into engagement with the contacts 1 in the associated contact banks. In response to the advancement of the wipers from position 26 to position 1 the code send switch off-normal contacts 2273 are opened and the contacts 2274 are closed. It may be well to point out at this time that the code send switch off-normal contacts 2274 are closed when the wipers of the code send switch 1950 engage positions 1 to 25, inclusive, and the contacts 2273 are closed only while the wipers are in the position 26 in the associated contact banks.

In response to the opening of the contacts 2273 the initial operating circuit for the magnet RM1957 is opened and upon the closure of contacts 2274, a circuit is completed from ground, by way of the contacts 2238, and the winding of the pulse start relay R2260, to battery. The pulse start relay R2260 operates when the above-traced circuit is completed and locks itself, by way of its contacts 2264, to the locking conductor C2244. Also, at its contacts 2261, the relay R2260 completes a circuit via the contacts 2171 and 2151, and the winding of the code pulse relay R2150, to battery. This relay, upon operating, interrupts its initial operating circuit, at its contacts 2151, whereupon the relay slowly restores to normal and recloses its initial operating circuit as soon as the contacts 2151 are again closed. The cyclic operation of the relay R2150 occurs at the rate of ten pulses per second under control of the variable discharge condenser connected to the circuit including the lower winding of the relay. In view of the above-traced circuit for the code pulse relay R2150 it should be understood that this relay will continue to operate and restore at a predetermined rate as long as the circuit is completed for its upper winding.

When the wipers 1951 to 1956, inclusive, of the code send switch 1950 engage the contacts 1 in the associated contact banks, a circuit is completed for operating the mark relay R2210. This circuit may be traced from ground by way of the right-hand terminal of the call recorder identifying terminal block TB1959, the W6 conductor of the WXYZ6 code marking conductors, the contact 1 engaged by the wiper 1954, the contacts 2176, and the winding of the mark relay R2210, to battery. The mark relay R2210 operates when the above-traced circuit is completed and, at its contacts 2211, places a ground potential upon the contacts 2152 of the code pulse relay R2150, thereby to short out the resistance ground potential applied to these contacts by way of the resistor 2154. The above-traced circuit for the mark relay R2210 is completed prior to the completion of the operating circuit for the code pulse relay R2150. Therefore, when the pulse relay R2150 operates to transmit the first pulse it closes its contacts 2152, whereupon a direct ground potential is transmitted via the contacts 2236, to the T conductor C885 extending to Fig. 8, and then over the conductor C469 extending to Fig. 4, the wiper 454 of the director hunter 450, the conductor C502, the contacts 515 and 524, and the wiper 504, to the code mark and step relays provided in the connected toll ticketing repeater. Also upon the first operation of the pulse control relay R2150, a ground pulse is transmitted to operate the rotary magnet RM1957. At the end of the first pulse the code pulse relay R2150 restores to normal and, at its contacts 2152, it removes the direct ground pulse from the T conductor C885 and, at its contacts 2153, it interrupts the circuit for the magnet RM1957. The wipers of the code send switch R1950 are advanced from engagement with the contacts 1 into engagement with the contacts 2 in response to the restoration of the magnet RM1957.

In view of the foregoing it will be understood that upon each operation of the code pulse relay R2150 a direct ground or a resistance ground pulse will be transmitted over the T conductor C885 to the connected toll ticket repeater, and a pulse will be transmitted to the rotary magnet RM1957 to advance the wipers step-by-step over the associated contact banks. The transmission of a direct ground or a resistance ground pulse over the conductor C885 is determined in accordance with the operated or non-operated condition of the mark relay R2210 at the time the pulse relay R2150 closes its contacts 2152. Each time a direct ground pulse is received by a toll ticket repeater, a step relay and a code mark relay will both energize in series to register in the toll ticket repeater a marking corresponding to the information stored in the call recorder 2000. On the other hand, if a resistance ground potential is transmitted to and received by the toll ticket repeater, the step relay in the repeater will operate but due to the marginal operating characteristics of the code mark relay the last-mentioned relay will not operate on a resistance ground pulse.

Continuing now with the stepping operation of the code send switch 1950, it will be seen that at the end of the first pulse the wiper 1954 will engage contact 2 in the associated contact bank. This contact terminates the X6 conductor of the WXYZ6 marking conductors and it is grounded in the same manner as the W6 conductor from the terminal block TB1959. Therefore, a circuit is again completed for operating the mark relay R2210. Upon the next operation of the code pulse relay R2250 a direct ground pulse is again transmitted over the T conductor C885 to the toll ticket repeater and a pulse is transmitted to the magnet RM1957.

At the end of the second pulse the above-described circuits are interrupted and the wipers of the code send switch 1950 are advanced into engagement with the contacts 3 in the associated contact bank. In this position no circuit is completed for the mark relay R2210 inasmuch as the Y6 conductor of the WXYZ6 marking conductors is not grounded. Upon the third operation of the code pulse relay R2150 a resistance ground pulse is now transmitted over the T conductor C885 and a pulse is transmitted to the magnet RM1957. At the end of the pulse the above-traced circuits are interrupted and the wipers of the code send switch 1950 are advanced into engagement with contacts 4 in the associated contact banks. The Z6 conductor of the WXYZ6 marking conductors is not grounded in this position and, therefore, the mark relay R2210 is not operated. Therefore, upon the next cyclic operation of the code pulse relay R2150 a second resistance ground pulse is transmitted over the T conductor C885 to the toll ticket repeater and the rotary magnet RM1957 is operated and restored thereby to advance the wipers into engagement with the contacts 5 in the associated contact banks.

The next four operations of the code pulse relay R2150 advances the wipers of the code send switch 1950 step-by-step over the contacts 5 to 8, inclusive, whereby the wiper 1954 successively tests the WXYZ7 marking conductors and to operate the marking relay R2110 only when a ground potential is encountered on the marking leads. Depending upon the operated condition or non-operated condition of relay R2210, direct ground pulses or resistance ground pulses are transmitted to the toll ticket repeater in the same manner as has been described above. The WXYZ6 marking conductors are marked in accordance with the tens digit identifying the particular director (call recorder) being utilized in the present telephone connection. The WXYZ7 marking conductors are permanently marked in accordance with the units digit of the particular director (call recorder). In the example shown on the drawings, the director identifying terminal block TB1959 is wired to transmit in code form to the toll ticket repeater the tens digit 1 and the units digit 2 identifying the director 12. It should be understood at this time that each director (call recorder) is wired in accordance with its own particular identifying number.

The contact 9 in the bank associated with the wiper 1954 terminates the W8 class conductor C708 extending to Fig. 7. Referring now to Fig. 7 it will be seen that the W8 class conductor C708 will be grounded only in the event that a class 2 subscriber has initiated a call and has operated the class 2 test relay R670. If a class 1 subscriber has initiated the call, the W8 class conductor C708 will not be grounded because, in that event, the class 2 test relay R670 will not be operated. Inasmuch as class 3 subscribers are subscriber substations of the paystation type, calls which may be automatically ticketed are not completed for paystation subscribers. In other words, the director is arranged to deny automatic toll ticketing services to subscribers of the paystation type. Consequently, the W8 class conductor C708, when grounded, will indicate a class 2 subscriber and when not grounded will indicate a class 1 subscriber and since only subscribers of the class 1 and the class 2 type may utilize the toll ticketing facilities, it is not necessary to make an additional marking to include class 3 subscribers.

In view of the foregoing, it will be understood that when the wiper 1954 engages the contact 9, the mark relay R2210 will be operated and that a direct ground pulse will be transmitted to the toll ticket if the call being made has been initiated by a class 2 calling subscriber. On the other hand, if a class 1 subscriber has initiated the call, the relay R2210 will not be operated and a resistance ground pulse, instead of a direct ground pulse, will be transmitted to the toll ticket repeater.

The next four contacts 10 to 13, inclusive, in the bank associated with the wiper 1954 terminate respectively the WXYZ17 conductors C1850 extending to Fig. 17, where they are connected to the WXYZ17 rate relays R1825 to R1828, respectively. The rate relays noted above are operated in accordance with the units digit of the rate established for a call by a calling subscriber in the FLorida 3 exchange to called subscriber in the EMpire 1 exchange and in the present example, this digit is assumed to be the units digit 1 of the rate 01. Consequently, the W17 and X17 relays R1825 and R1826 are operated and locked to the locking ground conductor C787, as previously described. The locking ground potential is further extended by way of the left-hand make contacts of the relays R1825 and R1826 to the W17 and X17 conductors in order to mark these conductors in code in accordance with the digit 1.

Therefore, as the wiper 1954 advances step-by-step over the contacts 10 to 13, inclusive, the mark relay R2210 will be operated to transmit two direct ground pulses to the toll ticket repeater over the conductor C885, and the mark relay R2210 will be restored so that two resistance ground pulses are then transmitted over the conductor C885 to the toll ticket repeater. More specifically, when the wiper 1954 successively engages contacts 10 and 11 relay R2210 will be operated and when the wiper successively engages contacts 12 and 13 the relay R2210 will not be operated. Accordingly during the four pulse code two direct ground pulses followed by two resistance ground pulses are transmitted to the toll ticket repeater.

The next three items of information to be transmitted from the call recorder 2000 to the ticket repeater are the first, second and third code digits of the called subscriber directory number as registered in the first, second and third code registers 1520, 1530 and 1540 of the call register 1500. In the present example it was assumed that the digits 361 were respectively registered on the above-mentioned three code registers. Therefore, the wipers 1524 and 1525 of the first code register 1520 are in engagement with the contacts 3 of the associated contact banks thereby to mark the W21 and Z21 conductors of the WXYZ21 marking conductors in code in accordance with the digit 3. The wipers 1534 and 1535 of the second code register 1530 are in engagement with the contacts 6 in the associated contact banks thereby to mark the Y22 and Z22 conductors of the WXYZ22 marking conductors in code in accordance with the digit 6. The wipers 1544 and 1545 of the third code register 1540 engage the contacts 1 thereby to mark the W23 and X23 conductors of the WXYZ23 marking conductors in code in accordance with the digit 1. The WXYZ21, 22 and 23 conductors terminate in corresponding contacts in the banks of the send sequence switch 1650 and are multiply connected therefrom to Fig. 19 where they terminate respectively in the contacts 14 to 25, inclusive, associated with the wiper 1954. Therefore, as the wiper 1954 successively engages the contacts 14 to 25, inclusive, the marking relay R2210 will be operated only when a direct ground is encountered by the wiper 1954 and will not be operated when the wiper 1954 fails to encounter a direct ground potential. With this arrangement the code pulse relay R2150 will transmit either direct ground or resistance ground pulses over the conductor C885 to the toll ticket repeater in order to transmit, in code form, the digits 361 registered in the call register 1500 to the toll ticket repeater.

During this first cycle of operation of the code send switch 1950 the wipers 1951, 1952, 1953, 1955 and 1956 perform no operating controls in the call recorder 2000, the wiper 1954 being the only one effective during the first cycle of 25 steps. When the wipers 1951 to 1956, inclusive, are advanced to the home contact position 26, the code send switch off-normal contacts are operated to open the contacts 2274 and to close the contacts 2273. In response to the closure of the contacts 2273 a circuit is completed from ground by way of the contacts 2263 and 2175, and the winding of the second cycle auxiliary relay R2240, to battery. The relay R2240 operates and, at its contacts 2241, prepares a circuit for operating the wiper switching relay R2170. The last-mentioned circuit, however, is ineffective until the operating ground potential is removed from the winding of the relay R2240.

In response to the next operation of the code pulse relay R2150 a resistance ground pulse is transmitted to the toll ticket repeater over conductor C885 and a pulse is transmitted to the magnet RM1957. When the relay R2150 restores, at the end of this pulse, the resistance ground potential applied to the conductor C885 is removed therefrom and the rotary magnet RM1957 is de-energized thereby to cause the wipers noted of the code send switch 1950 to be advanced one step into engagement with the contacts 1. In response to the advancement of the wipers from position 26 into engagement with the contacts 1 the code send switch off-normal contacts 2273 are opened and the contacts 2274 are closed. In response to the opening of the contacts 2273 the above-traced energizing circuit for operating the second cycle auxiliary relay R2240 is opened. When the circuit for the relay R2240 is opened, in the manner described above, the previously mentioned locking circuit is completed for the relay R2240 by way of the contacts 2241, the winding of the wiper switching relay R2170 and the locking conductor C2244. When this circuit is completed, the relay R2240 remains in its operated position and the relay R2170 is operated in series therewith.

The main function of the wiper switching relay R2170 is to transfer the circuit for controlling the mark relay R2210 from the wiper 1954 to the wiper 1955 so that the latter wiper is effective during the second cycle of rotation of the code send switch to transmit the information stored in code form and terminating in the associated contact banks, to the toll ticket repeater. More specifically, at its contacts 2171 and 2172, the relay R2170 transfers the operating circuit for the code pulse relay R2150 from ground, at contacts 2261, to operating ground potentials which are applied at proper times to the contacts accessible to the wiper 1951 of the code send switch 1950. The last-mentioned circuit for the code pulse relay may be traced from the winding of the code pulse relay R2150, by way of the contacts 2151, 2172 and 2221, to the wiper 1951. In position 1 an obvious ground potential is applied to the above-traced circuit, and positions 2 to 23, inclusive, ground potential is applied from the contacts 2121 and 2122 of the operated detection complete relay R2120. In contact positions 24, 25 and 26 the ground potential for continuing the pulsing operation of the code pulse relay R2150 is supplied over the conductor C970 and contacts 943 of the first numerical send relay R940 (Fig. 9). Therefore, if a digit has not been registered in the first numerical register 1610, the pulse relay R2150 will not continue pulsing. Consequently, the call recorder 2000 will withhold transmission of information in code form to the toll ticket repeater until a digit is registered in the first numerical register 1610.

As a further result of the operation of relay R2170, at its contacts 2173, it applies a marking ground potential to the wiper 1953, which ground potential is further extended when the wiper 1953 engages the contact 3, to the contacts 2133 of the detector failure relay R2130. If the detector failure relay had been operated, in the manner previously described, this ground potential will be further extended by way of the contacts 2133, to the conductor C883 extending to Fig. 8 and the winding of the director release relay R780, to battery. In other words, the call recorder 2000, on a detector failure call, will transmit certain items of information to the connected toll ticket repeater, including a signal indicative of the fact that the detector failed to identify the directory number of the calling subscriber line, and the director release relay R780 will be operated to forceably release the director from the calling subscriber line.

As a further result of the operation of relay R2170, at its contacts 2174 and 2175, it interrupts a further point in the initial operating circuit for the relay R2240, and it prepares a point in the circuit for subsequently operating the third auxiliary relay R2250.

Finally, the relay R2170, upon operating, at its contacts 2176 and 2177, disconnects the marking relay R2210 from the wiper 1954 and it connects the relay R2210, by way of the contacts 2177 and 2225, to the wiper 1955.

The call recorder 2000 is now in condition to transfer the stored items of information which are marked in the bank contacts associated with the wiper 1955, to the connected toll ticket repeater. With the wiper 1955 in engagement with contact 1 the circuit for operating the mark relay R2210 is extended to the contacts 2165 of the two digit code relay R2160. Since the call being described is extended to an exchange having a three-digit office code, that is, EMpire 1 (EM–1), the two-digit code relay R2160 is not operated and, consequently, the circuit for the mark relay R2210 is not completed. Therefore, upon the next operation and release of the code pulse relay R2150, a resistance ground pulse is transmitted over the conductor C885 to the connected toll ticket repeater and a pulse is transmitted to the rotary magnet RM1957 thereby to advance the wipers of the code send switch 1950 from engagement with the contacts 1 into engagement with the contacts 2.

In this position the wiper 1955 again prepares a circuit for the mark relay R2210 which now includes the contacts 2135 of the detector failure relay R2130. If this relay is not operated, indicating that the detector has not failed in its operation, the mark relay R2210 will not be operated and the code pulse relay R2150 will transmit a resistance ground pulse over the conductor C885 to the toll ticket repeater. On the other hand, if the detector has failed, the relay R2130 will be in its operated position and the ground, at contacts 2135, will cause the relay R2210 to operate, whereby the code pulse relay R2150 will transmit a direct ground pulse over the conductor C885 to the connected toll ticket repeater. A direct ground pulse transmitted at this time will indicate to the toll ticket repeater that the detector has failed to identify the call subscriber line and appropriate operations will take place in the toll ticket repeater to intercept the call. The pulse relay R2150 will also transmit a pulse to the magnet RM1957 thereby to advance the wipers of the code send switch from engagement with contacts 2 into engagement with contacts 3.

When the wiper 1955 engages contact 3, a circuit is now prepared for operating the mark relay R2210 from ground, at contacts 2271, depending upon whether or not the tens digit rate relay R2270 is operated. In the present example it was assumed that the charge rate for the call being extended is the rate 01 and, consequently, the tens digit rate relay will not be operated on the present call. Therefore, the mark relay R2210 will not be operated, and the relay R2150 will transmit a resistance ground pulse over conductor C885 and it will transmit a stepping pulse to the magnet RM1957. A resistance ground pulse transmitted to the toll ticket repeater will indicate that the tens digit of the rate is the digit "0," which digit will be registered in the toll ticket repeater. On the other hand, if the rate for the call being described is any rate from the rate 10 to the rate 19, inclusive, the tens digit rate relay R2270 would have been operated from the appropriate translator relay in the translator 1300. In the latter event the contacts 2271 will be closed to cause the operation of the mark relay R2210 whereby a direct ground pulse, instead of a resistance ground pulse, would have been transmitted to the toll ticket repeater. In response to the transmission of a direct ground pulse, in this position of the code send switch 1950, the connected toll ticket repeater would register the tens digit of the rate for the call which is the digit "1." Also in response to the operation of the code pulse relay R2150 the wipers of the code send switch 1950 will be advanced from engagement with the contacts 3 into engagement with the contacts 4.

Contacts 4 to 23, inclusive, associated with the wiper 1955 are respectively connected to the code storage relays WXYZ1 to WXYZ5, inclusive. The code storage relays WXYZ1 have registered therein the exchange digit 3 of the calling FLorida 3 exchange code. The code storage relays and WXYZ2 to WXYZ5, inclusive, have registered therein the numerical portion of the directory number of the calling subscriber substation. It will be recalled that the last-mentioned four code storage relay groups were operated under control of the detector 1900. The WXYZ1 code storage relays operated in accordance with the permanent wiring shown to the left of contacts 1914 to 1917, inclusive. It should be mentioned at this time that the particular operating ones of the code storage relays WXYZ1 to WXYZ5, inclusive, are locked in their operated positions to the locking conductor C2244. All of the above-mentioned code storage relays are of the type which are provided with a single make contact, such as the relays R1825 to R1828, inclusive, shown on Fig. 18. The wipers of the code send switch 1950 are advanced step-by-step under control of the code pulse relay R2150, in the manner previously described, and during the stepping operations the mark relay R2210 is either in its operated position or its restored position depending upon the marking ground potential applied to the corresponding WXYZ contacts associated with the wiper 1955. The code marking potentials are applied to the respective contacts by the operated ones of the code storage relays. Therefore, either resistance ground pulses or direct ground pulses are transmitted over the conductor C885 to the connected toll ticketing repeater whereby the digits stored in code form in the code storage relays WXYZ1 to WXYZ5, inclusive, are transferred to the toll ticketing repeater in the same manner as has been described hereinbefore.

When the wiper 1951 of the code send switch 1950 engages contact 24, the operating ground potential for the code pulse relay R2150 will be supplied from the conductor C970, if a digit has been registered in the first numerical register 1610 of the call register 1500, in the manner previously described. If a ground potential is, at this time, applied to the conductor C970 as described above, the code pulse relay R2150 will again operate and restore. Contacts 24 and 25 accessible to the wiper 1955 terminate respectively the W24 and X24 marking conductors extending to the first numerical register 1610 in the call register 1500 (Fig. 16). Inasmuch as it has been assumed that the numerical portion of the called subscriber number are the digits 1, 2, 3, and 4, the digit 1 will be registered on the numerical register 1610 and the W24 and X24 code marking conductors will have direct ground potential applied thereto. Consequently, during the stepping of the wiper 1955 over the contacts 24 and 25 the direct ground potential applied to the W24 and X24 code marking conductors will cause the mark relay R2210 to be operated, so that two direct ground pulses will be transmitted by the code pulse relay R2150 to the connected toll ticketing repeater.

When the wipers of the code send switch 1950 are in engagement with contacts 25, the next operation of the code pulse relay R2150 will cause the wipers to be advanced to the position 26 of the code send switch 1950. In this position, the code send switch off-normal contacts are again controlled thereby to open the contacts 2274 and to close the contacts 2273. This terminates the second cycle of operation of the code send switch 1950.

When the contacts 2273 of the code send switch off-normal contacts are closed at the end of the second cycle, a circuit is now completed from ground by way of the contacts 2263, 2174, and 2224, and the winding of the third cycle auxiliary relay R2250, to battery. The relay R2250 operates when the above-traced circuit is closed and, at its contacts 2251, it completes a circuit including the winding of the wiper switch relay R2220 and the lock conductor C2244. The last-mentioned relay, however, is short-circuited as long as the code send switch off-normal contacts 2273 are closed. As a further result of the code send switch wipers being advanced to position 26 a circuit is completed for operating the code pulse relay R2150 from the grounded conductor C970. Relay R2150 operates the magnet RM1957 to advance the wipers from position 26 to contact 1. As soon as the wipers leave position 26 the code send switch off-normal contacts 2273 are opened and the contacts 2274 are closed. At the contacts 2273, the initial operating circuit for the third cycle auxiliary relay R2250 is opened and the above-mentioned locking circuit, including the relay R2250 and the wiper switching relay R2220 is completed. The relay R2250 remains in its operated position and the wiper switching relay R2220 now operates.

The main function of the wiper switching relay R2220, upon operating, is to transfer the circuit for controlling the mark relay R2210 from the wiper 1955 to the wiper 1956. Also the relay R2220 completes a new pulsing circuit for controlling the code pulse relay R2150. More specifically, at its contacts 2221 and 2222, the relay R2220 transfers the operating ground potential for the relay R2150 from the wiper 1951 to the wiper 1952. At its contacts 2223, the relay R2220 connects the conductor C986 to the contact 15 associated with the wiper 1953. At its contacts 2224, the relay R2220 interrupts a further point in the initial operating circuit for the relay R2250. Finally, at its contacts 2225 and 2226, the relay R2220 transfers the circuit for controlling the mark relay R2210 from the wiper 1955 to the wiper 1956. In this manner the call recorder 2000 is conditioned to operate the code send switch 1950 in its third cycle of operation whereby the information stored in code form and marked in the bank contacts associated with the wiper 1956 may be transferred to the connected toll ticket repeater.

The Y24 and Z24 code marking conductors terminate respectively in the contacts 1 and 2 associated with the wiper 1956 and they extend to the first numerical register 1610 of the call register 1500. In the call being described these conductors are not marked with a direct ground potential and, consequently, the mark relay R2210 is not operated when the wiper 1956 successively engages its contacts 1 and 2. Therefore, the code pulse relay R2150 will transmit two resistance ground pulses to the connected toll ticket repeater while it advances the wipers of the code send switch 1950 over the contacts 1 and 2 in the associated contact banks. At the end of the second pulse, noted above, the wipers of the code send switch 1950 engage contacts 3 in the associated contact banks.

Contacts 3 to 14, inclusive, associated with the wiper 1956 terminate the code marking conductors WXYZ25 to WXYZ27, inclusive, and these code conductors are respectively marked in code in accordance with the digits registered in the second, third and fourth numerical registers 1620, 1630 and 1640 of the call register 1500. When the wiper 1952 is stepped from contact 2 in the associated contact bank, the operating ground potential for the code pulse relay R2150 which is applied to the conductor C970 is interrupted, and when the wiper 1952 engages contact 3 a ground potential must be applied to the conductor C971 before the pulse relay R2150 can again be reoperated to continue the transfer of code information from the call recorder 2000 to the connected toll ticket repeater. A ground potential will be applied to the conductor C971 only in the event that a digit has been registered in the second numerical register 1620. As previously pointed out, the registration of a digit in the second numerical register 1620 will cause the receiving sequence switch 1510 in the call register 1500 to advance its wipers into engagement with contact 5 whereupon a circuit is completed, at the wiper 1515, for operating the second numerical send relay R950. When this relay operates, at its contacts 953, it applies ground potential to the conductor C971 extending to Fig. 20 and then over any one of the multiply connected contacts 3 to 6, inclusive, and the engaging wiper 1952 of the code send switch 1950 to again cause the code pulsing relay R2150 to pulse, in the manner previously described.

Upon each operating and restoration of the code pulse relay R2150, the wipers of the code send switch 1950 are stepped over the contacts 3 to 6, inclusive, in order to transfer in code form the digit registered in the second numerical register 1620 to the connected toll ticket repeater. During the stepping of the wiper 1956 over the contacts 3 to 6, inclusive, the mark relay R2210 is controlled to transmit a direct ground pulse over the conductor C885 to the toll ticket repeater or, in the absence of an operation of the mark relay R2210, a resistance ground pulse is transmitted.

At the conclusion of the transfer of the digit registered in the second numerical register 1620 to the connected toll ticket register, the wipers 1951 to 1956, inclusive, are advanced from engagement with the contacts 6 into engagement with the contacts 7 in the associated contact banks. In this position the wiper 1952 engages one of four multiply connected contacts terminating the conductor C973 which is grounded, in the manner previously described, only in the event that the third numerical send relay R960 has been operated in response to the registration of a digit in the third numerical register 1630. The relay R960, at its contacts 963, grounds the conductor C973 thereby to recomplete the circuit for operating the code pulse relay R2150 to step the wipers of the code send switch 1950 over the contacts 7 to 10, inclusive. After wiper 1956 is advanced step-by-step over the contacts 6 to 10, inclusive, the digit registered in the third numerical register 1630 and marked in code form on the code marking conductors WXYZ26 is transferred to the connected toll ticket repeater by direct ground and resistance ground pulses under control of the mark relay R2210 and the pulse relay R2150, in the manner previously described.

When the wipers of the code send switch 1950 are stepped from engagement with contact 10, the pulsing circuit for the pulse relay R2150 is again opened at the wiper 1952 and when the wiper 1952 engages the contact 11 a test is again made to determine whether the code pulse relay R2150 can be reoperated. If a digit has been registered in the fourth numerical register 1640 the fourth numerical send relay R990 will have been operated and, at its contacts 994, a ground potential is applied to the conductor C987 terminating in the contacts 11 to 14, inclusive, associated with the wiper 1952. This ground potential causes the relay R2150 to again advance the wipers of the code send switch 1950 over the contacts 11 to 14, inclusive, whereby the digit registered in the fourth numerical register 1640 and marked in code form on the WXYZ27 marking conductors is transferred to the connected toll ticket by direct ground and resistance ground pulses under control of the mark relay R2210 and the code pulse relay R2150, in the manner previously described.

When the pulse relay R2150 restores at the termination of the pulse that advanced the wipers 1951 to 1956, inclusive, from engagement with the contact 14 into engagement with the contacts 15, the wiper 1952 interrupts the circuit for controlling the code pulse relay R2150 which now remains in its restored position.

When the wiper 1953 engages contact 15 a circuit is completed to permit the sender switch 1660 to send out switch setting impulses corresponding to the digit registered in the fourth numerical register 1640. This circuit may be traced from ground by way of the contacts 2173 of the operated wiper switching relay R2170, and then by way of the wiper 1953 and the engaged contact 15, the contacts 2223, 2164 and 2233, the conductor C986 extending to Fig. 9, the contacts 991 of the operated relay R990, the conductor C985 extending to Fig. 16, the contact 13 engaged by the wiper 1653, the conductor C892 extending to Fig. 8, the contacts 864, the winding of the pulse control relay R870, and the resistor 879, to battery. The relay R870 operates when the above-traced circuit is completed and controls the sender switch 1660, in the manner previously described, to transmit the numerical impulses corresponding to the digit registered in the fourth numerical register 1640.

The transmission of the last digit controls the last switch in the switch train to select the terminals of the particular called subscriber line and to signal the subscriber thereon in the well-known manner. The main purpose of preventing the transmission of the last digit of the called number to the switch train until all of the items of information have been transferred from the call recorder 2000 to the connected toll ticket repeater is to prevent a called subscriber from answering a connection during the period of time that the toll ticket repeater is receiving the various items of information from the call recorder 2000. In other words, if a called subscriber is permitted to answer a call while the transfer of information is being made, it would be possible to either mutilate the code information as it is transferred, or the called subscriber would not hear a response from a calling subscriber inasmuch as the calling subscriber line is not connected through to the called subscriber line until the transfer of information to the toll ticket repeater has been complete.

When the code send switch 1950 has completed the first, second and third cycle of rotation to transfer all of the items of information and the wiper 1953 engages contact 15 to permit the director to send out the last digit registered in the fourth numerical register 1640, the call recorder 2000 will have completed all of its controlling operations and it will remain in the position last-described until the holding ground potential is removed from the conductor C725 by the controller 600 portion of the director.

In view of the foregoing description of the call recorder 2000, it will be seen that the code send switch 1950 first utilizes its wiper 1954 to transfer to the toll ticket repeater certain enumerated items of information, that during the second cycle of operation the wiper 1955 transfers certain additional items of information, and finally, during the third cycle of operation the wiper 1956 transfers the remaining items of information. In order more readily to understand the order in which the items of information are transferred during the cyclic operation of the code send switch 1950 reference may be had to the following information.

WIPER 1954 OF THE CODE SEND SWITCH 1950

| Contact Position | Code Marking | Information Transmitted |
|---|---|---|
| 1 | W6 | Identity of the director tens digit. |
| 2 | X6 | |
| 3 | Y6 | |
| 4 | Z6 | |
| 5 | W7 | Identity of the director units digit. |
| 6 | X7 | |
| 7 | Y7 | |
| 8 | Z7 | |
| 9 | W8 | Class of calling line: Class 1 if not grounded; class 2 if grounded. |
| 10 | W17 | Charge rate—units digit. |
| 11 | X17 | |
| 12 | Y17 | |
| 13 | Z17 | |
| 14 | W21 | Called station directory number 1st digit. |
| 15 | X21 | |
| 16 | Y21 | |
| 17 | Z21 | |
| 18 | W22 | Called station directory number, 2nd digit. |
| 19 | X22 | |
| 20 | Y22 | |
| 21 | Z22 | |
| 22 | W23 | Called station directory number, 3rd digit. |
| 23 | X23 | |
| 24 | Y23 | |
| 25 | Z23 | |
| 26 | | Stepping pulse. |

WIPER 1955 OF CODE SEND SWITCH 1950

| Contact Position | Code Marking | Information Transmitted |
|---|---|---|
| 1 | X9 | 6 digit called number: Indicates 7 digit No. if not grounded; indicates 6 digit No. if grounded. |
| 2 | X10 | Detector failure—if grounded. |
| 3 | Y18 | Charge rate: tens digit "0" if not grounded; tens digit "1" if grounded. |
| 4 | W1 | Calling station directory No., 3rd digit. |
| 5 | X1 | |
| 6 | Y1 | |
| 7 | Z1 | |

WIPER 1955 OF CODE SEND SWITCH 1950—Continued

| Contact Position | Code Marking | Information Transmitted |
|---|---|---|
| 8 | W2 | Calling station directory No., 4th digit. |
| 9 | X2 | |
| 10 | Y2 | |
| 11 | Z2 | |
| 12 | W3 | Calling station director No., 5th digit. |
| 13 | X3 | |
| 14 | Y3 | |
| 15 | Z3 | |
| 16 | W4 | Calling station directory No., 6th digit. |
| 17 | X4 | |
| 18 | Y4 | |
| 19 | Z4 | |
| 20 | W5 | Calling station directory No., 7th digit. |
| 21 | X5 | |
| 22 | Y5 | |
| 23 | Z5 | |
| 24 | W24 | Called station directory No., 4th digit. |
| 25 | X24 | |
| 26 | | Stepping pulse. |

WIPER 1956 OF CODE SEND SWITCH 1950

| Contact Position | Code Marking | Information Transmitted |
|---|---|---|
| 1 | Y24 | Called station directory No., 4th digit. |
| 2 | Z24 | |
| 3 | W25 | Called station directory No., 5th digit. |
| 4 | X25 | |
| 5 | Y25 | |
| 6 | Z25 | |
| 7 | W26 | Called station directory No., 6th digit. |
| 8 | X26 | |
| 9 | Y26 | |
| 10 | Z26 | |
| 11 | W27 | Called station directory No., 7th digit. |
| 12 | X27 | |
| 13 | Y27 | |
| 14 | Z27 | |

*Release of the director*

Referring now to the call register 1500, shown in Figs. 15 and 16, it will be seen that when the sender switch 1660 has completed the transmission of the numerical impulses corresponding to the digit registered in the fourth numerical register 1640, the send sequence switch 1650 is controlled in the manner previously described to advance its wipers 1653 to 1658, inclusive, from engagement with contacts 13 into engagement with contacts 14. When the wiper 1654 engages contact 14 ground potential is applied to the conductor C887 extending to Fig. 8, and then through the upper winding of the director release relay R780, to battery. The relay R780 operates when the above-traced circuit is completed and, at its contacts 786, it completes a locking circuit from ground, at contacts 758, which locking circuit is independent of the initial operating circuit.

Before continuing with the operations which are performed as a result of the energization of the director release relay R780, a brief summary of the operation of the call recorder 2000 will be given, which operations occur as a result of having transferred from the call recorder 2000 to the connected toll ticket repeater all of the stored items of information. More specifically, when wiper 1953 engages the contact 15 in its associated contact bank, it applies ground potential to the conductor C986 to permit the sender switch 1660 and the send sequence switch 1650 to cooperate in the manner previously described to transmit the last digit of the called number over the operated switches in the switch train in order to complete the connection to the desired called subscriber substation. Incident to the completion of the transmission of the last digit, the send sequence switch 1660 advances its wipers into engagement with the contacts 14 and the wiper 1654, in this position, completes the above-mentioned operating circuit for the director release relay R780. The relay R780, upon operating, will cause the release of the director and it will establish a communication connection from the calling subscriber substation to the called subscriber substation.

As a further result of the operation of the director release relay R780 it closes, at its contacts 781, a holding ground circuit for the operated director busy relay R610 in order to mark the instant director busy until the releasing operations thereof have been completed. Also, at its contacts 784, it completes a circuit for illuminating the release lamp 777 thereby to indicate to the exchange attendant that this particular director is in condition to be released. Also, at its contacts 785, the relay R780 completes a circuit for the operated winding of the pulse generator 700 whereby the pulse generator 700, upon the ultimate release of the director release relay R780 will stop in a position whereby it can be restarted upon a reoperation of the seizure relay R750. Finally, at its contacts 782, the director release relay R780 interrupts the previously described series circuit including the hold relay R820, the director test relay R510 (Fig. 5) and the rotary magnet M451 of the director hunter 450. The hold relay R820 in the controller 600 portion of the director restores to normal when its circuit is interrupted but performs no function at the present time. The director test relay R510 also restores to normal when the above-described series circuit is interrupted and performs the switch-over operations whereby the calling subscriber line is disconnected from the director and connected to the established connection set up under control of the director, and whereby the director is disconnected from the primary selector 500.

Referring now to the director test relay R510 it will be seen that when this relay restores to normal the contacts 511, 512, 513, 515, 516, 518, 518′, and 519 are opened and the contacts 514′, 514, 517 and 519′ are closed. As soon as the contacts 511, 513 and 516 are opened, the conductors C444, C445 and C446 extending from the line finder 440 are disconnected from the conductors C504, C505 and C506. Furthermore, when the contacts 512, 515 and 518 are opened, the conductors C501, C502 and C503 extending to the controller 600 portion of the director are disconnected from the primary selector 500. Finally, when the contacts 514′, 514 and 517 are closed the conductors C444, C445 and C446 from the line finder 440 are connected through to the primary selector 500 and to the subsequent switches in the switch train to the called subscriber substation.

Referring now to the code switch 1100 portion of the director, it will be seen that as soon as the conductors C444 and C445 are disconnected from the conductors C504 and C505, the previously described loop circuit including the windings of the party line relay R1130 and the upper winding of the line relay R1140 is interrupted. The line relay R1140 will now restore to normal and the party line relay R1130, although its windings are energized, is in its restored position due to the differential characteristics of its windings. Incident to the restoration of the relay R1140, at its contacts 1142, it interrupts the circuit for the hold relay R1150 which also restores. At its contacts 1151, the relay R1150 removes ground potential from the conductor C1137 extending to Fig. 7 thereby to cause the restoration of certain apparatus in the controller 600 portion of the director. Also, the removal of ground, at contacts 1151, interrupts the holding circuits for relays R1110 and R1120. If the last-mentioned relays are in their operated position they will now restore.

Referring now to Fig. 7 of the controller 600 portion of the director, it will be seen that when the hold relay R1150 in the code switch 1100 restores to normal and removes ground potential from the conductor C1137, the seizure relay R750 will restore to normal. The restoration of the last-mentioned relay will remove holding ground potentials from various locking conductors whereby the remaining operating relays and switches in the director will restore to their normal positions. Starting with the contacts 751, the relay R750 upon restoring removes ground potential from the locking ground conductor C788 extending to Fig. 16 and from conductor C787 extending to Fig. 18. The removal of ground from conductor C788 has no function to perform at the present time inasmuch as the wiper 1664 of the sender switch 1660 is in engagement with the contact 1 in its associated contact bank. However, the removal of ground from the conductor C787 extending from Fig. 18 removes the locking ground potential from all of the operated route digit register relays, rate relays and control relays in the coder 1800 thereby to cause the restoration of such relays. Consequently, the coder 1800 is now restored to normal. Before proceeding with the controls exercised by the remaining contacts on the seizure relay R750, it should be mentioned at this time that when the operated relays in the first route digit register of the coder 1800 are restored to normal, the ground potential is removed from the conductor C884 extending to Fig. 8 thereby to cause the restoration of the translation complete relay R810.

Referring now to the contacts 752 of the seizure relay R750, it will be seen that when these contacts are opened, the locking circuits for any one of the operated relays R670, R710, R760 and R770 will be interrupted to cause operated ones of the above-mentioned relays to now restore to normal.

At the contact 753, the relay R750 interrupts a point in one of the holding ground circuits for the director busy relay R610 but the last-mentioned relay does not restore at this time since it is held operated from ground at contacts 781. At the contacts 754, the relay R750 removes the locking ground potential from the relays R940, R950, R960 and R990 thereby to cause the last-mentioned relays to restore to normal. At its contacts 755, the relay R750 interrupts a further point in the circuit for the hold relay R820; at its contacts 756, it removes the holding ground potential from the tone control relay R620 thereby to cause the restoration of the last-mentioned relay if it is in its operated position. At its contacts 757, the relay R750 removes ground from the conductor C794 extending to Fig. 16 and from the conductor C725 extending to Fig. 22. The removal of ground from conductor C794 has no function to perform at the present time. The removal of ground from the conductor C725 causes the start relay R2230 in the call recorder 2000 to restore to normal and it causes any one or more of the operated relays R2010 to R2060, inclusive, in the call recorder 2000 to restore to normal. At its contacts 758, the relay R750 removes the locking ground potential from the relays R780, R840 and R930 thereby to cause the release of the last-mentioned relays if they are in their operated positions. However, the director release relay R780 will not restore to normal when the above-mentioned locking circuit is interrupted unless a circuit, including the lower winding of the relay has been interrupted in the manner to be described hereinafter Also, at is contacts 753', the relay R750 interrupts the circuit for the left-hand winding of the delay send relay R910.

Finally, at its contacts 751' and 752', the relay R750 completes circuits for restoring to normal the various operated switches in the call register 1500 and in the code switch 1100 in series with the lower winding of the director release relay R780. These circuits may be traced from ground at wiper 1667 of the sender switch 1660 in engagement with contact 1 in the associated contact bank and then over the conductor C795 extending to Fig. 7, the contact 751' and the lower winding of the director release relay R780 and then over two separate paths; the first of which extends by way of the contacts 752' and the conductor C1232 to Fig. 12; and the second of which extends by way of the conductor C796 to Fig. 16.

Referring now to Fig. 12 it will be seen that when ground potential is applied in the above-described manner to the conductor C1232 it is further extended by way of the vertical off-normal contacts VON1217 of the Strowger switch 1200 and the winding of the release magnet RM1212, to battery. The release magnet is of the well-known type which upon operation will cause the wipers of the Strowger switch to be restored to their normal resting positions. As soon as the wipers are restored to normal, the vertical off-normal contacts VON1217 are opened and the contacts VON1216 are closed, the former to interrupt the energizing circuit for the release magnet RM1212 and the latter to extend the grounded conductor C1232 by way of the off-normal contacts RON1195 and the winding of the release magnet RM1198, to battery.

The timer switch 1190, shown on Fig. 11, is controlled, during the time that the hold relay R1150 is in its operated condition, from ground impulses transmitted from an interrupter (not shown) at the rate of twelve impulses per minute over the conductor C1135. It will be seen that when the relay R1150 closes its contacts 1153 upon seizure of the director and code switch 1100 portion thereof, that a circuit is completed by way of the wiper 1192 for operating the rotary magnet RM1194. The timer 1190 is of the well-known minor switch construction in that it is arranged to advance its wipers upon operation of the rotary magnet rather than upon the restoration of the magnet. Furthermore, the switch is constructed and arranged to restore its wipers in a direction opposite to the direction that the wipers are advanced during stepping. Furthermore, as soon as the wipers 1191 and 1192 are stepped in a counterclockwise direction from the contact 1 the rotary off-normal contacts RON1195 are closed and they remain closed until the wipers are again returned in a clockwise direction back to the home contact position 1.

Since the wipers are advanced one step every five seconds, at the end of an interval of time which will not be greater than 15 seconds and which will not be less than ten seconds, the wiper 1191 will apply ground potential to the conductor C1196. Also after an elapsed period of time which may be as great as 30 seconds and will not be less than 25 seconds, the wiper 1191 applies ground potential to the conductor C1197. The main function of the timer 1190 is to ground the conductor C1196 after approximately 15 seconds in order to register the fact that a false seizure has been made of the director. This will not occur if the calling subscriber begins to dial the called number within 15 seconds after the director is seized. Also if the subscriber begins to dial the called number within the 15 seconds, he must complete the dialing of the called subscriber number within 30 seconds or a false seizure will be registered in the director. The above-mentioned operations will be described more in detail hereinafter in connection with the description of the operation of the director in response to false calls.

In any event, when the director is being released in the manner previously described, the ground applied to conductor C1232 operates the release magnet RM1198 thereby to restore the wipers 1191 and 1192 in a clockwise direction to the home contact 1 position illustrated in the drawings. When the wipers have returned to the contact 1, the contacts RON1195 are opened to interrupt the operating circuit for the magnet RM1198 which now restores to normal. The Strowger switch 1200 and the timer 1190 have now been restored to normal and, consequently, the releasing operations which are controlled over the conductor 1232 are completed.

The releasing operations which are controlled over the conductor C796 extending to Fig. 16 will now be explained. Referring now to Fig. 16 it will be seen that when ground potential is applied to the conductor C796 a self-interrupting circuit will be completed for the fourth numerical registers 1640 over the wipers 1643. The magnet RM1641 will be self-interruptedly operated and released to advance the wipers noted in a counterclockwise direction back to the home contact position illustrated in the drawings. When the home contact position is reached, the ground conductor C796 is successively extended to the third numerical register 1630, then to the second numerical register 1620, and finally, to the first numerical register 1610. In each of the above-mentioned registers a self-interrupting circuit will be completed for the respective rotary magnets thereby to cause the associated wipers to be successively returned to their home contact positions. The above-described operations will also be successively completed to the third code register 1540, the second code register 1530 and the first code register 1520 thereby to cause the respective rotary magnets to return wipers to the home contact positions in the manner described above. When the first code register 1520 returns its wipers to the home contact position, the ground potential applied to the conductor C796 will be extended by way of the wipers and the home contact positions of each of the numerical and code registers to the wiper 1513 of the receiving sequence switch 1510. A self-interrupting circuit will now be completed for the magnet RM1511 to advance its wipers back to the home contact position, in the manner previously described, whereupon the above-noted ground potential is further extended by way of the contacts 1659 and 1652 to the magnet RM1651 of the send sequence switch 1650. The magnet RM1651 will now be self-interruptedly operated to advance its wipers into engagement with the home contact position, whereupon the send sequence switch off-normal contacts 1659 are opened and the contacts 1659′ are closed. When the last-mentioned operation takes place, all of the stepping switches of the call register 1500 will have been restored to their normal positions and prepared for further operations in response to additional calls.

Returning now to the controller 600 portion of the director it should be understood that as long as a circuit is completed through the lower winding of the director release relay R780 and any one of the magnets of the stepping switches in the call register 1500 or the release magnets of the Strowger switch 1200 or the timer 1190, the director release relay R780 will remain in its operated position even though the locking circuit for its upper winding has been previously interrupted. When the send sequence switch 1650 finally restores its wipers to the home contact positions and the off-normal contacts 1659 are opened, the circuit for the relay R780 is interrupted and the relay now restores to normal. Upon restoring, the relay R780, at its contacts 781, opens a circuit for the director busy relay R610 which now restores to normal and removes the busy marking ground potential from the conductor C475. The removal of the ground potential from conductor C475 will again render the director available for additional calls. At its contacts 782 and 783, the relay R780 prepares points in the circuits for re-operating the hold relay R620 and the assigner start relay R640. Finally, at its contacts 784, the relay R780 interrupts the circuit for illuminating the release lamp 777 thereby to indicate to the exchange attendant that the director is now released and available for further calls; and, at its contacts 785, it interrupts the circuit for the pulse generator relay 700 thereby to terminate the operation of the pulse generator in a position from which it may be automatically re-started in response to a succeeding operation of the seizure relay R750.

In view of the foregoing description of the mode of operation of releasing the various portions of the director which has been utilized in setting up the present connection, it should be understood that the director is now restored to its normal position and rendered available for use in a new call.

*Setting up of the connection to the called station under control of the director*

In view of the foregoing description of the mode of operation of the director it will be understood that when the called subscriber at substation 401 dialed the directory number of the called subscriber substation, which, in the present example, is assumed to be EMpire 1–1234, the digits 361–1234 were registered in the director, the digits 361 were translated by the director into the routing digits 48 and registered in the director. When the translation operation was completed, the director then transmitted the routing digits 4 and 8 and then the digits 1–1234 which were registered by the calling subscriber in the director. In this particular case, the digits 3 and 6 of the called subscriber's exchange number were absorbed by the director and translated into the digits 4 and 8.

Referring now to Fig. 3 of the drawings, it will be seen that when the director sends out the digit 4, the primary selector 500 will raise its wipers to the fourth level and will select an idle toll ticket repeater. The digit 8 transmitted by the director will control the ticket repeater selector associated with the toll ticket repeater and raise the wipers thereof to the level 8 and cause the selector to find an idle repeater terminating an idle trunk extending to the EMpire-1 exchange. The digit 1 (that is, the third digit dialed by the calling subscriber) is transmitted by the director to control the incoming selector in the EMpire 1 exchange, which raises its wipers to the first level and selects an idle local selector which has access to the local switch train terminating the called subscriber substation. The following digits 1, 2, 3 and 4 of the numerical portion of the called subscriber number are then transmitted by the director to the second selector in the EMpire exchange, which selector further extends the connection to the third selector. The director now transmits the digit 2 to the third selector which selects an idle connector. The director now transmits the fourth numerical digit 3 to raise the wipers of the connector to a level terminating the line of the called subscriber substation.

It will be recalled at this point in the setting up of the connection that the director will not transmit the last digit 4 of the called subscriber directory number until it has been signaled by the call recorder 2000 that all of the information necessary for ticketing the particular call has been transmitted to the connected toll ticketing repeater. When this signal has been received by the director, it transmits the last digit 4 of a called subscriber number to the connector and the connector, in turn, will rotate its wipers over the third level into engagement with the contacts 4 terminating the called subscriber line. The connector will now ring the bell at the called subscriber substation. During the ringing period, the director is disconnected from the calling subscriber line in the manner previously described and the calling subscriber line will be extended by way of the primary selector 500A over the above-traced connection to the called subscriber line. When the called subscriber answers the call, the connector will operate in a well-known manner to transmit an answer supervision by way of the exchange repeaters to the connected ticketing repeater in order to initiate timing of the conversation and to complete the talking connection between the calling and the called subscribers.

When the conversation is completed and the calling and called subscribers restore their receivers upon the switchhooks of their associated telephone instruments, the timing of the conversation will be terminated and temporarily registered in the toll ticket repeater included in the connection. Also all of the various switches included in the connection between the two subscribers will now restore to normal and be made available for additional calls. However, the toll ticket repeater which has stored therein all of the information which was transferred thereto from the call recorder 2000 and which has accumulated additional ticketing information, including the elapsed time of the conversation, is maintained in a busy condition to prevent its seizure for additional calls. This busy condition is maintained in the toll ticketing repeater until a permanent record is made of all of the items of information which have been stored in the toll ticketing repeater. The toll ticketing repeater is then automatically released and rendered available for additional calls.

*Operation of the primary selector 500 under control of the director*

In the previous description of the mode of operation of the director and the primary selector 500 in response to a call from the calling subscriber substation 401 to another subscriber substation in the local exchange area it was pointed out that the three code digits corresponding to the code of the local exchange were registered in the call register 1500 portion of the director and the primary selector 500 was automatically controlled in response to the third digit to select an idle trunk to the local switch train. It was also pointed out in that description that the director absorbed the first two digits of the code and repeated the third digit of the code to the primary selector 500 before the director was automatically disconnected from the connection. It was also pointed out that the remaining digits of the called subscriber directory number controlled the remaining switches in the local switch train to complete the call to the called subscriber substation without aid of the director.

In the previous description of the operation of the director in response to a call to be extended outside of the originating exchange local area it was pointed out that the first three digits of the called office code were registered in the call register 1500 followed by the four digits of the numerical portion of the called subscriber directory number. It was also pointed out that the translator 1300 was operated in accordance with the first three digits of the called office code and registered certain routing digits in the coder 1800. Finally, it was pointed out that the director, under control of the sender switch 1660, transmitted switch controlling impulses over the conductor C468 to the primary selector 500 in order to complete the connection to the desired called subscriber in the remote called exchange. In the particular call assumed to be illustrative of a shorthaul toll call, the calling subscriber dialed the digits 361–1234 corresponding to the directory number of the TR–1 subscriber located in the EMpire 1 exchange. In response to the registration of the above digits in the call register 1500 the director functioned in the manner previously described to transmit the digits 481–1234, the first digit 4 being transmitted by the sender switch 1660 to the primary selector 500 (Fig. 5).

Referring now to the primary selector 500 (Fig. 5) it will be seen that the line relay R530 will be operated over a circuit including its upper winding as soon as the pulse control relay R870 in the controller 600 portion of the director is operated, in the manner previously described. The line relay R530, upon operating, completes the circuit for the hold relay R540 and the hold relay, in turn, completes a circuit for operating the transfer relay R550 thereby to prepare the circuit for controlling the vertical magnet VM575. The detail circuits for operating the above-mentioned relays have been previously described and need not be repeated at this time.

In response to the first digit 4 transmitted over the conductor C468 by the director, the line relay R530 will momentarily restore and reoperate four times. At its contacts 532, the line relay R530 will repeat four pulses to the winding of the vertical magnet VM575 thereby to cause the vertical magnet to raise the wipers 563 to 565, inclusive, of the primary selector 500 step-by-step in a vertical direction to a position opposite the fourth level of the associated contact banks. In response to the first vertical step of the wipers the vertical off-normal contacts VON578 and VON579′ are closed, and the contacts VON579 interrupt the initial operating circuit of the transfer relay R550. However, this relay being somewhat slow-to-release, remains in its operating position over a circuit including its lower winding under control of the pulses transmitted to the vertical magnet VM575. In response to the closing of the contacts VON578, on the first vertical step, a circuit will be completed for the rotary relay R560 which may be traced from ground, at contacts 541, and then via the contacts 572, 554, 545, 577, and VON578, and the winding of relay R560, to battery. The relay R560′ upon operating, at its contacts 561, completes a locking circuit for itself which may be traced from ground, at contacts 529, and then by way of the contacts 561, 545, 577, and VON578, and maintains the relay R560 in its operated position after the transfer relay R550 restores to normal. At the end of the fourth impulse repeated by the line relay R530 to the vertical magnet VM575, the transfer relay R550 restores to normal and, at its contacts 555, it completes a circuit for operating the rotary magnet RM576. The circuit for the rotary magnet RM576 may be traced from ground at contacts 541, and then by way of the contacts 572, 555 and 562, and the winding of the rotary magnet RM576, to battery. The magnet now operates and rotates the wipers 563 to 565, inclusive, one step in a rotary direction to engage the first set of contacts in the fourth level of the associated contact banks. As a further result of the operation of the magnet RM576, at its contacts 577, it interrupts the previously traced circuit for operating the rotary relay R560. The relay R560 now restores to normal, thereby to interrupt, at its contacts 561, the locking circuit for itself and to interrupt, at the contacts 562, the circuit for the rotary magnet RM576. The rotary magnet RM576 now restores and, at its contacts 577, prepares a point in the circuit for reoperating the rotary relay R560. If the wiper 565 encounters a ground potential on the engaged contact, a circuit will be recompleted by way of the contacts 525, 545, 577 and VON578, for reoperating the rotary relay R560. Reoperation of the last-mentioned relay will reclose the circuit for the rotary magnet RM576 thereby to initiate the above-described cycle of operaion in order to advance the wipers an additional step in a rotary direction into engagement with the second set of contacts in the fourth level of the associated contact banks.

When an idle trunk is reached during the rotary stepping of the wipers 563 to 565, inclusive, the wiper 565 will not encounter a busy marking ground position and, consequently, the above-described circuit for reoperating the rotary relay R560 will not be recompleted. When this condition exists, the test relay R520 will be operated in order to cut-through the connection to the succeeding switch in the switch train. The circuit for operating the test relay R520 may be traced from ground, at contacts 541, and then by way of the contacts 572, the eleventh rotary step cam contacts CAM557, the winding of the test relay R520, the contacts 545, 577, and VON578, and the winding of the rotary relay R560, to battery. The relay R520 operates over this circuit in series with the relay R560 but due to the resistance of relay R520, the relay R560 will not operate.

In response to the operation of the test relay

R520, at its contacts 521 and 523, it disconnects the line relay R530 from the conductors C501 and C502 extending to the connected director and extends these conductors, by way of the contacts 522 and 524, and the wipers 563 and 564, to the next switch in the switch train. When the above-mentioned switch-through operation takes place, the succeeding switch is seized and returns a ground potential over the wiper 565, the contacts 526, 572, and CAM557, the winding of the relay R520, the contacts 529′, 577, and VON578, and the winding of relay R560, to battery. The test relay R520 is now locked in its operated position under control of the ground potential applied to the wiper 565 from the succeeding switch. As a further result of the operation of relay R520 it interrupts, at its contacts 529, the previously traced circuit for the hold relay R540 which now slowly restores to normal. All of the relays in the primary selector 500 are now restored to normal, except the test relay R520 which is held in its operated position from its succeeding switch, and the director test relay R510 which is held in its operated position over the conductor C507 from the associated director.

For the purpose of this description it will be assumed that the primary selector 500 has selected the contacts in the associated contact banks terminating the conductors C2305 to C2307, inclusive, extending to the toll ticket repeater 2300 (Fig. 23) and the associated ticket repeater selector 2700 (Fig. 27).

*Operation of the ticket repeater selector 2700*

In describing the operation of the director it was pointed out that the first digit transmitted, in the setting up of the connection, over the conductor C468, controlled the primary selector 500. The primary selector 500 in response to the first digit "4" transmitted thereto selected the idle toll ticket repeater 2300 and the associated ticket repeater selector 2700. The switch-through operation of the primary selector 500 extended the impulse conductor C468 from the director through to the conductor C2305 terminating in the toll ticket repeater 2300. A branch of the above-mentioned conductor also extends over the conductor C2381 and the contacts 2711 to the upper winding of the line relay R2720 in the ticket repeater selector 2700. From the foregoing it will be understood that the selector 2700 is now in condition to receive the second switch setting digit transmitted by the associated director in the manner previously described. As a further result of the switch-through operation of the primary selector 500 a ground potential is momentarily applied to the conductor C2307 extending to the toll ticket repeater 2300 in order to operate the transfer relay R2740 in the associated ticket repeater selector 2700. The above-mentioned circuit for controlling the operation of the transfer relay R2740 may be traced from ground by way of the contacts 541 (Fig. 5) and 526, the wiper 565, the conductor C2307, the contacts 2522 and 2333, the conductor C2383 extending to Fig. 27, the contacts 2796 of the busy key 2795, the vertical off-normal contacts VON2762, and the upper winding of the transfer relay R2740, to battery. The above-mentioned circuit for controlling the line relay R2720 and the transfer relay R2740 in the selector 2700 occur substantially simultaneously and, therefore, both relays operate to seize the ticket repeater selector 2700.

The line relay R2720, upon operating, at its contacts 2721, completes an obvious circuit for operating the hold relay R2730. The transfer relay R2740, upon operating, at its contacts 2742, prepares a point in a circuit for operating the vertical magnet VM2760 and a multiple circuit for maintaining the transfer relay R2740 in its operated position during pulsing of the vertical magnet.

When the hold relay R2730 operates, in the manner noted above, at its contacts 2731, it applies ground potential to the conductor C2386 extending to the toll ticket repeater 2300 and then by way of the contacts 2522 to the conductor C2307, which ground potential maintains operated the switch-through relay R520 in the primary selector 500 when the hold relay R540 restores to normal. The hold relay R540 is restored to normal under control of the line relay R530 in response to the switch-through operation of the relay R520 in the primary selector 500.

Furthermore, the ground potential applied to the conductor C2386 is extended by way of the contacts 2333 in the toll ticket repeater 2300 to the conductor C2383 and then over the previously traced circuit, including the contacts 2796 and VON2762, to the upper winding of the transfer relay R2740. The last-mentioned circuit maintains the relay R2740 in its operated position under control of the hold relay R2730.

As a further result of the operation of relay R2730, at its contacts 2732, it prepares a point in a testing circuit for operating the switch-through relay R2710; at its contacts 2733, it prepares a point in the circuit for operating the rotary relay R2750; and at its contacts 2734, it prepares a further point in the impulsing circuit for the vertical magnet VM2760 and the lower winding of the transfer relay R2740. The ticket repeater selector 2700 is now prepared for operation under the control of the second switch setting digit transmitted by the director. It should be noted, however, that the circuit including the lower winding of the line relay R2720 is ineffective at the present time inasmuch as the conductor C2382 is disconnected, at the contacts 2345, in the toll ticket repeater 2300.

The second switch setting digit transmitted by the director in the present call is assumed to be the digit "8." Therefore, eight impulses are transmitted over the conductor C468 in the manner previously described and then by way of the conductors C2305 and C2381 to the line relay R2720. The line relay in restoring in response to the first pulse of the digit "8" completes, at its contacts 2722, a circuit for operating the vertical magnet VM2760 and a circuit including the lower winding of the transfer relay R2740. These circuits may be traced from ground by way of the contacts 2719, 2722, 2734, and 2742, one branch extending therefrom through the vertical magnet VM2760, to battery, and the other branch extending therefrom through the lower winding of the transfer relay R2740, to battery. The vertical magnet operates in the well-known manner to raise the wipers 2701 to 2704, inclusive, of the selector 2700 one step in a vertical direction. The circuit including the lower winding of the transfer relay R2740 maintains the last-mentioned relay in its operated position during pulsing. As soon as the wipers of the switch are raised one step from their normal resting positions the vertical off-normal contacts VON2761 and VON2763 are closed and the contacts VON2762 are opened. The opening of the contacts VON2762 interrupts the circuit for the upper winding of the relay R2740 but due to its slow-to-release characteristics and the impulse transmitted through the circuit including its lower windings, the relay remains in its operated position. In response to the closing of the contacts VON2763 a circuit is completed for operating the rotary relay R2750. The last-mentioned circuit may be traced from ground by way of the contacts 2731, the conductor C2386, the contacts 2333, the conductor C2383, the contacts 2796, VON2793, 2718, and 2733, the 11th rotary step cam springs CAM2777, the contacts 2771, and the winding of the rotary relay R2750, to battery. The relay R2750, upon operating, at its contacts 2751, prepares a point in the circuit for operating the rotary magnet RM2770; and, at its contacts 2752, it completes a locking circuit for itself which is independent of the 11th rotary step cam springs CAM2777.

The remaining impulses constituting the digit "8" will control the line relay R2720 which relay, in turn, controls the vertical magnet VM2760 a corresponding number of times and maintains the transfer relay R2740 operated during the impulse series. At the end of the eight impulses transmitted by the director constituting the digit "8," the wipers 2701 to 2704, inclusive, of the selector 2700 will be raised to a position opposite the eighth level of the associated bank contacts. When the last impulse of the digit "8" has been received by the line relay R2720, the relay will be retained in its operated position and complete, at its contacts 2721, the holding circuit for the relay R2730. It should be understood, however, that the momentary interruptions in the circuit for the hold relay R2730 during pulsing prevents the release of the last-mentioned relay due to its slow-to-release characteristics. As a further result of the line relay R2720 being retained in its operated position, at its contacts 2722, it interrupts the previously traced pulsing circuit for the vertical magnet VM2760 and the multiply connected transfer relay R2740. The transfer relay R2740 slowly restores to normal and when it restores it completes, at its contact 2741, the above-mentioned circuit for operating the rotary magnet RM2770. Also, at its contacts 2742, the relay R2740 interrupts a point in the operating circuit including its lower winding.

In response to the completion of the above-mentioned circuit for the rotary magnet RM2770, the magnet operates to rotate the wipers 2701 to 2704, inclusive, one step into engagement with the first set of contacts in the eighth level in the associated contacts banks. Furthermore, at its contacts 2771, the rotary magnet RM2770 interrupts the circuit for the rotary relay R2750 which now restores to normal. Upon restoring the relay R2750 interrupts the operating circuit for the magnet RM2770, at its contacts 2751 and, at its contacts 2752, it interrupts a point in the multiple holding circuit for itself. The magnet RM2770 now restores to normal and recloses, at its contacts 2771, a point in the operating circuit for the rotary relay R2750.

The operation of the relay R2750 now depends upon the busy condition of the trunk connected to the contacts engaged by the wipers 2701 to 2704, inclusive. If the trunk is busy, a ground potential will be applied to the wiper 2704 thereby to short-circuit the upper winding of the switch-through relay R2710. Also, if no potential is encountered by the wiper 2704, the switch-through relay R2710 cannot operate. Under either one of the above-mentioned conditions a circuit will again be completed for operating the rotary relay R2750 from ground at contacts 2731 and then by way of the conductor C2386, the contacts 2333, the conductor C2383, the contacts 2796, VON2763, 2718, 2733, CAM2777, and 2771, and the winding of the rotary relay R2750, to battery. The rotary relay R2750 will again operate thereby to initiate the above cycle of operation of the rotary magnet RM2770 and the rotary relay R2750. In this manner the wipers 2701 to 2704, inclusive, are advanced an additional step in a rotary direction into engagement with a second set of contacts in the selected eighth level.

The above cycle of operation for advancing the wipers step-by-step in a rotary direction will continue until the wiper 2704 engages a contact terminating an idle trunk extending to the EMpire-1 exchange. When an idle trunk is encountered, a battery potential will be applied to the wiper 2704 and then over a circuit including the contacts 2781, the upper winding of the switch-through relay R2710, and the contacts 2732, to ground. The switch-through relay R2710 now operates and, at its contacts 2717, it completes a locking circuit for its lower winding by way of the grounded conductor C2383. As a further result of the operation of relay R2710, at its contacts 2718, it interrupts a point in the previously traced circuit for the rotary relay R2750 thereby to prevent re-operation of the last-mentioned relay. Finally, at its contacts 2711 to 2714, inclusive, the relay R2710 disconnects the line relay R2720 from the talking conductor C2381 and C2382 and connects the last-mentioned conductors through to the trunk repeater seized over the trunk selected by the wipers 2701 to 2704, inclusive.

As soon as the line relay R2720 is disconnected, in the manner noted above, the relay restores to normal and, at its contacts 2721, it interrupts a further point in the circuit for the hold relay R2730. The last-mentioned relay is somewhat slow-to-release thereby to maintain a ground potential on the conductor C2386 to hold the switch-through relay R2710 in its operated position over its locking winding until a ground potential is substituted for the battery potential on the wiper 2704 by the seized trunk repeater.

In response to the switch-through operation of the switch-through relay R2710 the seized trunk repeater will operate in a well-known manner to respond to subsequent impulses transmitted by the director and to repeat said impulses to the EMpire 1 exchange. Also, the seizure of the trunk repeater will substitute a busy ground potential, for the idle marking battery potential, applied to the wiper 2704. This ground potential is now extended by way of the contacts 2781, 2716, the conductor C2386, the contacts 2333, the conductor C2383, the contacts 2796, VON2763 and 2717, and the lower winding of the switch-through relay R2710, to battery.

In view of the above-mentioned circuit it will be seen that the switch-through relay R2710 will be maintained in its operated position under control of the busy marking ground potential applied to the wiper 2704 by the seized trunk repeater. Therefore, when the hold relay R2730 subsequently restores to normal, the removal of ground potential at the contacts 2731 and 2732 will have no effect upon the operated condition of the switch-through relay R2710. All of the relays and magnets of the ticket repeater selector 2700 are in their restored position except the switch-through relay R2710.

After the interdigital pause inserted between the transmission of successive series of impulses constituting successive digits of the called subscriber number, the director involved in the connection will continue to transmit such digits to the first repeater where they are repeated over the inter-exchange trunk line to the EMpire 1 exchange. The subsequent digits will control the switching apparatus in the EMpire 1 exchange in the well-known manner to complete the connection to the desired called subscriber whose directory number is EMpire 1-1234. It should be mentioned at this time, however, that the transfer of the items of information necessary for the ticketing of the above-described toll call is transferred from the call recorder 2000 to the toll ticketing repeater 2300, in the manner previously described, during the period of time that the director is transmitting switch setting impulses to the ticket repeater selector 2700 to subsequent switches in the switch train. Also when the called party answers, ground potential is applied to the wiper 2703 of the selector 2700. This ground potential is further extended by way of the contacts 2715, the conductor C2387 and the contacts 2343 to the winding of the answer supervisory relay R2480 to initiate conversation timing operations in the toll ticket repeater 2300.

In response to the release of the connection by both the calling and the called subscriber, the answer supervisory relay R2480 in the toll ticket repeater 2300 will be restored to normal in order to terminate conversation timing in the manner to be described hereinafter and, in addition thereto, the trunk repeater which was seized by the ticket repeater selector 2700, is released. In releasing, the repeater removes ground potential from the wiper 2704 thereby to interrupt the previously described holding circuit including the lower winding of the switch-through relay R2710. The relay R2710 now restores to normal thereby to initiate the release of the ticket repeater selector 2700.

Before describing the releasing operation of the ticket repeater selector 2700, it should be noted that the removal of ground potential from wiper 2704 also removes the holding ground potential from the conductor C2307. The last-mentioned holding ground was applied to the conductor C2307 over the circuit which includes the wiper 2704, the contacts 2781, 2716, the conductor C2386, the contacts 2522, and the conductor C2307. The removal of ground from the conductor C2307 causes the release of the primary selector 500, the line finder 440, and the line circuit 405, in the manner previously described. Furthermore, it interrupts the locking circuit for the upper winding of the seizure relay R2410 in the toll ticket repeater 2300.

Returning again to the selector 2700 it will be seen that as soon as the switch-through relay R2710 restores to normal, at its contacts 2719, it completes a circuit from ground by way of the contacts 2719, 2722, 2735 and VON2761, and the winding of the release magnet RM2780, to battery. The release magnet RM2780 operates over the above-traced circuit to open, at its contacts 2781, a further point in the previously mentioned circuit including the wiper 2704, and to cause the wipers 2701 to 2704, inclusive, to be restored to their normal resting positions in the well-known manner. As soon as the wipers noted are restored to normal, the contacts VON2761 are opened thereby to interrupt the circuit for the release magnet RM2780 which also restores to normal. Finally, at the contacts VON2762 and VON2763, circuits are prepared to condition the ticket repeater selector 2700 for further calls. Since the ticket repeater selector 2700 is individually associated with the toll ticket repeater 2300, it will not be reoperated in a new call until the toll ticket repeater 2300 has transferred all of the information stored therein, including the conversation time, to the tabulator and has released.

Before concluding the operations of the selector 2700, a description will be given of its operation in the event that an idle trunk is not available at the time the rotary magnet RM2770 is rotating its wipers over the contacts in the eighth level of the associated contact banks. As has been previously pointed out, the cyclic operation of the rotary magnet RM2770 and the rotary relay R2750 continues until a battery potential is encountered by the wiper 2704. In the event that no battery potential is encountered, the rotary magnet will advance the wipers 2701 to 2704, inclusive, step-by-step over the ten contacts in the eighth level of the associated contact banks and, finally, steps the wipers into the 11th step position. When this occurs, the 11th step cam contacts CAM2775 are closed and CAM2776 and CAM2777 are opened, the circuit whereby the rotary relay R2750 is operated is interrupted thus preventing the last-mentioned relay from again completing, at its contacts 2751, a circuit for reoperating the rotary magnet RM2770. Also, the 11th step cam contacts CAM2775 completes a circuit whereby a busy tone signal, transmitted over the conductor C2725 is applied to the lower winding of the relay R2720. The tone signal is subsequently transmitted to the calling subscriber in the well-known manner to indicate that the attempted call cannot be completed at the present time due to the busy condition encountered by the ticket repeater selector 2700. It may be well to point out, however, that since the selector 2700 has not been able to seize an idle trunk to the EMpire 1 exchange in the condition assumed, the director will continue to transmit the switch setting digits to the line relay R2720 of the selector 2700. The relay R2720 will follow the impulses constituting the switch setting digits but since the transfer relay R2740 is in its restored position, at the present time, the impulses constituting the switch setting digits will merely be absorbed by the line relay R2720. As soon as all of the digits have been transmitted by the associated director, it will be disconnected from the calling line and from the connection including the primary selector 500 and the ticket repeater selector 2700, in the manner previously described, and the calling subscriber line will automatically be connected through to the line relay R2720. When the last-mentioned operation occurs, the calling subscriber will hear the busy tone signal and will release the connection, by replacing his receiver upon the switchhook of the associated telephone instrument.

As soon as the subscriber replaces his receiver, the loop circuit over which the line relay R2720 is held, is interrupted and the relay restores to normal. At its contacts 2721, the relay R2720 will interrupt the circuit for the hold relay R2730 which slowly restores to normal. The restoration of the hold relay R2730 will complete the previously traced circuit for operating the release magnet RM2780 and the ticket repeater selector 2700 will restore to normal. Finally, the hold relay R2730, at its contact 2731, will remove ground potential from the conductor C2386 thereby to cause the release of the seizure relay R2410 in the toll ticket repeater 2300 and the release of the preceding switches, in the manner previously described.

*Operation of the toll ticket repeater 2300 under control of the director*

When the conductors C2305 to C2307, inclusive, are selected by the primary selector 500 as previously described, the toll ticket repeater 2300 and the associated ticket repeater selector 2700 will be seized for further operation. The switch-through operation of the primary selector 500 has extended the impulsing circuit from the director by way of the conductor C2305 and the conductor C2381 to the ticket repeater selector 2700. In response to the above-mentioned circuit, the line relay R2720 in the ticket repeater selector and the hold relay R2730 will operate, the former to prepare the impulsing circuit for directively operating the ticket repeater selector under control of the second digit transmitted by the director, and the latter to mark the ticket repeater selector 2700 and the associated toll ticket repeater 2300 busy to other primary selectors having access thereto. The operation of the hold relay R2730 in the ticket repeater selector 2700 applies the busy marking ground potential to the conductor C2386 and this ground potential is extended by way of the contacts 2522, the conductor C2307, the wiper 565, the contacts 526, 572, and CAM557, the winding of the switch-through relay R520, the contacts 529′, 577, VON578, and the winding of relay R560, to battery. This ground potential, over the above-traced circuit maintains the switch-through relay R520 in the primary selector 500 in its operated position thereby to retain the primary selector 500 connected to the toll ticket repeater 2300 and the associated ticket repeater selector 2700. The ground potential also marks the multiply connected contacts terminating the conductor C2307 in all of the other primary selectors having access to the toll ticket repeater 2300.

As a further result of the seizure of the toll ticket repeater 2300, a circuit is completed for operating the seizure relay R2410. The circuit for operating the seizure relay R2410 may be traced from battery through the lower winding of relay R2410, the contacts 2413, 2335 and 2344, the conductor C2306 extending to Fig. 5, the wiper 564, the contacts 524 and 515, the conductor C502, the wiper 454, the conductor C469 extending to Fig. 8, the conductor C885, extending to Fig. 22, the contacts 2236 and 2143, and the lower winding of the code send relay R2140, to ground. In this manner the toll ticket repeater 2300 is prepared to receive the various items of information transmitted from the call recorder 2000 and the call recorder 2000 is signalled to initiate the operations whereby the items of information are transferred to the toll ticket repeater 2300. When the above-traced circuit is completed, the code send relay R2140 in the call recorder 2000 is operated in order to control the operation of the call recorder to transmit all of the stored information to the ticket repeater 2300, all in the manner previously described.

When the seizure relay R2410 in the toll ticket repeater 2300 operates, at its contacts 2411, it completes a locking circuit for its upper winding which includes the grounded conductor C2386. At its contacts 2412 and 2413, the relay R2410 disconnects its lower winding from the conductor C2306 and transfers the latter conductor to the circuit including the winding of the marginal code mark relay R2370 and the winding of the step relay R2360. The last-mentioned relays are now connected in the series circuit over which either resistance ground or direct ground pulses are transmitted by the call recorder 2000 to transfer the various items of information from the call recorder to the toll ticket repeater 2300.

As a further result of the operation of relay R2410, at its contacts 2416 and 2418, it completes a circuit whereby the code receiving switch 2610 is controlled to advance its wipers from the normal resting contact position 26 into engagement with the contact 1 in the associated contact banks. The stepping circuit for the code receiving switch 2610 may be traced from ground by way of the contacts 2418, the code receiving switch off-normal contacts 2618 (closed only on contact 26), the contacts 2438, 2416 and 2616, and the winding of the rotary magnet RM2615, to battery. The magnet operates when the above-traced circuit is completed and, at its contacts 2616, interrupts its own circuit thereby to cause the magnet to restore to normal and advance its wipers from position 26 into engagement with the contacts 1. As soon as the wipers of the code receiving switch 2610 are stepped from contact 26 into engagement with contact 1, the code receiving switch off-normal contacts 2618 are opened, and the contacts 2617 are closed. The last-mentioned contact remains closed, the entire time the wipers of the code receiving switch 2610 are in engagement with any one of the contacts 1 to 25, inclusive. In response to the closure of the code receiving switch off-normal contacts 2617, a circuit is completed for the lower winding of the auxiliary relay R2430 which may be traced from ground, by way of the contacts 2418, 2617, 2431′, and 2411′, and the lower winding of the relay R2430, to battery. The relay R2430 upon operating, at its contacts 2436 completes a locking circuit for its upper winding from ground at contacts 2414. As a further result of the operation of relay R2430 it applies ground to the locking ground conductor C2453, at its contacts 2433, and, at its contacts 2432, it applies ground potential to the conductor C2388 extending to the associated ticket repeater selector 2700 and, in multiple therewith, it extends ground by way of the resistor 2452, the contacts 2472, and the signal 2303, to battery. The last-mentioned circuit causes the signal lamp 2303 to be dimly lighted to signal the operator at the monitoring operator's position that the toll ticket repeater 2300 has been seized, that it is in readiness to receive and store the items of information pertaining to the connection.

The call recorder 2000 may now transmit the code impulses in the manner described in connection with the previous description of the operation of the call recorder 2000 whereby the step relay R2360 is operated in response to each resistance ground pulse and whereby the step relay R2360 and the marginal code mark relay R2370 are operated in series in response to direct ground pulses.

Referring now to the code receiving switch 2610 it will be seen that in response to the seizure of the toll ticket repeater 2300 the wipers 2611 to 2614, inclusive, have been automatically stepped from the contact 26 position into engagement with the contacts 1. In this position of the code receiving switch 2610, the wiper 2612 is effective to control the operation of the W8 code storage relay depending upon the operation of the marginal code mark relay R2370. The first four pulses received from the call recorder 2000 over the conductor C2306 operates and restores the step relay R2360 a corresponding number of times and if any one or more of the four impulses are direct ground pulses, instead of resistance ground pulses, the marginal code mark relay R2370 will complete, at its contacts 2371, a circuit for operating the WXYZ6 code storage relays to register therein the digit corresponding to the digit transmitted by the call recorder 2000. Upon each operation of the step relay R2360, at its contacts 2361, it completes an operating circuit for the rotary magnet RM2615 and upon the restoration of the relay R2360 at the end of each impulse, the magnet RM2615 is restored to normal thereby to advance the wipers 2611 to 2614, inclusive, an additional step in a clockwise direction. In this manner, the code storage relays WXYZ6 will be operated, either individually or in combinations, to register the tens digit 1 identifying the director utilized in transferring various items of information to the toll ticket repeater 2300.

Contacts 5 to 8, inclusive, associated with the wiper 2612 of the code receiving switch 2610 terminate the WXYZ7 code storage relays which will be operated individually or in combinations, as the wiper 2612 is advanced step-by-step over the contacts 5 to 8, inclusive, to register the units digit 2 identifying the director.

When the wipers 2611 to 2614, inclusive, are advanced into engagement with the contacts 9 in the associated contact banks, either a direct ground or a resistance ground pulse will be transmitted over the conductor C2306, by the call recorder 2000, depending upon the class of the calling subscriber line involved in the connection. If a class 1 subscriber has originated the call being described, the call recorder 2000 will transmit a resistance ground pulse to the toll ticket repeater 2300 thereby to operate only the step relay R2360. Consequently, at its contacts 2361, the relay R2360 controls the magnet RM2615 to advance the wipers of the code receiving switch 2610 into engagement with the contacts 10. In view of the above, it will be seen that the W8 code storage relay will not be operated and thus indicates that a class 1 subscriber has initiated the call. However, if a direct ground pulse is transmitted by the call recorder 2000 over the conductor C2306 when the wiper 2612 of the code receiving switch 2610 is in engagement with its contact 9, the relay R2370 and the relay R2360 will operate in series. The code mark relay R2370 will thereupon complete a circuit for operating the W8 code storage relay and the step relay R2360 will control the magnet RM2615 to advance the wipers from contacts 9 into engagement with contacts 10. The operated code storage relay W8, at its upper make contacts, will lock itself in its operated position to the grounded locking conductor C2453. The code storage relay W8, in its operated position, will register the fact that the calling subscriber that initiated the call is a class 2 subscriber.

In contact positions 10, 11, 12 and 13 the wiper 2612 will successively connect the WXYZ17 code storage relays with the contacts 2371 of the marginal code mark relay R2370 as the step relay R2360 responds to the impulse from the call recorder 2000 and steps the wipers of the code receiving switch 2610. The code storage relays WXYZ17 will be operated individually or in combinations to register the units digit of the charge rate for the particular connection and transferred thereto under control of the call recorder 2000. The operated ones of the WXYZ17 code storage relays will be locked in the operated position to the grounded conductor C2453 by way of the make contacts individually associated with each of the relays.

The wiper 2612 will now be advanced step-by-step under control of pulses from the call recorder 2000 over the contact positions 14 to 25, inclusive, in the manner previously described. As the wiper 2612 is successively stepped over the contact 14 to 17, inclusive, the WXYZ21 code storage relays will be operated individually or in combinations to register therein the first code digit of the called station exchange designation, that is the first digit of the called subscriber directory number. In contact positions 18 to 21, inclusive, the wiper 2612 successively connects the WXYZ22 code storage relays whereby these relays may be operated individually or in combinations to register the second digit of the called station exchange code, that is, the second digit of the called subscriber directory number. In contact positions 22 to 25, inclusive, the wiper 2612 will successively connect the WXYZ23 code storage relays, whereby the third code digit of the called station exchange code, that is the third digit of the called subscriber directory number is registered in the WXYZ23 code storage relays.

The wipers 2611 to 2614, inclusive, are now advanced from contacts 25 into engagement with the contacts 26. In this position of the wipers, the off-normal contacts 2617 are opened and the contacts 2618 are closed. A circuit is now completed from ground at contacts 2418, by way of the contacts 2618, 2437, and 2444, through the winding of the second cycle auxiliary relay R2420, to battery. The relay R2420 now operates and, at its contacts 2421, completes a circuit by way of the winding of the wiper switching relay R2440, to the grounded locking conductor C2453. The circuit for the relay R2440, however, is short-circuited until the off-normal contacts 2618 of the code receiving switch 2610 are again opened.

At the time the code receiving switch 2610 has its wipers in engagement with the contacts 26, the code send switch 1950 in the call recorder 2000 has its wipers in engagement with the contacts 26. Consequently, upon the next operation of the code pulse relay R2150 in the call recorder 2000, the wipers of the code send switch 1950 are advanced in a counterclockwise direction from engagement with the contacts 26 into engagement with the contacts 1. Simultaneously therewith the code pulse relay R2150, at its contacts 2152, transmits a resistance ground pulse to the toll ticket repeater 2300 thereby to cause the operation and release of the step relay R2360. The last-mentioned relay, at its contacts 2361, transmits a stepping pulse to the rotary magnet RM2615 thereby to advance the wipers 2611 to 2614, inclusive, from engagement with the contacts 26 into engagement with the contacts 1.

From the foregoing it will be understood that during the first cycle of operation of the code send switch 1950, the wiper 1954 is advanced step-by-step under control of the code pulse relay R2150 and, simultaneously therewith and in synchronism, the code receiving switch 2610 advances its wipers step-by-step. In this manner the various items of information stored in the call recorder 2000 and marked in code form on the bank contacts associated with the wiper 1954 are transferred to the code storage relays terminating in the bank contacts associated with the wiper 2612 of the code receiving switch 2610.

As soon as the contacts 2618 are opened, in response to the advancement of the wipers of the code receiving switch 2610 from contacts 26 to contacts 1, the short-circuit around the wiper switching relay R2440 is removed and the relay R2440 operates in series with the relay R2420. The relay R2420 remains in its operated position and the relay R2440, upon operating, at its contacts 2441 and 2442, transfers the code marking impulsing circuit from the wiper 2612 to the wiper 2613. The last-mentioned circuit may be traced from ground, at contacts 2371, by way of the contacts 2441 and 2463, to the wiper 2613. In this manner the wiper 2613 is effective to successively connect the various code storage relays to the code marking contacts 2371 as the wipers of the code receiving switch 2610 are advanced step-by-step over the contacts 1 to 25, inclusive. During the second cycle of operation of the code receiving switch 2610 the code send switch 1950 in the call recorder 2000 is also controlled in its second cycle of operation to advance the wipers 1955 step-by-step over the associated contacts 1 to 25, inclusive, in order to transmit either resistance ground or direct ground pulses to the toll ticket repeater 2300 whereby the information stored in the call recorder 2000 is transferred to the toll ticket repeater 2300.

With the wiper 2613 in engagement with contact 1, a circuit is prepared for the code storage relay X9. Since the call being described is to be extended to an exchange having a three-digit called office code and to a called subscriber having a four-digit numerical number, the two-digit code relay X9 will not be operated. In other words, the call recorder 2000 will transmit a resistance ground pulse to the step relay R2360 thereby to cause the rotary magnet RM2615 to advance its wipers from contacts 1 into engagement with the contact 2. Since the two-digit code relay X9 is not operated, an indication is given that the called subscriber number is a seven-digit number instead of a six-digit number. It may be well to mention at this time, however, that if the call being considered is to be extended to a called exchange having a two-digit code instead of a three-digit code, a direct ground pulse would have been transmitted from the call recorder 2000 to the toll ticket repeater 2300. In this event the two-digit code relay X9 is operated and locked to the locking conductor C2453 thereby to register in the toll ticket repeater 2300 the fact that the called subscriber directory number is a six-digit number.

When the wiper 2613 is in engagement with the contact 2, a circuit is prepared for the intercepting relay R2330. Therefore, the next pulse transmitted by the call recorder 2000 will operate the intercept relay R2330 if that pulse is a direct ground pulse. A direct ground pulse is transmitted from the call recorder 2000 in the event the detector 1900 has failed to identify the number of the calling subscriber. In the present example, the detector has functioned properly and has identified and registered the calling subscriber directory number in the code storage relays WXYZ1 to WXYZ5, inclusive, in the call recorder 2000. Consequently, a resistance ground pulse will be transmitted from the call recorder 2000 to the toll ticket repeater 2300 thereby to cause the code receiving switch 2610 to advance its wipers from engagement with the contacts 2 into engagement with the contact 3 without operating the intercepting relay R2330. The operations which occur in the event a detector has failed to identify a calling subscriber and the subsequent control of the intercepting relay R2330 will be described hereinafter.

With the wiper 2613 in engagement with contact 3 a circuit is prepared for controlling the tens digit rate register relay Y18. In the present call it has been assumed that the charge rate is the rate 01 and consequently, the tens digit rate register relay Y18 will not be operated. More specifically, the call recorder 2000 will transmit a resistance ground pulse to the toll ticket repeater 2300 thereby to advance the wipers of the code receiving switch 2610 from engagement with the contact 3 into engagement with the contact 4 without operating the tens digit rate register relay Y18. In its unoperated position the tens digit rate register relay Y18 will register the digit "0" in the toll ticket repeater 2300. If, on the other hand, the rate for the call being described is any rate from 10 to 19, inclusive, a direct ground pulse would have been transmitted from the call recorder 2000 to the ticket repeater 2300 thereby to cause the operation of the tens digit rate register relay Y18. In its operated position the tens digit rate register relay Y18 will be locked to the locking conductor C2453 thereby to register in the toll ticket repeater 2300 the tens digit "1" for the rate.

The wiper 2613 will now be successively stepped over the contacts 4 to 23, inclusive, thereby to successively connect the WXYZ1 to WXYZ5 code storage register relays to the code marking relay R2370. As the wiper 2613 of the code receiving switch 2610 is advanced step-by-step over the above-mentioned contacts, the call recorder 2000 will transmit in code form the information stored on the code storage register relays WXYZ1 to WXYZ5, inclusive, in the call recorder 2000, to the corresponding code storage relays in the toll ticket repeater 2300. In this manner the third digit of the calling exchange code and the first, second, third and fourth numerical digits of the calling subscriber directory number are respectively registered in the code storage register relays WXYZ1 to WXYZ5, inclusive, in the toll ticket repeater 2300.

The wipers of the code receiving switch 2610 are now advanced step-by-step over the contacts 24 and 25 and into engagement with the contacts 26 thereby to successively connect the W24 and X24 code storage register relays in the toll ticket repeater 2300 to the code marking relay R2370. In this manner the W24 and X24 register relays may be operated depending upon the marking of the W24 and X24 code marking leads terminating in the contact 24 and 25 accessible to the wiper 1955 in the call recorder 2000.

When the wiper 2613 engages the contact 26 position the code receiving switch off-normal contacts 2618 are again closed and the contacts 2617 are opened. The circuit is now completed from ground, at contacts 2418, and then by way of the contacts 2618, 2437, 2443 and 2464, and the winding of the third cycle auxiliary relay R2450, to battery. The relay R2450 upon operating, at its contacts 2451, completes a circuit for itself in series with the wiper switching relay R2460 and the locking ground conductor C2453. The last-mentioned relay does not operate at the present time due to the shunting circuit completed by the operating ground for the relay R2450.

The call recorder 2000 now transmits a resistance ground pulse thereby to control the code receiving switch 2610 to advance its wipers from the contact 26 position into engagement with the contacts 1 in the manner previously described. As soon as the wipers are advanced in the manner described above, the off-normal contacts 2618 are opened and the contacts 2617 are closed. The opening of the contacts 2618 removes the shunting ground from the winding of the relay R2460 whereupon the last-mentioned relay operates in series with the relay R2450. Upon operating, the relay R2460, at its contacts 2462 and 2463, transfers the code marking circuit from the wiper 2613 to the wiper 2614 of the code receiving switch 2610. Finally, at its contacts 2461, the relay R2460 prepares a point in the circuit whereby the switch-through relay R2340 will be subsequently operated.

The code receiving switch 2610 is now in condition to start the third cycle of its operation under control of pulses transmitted from the call recorder 2000. The wiper 2614 is now advanced step-by-step over the contacts 1 and 2 thereby to successively connect the Y24 and Z24 code storage register relays to the code marking contacts 2371. Simultaneously with the above-mentioned operations, the wiper 1956 of the code send switch 1950 is advanced step-by-step over the contacts 1 and 2 terminating the Y24 and Z24 code marking conductors in the call recorder 2000. As the code send switch 1950 and the code receiving switch 2610 are advanced in the manner described above, the Y24 and X24 code storage relays in the toll ticket repeater 2300 are operated individually or in combination. The WXYZ24 code storage relays in the toll ticket repeater 2300 are operated to register the fourth digit of the called station directory number.

The wiper 2614 of the code receiving switch 2610 is now advanced step-by-step over the contacts 3 to 14, inclusive, in synchronism with the wipers of the code send switch 1950 thereby to transfer the fifth, sixth and seventh digits of the called station directory number from the call recorder 2000 to the code storage relays WXYZ25, WXYZ26 and WXYZ27 respectively in the toll ticket repeater 2300.

When the wipers of the code receiving switch 2610 are advanced from engagement with the contacts 14 into engagement with the contacts 15, a circuit is completed by way of the grounded wiper 2611, the engaged contact 15, the contacts 2461, and the winding of the switch-through relay R2340, to battery. All of the items of information which have been stored in the call recorder 2000 and the associated call register 1500 have now been transferred to and stored in the code storage register relays of the toll ticket repeater 2300.

Before proceeding with the description of the operations which take place in the toll ticket repeater 2300 in response to the operation of the switch-through relay R2340, it should be understood that the various items of information which have been stored in the code storage register relays of the toll ticket repeater 2300 during the three cycles of operation of the code receiving switch 2610 are as follows:

WIPER 2612 OF THE CODE RECEIVING SWITCH 2610

| Contact Position | Code Marking | Information Transmitted |
|---|---|---|
| 1 | W6 | Identity of the director tens digit "1." |
| 2 | X6 | |
| 3 | Y6 | |
| 4 | Z6 | |
| 5 | W7 | Identity of the director units digit "2." |
| 6 | X7 | |
| 7 | Y7 | |
| 8 | Z7 | |
| 9 | W8 | Class of calling line: class 1, if not grounded; class 2, if grounded. |
| 10 | W17 | Charge rate—units digit. |
| 11 | X17 | |
| 12 | Y17 | |
| 13 | Z17 | |
| 14 | W21 | Called station directory number, 1st digit. |
| 15 | X21 | |
| 16 | Y21 | |
| 17 | Z21 | |
| 18 | W22 | Called station directory number, 2d digit. |
| 19 | X22 | |
| 20 | Y22 | |
| 21 | Z22 | |
| 22 | W23 | Called station directory number, 3d digit. |
| 23 | X23 | |
| 24 | Y23 | |
| 25 | Z23 | |
| 26 | ---------- | Stepping pulse. |

WIPER 2613 OF THE CODE RECEIVING SWITCH 2610

| Contact Position | Code Marking | Information Transmitted |
|---|---|---|
| 1 | X9 | 6 Digit called number: 7 digit No. if not grounded; 6 digit No. if grounded. |
| 2 | X10 | Detector failure—if grounded. |
| 3 | Y18 | Charge rate: tens digit "0" if not grounded; tens digit "1" if grounded. |
| 4 | W1 | Called station directory No., 3d digit. |
| 5 | X1 | |
| 6 | Y1 | |
| 7 | Z1 | |
| 8 | W2 | Calling station directory No., 4th digit. |
| 9 | X2 | |
| 10 | Y2 | |
| 11 | Z2 | |
| 12 | W3 | Calling station directory No., 5th digit. |
| 13 | X3 | |
| 14 | Y3 | |
| 15 | Z3 | |
| 16 | W4 | Calling station directory No., 6th digit. |
| 17 | X4 | |
| 18 | Y4 | |
| 19 | Z4 | |
| 20 | W5 | Calling station directory No., 7th digit. |
| 21 | X5 | |
| 22 | Y5 | |
| 23 | Z5 | |
| 24 | W24 | Called station directory No., 4th digit. |
| 25 | X24 | |
| 26 | ---------- | Stepping pulse. |

WIPER 2614 OF THE CODE RECEIVING SWITCH 2610

| Contact Position | Code Marking | Information Transmitted |
|---|---|---|
| 1 | Y24 | Called station directory No., 4th digit. |
| 2 | Z24 | |
| 3 | W25 | Called station directory No., 5th digit. |
| 4 | X25 | |
| 5 | Y25 | |
| 6 | Z25 | |
| 7 | W26 | Called station directory No., 6th digit. |
| 8 | X26 | |
| 9 | Y26 | |
| 10 | Z26 | |
| 11 | W27 | Called station directory No., 7th digit. |
| 12 | X27 | |
| 13 | Y27 | |
| 14 | Z27 | |

The operation of the switch-through relay R2340 indicates that all the items of information have been stored in the code storage register relays of the toll ticket repeater 2300 and that the connection of the conductor C2306 may be extended through to the associated ticket repeater selector 2700 over the conductor C2282. It will be recalled that the call recorder 2000 controlled the sender switch 1660 of the associated director to send out the last switch setting digit to complete the connection to the called subscriber line as soon as the call recorder 2000 had completed the transfer of the various items of information. It will also be recalled that the send sequence switch 1650 controlled the release of the director as soon as the sender switch 1660 sent out the last switch setting digit.

Referring now to the switch-through relay R2340 of the toll ticket repeater 2300 it will be seen, that in response to its operation, it completes, at its contacts 2346, a locking circuit for itself which includes the grounded contacts 2413'. Also, at its contacts 2342, relay R2340 completes a self-interrupting circuit for the magnet RM2615 thereby to cause the wipers of the code receiving switch 2610 to be advanced step-by-step in a clockwise direction from the contacts 15 to the contact position 26. This circuit may be traced from ground, at contacts 2418, and then by way of the off-normal contacts 2617, the contacts 2439, 2342, 2473, 2484, 2416, and 2616, and the winding of the magnet RM2615, to battery. Upon each operation of the magnet RM2615, the contacts 2616 are opened thereby to cause the magnet to restore to normal to advance the wipers an additional step and to reclose its operating circuit at the contacts 2616. This cycle of operation is completed after each advancement of the wipers until the wipers engage the contact 26 position to open the off-normal contacts 2617 and to close the contacts 2618. When the contacts 2617 are opened, the self-interrupting circuit for the magnet RM2615 is interrupted thereby to terminate the automatic stepping of the wipers.

As a further result of the operation of the relay R2340, at its contacts 2343, it connects the conductor C2387 extending to the associated ticket repeater selector 2700 to the winding of the answer supervisory relay R2480. The circuit for the above-mentioned relay will be completed under control of the ticket repeater selector 2700 as soon as the called subscriber answers the call.

Also, at its contacts 2345, the relay R2340 connects the conductor C2306 to the conductor C2382 extending to the associated ticket repeater selector 2700 thereby to complete a point in the talking circuit over which the conversation will be established between the calling subscriber and the called subscriber. Finally, at its contacts 2344, the relay R2340 disconnects the circuit including the series connected marginal code mark relay R2370 and the step relay R2360 from the conductor C2306.

The toll ticket repeater 2300 is now in condition to be operated under control of the called subscriber to initiate conversation timing. In considering this phase of the established connection to the called subscriber line, it should be understood that when the connector seizes the terminals, in its associated contact bank, terminating the called subscriber line, ringing current is transmitted thereover to signal the called subscriber. A ring-back tone signal is returned over the established connection to the calling subscriber substation to inform the subscriber thereat that the called station is being signaled. In this connection it will be recalled that in response to the release of the director and the call recorder from the calling subscriber line and the primary selector 500, the connection from the calling subscriber line was extended straight through the line circuit 405, the line finder 440, the primary selector 500, the toll ticket repeater 2300, the associated ticket repeater selector 2700, and the remaining switches in the switch train, including the inter-office trunk line and associated repeaters, to the called subscriber substation.

As soon as the called subscriber answers the call, the ringing signal will be terminated and the connector or, as it is sometimes called, the final selector, reverses the current flow over the talking connection for answering supervision. The reversal of the current flow will operate a supervisory relay in the repeater selected by the ticket repeater selector 2700 thereby to apply ground potential to the control conductor C2387 in the toll ticket repeater 2300. This ground potential is extended by way of the contacts 2343, and the winding of the answer supervisory relay R2480, to battery. The relay R2480 now operates and, at its contacts 2485, connects the contacts 24 and 25, associated with the wiper 2611 of the code receiving switch 2610, to the self-interrupting circuit for the magnet RM2615. This circuit is provided to insure the restoration of the wipers of the code receiving switch 2610 to the contact 26 position in the event that the answer supervisory relay R2480 is operated to open its contacts 2484 before the wipers of the code receiving switch 2610 have been automatically restored to contact position 26. In other words, in the process of restoring the wipers to normal if the answer relay R2480 is operated at a time when the wiper 2611 is in engagement with its contacts 24, the stepping action of the wipers will be terminated. However, a circuit will now be completed from ground at the wiper 2611, the engaged contact 24, the contacts 2485, 2416 and 2616, and the winding of the rotary magnet RM2615, to battery. The rotary magnet RM2615 operates and restores in the manner previously described thereby to advance the wipers from the contacts 24 into engagement with the contacts 25 whereupon the above-mentioned circuit is recompleted to advance the wipers from the contacts 25 into engagement with the contacts 26.

At the contacts 2486, the answer supervisory relay R2480 completes a circuit by way of the off-normal contacts 2638, the contacts 2637, and the winding of the rotary magnet RM2636, to battery. The above-mentioned magnet of the storage transfer switch 2620 now operates and restores, due to its self-interruptin contacts 2637, thereby to advance its wipers 2631 to 2635, inclusive, one step from the contact 26 position into engagement with the contacts 1. In response to the advancement of the wipers of the storage transfer switch 2630, in the manner noted above, the storage transfer switch off-normal contacts 2638 are opened and the contacts 2639 are closed. The opening of the contacts 2638 opens a point in the circuit for controlling the magnet RM2636. As soon as the wiper 2631 engages the contact 1, a circuit is completed for operating the timer control relay R2470. This circuit may be traced from ground by way of the contacts 2431, the wiper 2631 in engagement with contacts 1 and the winding of the relay R2470, to battery.

As a further result of the operation of the answer supervisory relay R2480, at its contacts 2487, it completes a circuit for operating the time pulse relay R2550 under control of time pulses applied to the conductor C2475 at the rate of twelve impulses per minute. Ground pulses are applied to the conductor C2475 at the rate of twelve pulses per minute and each ground pulse remains on the conductor C2475 for a minimum period of one half second. Thus, it will be seen that the time pulse relay operates for a minimum time of one half second, every five seconds.

When the timer control relay R2470 operates in the manner described above, at its contacts 2472, it interrupts the previously traced circuit whereby the signal lamp 2303 at the monitoring operator position 2395 was dimly illuminated and, at its contacts 2471, it completes a circuit from the conductor C2489 over which grounded impulses at the rate of sixty pulses per minute are transmitted for flashing the signal lamp 2303, sixty times a minute. The flashing lamp 2303 will indicate to the operator at the monitoring position that the conversation timing of the call extended via the toll ticket repeater 2300 has been initiated.

*Conversation timing in the toll ticket repeater 2300*

In response to each operation of the time pulse relay R2550 the contacts 2551 to 2554, inclusive, are operated. It will be understood from the subsequent description that the time pulse relay will operate the code receiving switch 2610 every five seconds and at the end of twelve pulses, or one minute, a circuit will be completed to drive the unit time switch U2585 one step to register the units digit "1." At the end of the second minute, another circuit will be completed for the unit time switch U2585 to control that switch to register the unit digit "2." In this manner at the end of every minute, the unit time switch U2585 will register a digit corresponding to the number of minutes of time. At the beginning of the tenth minute, the ten time switch T2590 will be operated to register the tens digit "1" and on each succeeding ten minute interval the ten time switch T2590 will be advanced a corresponding number of steps to register the tens digit of the elapsed time. Finally, at the end of each period of time constituting 100 minutes, the hundred time switch H2595 will be operated to register the hundreds digit of the elapsed time. With the above arrangement the unit time switch U2585, the ten time switch T2590, and the hundred time switch H2595 may be utilized to register an elapsed time period of one minute to 999 minutes.

When the time pulse relay R2550 operates in response to the first time pulse, it closes its contacts 2551 and 2552, the former to complete a circuit from ground at contacts 2481 for operating the magnet RM2615 and the latter to complete a circuit for the unit time switch magnet RM2586. The last-mentioned circuit may be traced from ground by way of the wiper 2611 in engagement with the contact 26, the contacts 2552, and the winding of the magnet RM2586, to battery. At the end of the first pulse the time pulse relay R2550 will restore to normal, thereby to interrupt, at its contacts 2551 and 2552, the circuit for the magnet RM2615 and the circuit for the magnet RM2586. The magnet RM2615 restores to normal thereby to advance its wipers one step in a clockwise direction from the contacts 26 into engagement with the contacts 1. The magnet RM2586, upon restoring, advances its wipers from engagement with the contacts 11 into engagement with the contacts 1. In this manner is response to the first five-second-time-pulse received by the time pulse relay R2550, the wipers of the unit time switch U2585 are advanced from contacts 11 to engage the contacts 1. In this position of the wipers, the wiper 2589A will apply ground potential to the W33 code marking conductor and the wiper 2589B will apply ground potential to the X33 marking conductor thereby to register the unit digit "1."

From the foregoing description of the operation of the unit time switch U2585 it will be seen that an elapsed period of one minute will be registered as soon as the first time pulse is received by the time pulse relay R2550. Depending upon the time that the call was answered, this first time pulse may operate the relay R2550 either immediately, or after an elapsed time of approximately five seconds.

In response to the next operation of the time pulse relay R2550, at its contacts 2551, it completes a circuit from ground, at contacts 2481, for operating the rotary magnet RM2615. At the end of the pulse the wipers of the code receiving switch 2610 are advanced from the contacts 1 into engagement with the contacts 2. The wiper 2611 is the only wiper that is effective during the stepping of the code receiving switch 2610 under control of the time pulse relay R2550. Therefore, after the wiper 2611 has been advanced from the contact 1 step-by-step until the wiper engages the contact 12, a circuit is completed from the grounded wiper 2611 and the engaged contact 12, upon the next operation of the time pulse relay R2550, over the contacts 2552 and the winding of the unit time switch magnet RM2586, to battery.

The magnet RM2586 is therefore operated a second time at the end of the first minute whereupon the wipers are advanced into engagement with the contacts 2. In this position the wipers 2589A and 2589B respectively ground the W33 and Y33 code marking conductors to register the units digit "2" indicating the elapsed time of two minutes.

At the end of first minute the wiper 2611 will be advanced one step from contact 12 into engagement with contact 13 and upon each succeeding operation of the time pulse relay R2550 the code receiving switch 2610 will be operated in the manner previously described to advance the wipers to the contacts 24. In this position the wiper 2611 will complete the above-traced self-interrupting circuit for the magnet RM2615 thereby to advance the wipers from engagement with the contacts 24 into engagement with the contacts 25. The self-interrupting circuit for the magnet RM2615 will be re-completed at the contact 25 of the wiper 2611 thereby to advance the wipers into engagement with the contacts 26. Upon the next operation of the code pulse relay R2550, a circuit will be recompleted, at the contacts 2552, for again operating the magnet RM2586 of the unit time switch U2585 thereby to advance the wipers into engagement with the contacts 3. With the wipers 2589A and 2589B in engagement with contacts 3, the W33 and Z3 marking conductors will be grounded to register the digit "3" indicating the elapsed time of three minutes.

In view of the foregoing description of the operation of the time pulse relay R2550, the code receiving switch 2610, and the unit time switch U2585, it will be seen that the elapsed time of the conversation in minutes, will be registered by the wipers 2589A and 2589B. During the 9th minute, the wipers 2589A and 2589B will be in engaged with the contacts 9. At the end of the ninth minute, the wiper 2611 will be in engagement with contacts 12, and the next pulse to the time pulse relay R2550 will cause the relay to close its contacts 2551 to 2554, inclusive. The closing of the contacts 2551 completes a circuit for operating the magnet RM2615, the closing of the contacts 2552, completes the circuit for operating the magnet RM2586, and the closing of the contacts 2553 prepares a circuit for operating the magnet RM2591 of the ten time switch T2590. As soon as the magnet RM2586 operates, it closes its contacts 2588 thereby to complete a circuit from ground by way of the wiper 2589B, the engaged contact 9, the contacts 2588 and 2553, and the winding of the magnet RM2591, to battery. At the end of this pulse the relay R2550 restores to normal thereby to interrupt the circuit for the magnet RM2516 which magnet restores and advances the wiper of the code receiving switch 2610 one step in a clockwise direction. Also, upon restoring, the relay R2550 interrupts, at its contacts 2552, the circuit for the magnet RM2586 which now restores and advances its wipers one step in a counterclockwise direction into engagement with the contacts 10. Finally, at its contacts 2553, the relay R2550 interrupts the circuit for the magnet RM2591 thereby to advance the wipers 2594A and 2594B in a counterclockwise direction one step from the contacts 11 into engagement with the contacts 1. As soon as the wiper 2589B engages the contact 10 a circuit is completed by way of the contacts 2587 and the winding of the magnet RM2586, thereby to operate the magnet. Upon operating, the magnet RM2586 interrupts its operating circuit, at the contacts 2587, whereupon the magnet restores to normal and thus advances its wipers an additional step from the contacts 10 into engagement with the contacts 11. In position 11 the wiper 2589A applies ground potential to the Z33 code marking conductor thereby to register in code the units digit "0." With wiper 2594A and 2594B of the ten time switch T2590 in engagement with the contacts 1 the W32 and X32 code marking conductors are grounded to register the tens digit "1."

In view of the foregoing it will be seen that the unit time switch U2585 will be operated once every minute to register the units digit and that at the end of the ninth minute the ten time switch T2590 will be operated to register the tens digit. Furthermore, it will be seen, from the foregoing description, that at the end of every ten minutes the ten time switch magnet RM2591 will be operated in the manner described above thereby to successively register the tens digits "1" to "9," inclusive, and "0."

At the beginning of the five second pulse occurring at the end of the 99th minute, the relay R2550 operates in the manner previously described and closes its contacts 2551 to 2554, inclusive. At this time the code receiving switch 2610 will have its wiper 2611 in engagement with contact 12, the unit time switch U2585 will have its wiper 2589B in engagement with its contact 9, and the ten time switch T2590 will have its wiper 2594B in engagement with its contact 9. The hundred time switch H2595 will have its wiper 2598A in engagement with its contact 11 thereby to normally mark the Z31 conductor of the WXYZ33 code marking conductors in accordance with the hundreds digit "0." Consequently, when the time pulse relay R2550 operates, it completes, at the contacts 2551, a circuit for operating the magnet RM2615 of the code receiving switch 2610; it completes, at the contacts 2552, a circuit for operating the magnet RM2586 of the unit time switch U2585; it completes, at the contacts 2553, a circuit for operating the magnet RM2591 of the ten time switch T2590; and it completes, at the contacts 2554, a circuit for operating the magnet RM2596 of the hundred time switch H2595. It should be noted that the circuit for operating the magnet RM2591 includes the wiper 2589B, the engaged contact 9, the contacts 2588 of the operated magnet RM2586, the contacts 2553, and the winding of the magnet RM2591. The circuit for operating the magnet RM2596 includes the wiper 2594B, the engaged contact 9, the contacts 2593 of the operated magnet RM2591, the contacts 2554, and the winding of the magnet RM2596. In view of the foregoing it will be seen that when the time pulse relay R2550 operates at the end of the 99th minute, each of the magnets RM2615, RM2586, RM2591, and RM2596 will operate and, at the end of the pulse, the relay R2550 will restore thereby to cause each of the above-named magnets to advance their associated wipers an additional step.

In contact positions 10 the magnets RM2586 and RM2591 are self-interruptedly operated and restored thereby to automatically advance their wipers an additional step from engagement with contacts 10 into engagement with the contacts 11. In these positions the wiper 2589A and the wiper 2594A of the unit and ten time switches U2585 and T2590 will respectively mark the code marking conductors WXYZ33 and WXYZ32 in accordance with the digit "0." The operation of the hundred time switch H2595, as noted above, will advance its wipers 2598A and 2598B from engagement with the contacts 11 into engagement with the contacts 1. In this position the above-named wipers mark the code marking conductors WXYZ31 in accordance with the digit "1." In view of the foregoing it will be seen that at the end of each elapsed period of time of 99 minutes the wipers of the hundred time switch H2595 will be advanced an additional step to register the hundreds digit of the elapsed period of time.

From the foregoing description it will be understood that as soon as the called subscriber answers a call, the timing switch comprising the unit, ten and hundred time switches U2585, T2590 and H2595 will start to time the conversation and will register the units, tens and hundreds digits of the elapsed conversation time on the code marking conductors WXYZ33, 32 and 31. As soon as the conversation is terminated at the called subscriber substation, a disconnect supervisory signal will be transmitted to the answer supervisory relay R2480 by the removal of ground potential from the conductor C2387. The relay R2480 will now restore to normal and, at its contacts 2487, will disconnect the time pulse conductor C2475 from the time pulse relay R2550 thereby to terminate conversation timing. As a further result of the restoration of the relay R2480, at its contacts 2482 and 2483, it will disconnect the sixty impulse per minute conductor C2489 and connect the 120 impulse per minute conductor C2488 to the signal lamp 2303 at the monitoring operator position 2495. The lamp 2303 will now flash at the rate of 120 impulses per minute and signal the monitoring operator that the called subscriber involved in the connection has disconnected and that the timing of the call has been terminated. Further operations of the toll ticket repeater 2300 now depend upon the release of the connection by the calling subscriber. In passing, it should be noted, however, that if the called subscriber should again remove his receiver before the calling subscriber has released the connection, the answer supervisory relay R2480 will be reoperated thereby to continue timing of the call.

*Release of the connection*

When the calling subscriber releases the connection after the called subscriber, ground potential will be removed from the conductor C2386 by the associated ticket repeater selector 2700 thereby to cause the restoration of the seizure relay R2410 in the toll ticket repeater 2300. As soon as the relay R2410 restores, at its contacts 2415, it completes an operating circuit for the disconnect relay R2520. The relay R2520 is of the slow-to-operate type and, therefore, does not re-apply a busy marking potential to the conductor C2307 until after a short delay following the removal of ground from conductor C2386. This delay period is provided in order to permit the release of the primary selector 500, line finder 440, and the line circuit 405.

As soon as the ground potential is removed from the conductor C2386, indicating that the calling subscriber has disconnected, the relay R2410 restores, as noted above and the holding ground potential is removed from the conductor C2307. Referring now to the primary selector 500, it will be seen that when the ground potential is removed from the conductor C2307 the previously traced holding circuit for the switch-through relay R520 will be interrupted thereby to cause the last-mentioned relay to restore to normal. Also, ground potential will be removed from the conductor C446 extending to the line finder 440 thereby to cause the restoration of that switch in the well-known manner. Finally, the removal of ground from the conductor C446 will also interrupt the circuit for the cut-off relay R410 which restores to normal, and the busy marking ground potential will also be removed from the C conductor in the cable 404 extending to the connector banks terminating the calling subscriber line. The calling subscriber at the substation 401 may now make a new call or a call may be extended to the subscriber at substation 401.

Returning again to the primary selector 500 it will be seen that when the relay R520 restores to normal, at its contacts 529, it will complete a circuit, including the contacts 532, 544, and VON579', for operating the release magnet RM570. Upon operating, the magnet RM570, at its contacts 571, applies ground potential to the conductor C446 thereby to mark the primary selector 500 and the associated line finder 440 busy until the primary selector 500 is fully restored to normal. As the further result of the operation of the magnet RM570, the wipers 563 to 565, inclusive, are restored to normal, in the well-known manner, to their resting positions. As soon as the wipers of the primary selector 500 restore to normal, the vertical off-normal contacts VON578 and VON579' are opened and the contacts VON579 are closed. The opening of the contacts VON579' interrupts the circuit for the magnet RM570 which now restores to normal and removes the busy marking ground potential from the conductor C446. The primary selector 500 is now fully restored to normal and is available for use in additional calls.

Returning again to the toll ticket repeater 2300 it will be seen that the delay in the operation of the disconnect relay R2520 permits the release of the preceding equipment in the manner described above and that, at its contacts 2523, the relay R2520 will re-apply a busy marking ground potential to the conductor C2307. Since the toll ticket repeater 2300 has not been fully released, it is essential that the busy marking ground potential be re-applied to the conductor C2307 in order to prevent the repeater 2300 from being re-seized in a new call until after the repeater has been fully restored to normal.

As a further result of the operation of relay R2520, at its contacts 2524, it completes a circuit including the contacts 2474 and 2534 for operating the call complete relay R2540. Upon operating the relay R2540, at its contacts 2541, applies ground potential to the conductor C2544 thereby to operate a message register to indicate the number of completed toll calls. Finally, at its contacts 2542 and 2543, the relay R2540 completes a circuit for associating a tabulator circuit with the toll ticket repeater 2300 whereby the toll ticket repeater 2300 may transfer to the tabulator all of the information stored therein.

Before describing the seizure of a tabulator, it should be noted that as a further result of the restoration of the seizure relay R2410, at its contacts 2413', it interrupts the locking circuit for the switch-through relay R2340. The relay R2340 now restores to normal to interrupt, at its contacts 2343, the previously described circuit for controlling the answer supervisory relay R2480 and performs other circuit switching operations, at its contacts 2341, 2342, 2344, 2345, and 2346 which are of no importance at the present time.

*Associating the toll ticket repeater 2300 with the tabulator 2800*

It will be recalled that in response to the release of the connection by the calling and called parties the toll ticket repeater 2300 is disconnected from the released connection and that it is maintained busy in order to prevent its re-seizure until the information stored therein is transferred to the tabulator 2800. In response the disconnection of the toll ticket repeater 2300 from the released connection certain relays therein restore to normal and cause the operation of the disconnect relays R2520 and the call completion relay R2540. As soon as the call completion relay R2540 operates, it controls the tabulator allotter 2801 to search for an idle tabulator and when an idle tabulator is found, it searches for and connects with the calling toll ticket repeater 2300. More specifically, when the call completion relay R2540 operates, at its contacts 2542, it applies ground potential to the tabulator allotter start conductor C3001 thereby to initiate the operation of the tabulator allotter 2801 and, at its contacts 2543, it removes the busy marking ground potential from the conductor C3002 thereby to indicate to the tabulator 2800 that the toll ticket repeater 2300 is the calling toll ticket repeater.

Referring now to Figs. 28, 29, 30 and 31, which disclose the tabulator 2800 and the tabulator allotter 2801, it will be seen that when the ground potential is applied to the conductor C3001 an operating circuit is completed for the start relay R2805. When the start relay R2805 operates, it closes its contacts 2806 thereby to complete a circuit from ground by way of the contacts 2808, the wiper 2804 and the engaged contact 1, the contacts 2806 and 2803, and the winding of the rotary magnet RM2802, to battery.

As illustrated in the drawing, it will be seen that the tabulator busy relay R2807 normally operated by ground potential is applied to the conductor C2813. The conductor C2813 is common to each of the tabulator units, such as the tabulator 2800, and as long as any one of the available tabulators is idle, a ground potential will be applied to conductor C2813 in order to maintain the relay R2807 operated. As soon as a tabulator becomes busy, the test conductor individual thereto, such as the conductor C2809, is grounded in order to prevent the wiper 2804 of the tabulator allotter 2801 from seizing the busy tabulator. Accordingly, if all tabulator units are busy, the wiper 2804, as it is advanced step-by-step under control of the magnet RM2802, encounters ground potentials on each of the conductors, such as the conductor C2809, in order to cause the magnet to advance the wiper into engagement with a contact terminating the busy marking conductor of the next tabulator. Consequently, when all tabulators are busy, the rotary magnet RM2802 would ordinarily cyclically rotate the wiper 2804 continuously, searching for an idle tabulator. In order to prevent continuous rotation of the wiper 2804, the tabulator busy relay R2807 has been provided and when all the tabulators are busy, the relay restores to normal. In its restored position the relay R2807 removes, at its contacts 2808, the starting ground potential for the magnet RM2802 and, at its contacts 2808A, it completes a circuit for operating a traffic register to indicate the number of times that the use of a tabulator has been required but at which time all such tabulators are busy. Since a starting ground potential is not available for the magnet RM2802 when the wiper 2804 engages contact 1 the wiper will remain in this position until an idle tabulator is available and has reoperated the relay R2807.

For the purpose of this description it will be assumed that the tabulator 2800 is available when the start relay R2805 is operated and, therefore, the tabulator busy relay R2807 is in its operated position. When the magnet RM2802 operates, it interrupts its operating circuit, at its contacts 2803. The magnet now restores to normal thereby to cause the wiper 2804 to be advanced in a clockwise direction one step into engagement with the contact 2 terminating the conductor C2809. In this position of the wiper 2804, the circuit for operating the rotary magnet RM2802 is connected by way of the conductor C2809 and the winding of the finder start relay R2810, to ground. In this series circuit the relay R2810 operates, but due to its high resistance the magnet RM2802 does not operate.

As soon as the finder start relay R2810 operates, it completes, at its contacts 2812, a test circuit over which the rotary magnet RM2861 of the ticket repeater finder 2860 will operate to advance the wipers 2863 to 2868, inclusive, step-by-step in a counterclockwise direction to search for the calling toll ticket repeater 2300. Also, at its contacts 2811, the finder start relay R2810 completes a circuit for operating the finder test relay R2820 in series with the magnet RM2861 when the wipers of the ticket repeater finder 2860 encounter the contacts terminating the calling ticket repeater 2300.

With the wipers of the ticket repeater finder 2860 positioned as illustrated in the drawing, the wiper 2863 applies ground potential by way of the contacts 2825, 2812, and 2862, and the winding of the magnet RM2861, to battery. The magnet operates to interrupt its operating circuit, at its contacts 2862, and then restores, in the manner previously described, to advance the wipers in a counterclockwise direction into engagement with the contacts 1. In this position of the wipers, the conductor C3002, extending from the calling ticket repeater 2300, has ground potential removed therefrom and, consequently, a circuit will not be completed for reoperating the magnet RM2861. As long as an operating ground potential is not encountered by the wiper 2863, the finder test relay R2820 will not be short-circuited. The relay R2820 will, however, operate in series with the magnet RM2861, but due to the high resistance of relay R2820, the magnet RM2861 will not operate. It may be well to mention at this time that if the toll ticket repeater 2300 was not the calling repeater, the conductor C3002 would be grounded at the present time thereby to cause the magnet RM2861 to advance the wipers of the ticket repeater finder 2860 an additional step in the counterclockwise direction. The remaining contacts accessible to the wipers of the ticket repeater finder 2860 terminate conductors, such as the conductors C3002 to C3007 inclusive, individual to other toll ticket repeaters of the system.

Before proceeding with further operation of the tabulator 2800 as a result of the operation of the finder test relay R2820, it should be noted that the wipers 2863 to 2868, inclusive, now engage contacts 1 in their associated contact banks respectively terminating the conductors C3002 to C3007, inclusive, which are individual to the toll ticket repeater 2300. The conductor C3002 is the test conductor referred to above and terminates in the now open contacts 2543. The conductor C3003 extends to Fig. 25 and terminates in the grounded winding of the pick-up relay R2530. The conductors C3004 to C3007, inclusive, extend to Fig. 26, and terminate respectively in the wipers 2632 to 2635, inclusive, of the storage transfer switch 2630.

When the finder test relay R2820 operates, as noted above, at its contacts 2822, it removes ground potential from the conductor C2813 and the winding of the relay R2807 which will restore to normal only if all other tabulators are busy as previously described. At its contacts 2823, the relay R2820 completes a circuit from ground by way of the contacts 2932, 2823, and 2831, for energizing the lower winding of the slow-to-operate fault relay R2850. Due to its slow-to-operate characteristics, the relay R2850 does not operate at the present time. At its contacts 2825, the relay R2820 opens a point in the previously described circuit for controlling the rotary magnet RM2861 in order to prevent further rotation of the wipers of the ticket repeater finder 2860. Finally, at its contacts 2824, it completes a circuit for operating the tabulator start relay R2830 in series with the pick-up relay R2530 in the toll ticket repeater 2300. This circuit may be traced from ground by way of the upper winding of the relay R2530 contacts 2531, conductor C3003 extending to Fig. 28, wiper 2864 and the engaged contact 1, the contacts 2824 and 2842, and the lower winding of the tabulator start relay R2830, to battery. The relays R2530 and R2830 operate in series over the abovementioned circuit.

The relay R2830 upon operating, opens, at its contacts 2831, the above-mentioned circuit for energizing the lower winding of the fault relay R2850. Accordingly, under normal conditions, the circuit for the relay R2850 will be opened before the relay can operate to transmit an alarm signal indicating a fault in the operation of the tabulator 2800. At its contacts 2832, the relay R2830 completes a locking circuit from ground by way of the contacts 2932, 2823, and 2832, and the lower winding of relay R2820, to battery. This locking circuit for the relay R2820 prevents the relay from restoring to normal after its initial operating circuit, including its upper winding, is subsequently interrupted. At its contacts 2834, the relay R2830 completes a locking circuit for its upper winding from ground at contacts 2932, and simultaneously therewith it completes an operating circuit for the hold relay R2920. Finally at its contacts 2833, the relay R2830 applies ground potential to the conductor C2809 thereby to cause the relay R2810 to restore to normal, by short-circuiting its winding, and to complete a circuit, by way of the wiper 2804, for reoperating the magnet RM2802 in the event the start relay R2805 has not been restored to normal. In other words, the tabulator allotter 2801 is controlled to advance its wipers to preselect another idle tabulator.

Before describing the circuit changes resulting from the restoration of the relay R2810 and the operation of the relay R2920 in the tabulator 2800, the circuit changes which occur as a result of the operation of the pick-up relay R2530 in the toll ticket repeater 2300 will be described. When the circuit is completed for the upper winding of the relay R2530, the relay operates to close its contacts 2533 thereby to immediately complete a circuit, including the contacts 2524, for operating the relay R2530 over its lower winding. As soon as the relay R2530 is operated over the circuit including its lower winding, the remaining contacts on the relay are actuated. More specifically, the contacts 2531 and 2532 transfer the conductor C3003 from the upper winding of the relay R2530 to the winding of the magnet RM2636 of the storage transfer switch 2630. No operation takes place as a result of this transfer inasmuch as battery potential is applied to the conductor C3003 through the lower winding of the relay R2830. Finally, at its contacts 2534, the relay R2530 interrupts the circuit for the call completion relay R2540 which now restores to normal. Upon restoring, the relay R2540, at its contacts 2541, removes ground potential from the conductor C2544; at its contacts 2542, it removes the ground potential from the start conductor C3001 thereby to restore the start relay R2805 in the tabulator allotter 2801; and finally, at its contacts 2543, it reapplies ground potential to the conductor C3002 in order to prevent the ticket repeater finder of another tabulator from being associated with the calling toll ticket repeater 2300. The toll ticket repeater 2300 is now in a condition to be controlled by the associated tabulator 2800 to transfer the information stored in the code storage relays of the ticket repeater to the tabulator.

Referring again to the tabulator 2800, it will be seen that when the relay R2810 is short-circuited, it restores to interrupt, at its contacts 2811, the initial operating circuit for the upper winding of the relay R2820 and, at its contacts 2812, it interrupts a further point in the circuit for controlling the stepping magnet RM2861 of the ticket repeater finder 2860.

When the hold relay R2920 operates, it simultaneously initiates circuit operations for controlling the transfer of information from the toll ticket repeater 2300 to the code storage registers in the tabulator 2800 and for controlling the record tape punch mechanism 2967 and the ticket tape punch mechanism 2968 to record the information which is either permanently or temporarily stored in the tabulator 2800. The manner in which the information to be recorded is transferred from the ticket repeater 2300 to the translator 2800 will first be described.

As soon as the relay R2920 operates, at its contacts 2921, it completes an obvious circuit for controlling the out-pulse relay R2860 and, at its contacts 2922, it completes a circuit from ground by way of the wiper 2893 and the engaged contact 26, the contact 2922 and 2841, and the winding of the transfer pulse relay R2840, to battery. The last-mentioned relay will operate and restore at a predetermined rate in order to control the transfer of information from the ticket repeater 2300 to the tabulator 2800 as will be described hereinafter. At its contacts 2923, the relay R2920 applies ground potential to the conductor C2915 thereby to provide a locking circuit for the various code storage register relays as they are operated during the course of the transfer of information. At the contacts 2924, the relay R2920 interrupts a point in the circuit for the release relay R2930 and, at its contacts 2925, it applies ground potential to the conductor C2926 whereby code marking control pulses are transmitted to the record and ticket tape punch mechanisms 2967 and 2968.

When the above-mentioned circuit is completed for the transfer pulse relay R2840, the relay operates and restores self-interruptedly at a rate determined by the capacity of the condenser connected in series with its lower winding. The relay in this particular case is arranged to self-interruptedly operate and restore at the rate of approximately twenty times per second. In response to the first operation of the relay R2840, it simultaneously closes its contacts 2843 and 2844. At the contacts 2843, it applies ground potential to the conductor C3003 thereby to complete an operating circuit for the rotary magnet RM2636 of the storage transfer switch 2630 in the toll ticket repeater 2300. The magnet operates in the well-known manner and prepares to advance the wipers 2631 to 2635, inclusive, one step in a clockwise direction. At the contacts 2844, the relay R2840 completes an obvious circuit for operating the magnet RM2891 of the storage register switch 2890 in the tabulator 2800. The operation of the magnet RM2891 prepares the storage register switch 2890 to advance its wipers 2893 to 2897, inclusive, one step in a counterclockwise direction.

As soon as the transfer pulse relay R2840 restores it simultaneously interrupts the above-mentioned circuits for operating the magnet RM2636 and the magnet RM2891. The restoration of the magnet RM2891 advances the wipers 2893 to 2897, inclusive, into engagement with the contacts 1 in the associated contacts banks. In this position the wiper 2894 connects the conductor C3004 extending from Fig. 26 to the winding of the W8 code storage register relay; the wiper 2895 connects the conductor C3005 extending from Fig. 26 to the winding of the X9 code storage register relay; the wiper 2896 connects the conductor C3006 extending from Fig. 26 to the winding of the Y18 code storage register relay; and the wiper 2897 has no function to perform when it is in engagement with its contact 1.

Referring now to the storage transfer switch 2630 in the toll ticket repeater 2300 it will be recalled that the wipers 2631 to 2635, inclusive, are positioned in engagement with the contacts 1 in the associated contact banks at the time the magnet RM2636 was operated over the conductor C3003. The preliminary advancement of these wipers from the normal contact position 26 into engagement with the contacts 1 occurred at the time that the answer supervisory relay R2480 was operated in response to the called subscriber answering the call. Consequently, when the magnet RM2636 restores at the end of the first pulse transmitted over the conductor C3003, the wipers 2631 to 2635, inclusive, are advanced from the contacts 1 into engagement with the contacts 2. In this position the wiper 2632 connects the conductor C3004 to the W8 code storage register relay in the ticket repeater 2300; the wiper 2633 connects the C3005 conductor to the X9 code storage register; the wiper 2634 connects the conductor C3006 to the Y18 code storage register relay; and in this position the wiper 2635 has no function to perform.

As previously noted, the W8 code storage relay in the toll ticket repeater has stored therein the class of the calling subscriber line. If a class 1 subscriber has made the call, the code storage register relay W8 will be in its normal position and no circuit will be completed for operating the W8 code storage register relay in the tabulator 2800. If a class 2 subscriber initiated the call, the W8 code storage register relay will be in its operated position and a circuit will be completed for operating the W8 code storage register relay in the tabulator 2800. The circuit may be traced from ground applied to the locking ground conductor C2453 in the toll ticket repeater 2300 and then by way of the upper make contact of the W8 code storage register relay, the contact 2 and the engaged wiper 2632, the conductor C3004 extending to Fig. 28, the contact 1 and the engaged wiper 2865, the wiper 2894 and the engaged contact 1, and the winding of the W8 code storage register relay, to battery. When this circuit is completed, the W8 code storage register relay in the tabulator 2800 will operate and at its upper make contact it will lock, in its operated position, to the grounded conductor C2915. Substantially the same circuits are completed by the X9 and Y18 code storage register relays in the toll ticket repeater 2300 for operating the X9 and Y18 code storage register relays in the tabulator 2800. In this manner, the class of the calling subscriber line, the number of digits in the code of the called exchange, and the tens digit of the rate designation of the charge for the call are simultaneously transferred from the ticket repeater 2300 to the tabulator 2800.

The transfer pulse relay R2840 will continue to operate and restore thereby to cause the magnets of the storage register 2890 and the storage transfer switch 2630 to simultaneously advance the wipers step-by-step over the associated contacts. As the wiper 2632 is advanced step-by-step, it connects the C3004 conductor to each of the W code storage register relays in a predetermined order as is indicated by the numerals applied to the conductors terminating in the contacts 2 to 23, inclusive. The wiper 2633 connects the C3005 conductor to the X code storage register relays indicated by correspondingly designated conductors terminating in the contacts 2 to 23, inclusive. The wiper 2634 connects the C3006 conductor to the Y code storage register relays of the correspondingly designated conductors terminating in the contacts 2 to 23, inclusive. Finally, the wiper 2635 connects the conductor C3007 to the Z code storage register relays of the correspondingly designated conductors terminating in the contacts 3 to 23, inclusive. Simultaneously with the stepping of the wipers of the storage transfer switch 2630, over the contacts 2 to 23, inclusive the wiper of the storage register switch 2890 are advanced step-by-step over the contacts 1 to 22, inclusive. The wipers 2894, 2895, 2896 and 2897, respectively, connect the conductors C3004 to C3007, inclusive, extending from the ticket repeater 2300, to the respective WXYZ code storage register relays corresponding to the designations of the conductors terminating in the contacts 1 to 22, inclusive, of the storage register switch 2890.

The various items of information which are transferred from the toll ticket repeater 2300 to the tabulator 2800 and the sequence in which the information is transferred may be readily determined from the following table:

| Storage transfer Switch 2630 | to Storage register Switch 2890 | Code Storage | Information Transferred |
|---|---|---|---|
| Contact pos. | Contact pos. | Reg. Relay Design. | |
| 1 | | Blank | |
| 2 wiper 2632 | 1 wiper 2894 | W8 | Class 1, if normal; Class 2, if operated. |
| wiper 2633 | wiper 2895 | X9 | 3 digit code, if normal; 2 digit code, if operated. |
| wiper 2634 | wiper 2896 | Y18 | Rate tens digit "0," if normal; Rate tens digit "1," if operated. |
| wiper 2635 | wiper 2897 | Blank | |
| 3 | 2 | WXYZ1 | Calling No. "C" code digit. |
| 4 | 3 | WXYZ 2 | Calling No. Thous. digit. |
| 5 | 4 | WXYZ3 | Calling No. Hund. digit. |
| 6 | 5 | WXYZ4 | Calling No. Tens digit. |
| 7 | 6 | WXYZ5 | Calling No. Units digit. |
| 8 | 7 | WXYZ6 | Director Iden. Tens digit. |
| 9 | 8 | WXYZ7 | Director Iden. Units digit. |
| 10 | 9 | WXYZ17 | Rate units digit. |
| 11 | 10 | WXYZ21 | Called No. "A" code digit. |
| 12 | 11 | WXYZ22 | Called No. "B" code digit. |
| 13 | 12 | WXYZ23 | Called No. "C" code digit. |
| 14 | 13 | WXYZ24 | Called No. Thous. digit. |
| 15 | 14 | WXYZ25 | Called No. Hund. digit. |
| 16 | 15 | WXYZ26 | Called No. Tens digit. |
| 17 | 16 | WXYZ27 | Called No. Units digit. |
| 18 | 17 | WXYZ31 | Conv. Time Hund. digit. |
| 19 | 18 | WXYZ32 | Conv. Time Tens digit. |
| 20 | 19 | WXYZ33 | Conv. Time Units digit. |
| 21 | 20 | WXYZ34 | Ticket Rept. Ident. Hund. Digit. |
| 22 | 21 | WXYZ35 | Ticket Rept. Ident. Tens Digit. |
| 23 | 22 | WXYZ36 | Ticket Rept. Ident. Units Digit. |
| 24 | 23 | Blank | |
| 25 | 24 | Blank | |
| 26 | 25 | Blank | |

*Control of the record tape punch 2967 and the ticket tape punch 2968 by tabulator 2800*

The manner in which the information stored in the tabulator 2800 is transferred to the record and ticket tape punch mechanisms 2967 and 2968 will now be described.

From the previous description it will be understood that the transfer pulse relay R2840 in the tabulator 2800 will simultaneously transmit stepping pulses to the magnet RM2891 of the storage register 2890 and to the magnet RM2636 of the storage transfer switch 2630 in the toll ticket repeater 2300 in order to simultaneously advance the wipers thereof step-by-step whereby the items of information, noted above, are transferred from the ticket repeater 2300 to the tabulator 2800. The circuit for controlling the transfer pulse relay R2840 includes the wiper 2893 and the multiply connected contacts 1 to 22, inclusive, and 26 of the storage register 2890. The wiper 2893 is advanced from the contact 22 into engagement with the contact 23 as soon as the last item of information has been stored in the code storage registers WXYZ36. Since contact 23 is not included in the above-mentioned multiple, the transfer pulse relay R2840 cannot reoperate and further impulses cannot be transmitted to the magnets RM2891 and RM2636 of the storage register 2890 and the storage transfer switch 2630. Consequently, the wipers 2893 to 2897, inclusive, of the storage register 2890 will remain in engagement with the contacts 23 until the tabulator 2800 is subsequently released as a result of the restoration of relays R2820, R2830 and R2920 under control of the release relay R2930.

At the time the above-mentioned wipers of the storage register 2890 are advanced from contacts 22 into engagement with contacts 23, the storage transfer switch 2630 in the toll ticket repeater 2300 advances its wipers from engagement with the contacts 23 into engagement with the contacts 24. It will be seen that the advancement of the wiper 2631 of the storage transfer switch 2630 from contact 23 into engagement with contact 24 interrupts the circuit for the timer control relay R2470. Consequently, the relay R2470 now restores to normal thereby indicating to the toll ticket repeater 2300 that all of the information stored therein has now been transferred to the tabulator 2800. Upon restoring, the relay R2470, at its contacts 2471 and 2472, transfers the monitoring operator's signal lamp 2303 from the 120 impulses per minute conductor C2488 to direct ground potential at the contacts 2521 in order to change the flashing lamp signal to a steady lamp signal and thus indicate to the operator that the toll ticket repeater 2300 has completed the transferring operations. At the contacts 2473, the relay R2470 completes a point in the releasing circuit for restoring the toll ticket repeater 2300 to its normal position. At the contacts 2474, the relay R2470 interrupts a further point in the circuit for the call completion relay R2540, which relay has previously been restored to normal. Finally, at its contacts 2475, the relay R2470 opens the holding circuit for the auxiliary relay R2430 which also restores to normal.

When the relay R2430 restores to normal, it completes the self-interrupting circuit for the magnet RM2615 of the code receiving switch 2610 thereby to cause the wipers of the switch to be restored to the normal resting contact position 26 and it interrupts circuits whereby various operated relays, including the operated code storage registers, are restored to normal. More specifically, at its contact 2431', relay R2430 completes a circuit for operating the magnet RM2615 in series with the release relay R2510. This circuit may be traced from ground by way of the winding of the release relay R2510, the contacts 2419, the contacts 2617 of the code receiving switch 2610 which are closed when the wipers of the switch are in any one of the contact positions 1 to 25, inclusive, the contacts 2431', 2412', 2417, and 2616, and the winding of the magnet RM2615, to battery. The release relay R2510 and the magnet RM2615 operate when the above-traced circuit is completed. The relay R2510, at its contacts 2513, completes a circuit for maintaining the disconnect relay R2520 in its operated position during the releasing operation of the toll ticket repeater 2300. The magnet RM2615, at its contacts 2616, interrupts its own circuit thereby to cause the wipers of the code receiving switch 2610 to be advanced step-by-step until the wipers are advanced from the contacts 25. When the last-mentioned operation occurs, the contacts 2617 are opened thereby to interrupt the previously traced circuit for the magnet RM2615 and thus cause the wipers of the code receiving switch 2610 to terminate the step-by-step advancement of the wipers, with the wipers in engagement with the normal home contact position 26. In this position, the code receiving switch off-normal contacts 2618 are closed whereby the releasing circuit including the release relay R2510 is transferred to the magnet RM2586 of the unit time switch U2585.

Referring to the unit ten and hundred time switches U2585, T2590 and H2595, it will be seen that these switches are provided respectively with relays R2560, R2570 and R2580. These relays are operated by means of off-normal contacts 2563, 2573 and 2583 only when the wipers of the respective switches are in engagement with the contacts 1 to 10, inclusive, of the associated contact banks and are in their restored positions when the respective wipers engage the normal home contact positions 11. Therefore, if the three times switches have been operated from the home contact positions, each of the above-mentioned relays R2560, R2570 and R2580 will be operated.

Assuming the above condition, the release circuit will then be completed from the magnet RM2586 of the unit time switch U2585 over a circuit which may be traced from ground and then by way of the winding of the release relay R2510, the contacts 2419, the off-normal contacts 2618, the contacts 2438, 2464, 2473, 2341, 2562, and 2587, and the winding of the magnet RM2586, to battery. The magnet RM2586 and the relay R2510 operate over the above-mentioned circuit. Since the release relay R2510 is of the slow-to-release type, it remains in its operated position during the time the release circuit is transferred from the magnet RM2615 to the magnet RM2586. The magnet RM2586, upon operating, opens its energizing circuit, at its contacts 2587, thereby to advance the wipers of the unit time switch U2585 to the next contact position. This cyclic operation of the magnet RM2586 continues as long as the relay R2560 remains operated. However, when the wipers of the unit time switch U2585 reach the home contact position 11, the off-normal contacts 2563 are opened and thus cause the relay R2560 to restore to normal. The restoration of the relay R2560 transfers the above-traced releasing circuit from the magnet RM2586 of the unit time switch U2585 to the magnet RM2591 of the ten time switch T2590.

The magnet RM2591 of the ten time switch T2590 is now self-interruptedly operated to return the wipers of the associated switch to the home contact position 11 in the same manner as the wipers of the unit time switch U2585 are restored to normal. When the wipers of the ten time switch T2590 reach the contacts 11, the off-normal contacts 2573 are opened to cause the relay R2570 to restore to normal and, at the contacts 2571 and 2572 the releasing circuit is transferred from the magnet RM2591 of the ten time switch T2590 to the magnet RM2596 of the hundred time switch H2595. The magnet RM2596 is now self-interruptedly operated, in the same manner as has been previously described, whereby the wipers of the associated switch are advanced step-by-step to the home contact position 11. In this position, the off-normal contacts 2583 are opened, thus causing the relay R2580 to restore to normal, and the releasing circuit is transferred at contacts 2581 and 2582, from the magnet RM2596 of the hundred time switch H2595 to the magnet RM2636 of the storage transfer switch 2630.

Since the wipers of the storage transfer switch 2630 are now in engagement with the contacts 24 in the associated contact banks, the storage transfer switch off-normal contacts 2639 are closed. Consequently, when the hundred time switch H2595 is restored to normal in the manner noted above, the magnet RM2636 is self-interruptedly operated in series with the release relay R2510 over the previously traced circuit. In this manner, the magnet RM2636 advances the wipers of the storage transfer switch 2630 step-by-step in a clockwise direction until the wipers are advanced into engagement with the home contact position 26. As soon as the wipers are advanced from the contact position 25, the off-normal contacts 2639 are opened thereby to interrupt the circuit of the magnet RM2636. In this manner the wipers of the code receiving switch 2610, the wipers of the unit time switch U2585, the wipers of the ten time switch T2590, the wipers of the hundred time switch H2595, and the wipers of the storage transfer switch 2630 are successively restored to their home contact positions in order to prepare the switches for subsequent operation as soon as the toll ticket repeater 2300 is rendered available for additional calls. Since the release relay R2510 is maintained in its operated position during the entire period of the above-described releasing cycle, it maintains the disconnect relay R2520 in its operated position as previously noted. However, as soon as the series circuit for the relay R2510 and the magnet RM2636 is interrupted by the off-normal contacts 2639, the relay R2510 slowly restores to normal. Upon restoring, the relay R2510, at its contacts 2513, interrupts the circuit for the disconnect relay R2520 which also restores to normal. At its contacts 2521, the relay R2520 interrupts the circuit for the signal lamp 2303 at the monitoring operator's position thereby to indicate to the operator thereat that the toll ticket repeater 2300 has fully released and is now available for further calls. At its contacts 2523, the relay R2520 disconnects the busy marking ground potential from the conductor C2307 thereby to render the toll ticket repeater 2300 available for additional calls. Finally, at its contacts 2524, the relay R2520 interrupts the circuit for the lower winding of the pick-up relay R2530 which now restores to normal and completes the restoration of all the operated relays and switches included in the toll ticket repeater 2300.

Referring now to the tabulator 2800, it will be noted that after all of the information has been stored in the code storage registers and the wiper 2893 of the storage register 2890 is in engagement with the contact 23, the relays R2820, R2830 and R2920 are retained in their operated position from ground at contacts 2932 of the release relay R2930. At the time the hold relay R2920 was initially operated, at its contacts 2921, it completed a circuit for the upper winding of the out-pulse relay R2960. This relay will be self-interruptedly operated at a predetermined rate according to the capacity of the condenser connected in series with the lower winding of the relay. During the pulsing operation of the relay R2960, at its contacts 2962 and 2964, it will transmit ground pulses over the conductors C2965 and C2966 to the record tape punch 2967 and the ticket tape punch 2968. These ground pulses control the punch mechanisms to perforate the tape in accordance with a four hole code. A tape perforator of the type disclosed in the Nelson et al. Patent 2,183,820 granted December 19, 1939 may be used to produce perforated tapes of the character noted above. However, the tape perforating mechanism disclosed in the above-mentioned Nelson et al. patent is of the 6 hole code type, that is, each step of the tape perforating mechanism is arranged for producing combinations of codes on one or more of 6 channels or spaces on the tape. However, in the present disclosure, the record and ticket tape punch mechanisms only require the use of four channels or 4 hole code combinations.

In order to control the perforating magnets associated with the four channels, four conductors WT1, XT2, YT3 and ZT4 are provided for the ticket tape punch 2968 and four similar conductors designated WR1, XR2, YR3 and ZR4 are provided for the record tape punch mechanism 2967. The fifth conductor provided for each of the mechanisms are designated C2965 and C2966 and are connected to the trip relay or magnet in the respective punch mechanisms in order to cause the perforating mechanism to perforate the tape in accordance with the effective ones of the code punch magnets. In addition to the foregoing, the trip relay or magnet operates on each pulse transmitted by the out-pulse relay R2960 in order to perforate small feed holes in the central portion of the tape which are utilized to space the tape for perforations in accordance with the respective codes and which are utilized to feed a perforated tape through a subsequent translator, printing or card punch device.

In the tape perforator of the type disclosed in the above-mentioned Nelson et al. patent, the code punch magnets, are normally in the restored portion when no perforation is to be made in the tape and are in their operated positions in order to cause a perforation to be made. In the present arrangement, however, the code punch magnets provided in the record and tape punch mechanism will be in their operated positions when no holes are to be perforated and are in their restored positions when a perforation is to be made in the tape in accordance with the four-hole code combinations.

Before considering, in detail, the operation of the tabulator 2800 in controlling the ticket tape punch and record tape punch mechanisms 2967 and 2968, it will be helpful to consider first one practical example of the preselected combinational code by means of which the items of information which are to be recorded can be perforated on the respective tapes. In Fig. 33, a portion of a tape 3601 is shown and punched in the tape are all of the code hole designations, required in the present system, of a combinational four-hole code. The four code channels are indicated at both ends of the tape 3601 by the designations W, X, Y and Z and each code perforation is arranged in a vertical column or recording field and opposite each column bearing a code perforation and at the lower edge of the tape is placed the particular character or printing function represented by the code perforation in that column. The smaller holes 3602 in the central portion of the tape 3601 are provided in each column and are for the purpose of feeding the tape lengthwise during the perforating operation and also during the reading or sensing operation which will be effective when the tape is passed through a translating device. The code hole perforations and the feed holes 3602 are punched in the tape in accordance with the operated code punch magnets and in accordance with the operation of the trip magnet of the record tape punch 2967 and the ticket tape punch 2968 in the manner described in the above-mentioned Nelson et al. patent.

In view of the foregoing, it will be seen that when the hold relay R2920 operates, at its contacts 2921, it completes the above-traced self-interrupting pulsing circuit for the out-pulse relay R2960 and, at its contacts 2925, it applies ground potential to the conductor C2926. The conductor C2926 is multiply connected to the normally closed contacts of the four perforating control relays R3195W, R3195X, R3195Y and R3195Z. As long as the perforating control relays are in their restored positions, the ground potential applied to the conductor C2926 is extended to the four WT1, XT2, YT3, and ZT4 conductors of the ticket tape punch mechanism 2968 and to the four WR1, XR2, YR3, and ZR4 conductors extending to the record tape punch mechanism 2967. In each of the punch mechanisms, the above-noted conductors are connected to the four previously noted code punch magnets in order to determine whether or not the associated perforating mechanism is to perforate the tape in accordance with the four-hole code when the associated trip magnet is operated over the control conductors C2965 and C2964.

With the wipers of the recording control switch 2970 in the position shown in the drawings, the four perforating control relays R3195W, X, Y and Z are in their normal positions and the four code leads for the ticket tape punch and the record tape punch are grounded in order to operate the four code punch magnets in each of the mechanisms. Consequently, when the out-pulse relay R2960 operates the first time, the conductors C2965 and C2966 are grounded to operate the trip magnets in the record and ticket tape punch mechanisms. Also, at the contacts 2961, the out-pulse relay R2960 completes an obvious circuit for operating the magnet RM2971 of the recording control switch 2970. The operation of the trip magnets in the record and tape punch mechanisms will cause the tape to be perforated with the small feed hole by means of which the tape may be fed to the next step. Since all of the code punch magnets in each of the mechanisms are operated at the time the trip magnet causes the perforation of the tape, no code holes will be perforated in the tape on the first operation of the trip magnet. At the end of the first pulse, the out-pulse relay R2960 will restore to normal and remove the ground potential from the control conductors C2965 and C2966 thereby to cause the punch mechanisms to advance the tape to the next step position. Furthermore, at its contacts 2961, the relay R2960, upon restoring, opens the circuit for the magnet RM2971 thereby to advance the wipers of the recording control switch 2970 from the normal home contact position 61 into engagement with the contact position 1.

When the wipers 2974 to 2977, inclusive, engage the contact position 1, ground potential is applied to the windings of the control relays R3195W, X, Y and Z. These relays now operate and disconnect, at the contacts 3196W, X, Y and Z and 3197W, X, Y and Z, the four code marking conductors extending to the ticket tape punch mechanism 2968 and to the record tape punch mechanism 2967. Consequently, no ground potential will be applied to these conductors and the associated code punch magnets in the punch mechanisms will be in their restored position to cause four perforations to be made upon the next operation of the associated trip magnets. Therefore, when the pulse relay R2960 again operates, it applies ground potential to the control conductors C2965 and C2966 thereby to operate the respective trip magnets in the manner previously described. At the end of the pulse, the relay R2960 will restore to normal and again remove the ground pulse from the conductors C2965 and C2966 and cause the restoration of the respective trip magnets. As a result of the above-mentioned operation, a second small feed hole will be perforated in the tapes and, in addition thereto, four code holes will be perforated in each tape due to the fact that the code magnets in the respective mechanisms are in their restored positions. The four holes perforated in the tapes will indicate the start of a message. As a further result of the second operation and restoration of the relay R2960, the magnet RM2971 will operate and restore thereby to advance the wipers of the recording control switch 2970 from engagement with the contacts 1 into engagement with the contacts 2.

The contacts 2 to 9, inclusive, associated with the wipers 2974 to 2977, inclusive, terminate the WXYZ41 to WXYZ48 code marking conductors extending to the date and time unit U2953. This unit is a continuously operating device of the type disclosed in the Ostline Patent No. 2,581,287 wherein the WXYZ41 and WXYZ42 code marking conductors are marked in code form in accordance with any one of the tens digits 0, and 1 to 9, inclusive, or any one of the units digits 0 and 1 to 9, inclusive, in accordance with the month of the year. The WXYZ43 and WXYZ44 code marking conductors are marked in the manner noted above in accordance with the tens and units digits of the day. The WXYZ45 and WXYZ46 code marking conductors are marked in code in accordance with the tens and units digits of the hour. The WXYZ47 and WXYZ48 code marking conductors are marked in code form in accordance with the tens and units of the minute. For the detailed operation of the date and time unit, reference may had to the above-noted Ostline application which is arranged to mark the various code marking conductors in the manner described above except that the tens digit 0 has not been wired to be marked on the code marking conductors. The circuits of the date and time unit may be modified by appropriate wiring so that the tens digit 0 will be marked on the code marking conductors, as will be clearly understood from the circuit description of the operations of the timer circuit shown in said Ostline application.

In order to prevent the date and time unit U2953 from changing positions at a time when it is associated with the tabulator 2800, the guard conductor C2969 is grounded by the operation of the date control relay R2950. The manner in which the guard conductor C2969 controls the date and time unit U2953 is described in details in the above-mentioned Ostline application. Consequently, when the wiper 2973 is in engagement with the contacts 2 to 5, inclusive, the relay R2950 is held in its operated position over the circuit including its upper winding. Furthermore, when the wiper 2973 is in engagement with the contacts 6 to 9, inclusive, the date control relay R2950 is maintained in its operated position over a circuit including its lower winding. During the time the wiper 2973 engages the contacts 6 to 9, inclusive, a multiple circuit is completed by way of the contacts 2951 for operating the skip relay R2940. The last-mentioned relay in its operated position removes the ground potential, at the contacts 2941 from the control conductor C2966 of the ticket tape punch mechanism 2968 in order to prevent operation thereof under control of the out-pulse relay R2160, and at the contacts 2942 to 2945, inclusive, the four code marking conductors WT1, XT2, YT3, and ZT4 are grounded in order to operate the respective code punch magnets in the ticket tape punch 2968 and thus prevents code perforations in the associated tape. In other words, the skip relay R2940 prevents the ticket tape punch mechanism 2968 from perforating the tape in accordance with the tens and units digits of the hours, and the tens and units digits of the minute, as marked on the WXYZ code marking conductors 45 to 48, inclusive. The above information is not necessary for the production of a ticket individual to a particular telephone connection. However, the record tape punch mechanism 2967 will be operated in the normal manner to perforate the tape in accordance with the tens and units digits of the mouth, day, hour, and minute, that the perforating mechanism is being operated to produce a tape containing a record of a telephone connection.

The contacts 10 and 11 associated with the wipers 2974 to 2977, inclusive, terminate code marking conductors WXYZ37 and WXYZ38 extending to a terminal block included in the tabulator 2800 and the code marking conductors will be grounded in accordance with the first and second or A and B code digits of the calling office. The A and B digits of the calling office correspond to the first two letters of the calling office name. Accordingly, the ticket tape punch mechanism 2968 and the record tape punch mechanism 2967 will be controlled over the WXYZ code marking conductors depending upon the operated conditions of the perforated control relays R3195W, X, Y and Z to cause the tape to be perforated in accordance with the A and B digits of the calling office code.

Figure 28:
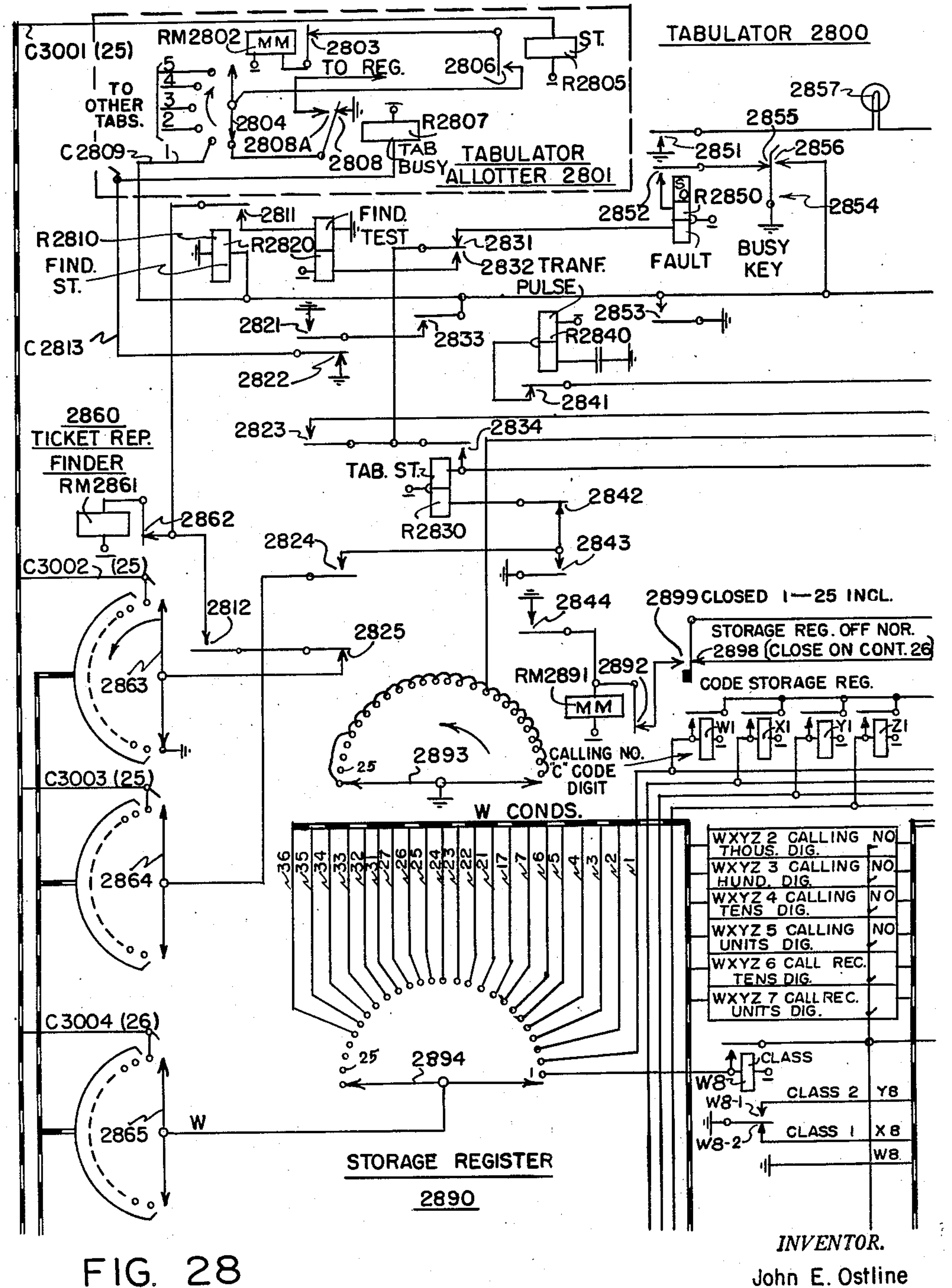
Figure 29:
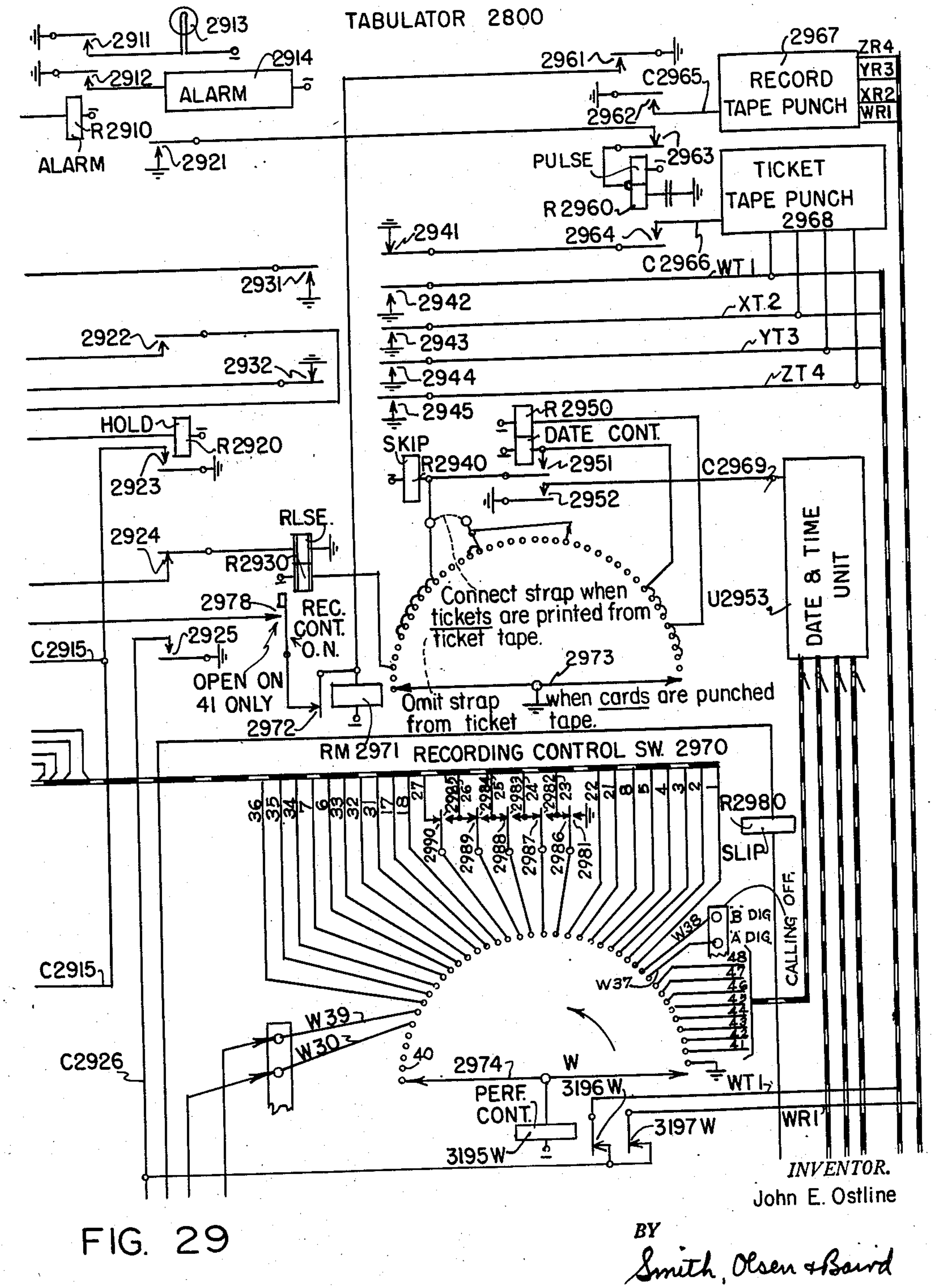
Figure 30:
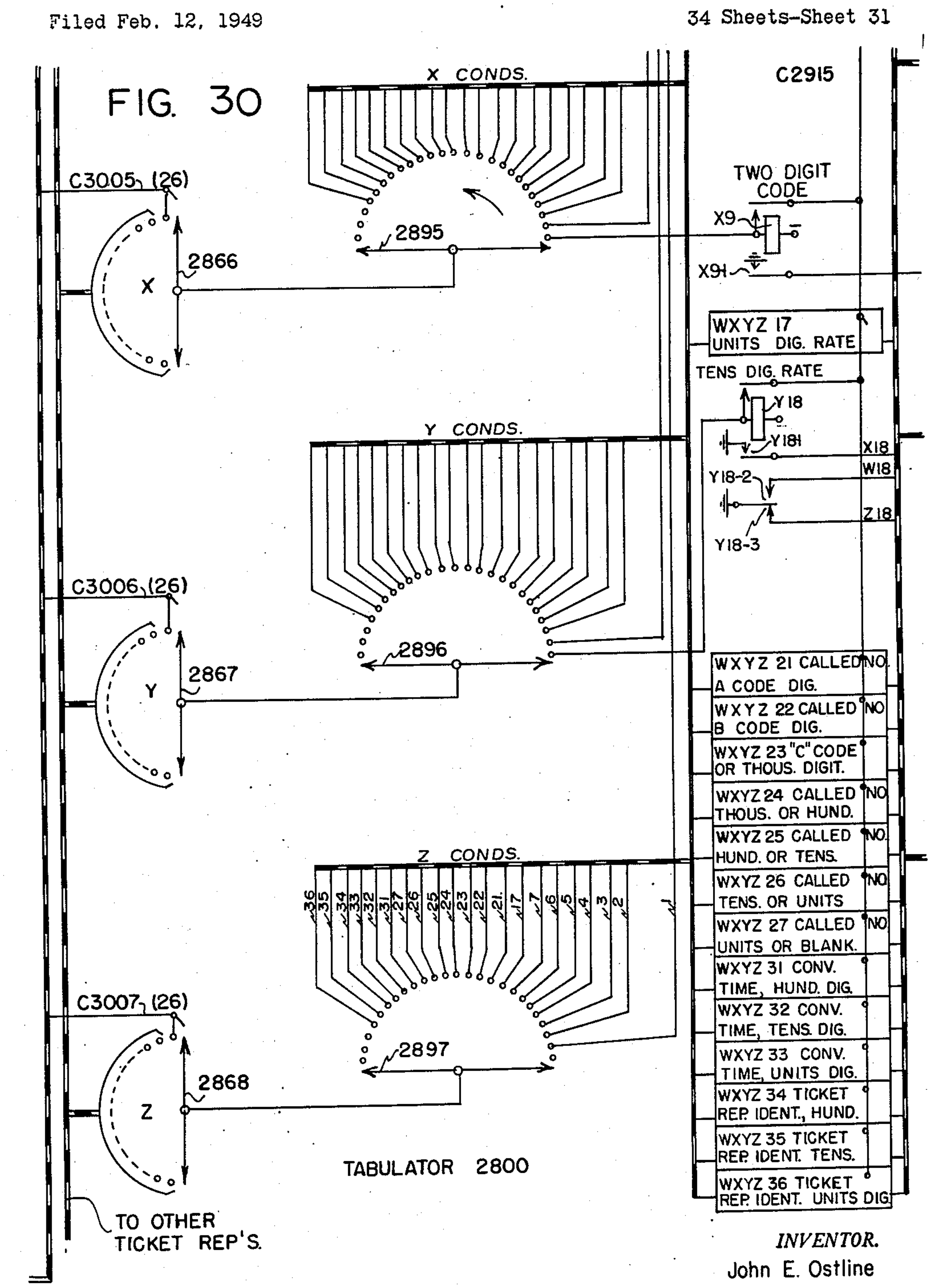
Figure 31:
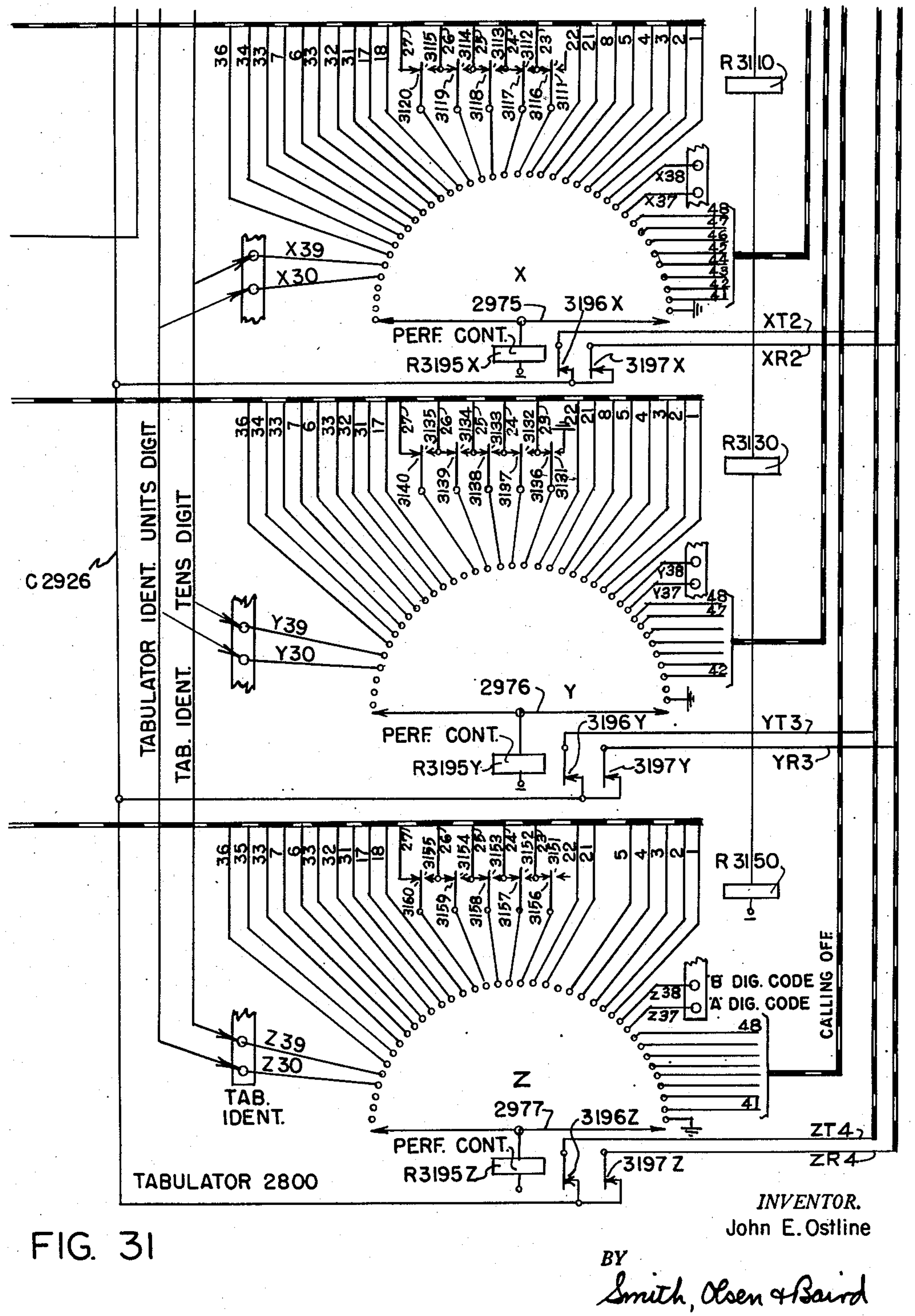

Referring now to Fig. 28 of the tabulator 2800, it will be seen that the four code storage register relays WXYZ1, which are provided for registering the third digit of the calling exchange code, that is, the C digit of the calling code, are shown in detail. These code storage registers are connected to the bank contacts accessible to the wipers 2894 to 2897, inclusive, of the storage register 2890. The storage register relays will be operated in pairs or individually to register any digit 0 and 1 to 9, inclusive. For example, if the digit 1 is the third digit or C digit of the calling office code, the W1 and X1 code storage register relays will be operated over circuits including the wipers 2894 and 2895 when these wipers are in engagement with the contacts 2 in the associated contacts banks. Upon operating, the W1 and X1 code storage register relays will lock in their operated positions over a circuit including their upper make contacts to the grounded conductor C2915. The code storage register relays WXYZ2 to WXYZ7, inclusive, WXYZ17, WXYZ21 to WXYZ27, inclusive, and WXYZ31 to WXYZ36, inclusive, are shown schematically by means of a block diagram and it should be understood that these code storage register relays are individually wired and connected in the same manner as the WXYZ1 code storage register relays. The code storage register relay W8, which is provided to indicate a class 1 calling subscriber line when it is not operated and to indicate a class 2 calling subscriber line when it is operated, is a single relay and is shown in detail. The X9 code storage register relay is provided to indicate when the called subscriber office code comprises two digits instead of the usual three digits. When this code storage register relay is operated, it will complete a circuit, at its contacts X9-1 for operating in series the four slip relays R2980, R3110, R3130 and R3150. The operation of the last-mentioned relays will alter the connections of certain marking conductors terminating in the bank contacts accessible to the wipers 2974 to 2977, inclusive, so that a space indication will be perforated by the record and ticket tape punch mechanisms in the place where the third code digit or C digit of the called office code is normally perforated. The Y18 code storage register relay is provided to indicate the tens digit of the rate applicable to the call. When the Y18 code storage register relay is in its normal position, the tens digit 0 will be perforated by the record and ticket tape punch mechanisms and when the relay is in its operated positions, the tens digit 1 will be perforated.

Referring again to the detail wiring of the WXYZ1 code storage register relays, it will be noted that the four conductors shown below the relays and extending to the right, are respectively designated W1, X1, Y1, and Z1. The W1 conductor terminates in the contact 12 accessible to the wiper 2974 of the recording control switch 2970. The X1 conductor terminates in the contact 12 accessible to the wiper 2975; the Y1 conductor terminates in the contact 12 accessible to the wiper 2976; the Z1 conductor terminates in the contact 12 accessible to the wiper 2977. The remaining code storage register relays are provided with corresponding W, X, Y and Z conductors terminating in correspondingly designated bank contacts accessible to the four wipers 2974, 2975, 2976 and 2977 of the recording control switch 2970. The three individual code storage register relays W8, X9 and Y18 are provided with marking conductors which terminate in the bank contacts accessible to the above-enumerated wipers in accordance with the WXYZ code designations.

With the W1 and X1 code storage register relays operated and locked to the grounded conductor C2915, the ground potential applied to the conductor C2915 is extended by way of the upper make contacts of the W1 and X1 code storage register relays to the W1 and X1 code marking conductors terminating in the contacts 12 accessible respectively to the wiper 2974 and 2975 of the recording control switch 2970. Consequently when the wipers of the recording control switch 2970 are in engagement with the contact 12, the associated perforating control relays R3195W and R3195X will be operated over the above-traced circuit. The perforating control relay R3195Y and R3195Z will not be operated at this time due to the fact that the associated code marking conductors Y1 and Z1 individual to the Y1 and Z1 code storage register relays will not be grounded when the digit 1 is stored in the WXYZ1 code storage register relays.

With the perforating control relay R3195W and R3195X in their operated positions, as noted above, the contacts 3196W, 3197W, 3196X and 3197X will be opened in order to remove ground potential applied to the conductor C2926 from the WT1 and XT2 conductors extending to the ticket tape punch mechanism 2968 and from the WR1 and XR2 conductors extending to the record tape punch mechanism 2967. The removal of ground potential from the above-mentioned conductors permits the corresponding code punch magnets in the record and ticket tape punch mechanisms to restore to their normal positions to prepare the associated perforating pins to be positioned to perforate the ticket tape and the record tape upon the next operations of the out-pulse relay R2960. Accordingly, when the out-pulse relay R2960 operates and applies ground potential to the conductors C2965 and C2966, the trip magnets in the record and ticket tape punch mechanisms will operate to cause these mechanisms to perforate the associated tapes in code to indicate the digit 1. When the out-pulse relay R2960 restores to normal, the trip magnets in the record and ticket tape punch mechanisms will be released and the perforated tape will be stepped to the next position.

In view of the foregoing description of the cyclic operation of the out-pulse relay R2960, it will be seen that the magnet RM2971 will cause the wipers of the recording control switch 2970 to be advanced step-by-step over the various contacts of the associated banks whereby the perforating control relays may be operated in accordance with the marking potentials applied to the code marking conductors terminating in the associated contact banks. It will also be understood that the perforating control relays will control the application of ground potential to the four control leads extending to the ticket tape punch mechanism and the four control leads extending to the record tape punch mechanism in accordance with the previously described WXYZ codes whereby code perforations will be made in the tapes corresponding to the digits stored in the various code storage register relays.

When the wipers of the recording control switch 2970 engage the contacts 35, the tens digit of the identity of the tabulator 2800 will be perforated on the record tape and when the wipers engage contacts 36, the units digit identifying the tabulator 2800 will be perforated on the record tape. It should be understood that the WXYZ39 code marking conductors terminating in the contacts 35 will be grounded in accordance with the WXYZ code at the terminal block shown to the left of the bank contacts accessible to the wipers 2974 to 2977, inclusive, in accordance with tens digit of the identity of the tabulator 2800. The WXYZ30 code marking conductor terminating in the contacts 36 are also grounded in accordance with the WXYZ code at the terminal block in accordance with the units digit of the identity of the tabulator 2800.

When the wipers of the recording control switch 2970 have been advanced from the contacts 36 into engagement with the contacts 37, the information pertaining to a call will have been perforated on the record tape in the manner disclosed in Fig. 35. Referring to Fig. 35, it will be seen that in response to the seizure of the record tape punch, the single small feed hole will be perforated in the tape as is shown at the left thereof. In each of the subsequent positions of the tape which have been numbered 1 to 37, inclusive, the various items of information, indicated below the tape, will be perforated therein in accordance with the four-hole code in the manner shown. In positions 38 and 39 of the tape, a small feed hole will be perforated as the wipers of the recording control switch 2970 are advanced from engagement with the contacts 37 and 38 into engagement with the contacts 39.

In position 39, the wiper 2973 of the recording control switch 2970 completes a circuit for operating the release relay R2930 over its lower winding. The relay R2930, upon operating, at its contacts 2932, opens the holding circuit for the relays R2820, R2830 and R2920 which now restore to normal. The restoration of the relay R2920, at its contacts 2921, interrupts the circuit for controlling the out-pulse relay R2960 in order to terminate further transmission of pulses to the record tape punch 2967 and the ticket tape punch 2968.

Before proceeding with further description of the operations which occur as a result of the operation of the release relay R2930, the manner in which the recording control switch 2970 eliminates certain unnecessary information from the ticket tape will now be described. It should be understood, however, that the tape produced by the ticket tape punch mechanism 2968 may be used to control a card punch mechanism in accordance with certain items of information pertaining to a call and that the card which has been produced may subsequently be utilized to control a printing mechanism whereby a ticket individual to the particular call will be printed having thereon the printed items of information pertaining to a call. This ticket is usually forwarded to the subscriber at the end of the month to inform the subscriber of the details pertaining to individual toll call. The tape produced by the record tape punch mechanism may be utilized in the same manner as described above, but the information contained on the tape is for the telephone company's use and, consequently provides additional information which is not necessary for subscriber's use. In the particular arrangement disclosed, the information relating to the exact hour and minute that the tape is perforated is not produced on the ticket tape whereas this information is contained on the record tape. Furthermore, the information relating to the identity of the director, the identity of the ticket repeater, and the identity of the tabulator is omitted from the ticket tape and is produced on the record tape. The manner in which the above information is omitted from the ticket tape will now be described.

When the wiper 2973 of the recording control switch 2970 engages the contact 6 to 9, inclusive, it completes a circuit for the date control relay R2950 for the purpose previously explained and in multiple therewith, it completes a circuit for the skip relay R2940. Also, when the wiper 2973 engages the contacts 30 to 36, inclusive, a direct circuit is completed for operating the skip relay R2940. Whenever the skip relay R2940 is operated, it removes the ground potential, at contacts 2941, whereby the trip magnet in the ticket tape punch mechanism 2968 is normally operated. Also, at the contacts 2942 to 2945, inclusive, the skip relay R2940 applies ground potential to the four WT1, XT2, YT3 and ZT4 conductors extending to the ticket tape punch mechanism 2968 in order to maintain the associated code punch magnets in their operated positions. Consequently, as the wipers 2974 to 2977, inclusive, engage the correspondingly numbered contacts, that is the contacts positions which control the operation of the skip relay R2940, the perforating control relays R3195W, X, Y and Z will be operated in code combinations in the manner previously explained to control the record tape punch mechanism 2967. However, while the same controls will be applied to the conductors of the ticket tape punch mechanism 2968, such controls will have no effect upon the code punch magnets therein because the skip relay R2940 will retain the code punch magnets in their operated positions over circuits which are independent of the controls exercised by the perforating control relays noted above.

While one arrangement has been illustrated for omitting certain information pertaining to a telephone connection from the ticket tape, it should be understood that any of the other bank contacts accessible to the wiper 2973 may be corrected to the skip relay R2940 in order to omit any additional information. Also, it should be understood that the skip relay R2940 may be omitted and in that event, the information contained on the record tape will also be produced on the ticket tape.

With the skip relay R2940 wired and connected in the manner illustrated in the drawings, the ticket tape punch mechanism 2968 will produce a tape containing the various items of information as is illustrated in Fig. 34 of the drawings. It should be further understood that the ticket tape illustrated in Fig. 34 may be fed through a translating mechanism which is arranged to calculate the cost of the call from the items of information which have been perforated on the ticket tape. These items of information which are utilized in calculating the cost of the call may be, for example, the rate applicable to the connection, the conversation time, and the class of the calling subscriber line. From these items the translating device will calculate the cost of the call and may either produce a punched card containing all of the items of information including the cost of the call or it may directly control a printing mechanism to print all of the items of information pertaining to the call, including the cost thereof. In this manner an individual ticket pertaining to the telephone connection will be produced and it may be transmitted to the calling subscriber with the monthly bill to give the subscriber detailed information pertaining to each of the short haul toll calls which have been made during a billing month.

Referring again to the operations of the tabulator 2800 in response to the operation of the release relay R2930, it will be seen that the removal of ground, at the contacts 2932, causes the restoration of the relays R2820, R2830 and R2920 as previously noted. Also, at the contacts 2931, the relay R2930 applies ground potential to the conductor C2809 in order to maintain the busy marking potential indication on the contact banks of the tabulator allotter 2801 to indicate that the tabulator 2800 is still in a busy condition. The relay R820, upon restoring, prepares various circuits whereby the tabulator 2800 will subsequently be rendered available for additional calls. The relay R2830, upon restoring to normal, at its various contacts, prepares additional circuit over which the tabulator 2800 may be subsequently controlled in response to a new call. Finally, the hold relay R2920, upon restoring, at its contacts 2921, opens the circuit for the outpulse relay R2960 thereby to terminate further transmission of control pulses to the record and ticket tape punch mechanisms 2967 and 2968 and to the magnet RM2971 of the recording control switch 2970. At the contacts 2923, the hold relay R2920 removes the holding ground potential from the conductor C2915 thereby to cause all of the operated ones of the code storage register relays to be restored to their normal positions. At the contacts 2925, the relay R2920 removes the ground potential from the conductor C2926 thereby to permit operated ones of the code punch magnets in the record and ticket tape punch mechanisms 2967 and 2968 to be restored to normal. Finally, at its contacts 2924, the relay R2920 completes a circuit over which the operated storage register 2890 and the operated recording control switch 2970 restore their wipers to their normal resting positions.

The restoration of the wipers of the storage register 2890 occurs under control of the magnet RM2891 over a self-interrupting circuit including the upper winding of the release relay R2930. This circuit may be traced from ground by way of the upper winding of the relay R2930, the contacts 2924, the off-normal contacts 2899, the contacts 2892, and the winding of the magnet RM2891, to battery. It should be noted at this time that the off-normal contacts 2899 are closed as long as the wipers of the storage register 2890 are in any one of the contact positions 1 to 25, inclusive. Consequently, the magnet RM2891 operates and restores under control of its contacts 2892 thereby to advance the wipers of the storage register 2890 step-by-step over the contacts 23, 24, and 25 into engagement with the contacts 26. As soon as the wipers engage the contacts 26, the above-traced circuit for the magnet RM2891 is interrupted at the off-normal contacts 2899 and the releasing circuit including the upper winding of the release relay R2930 is transferred by way of the contacts 2898, the recording control switch off-normal contacts 2978, the contacts 2972, to the winding of the magnet RM2971 of the recording control switch 2970. In this manner, the wipers of the storage register 2890 are restored to their normal home contact position 26 to prepare the tabulator 2800 for the next call.

As soon as the releasing circuit is transferred in the manner described above, the release relay R2930 and the magnet RM2971 are operated in series. The release relay R2930 is retained in its operated position during the restoration of the wipers of the storage register 2890 over the circuit including the magnet RM2891 and as soon as the releasing circuit is transferred to the magnet RM2971, the relay R2930 is retained in its operated position in series with the last-mentioned magnet. Upon operating, the magnet RM2971 interrupts its own circuit, at its contacts 2972, thereby to advance the wipers of the recording control switch 2970 from the contacts 39 into engagement with the contacts 40. The magnet RM2971, upon restoring, again re-completes its operating circuit whereby the wipers are advanced from the contacts 40 into engagement with the home resting contacts 41. As soon as the wipers of the recording control switch 2970 engage the contacts 41, the recording control switch off-normal contacts 2978 are opened thereby to interrupt the circuit for the magnet RM2971 and the relay R2930. Since the circuits for both the upper and lower windings of the release relay R2930 are now interrupted, the relay restores to normal and removes, at its contacts 2931, the busy marking ground potential applied to the conductor C2809. This renders the tabulator 2800 accessible to the tabulator allotter 2801 for use in additional calls.

Before concluding the description of operation of the tabulator 2800, a description will now be given of the operation of the tabulator 2800 in response to a call to a two-digit called office instead of to a three-digit called office. In the case of a call to a two-digit called office, the various code storage register relays will be operated to store the various items of information in substantially the same manner as has been previously described except that the two-digit code storage relay X9 will be operated and locked to the grounded conductor C2915. This code register relay is not operated when the call is for a three-digit called office. Also, the code storage register relays WXYZ21 and WXYZ22 will be operated in accordance with the first and second called office code digits, that is, the A and B digits of the called office code. The WXYZ23 code storage register relays will register the thousands digit of the numerical portion of the called subscriber directory number instead of the normal third code digit or C digit of a called office code. The WXYZ24, 25 and 26 code storage register relays will respectively register the hundreds, tens and units digits of the directory number of the called subscriber instead of the thousands, hundreds and tens digits as is the case when a three-digit called office code and directory number is registered. Finally, the WXYZ27 code storage register relays will not be operated since this register normally registers the seventh digit or units digit of a seven-digit called subscriber directory number.

The four code marking conductors WXYZ which are individual to each of the WXYZ23 to WXYZ27, inclusive, code marking register relays terminate respectively in the bank contacts 20 to 24, inclusive, accessible to the wipers 2974 to 2977, inclusive. Each of the above enumerated code marking conductors are connected to the various bank contacts by way of normally closed contacts of the four slip relays R2980, R3110, R3130 and R3150. More specifically, the W code marking conductors of the W23 to W27, inclusive, code register relays are connected respectively by way of the contacts 2986 to 2990, inclusive, of the slip relays R2980 to the contacts 20 to 24, inclusive, accessible to the wiper 2974. The X code marking conductors of the X23 to X27, inclusive, code storage registers are connected respectively by way of the contacts 3116 to 3120, inclusive, of the slip relay R3110 to the contacts 20 to 24, inclusive, accessible to the wiper 2975. The Y code marking conductors of the Y23 to Y27, inclusive, code storage register relays are connected respectively by way of the contacts 3136 to 3140, inclusive, of the slip relay R3130 to the contacts 20 to 24, inclusive, accessible to the wiper 2976. Finally, the Z code marking conductors of the Z23 to Z27, inclusive, code storage register relays are connected respectively by way of the contacts 3156 to 3160, inclusive, of the slip relay R3150 to the contacts 20 to 24, inclusive, accessible to the wiper 2977.

Accordingly, the C digit code, the thousands digit, the hundreds digit, the tens digit and the units digit of a called subscriber number are registered respectively in the WXYZ23 to WXYZ27, inclusive, code storage register relays and marked in code on the bank contacts 20 to 24, inclusive, accessible to the wipers 2974 to 2977, inclusive, of the recording control switch 2970. Consequently, the last five digits of a seven-digit called subscriber number will be perforated in adjacent columns on the tape 3601 as is shown in Figs. 34 and 35.

When a six-digit called number is registered, that is, a called subscriber number having a two-digit called office code and a four-digit number, the last five digits will be registered respectively in the WXYZ23 to WXYZ26, inclusive, code storage register relays; the WXYZ27 code storage register relays will be unoperated; and the X9 two-digit code storage register relay will be operated to indicate the six-digit number. The operation of the X9 two-digit code storage register relay will cause the operation of the four slip relays R2980, R3110, R3130 and R3150 in the manner previously explained. The relay R2980 will open its contacts 2986 to 2990, inclusive, and it will close its contacts 2981 to 2985, inclusive. The relay R3110 will open its contacts 3116 to 3120, inclusive, and close its contacts 3111 to 3115, inclusive. The relay R3130 will open its contacts 3136 to 3140, inclusive, and close its contacts 3131 to 3135, inclusive. The relay R3150 will open its contacts 3156 to 3160, inclusive, and close its contacts 3151 to 3155, inclusive. In this manner, the WXYZ23 to WXYZ27, inclusive, marking conductors are disconnected from the contacts 20 to 24, inclusive, terminating respectively in the bank contacts accessible to the wipers 2974 to 2977, inclusive, and the code marking conductors WXYZ23 to WXYZ26, inclusive, will be connected to the contacts 21 to 24, inclusive, terminating in the bank contacts accessible to the above mentioned wipers. Consequently, the thousands, hundreds, tens and units digits of a six-digit called number registered respectively in the WXYZ23 to WXYZ26, inclusive, code storage register relays will be perforated on the tape in the same vertical columns as the thousands, hundreds, tens and units digits of a seven-digit called subscriber number. The vertical column of the tape which normally is perforated in accordance with the code of the C digit of the called office code will be perforated in a manner to control the subsequent card punch or printing mechanism to produce a space. More specifically, the contacts 20 accessible to the wipers 2974, 2975 and 2976 will each be grounded thereby to operate the three perforating control relays R3195W, R3195X and R3195Y. When these three relays are simultaneously operated, the record tape punch mechanism and the ticket tape punch mechanism 2967 and 2968 will be controlled to perforate three holes indicative of a space as is shown at the right end of the tape, 3601 in Fig. 33. Finally, it should be noted that the code marking conductors of the WXYZ27 code storage register relays are disconnected from the bank contacts accessible to the wiper 2974 to 2977 of the recording control switch 2970 since no information is stored in these register relays when a six-digit called subscriber number is to be registered.

*Call from an extended service subscriber substation in the FLorida-3 exchange to a subscriber substation in the EMpire-1 exchange*

The private subscriber substations which are rendered extended service are referred to as class 1 subscribers. Such subscribers pay a higher flat rate service charge than ordinary private subscriber substations and for this additional charge they are entitled to make calls into nearby exchange areas on a free call basis. In other words, regular subscriber substations which are referred to as class 2 subscribers in making toll calls to the nearby exchange areas will have the usual toll ticket produced which will include all the information necessary to assess the calling subscriber in accordance with the rate applied to such calls and the time that the conversation connection is maintained. On the other hand, private subscriber substations rendered extended service, that is, class 1 subscribers, may make such toll calls into nearby exchange areas on a free call basis in which case no ticket is produced for the call. It may be well to point out at this time that class 1 subscribers in making calls to the more remote toll exchange areas will be permitted to make such calls and will be charged at a lesser rate than ordinary subscribers of the class 2 type.

The extension of a toll call from a private subscriber substation of the class 1 type, that is, an extended service subscribed such, for example, as the private subscriber substation TX3 (Fig. 3), is initiated and extended therefrom under control of the calling device thereat, in the manner previously explained. However, the line circuit, such as the line circuit 405A, individual to a calling subscriber of the class 2 type is arranged so that the terminal 428 and the conductor C432 (Fig. 4) does not have ground or resistance battery potential applied thereto. More specifically, referring to Fig. 4 of the drawings and assuming that the substation 401 is the station TX3 referred to above, then the line circuit 405 individual to the calling substation will not apply a potential to the conductor C432. The connection between the calling subscriber at substation 401 and the director 300A which includes the units of equipment comprising the controller 600, the code switch 1100, the call register 1500 and the coder 1800 is exactly the same as has been described hereinbefore. When the controller 600 portion of the director has been seized, the class test will be made to determine the class of the subscriber at substation 401. In the call being assumed, the calling subscriber is of the class 1 type and, consequently, the class 2 relay R670 and the class 3 relay R710 will remain in their restored positions, thus illuminating the class 1 lamp 676 to signal the exchange attendant or the monitoring operator that a class 1 subscriber is calling, and a ground potential is applied to the conductor C681 extending to Fig. 13 thereby to operate the class 1 relay R1340 of the translator 1300. The last-mentioned operation, however, does not take place until after the calling subscriber has dialed the first three digits of the exchange code of the called subscriber.

For the purpose of this description it will be assumed that the present call is to be extended to the TR1 subscriber substation in the EMpire 1 exchange, having the directory number EMpire 1-1234. In dialing the number of the called subscriber the calling subscriber dials the digits 361-1234. These digits are registered respectively in the manner previously described in the first, second and third code registers 1520, 1530 and 1540 and in the first, second, third and fourth numerical registers 1610, 1620, 1630 and 1640 in the call register 1500. In response to the registration of the three code digits of the called exchange, the code switch 1100 is controlled in the manner previously described to position its wipers into engagement with the contacts 61 in the associated contact banks and the wiper 1202 is rendered effective. Also, as a result of the registration of the three code digits, the assigner 1000 is controlled to associate the translator 1300 with the calling director.

Referring now to the translator 1300 (Figs. 13 and 14) it will be seen that since the calling subscriber is a class 1 or extended service subscriber, the relay R1340 operates and, at its contacts 1341, causes the operation of the relay R1310 whereby the 175 conductors terminating in the terminal block TB1250 are switched through to the terminal block TB1395. When the last-mentioned operation has been completed, a circuit is completed over the selected wiper 1202 of the code switch 1100 in the manner previously explained and then via the conductors C1241, C1242, and C1243, the contact 1 of the relay R1310, the conductor C1342, the jumper C1343, the conductor C1344 and the winding of the translator relay R1420, to battery. The translator relay R1420 is selected to transfer to the coder 1800 a translation of the called exchange code 361. In the example selected, the translate relay R1420 is permanently wired so that the WXYZ code marking leads will be marked in accordance with the single routing digit "8." The remaining WXYZ12 to WXYZ17 code marking leads are not marked in accordance with any digit, the TB code marking lead will be grounded in the same manner as described in connection with the operation of the transfer relay R1410; the ABT code marking lead will not be grounded inasmuch as the call recorder 2000 will not be called into use in connection with a call that is not to be ticketed.

In view of the foregoing it will be understood that only two items of information will be transferred from the translator 1300 to the coder 1800. The first item of information that is transferred is the route digit "8" which will be stored in the first route digit register in the coder 1800 by operation of the X relay R1802. The second item of information to be transferred to the coder 1800 is in the form of the circuit whereby the TB control relay R1885 operates in the manner previously described. After the above information is transferred from the translator 1300 to the coder 1800, the translator 1300 is disconnected from the director and the sender switch 1660 in the call register 1500 portion of the director will begin the transmission of the switch setting impulses in order to extend the connection to the called subscriber substation.

In the call being described the call recorder 2000 will not be utilized inasmuch as the start relay R2230 will not be operated. Furthermore, since the call recorder 2000 has not been seized, the detector 1900 will not be called into operation.

With the route digit "8" stored in the first route digit register of the coder 1800, the sender switch 1660 in conjunction with the send sequence switch 1650 will transmit eight impulses to the primary selector 500 in the manner previously described. The second, third, fourth, fifth and sixth route digit registers in the coder 1800 will be automatically skipped by the send sequence switch 1650 since no route digits have been registered therein. The sender sequence switch 1650 will now attempt to select the digits registered in the first code register 1520, but since the control relay R1885 has been operated by the translator 1300 the sender sequence switch 1650 is automatically controlled to skip the first and the second code storage registers 1520 and 1530. The sender sequence switch 1650 now successively connects the third code register 1540 and then the four numerical registers 1610, 1620, 1630 and 1640 to the sender switch 1660 whereby the impulses constituting the digits registered in the above-named registers by the calling subscriber are transmitted to control the succeeding switches in the switch train to establish the connection.

After all of the digits have been transmitted, the director is disconnected from the calling line and the calling line is connected through to the called line in the manner previously explained.

Referring now to Fig. 3 of the drawings a brief description will be given of the completion of the above-described connection from the calling extended service subscriber substation TX3 to the called subscriber substation TR1. When the calling subscriber at substation TX3 (class 1) removes his receiver the line circuit 405A, the finder 440A, the primary selector 500A, the director hunter 450A and the director 300A operate in the manner previously described whereby the calling subscriber receives the usual dial tone signal. The calling subscriber now dials the digits 361–1234 which are registered in the call register 1500 portion of the director. Since the calling subscriber is a class 1 subscriber, the translator 1300A functions in the manner described above to translate the digits 361 into the digit "8" which digit is registered in the coder 1800 portion of the director. Furthermore, the translator 1300A prevents operation of the call recorder 2000A and the detector 1900A. The translator 1300A is dismissed and made available for additional calls and the director starts sending the routing digit or digits followed by selected ones of the digits registered in the call register 1500.

In the present example, the first digit "8" transmitted by the director controls the primary selector 500A to select an idle outgoing trunk over the eighth level of its associated bank contacts, thus extending the connection from the primary selector 500A to the repeater 305. When the connection is extended to the repeater 305, the repeater, in turn, extends the connection over the inter-office toll line 335 to the repeater 290 in the EMpire 1 exchange. The next digit transmitted by the director is the third dialed digit which is registered in the third code register of the call register 1500. In the present example, this digit "1" is transmitted by the director and repeated by the repeaters 305 and 290 to the incoming selector 205 in the EMpire 1 exchange. The incoming selector 205 in response to the digit "1" raises its wipers to the first level in its associated bank and selects an idle local selector, such as the selector 210. The director now transmits the four numerical digits registered in the first, second, third and fourth numerical registers of the call register 1500. These digits are repeated in the manner noted above first to the local selector 210 which selects an idle local selector, such as the selector 215, and finally to the connector, such as the connector 220. In this manner the local selector 210 responds to the first or thousands numerical digit, the selector 215 responds to the second or hundreds digit, and the connector 220 responds to the third and fourth or tens and units digits to select the terminals terminating the line of the called subscriber at the substation TR1. When the final digit is transmitted, the director is disconnected from the connection and the primary selector 500A completes the talking circuit between the calling subscriber substation TX3 and the called subscriber substation TR1 in the manner described hereinbefore.

Particular attention is called to the fact that in the above-described connection between the calling and the called subscribers, the toll ticket repeater 2300 and the associated tabulator and tape punch mechanisms are by-passed in order to prevent the recording of information pertaining to the above-mentioned toll call. In other words, an extended service subscriber is permitted to extend calls into nearby toll areas without the assessment of a toll charge for the calls; whereas regular subscribers in extending toll calls to nearby toll areas are charged for such calls in accordance with the established charge rate and the conversation time period and a record is made of the connection.

Before concluding the description of the operation of the various units of equipment involved in the establishment of the above-described toll call, it should be mentioned that the director is controlled to transmit all of the digits to establish the connection without a delay in the transmission of either the final or the penultimate digit. More specifically, it will be recalled that when a call recorder 2000 is required in the establishment of a connection which requires the production of a toll ticket, it was necessary to prevent the sender switch 1660 from transmitting the last digit of the called subscriber number until after all of the items of record information were transferred by the call recorder 2000 to the toll ticket repeater 2300 included in the toll call. The prevention of the transmission of the last digit was controlled in the call recorder 2000 by means of the start relay R2230. This relay, upon seizure of the call recorder 2000, operated and, at its contacts 2232, removed ground potential from the conductor C986 extending to Fig. 9 and thus prevented the sender sequence switch 1650 and the sender switch 1660 from transmitting the last digit. After all of the information is transferred from the call recorder 2000 to the ticket repeater 2300 ground potential is re-applied to the conductor C986 thereby to control the call register 1500 to transmit the last digit whereby the connection is completed to the called subscriber line. As previously pointed out, in the present call the call recorder 2000 is not utilized in the establishment of the connection and the ticket repeater 2300 is by-passed. Therefore, the start relay R2230 in the call recorder 2000 remains in its normal position and, at its contacts 2232, maintains ground potential on the conductor C986 extending to Fig. 9. With this arrangement, as soon as the fourth numerical digit of the called subscriber number is registered, the fourth numerical send relay R990 operates to permit the send sequence switch 1650 and the sender switch 1660 to sequentially transmit the four digits of the numerical portion of the called subscriber directory number, one after another, and thus complete the connection to the called subscriber line.

When the calling and called subscriber terminate the connection by replacing the receivers on the switchhooks of their associated telephone instruments, all the switching apparatus involved in the established connection is automatically restored to normal in the conventional manner.

*Calls from paystation lines*

The substations which are rendered paystation service are referred to as class 3 substations. Such paystations require coins to be deposited before a call can be completed to a called subscriber substation. In the present system the paystation lines may make local calls when the appropriate coin is deposited in the coin chute of the telephone instrument but such lines are prohibited from making short haul toll calls either into adjacent exchanges or in the more remotely located exchanges. In this respect, the paystation lines of the class 3 type may be generally referred to as restricted service lines in that they are prevented from making short haul toll calls unless they first extend the connection to the toll operator position. Calls which are completed from a paystation line to a toll operator position are completed by the toll operator to the desired called subscriber substation and the toll operator supervises the connection and performs the usual coin collecting and refunding of deposited coins in the conventional manner.

Referring now to Fig. 3A of the drawings, it will be assumed that the substation designated TP3 is of the paystation type and, as disclosed, it is connected to the FLorida 3 exchange equipment in substantially the same manner as the class 2 regular subscriber substation and the class 1 extended service subscriber substation. However, the line circuit 405C is individual to the paystation line and connected and arranged to apply a resistance battery potential to the conductor C432 terminating in the banks of the line finder 440A. The resistance battery potential applied to the above-mentioned conductor will control the associated director 300A to indicate that the call being extended is from a paystation substation of the class 3 type. In the illustrated circuit arrangement the line circuit 405C, individual to the paystation, terminates directly in the banks of the line finder 440A, and the line finder 440A is shown directly connected to the primary selector 500A, in the same manner as they are connected when the switching apparatus is being utilized for extensions of calls by either the class 1 extended service subscribers or the class 2 local service subscribers. It is the usual practice in the case of class 3 paystation lines to insert a paystation repeater between the line finder 400A and the primary selector 500A. In the system disclosed in Fig. 3A the above-mentioned paystation repeater is omitted inasmuch as it performs its usual function of either refunding or collecting coins deposited by a calling subscriber, depending upon whether or not the call is abandoned before completion, the called subscriber fails to answer, or the connection is successful. These operations are well-known and are not essential for a complete understanding of the operation of the present system. Consequently, the detail circuit arrangements of the paystation repeater have been omitted from the disclosure.

When a call is extended from the paystation, the line circuit 405C, the finder 440A, the primary selector 500A, the director hunter 450A and the director 300A operate in the manner previously explained. If the digits designating the local FLorida 3 exchange code, that is the digits 353, are registered in the associated director, the director will be automatically disconnected so that the remaining digits dialed by the calling subscriber will control the local switch train to complete the connection to the desired local subscriber substation. It will be recalled that in response to the third digit "3" of the local office code, the primary selector 500A raised its wipers to the third level of the associated contact bank to select the local selector, such as the selector 315. Consequently, as soon as the director 300A releases from the calling subscriber line at the end of the third digit, the primary selector 500A switches through in the manner previously described to connect the calling paystation line through the finder 440A and the primary selector 500A, to the local selector 315. The last four digits of the called subscriber directory number respectively control the local selector 315, the local selector 320 and the connector 325 to complete the connection to the desired called local subscriber line. In response to the completion of the call the deposited coin will be collected under control of the paystation repeater (not shown) in the usual manner and when the conversation has been terminated by the calling and the called subscribers, the switching apparatus involved in the telephone connection will automatically restore to normal.

Occasionally, a subscriber at a paystation will either inadvertently or deliberately attempt to complete a short haul toll call beyond the area assigned for local calls. In order to automatically prevent a paystation subscriber from extending unauthorized calls, the director and associated apparatus in the FLorida-3 exchange functions automatically to intercept such calls by extending the connection from the paystation line to an intercepting operator position. Referring now to Fig. 4 of the drawings and assuming that the substation 401 is of the class 3 paystation type, the line circuit 405 individual thereto will be wired so that the resistance battery connected to the terminal 426 will be jumpered to the terminal 428 thereby to apply the resistance battery potential to the conductor C432. As soon as the calling subscriber removes his receiver, the line circuit 405, the line finder 440, the primary selector 500 and the director hunter 450 will respond in the manner previously described to extend the connection to the director 300A. Upon receiving the usual dial tone signal the subscriber will dial the directory number of the desired called subscriber. For the purpose of this description it will be assumed that the paystation subscriber is attempting to call the subscriber TR1 in the EMpire 1 exchange, whose directory number is EMpire 1–1234. In response to the dialing of the three code digits 361 designating the EMpire 1 exchange, the call register 1500 portion of the director will respond in the manner previously described to register the digits in the first, second and third code registers 1520, 1530 and 1540. As a further result of the operation of the call register 1500 the code switch 1100 advances its wipers in a vertical direction in response to the second code digit 6 and will rotate its wipers into engagement with the first contact in the selected level in response to the third digit 1 and the wiper 1202 will be rendered effective in response to the first digit 3, all in the manner previously described. In this manner the conductor C1243 extending to the translator 1300 is grounded in accordance with the three code digits designating the EMpire 1 exchange.

As soon as the three code digits are registered in the call register 1500 the assigner start relay R640 in the controller 600 portion of the director operates to initiate the operation of the translator assigner 1000. The translator assigner 1000 will automatically connect the translator 1300 to the coder 1800 portion of the director. The detail operations of the translator assigner 1000 and the associated apparatus has been previously described and need not be repeated at this time. Since the call being extended is from a paystation line of the class 3 type the usual class test is made by the controller 600 portion of the director to register therein the class of the calling line. In performing this test the controller 600 first connects the class 2 test relays R670 to the conductor C470 which extends by way of the director hunter 450, the primary selector 500, and the line finder 440 to the conductor C432 in the line circuit 405. The class 2 test relay R670 does not operate inasmuch as the conductor C432 has resistance battery applied thereto indicative of a class 3 substation. The controller 600 then makes a second test by connecting the class 3 test relay R710 to the conductor C432. The class 3 test relay R710 now operates and locks itself by way of its contacts 712 and the resistor 709, to battery, in order to register in the controller 600 that a class 3 type substation originated the call. As a further result of the operation of relay R710, at its contacts 713, it completes a circuit for illuminating the class 3 lamp 670 and, at its contacts 715, it applies ground potential to the class 3 conductor C683 extending to Fig. 13.

Referring now to Fig. 13 it will be seen that when ground potential is applied to the class 3 conductor C683, the class 3 relay R1360 in the translator 1300 operates. At its contacts 1361, the relay R1360 completes a circuit for operating the relay R1330 which closes its contacts 1 to 175, inclusive, thereby to extend the 175 conductors terminating in the terminal block TB1250 to the terminal block TB1395. At the present time the conductor C1243, connected to the terminal block TB1250, is grounded due to the operation of the code switch 1100 in response to the code digits 361 of the called exchange code. This ground potential, applied to the conductor C1243, is extended by way of the contact 1 of the operated relay R1330 to the conductor C1346. It should be noted, however, that the conductor C1346 is not cross-connected to a translator relay, such as the relays R1410, R1420 etc. In other words, a translation has not been provided in the translator 1300 for establishing routing digits and registering the same in the route digit registers of the coder 1800 when a call is extended from a class 3 paystation line. In other words, as far as a class 3 paystation call is concerned, there is no code number assigned to complete a call to the EMpire-1 exchange.

It will be recalled that in response to a call from either a class 1 or a class 2 line, the translator 1300 functions to register in the coder 1800 the routing digits required to complete the short haul toll call to the desired called exchange and that in response to the registration of the routing digits in the coder 1800 the translation complete relay R810 in the controller 600 portion of the director operated. The operation of the translation complete relay R810 indicates that the functions of the translator 1300 had been completed and that the assigner 1000 should disconnect the translator 1300 from the director. In the present call the translation complete relay R810 is not operated, after the translator 1300 is associated with the director, due to the fact that paystation lines are prohibited from extending calls from the FLorida 3 exchange to the EMpire 1 exchange and due to the fact that the circuit for the relay R810 is not completed.

Referring now to the translator assigner 1000, it will be recalled that the translator test relay R1050 normally operates in series with a translator relay over a circuit which may be traced from ground at the contacts 1031, and then by way of the winding of the translator test relay R1050, the contacts 1052, the wiper 1003, the conductor C1070 extending to Fig. 15, the wiper 1527, the conductor C1223 extending to Fig. 12, the wiper 1202, the conductors C1241, C1242, and C1243 contacts on one of the class relays, and then through a winding of one of the translator relays, to battery. The above-mentioned circuit is only completed when a translator relay has been provided which is individual to the called office code and the class of the calling line. In the present call, however, no translator relay has been provided for a class 3 call from the FLorida 3 exchange to the EMpire 1 exchange, and, therefore, the translator test relay R1050 cannot operate. The contacts 1051 of the relay R1050 remain closed so that the unassigned code relay R1060 will subsequently operate.

The unassigned code relay R1060 is of the slow-to-operate type and on normal calls the translator test relay R1050 operates to disconnect the relay R1060 before it fully operates. In the present call, however, the relay R1060 operates and, at its contacts 1064, completes a locking circuit for itself which is independent of the contacts 1051 of the translator test relay R1050. At its contacts 1063, the relay R1060 connects the grounded winding of the translator test relay R1050 to the conductor C1235 extending to Fig. 12 and which terminates on the terminal T1235A of the terminal block TB1240. The ground potential is further extended by way of the conductor C1235B to the terminal block TB1250 and then by way of the conductor C1235C to the contacts 175 of the operated class 3 auxiliary relay R1330, the conductors C1331, C1331A and C1331B, and the winding of the translator relay R1450, to battery. The relay R1450 and the translator test relay R1050 operate in series over the above-mentioned circuit. The translator relay R1450 is provided to route the call intended for a subscriber in the EMpire-1 exchange to the intercepting operator position.

When the unassigned called office code translator relay R1450 operates, it marks the WXYZ11 code marking conductors in accordance with the digit 5, it marks the WXYZ12 code marking conductors in accordance with the digit 0 and it marks the TD code marking conductors in order to cause the operation of the TD control relay R1875 in the coder 1800.

Referring now to the coder 1800 it will be seen that when the WXYZ11 code marking conductors are marked in accordance with the digit 5 the X11 and Z11 conductors will be grounded thereby to cause the operation of the X and Z relays R1802 and R1804 in the first route digit register of the coder 1800. It will also be seen that the WXYZ12 code markings conductors are marked in accordance with the digit 0 and the Z12 conductor will be grounded to operate the Z12 relay R1808 in the second route digit register of the coder 1800. Finally TD conductor will be grounded to operate the TD control relay R1875 in the coder 1800. The above-mentioned relays, upon operating, are locked to the ground potential applied to the locking ground conductor C787 in the manner previously described. In response to the operation of any one of the relays in the first route digit register, the conductor C884 extending to Fig. 8 will be grounded thereby to cause the operation of the translation complete relay R810 in the controller 600. In response to the operation of the relay R810, at its contacts 811, it interrupts a circuit for the assigner start relay R640 which restores to normal and interrupts the circuit of the assigner test relay R650.

Referring now to the translator assigner 1000 it will be seen that the relay R1030 now restores to normal thereby to interrupt the previously traced circuit for the translator start relay R1010 and the unassigned code relay R1060. As soon as the relay R1060 restores to normal it interrupts the circuit for the operated translator relay R1450 in the translator 1300 which also restores to normal. The translator assigner 1000 is now released and the translator 1300 is made available for translating functions in connection with other calls.

It will be assumed that the paystation subscriber has completed the dialing of the remaining digits of the directory number of the desired called subscriber in the EMpire 1 exchange. As a result of the foregoing, the first, second, third and fourth numerical registers 1610, 1620, 1630 and 1640 of the call register 1500 have registered therein the last four digits or the numerical portion of the directory number. Since the translation operation has been completed, the sender switch 1660 and the sender sequence switch 1650 of the call register 1500 are now in condition to transmit the routing digits registered in the first and second route digit registers of the coder 1800. The detail operations whereby the above-named switches transmit impulses corresponding to the registered route digits have been previously described and need not be repeated. Generally stated, however, the sender switch 1660 will send out five impulses corresponding to the digit 5 registered in the first route digit register and it will then send out the impulses corresponding to the digit 0 registered in the second route digit register of the coder 1800. Since no digits are registered in the third, fourth, fifth and sixth code digit register, the sender sequence switch 1650 will automatically skip these registers and automatically advance its wipers into engagement with the contact 7 in the associated contact banks. The contacts 7 accessible to the wipers 1655 to 1658, inclusive, are marked in accordance with the first code digit 3 of the called office code. However, this digit, as well as all of the remaining digits of the called subscriber directory number, will not be transmitted under control of the sender switch 1660 due to the fact that the TD control relay R1875 is operated and the TC, TB and TA control relays R1880, R1885 and R1890 are in their restored positions. With the above-mentioned control relays in the positions noted, an interrupting circuit will be completed for the send sequence switch 1650 whereby the wipers of the switch are advanced step-by-step over the contacts 7 to 13, inclusive, to skip the seven registers in the call register 1500 and thus prevent transmission of any umpulses corresponding to the digits registered in the respective registers. This automatic stepping circuit for skipping the registers in the call register 1500 is controlled by the ground potential applied to the wiper 1654 and then successively applied, as the wiper is advanced step-by-step from the contact 7 to the contact 13, to the conductors C1837 to C1843, inclusive. These conductors extend to Fig. 18 and terminate in various contacts on the four control relays TA, TB, TC and TD shown in the coder 1800. When ground potential is applied to the conductor C1837 it is extended by way of the contacts 1894 of the unoperated TA control relay R1890 to the skip conductor C1831 extending to Fig. 16 and then by way of the contacts 1652, and the winding of the magnet RM1651, to battery. Therefore, the magnet will operate and interrupt its operating circuit to advance the wipers from the contacts 7 into engagement with the contacts 8. The ground potential is now applied to the conductor C1838 and through the contacts 1893 to the skip conductor C1831 thereby to cause the magnet to step the wipers into engagement with the contacts 9. Ground potential is now applied to the conductor C1839 and then by way of the contacts 1891 and 1887 to the skip conductor C1831 to cause the wipers now to step into engagement with the contacts 10. In positions 10, 11, 12 and 13 the wiper 1654 will successively apply ground potential to the conductors C1840, C1841, C1842 and C1843 through the contacts 1876, 1877, 1878 and 1879 of the operated TD control relay R1875 to the skip conductor C1831 thereby to cause the sender switch 1650 to advance its wipers into engagement with the contacts 14 in the associated contact banks.

When the wiper 1654 engages contact 14, ground potential is applied to the conductor C887 extending to Fig. 8 thereby to cause the operation of the director release relay R780. Operation of the relay R780 controls the director in the manner previously described to restore the same to normal and render it available for additional calls.

Referring now to the primary selector 500, it will be seen that when the director transmits the routing digit 5 under control of the sender switch 1660 the line relay R530 of the primary selector will respond to cause its wipers 563 to 565, inclusive, to be raised step-by-step to a position opposite the fifth level of the associated bank contacts and during the interdigital pause the wipers will rotate over the contacts of the selected level to search for and seize a special second selector, such as the selector 340, all in the manner previously described. The second routing digit 0 is now transmitted by the director to control the special second selector 340 to raise its wipers to the tenth level of its associated bank and to rotate its wipers over the selected tenth level to extend the connection to the intercepting operator position. The special service selector 340 is of the well-known Strowger type and is schematically illustrated in Fig. 3A of the drawings.

When the director is released from the calling line, the director test relay R510 (Fig. 5) is restored to normal thereby to extend the connection from the substation 401, which in the present case is assumed to be a class 3 paystation line, through the primary selector 500, the special second selector 340, and to the intercepting operator position. The operator will answer the call which is extended to her position and inform the subscriber at the paystation telephone that he is not permitted to directly dial subscribers located outside of the local calling exchange area and that the subscriber should hang up and dial the toll operator whose directory number is 0. When the calling subscriber replaces his receiver upon the switchhook of the telephone instrument, the paystation repeater (not shown) will operate to refund the deposited coin and the switching apparatus involved in the intercepted connection will be restored in a conventional manner.

If the subscriber then removes his receiver and dials the single digit "0" assigned to the toll operator, the director will operate in the manner to be described hereinafter to automatically route the call to the toll operator position and the toll operator in turn will complete the connection to the desired called subscriber and control the collecting of the coins at the paystation telephone depending upon the charge to be assessed for a minimum conversation time interval. The last-mentioned operations whereby a call is completed through the medium of a toll operator position is conventional except for the detail operation of the director in response to the dialing of the toll operator single digit directory number 0.

*Dialing a non-existent office code*

In the previous description of the mode of operation of the director it was pointed out that when a paystation line of the class 3 type attempted to complete a connection to an exchange located beyond the local calling exchange area, the call was automatically routed to an intercepting operator position. In the event any subscriber, regardless of the class, attempts to complete a call to a non-existing exchange or an exchange which has not been assigned a code, the director will automatically function in substantially the same manner as has been described in connection with the paystation call to automatically route the call to an intercepting operator position.

More specifically, if a calling subscriber seizes the director in the manner previously described and registers in the first, second and third code registers 1520, 1530 and 1540 of the call register 1500 three digits of the code of a non-existing exchange, the code switch 1100 will respond in the normal manner to raise its wipers in a vertical direction in accordance with the second digit registered in the second code register 1530 and the wipers will be rotated over the contacts of the selected level a number of steps corresponding to the value of the digit registered in the third code register 1540. The particular wiper of the code switch 1100 which is rendered effective is determined by the value of the first digit registered in the first code register 1520. During the period of time that the calling subscriber registers the remaining digits of the numerical portion of the directory number in the numerical registers of the call register 1500, the translator 1300 will be seized in the manner previously described whereby an attempt will be made to complete a circuit to a translator relay, such as the relays R1410, R1420, etc. which has permanently registered therein routing digits for extending the call to the particular called exchange. In the present example, the code of the called exchange dialed by the calling subscriber and registered in the call register 1500 is the code of a non-existing exchange or an unassigned code. Consequently, as soon as the code switch 1100 has been positioned in accordance with the code digits registered in the call register 1500, a circuit will be completed over the selected wiper to one of the 175 conductors terminating in the terminal block TB1250. One of the class relays, such as the relays R1340, R1350 and R1360, will be operated depending upon the particular class of the calling station. The class relay, in turn, will operate one of the three relays R1310, R1320 or R1330 to further extend the circuit to the terminal block TB1395. Since a translator relay is not provided in the translator 1300 which correspond to the unassigned code dialed by the calling subscriber, the translator assigner 1000 cannot release the translator 1300 from the director within the normal period of time required to transfer routing digits of an operated translator relay to the coder 1800. Therefore, the unassigned code relay R1060 in the translator assigner 1000 will operate and complete a circuit whereby the unassigned called office code translator relay R1450 in the translator 1300 will be operated. The detail description for accomplishing the foregoing operations was given in connection with the description of operation of a call from a paystation line of the class 3 type to an exchange outside of the local calling exchange area. The operation of these circuits is substantially the same when any calling subscriber, regardless of the class, dials the code of non-existing called office and will be understood from the previous description.

When the translator relay R1450 operates, the route digits 50 stored therein will be transferred to the coder 1800 in the manner previously explained and the translator assigner 1000 will operate to disconnect the translator 1300 from the director. The director will then send out the digits 50 under control of the sender switch 1690 and the sender sequence switch 1650 to complete the connection to the intercepting operator position; the sender sequence switch 1650 will automatically skip the code and numerical registers of the call register 1500 and the director will disconnect itself from the calling subscriber line, all in the manner previously explained. The intercepting operator may now inform the calling subscriber that he has dialed the code digits of a non-existing exchange or, in some cases, the code may identify an existing exchange but calls cannot be completed thereto under control of the director. In the latter case the intercepting operator will inform the calling subscriber that he should call the toll operator whose directory number is the single digit 0.

In the above description it was pointed out that the code switch 1100 was positioned in accordance with the code digits registered in the second and third code registers of the call register 1500 and that the wiper of the code switch 1100 was selected in accordance with the digit registered in the first code register of the call register 1500. It was also pointed out that after the code switch 1100 was positioned in the manner explained above that a circuit was completed over the selected wiper to one of the 175 conductors terminating in the terminal block TB1250. It should be understood that the 800 terminals in the banks of the Strowger switch 1200 may individually be wired to the terminal block TB1240. It should also be understood that it is only necessary to wire the terminals of the banks of the code switch 1100 which represent assigned codes of exchanges in the telephone system. The terminals in the banks of the code switch 1100 which represent non-existing codes need not be jumpered or wired to the terminal block TB1240. On the other hand, if all 800 terminals are wired to the terminal block TB1240, jumpers, such as the jumpers C1242 and C1235B may be connected to the terminal block TB1240 and to one of the 175 terminals of the terminal block TB1250 which represents the code of an existing exchange. Jumpers to terminals which represent codes of non-existing exchanges will be omitted.

*Calls to "0" toll operator*

From the previous description of the mode of operation of the director and the translator 1300, it will be understood that the translator 1300 is only associated wtih the director in the event that three digits have been registered respectively in the first, second and third code registers of the call register 1500. Consequently, a translator 1300 will not be called into use until at least three digits have been dialed by a calling subscriber. However, when it is necessary to extend a connection to the "0" operator position for the purpose of having the toll operator complete the connection, facilities have been incorporated in the director whereby the translator 1300 will be associated with the calling director in response to the dialing of a single digit 0.

When any calling subscriber, regardless of the class, desires to extend a connection to the "0" operator position, he may do so by dialing the single digit 0. In response to the removal of the receiver from the switchhook of the calling subscriber telephone instrument the line circuit 405, the line finder 440, the primary selector 500, the director hunter 450 and the director will operate in the manner previously described and a dial tone signal will be transmitted to the calling subscriber to indicate that he may dial the single digit 0. When the calling subscriber dials the single digit 0 the rotary magnet RM1521 of the first code register 1520 will advance its wipers step-by-step in the manner previously described to position the wipers in engagement with the contacts 10 in the associated contact banks. At the end of the ten impulses constituting the digit 0 the wiper 1526 of the first code register 1520 will be in engagement with the contact 10 terminating the conductor C891. A ground potential is thus applied to the conductor C891 extending to Fig. 8 and then by way of the contacts 852, 811, 783 and 662 for operating the assigner start relay R640. The translator assigner 1000 will now operate in the manner previously described to find the calling director and it will connect the common translator 1300 to the calling director in the manner previously described.

From the above description it will be seen that the translator assigner 1000 is controlled to find the calling director and to associate the translator 1300 with the calling director as soon as the single digit 0 has been registered in the call register 1500, instead of waiting until three digits have been registered in the three code registers of the call register 1500. As soon as the translator 1300 is associated with the director a circuit will be completed which may be traced from ground at the contacts 1013 (Fig. 10) and then by way of the contacts 1031, the winding of the translator test relay R1050, the contacts 1062, the wiper 1003, the conductor C1070 extending to Fig. 15, the wiper 1527 of the first code register 1520, the conductor C1233 extending to Fig. 12, and the terminal T1235C on the terminal block TB1240. This terminal will be jumpered to one of the 175 terminals of the terminal block TB1250 and then by way of the associated conductor through one of the 175 contacts on one of the three relays R1310, R1320 or R1330 depending upon the class of the calling line and then to a terminal on the terminal block TB1395. This terminal will be cross-connected to a terminal on the terminal block TB1396 individual to a translator relay, such as the translator relays R1410, R1420 etc. The particular translator relay that is selected will operate and will register in the coder 1800 the single digit 0 and it will also operate the TD control relay R1875 in the coder 1800 thereby to cause the sender switch 1660 and the sender sequence switch 1650 to transmit the single routing digit 0 and to then skip all of the registers of the call register 1500 in the manner previously described. The translator 1300 will automatically be disconnected from the director as soon as the information registered therein has been transferred to the coder 1800 in the manner previously described.

It should be mentioned at this time that the translator relay in the translator 1300 which is selected in response to the dialing of the single digit 0 will not be wired to call in the call recorder 2000 and no rate information will be registered in the rate digit registers of the coder 1800. Therefore, it is contemplated that no ticketing information will be required on calls which are to be completed by the "0" toll operator.

When the director has sent out the single digit 0, the primary selector 500 will operate in the manner previously described to raise its wipers to the tenth level of the associated contact banks and will rotate its wipers over the selected level to extend the connection over an idle trunk to the "0" operator position. After the transmission of the tenth impulses constituting the single digit 0, the director will disconnect itself from the connection and thus switch through the calling subscriber line to the "0" operator position in the manner previously described.

*Toll call from the FLorida–3 exchange to the CHase exchange*

All of the exchanges included in the telephone system are identified by a three-digit code comprising the first two letters of the exchange name and a digit identifying the particular exchange. For example, EMpire 1 is identified by the two letters EM and the numerical digit "1." There may be eight other exchanges in the EMpire area which would be identified respectively by the numerical digits "2" to "9" inclusive. In attempting to provide a universal numbering scheme in which all the exchanges in the telephone system may be identified by a three-digit code, it sometimes becomes necessary during the transition period for retaining the old numbering scheme of one or more of the exchanges in the telephone system which may, for example, have a two-digit code designation. The CHase exchange is one of such exchanges which is identified by the two digit code 24, the individual subscriber terminal numbers constituting a four-digit number in accordance with conventional practice.

Assuming that a call extending from the calling subscriber substation 401 (Fig. 4) to the director by way of the line circuit 405, the line finder 440, the primary selector 500 and the director hunter 450 is to be extended to a called subscriber substation in the CHase exchange. The subscriber at the calling station proceeds to dial the directory number of the called substation. The directory number of the called substation comprises a code portion including the digits "24" identifying the called CHase exchange and a numerical portion, including four digits, such, for example, as the digits 7234 identifying the called subscriber line. Accordingly, the subscriber at substation 401 proceeds to dial the first digit 2 thereby to cause the digit to be registered in the first code register 1520 in the manner previously described. The subscriber then proceeds to dial the second digit 4 thereby to cause the second digit to be registered in the second code register 1530 in the manner previously described. The second digit "4" is repeated to the code switch 1100 thereby to raise the wipers thereof to a position opposite the fourth level of the associated contact banks. The subscriber then dials the third digit 7 thereby to cause the third digit to be registered in the third code register 1540 in the manner previously described. The third digit is repeated to the code switch 1100 thereby to cause the code switch 1100 to rotate the wipers over the fourth level of the bank contacts into engagement with the seventh set of contacts in the fourth level. In response to the registration of the first digit 2 in the first code register 1520, the wiper 1527 selects the bank contact terminating the conductor C1222 extending to Fig. 12 thereby to render the wiper 1201 of the code switch 1100 effective to complete the circuit whereby a translator relay corresponding to the code 247 is subsequently operated.

At this point it is noted that the first digit 2 and the second digit 4 respectively registered in the first and second code registers 1520 and 1530 comprise the code portion of the directory number of the called subscriber substation in the CHase exchange, while the third digit "7" registered in the third code register 1540 comprises the first digit of the numerical portion of the called subscriber directory number. The digit 7, that is the thousands of the called number is registered in the register 1540, due to the fact that the code portion of the CHase exchange comprises two digits instead of the normal three digits.

The calling subscriber then proceeds to dial the fourth, fifth and sixth digits of the called subscriber directory number thereby to register the digits 2, 3 and 4 in the respective first, second and third numerical registers 1610, 1620 and 1630. As soon as the third digit 7 is registered in the third code register 1540 the translator assigner 1000 is controlled in the manner previously explained to associate the common translator 1300 with the calling director. As soon as the translator 1300 and the calling director are associated, the previously described test circuit including the winding of the translator test relay R1050 and the conductor C1070 terminating in the wiper 1527 is further extended by way of the conductor C1222, the normal post contacts NP1215 of the code switch 1100, the wiper 1201 and the engaged contact 7, in the fourth level of the associated contact bank, the conductor C1245A, the jumper C1245B, extending to the conductor C1245C. The conductor C1245C is multipled to the contacts 2 of each of the relays R1310, R1320 and R1330. The further extension of the circuit including the conductor C1245C now depends upon the operated condition of one of the above-mentioned relays. The particular relay which is operated is determined by the class of the calling subscriber. In the present example, it will be assumed that the calling subscriber is of the class 1 type and that the relay R1310 is operated in the manner previously described. With the relay R1310 in its operated position, the circuit including the conductor C1245C is extended to the conductor C1245D by way of the contact 2 of relay R1310, to the terminal block TB1395 and then cross-connected, by way of the jumper C1377 to the terminal block TB1396.

It should be noted that the above circuit is further extended from the terminal block TB1395 to contacts on the alternative trunk route relay R1370, instead of being connected from terminal block TB1395 to one of the translate relays, such as the relays R1410, R1420 etc. The alternative trunk route relay R1370 is provided when the system is arranged to extend a connection to a particular called exchange over either one of two routes. Under normal conditions the call is routed over a direct route to the called exchange. However, if all of the direct routes are busy, the alternate trunk route relay R1370 will automatically operate to control the translator so that the call will be extended to the called exchange over a secondary route.

For the purpose of this description it will first be assumed that trunks are available in the direct trunk route to the CHase exchange and that the alternate trunk route relay R1370 is in its restored position. Consequently, the circuit including the jumper C1377 is now extended, by way of the contacts 1371, to the terminal block TB1395 and then, by way of the jumper C1376, to the terminal block TB1396, and the winding of the translator relay R1460, to battery. The translator relay R1460 and the translator test relay R1050 operate in series over the above-traced circuit in the manner previously described. The translator relay R1460 is permanently wired in the manner shown on the drawing (Fig. 14) and it transfers the digit 4 to the first route digit register in the coder 1800 and it transfers the digit 5 to the second route digit register in the coder 1800. In addition to the above, the operated translator relay R1460 transfers the units digit 5 of the rate 05 for the above call to the rate register in the coder 1800; it applies ground potential to the TB and TC conductors thereby to operate the TB and TC control relays R1885 and R1890 in the coder 1800; and it applies ground potential to the ABT conductor thereby to initiate the operation of the call recorder 2000 in the manner previously described. The transfer of the above information by the translator 1300 is accomplished in a short time interval and at the end of the interval, the translator assigner 1000 functions, in the manner previously described, to disconnect the translator 1300 from the calling director thereby to render the translator 1300 available to other calling directors.

The send sequence switch 1650 and the sender switch 1660 in the call register 1500 now operate in the manner previously described to send out impulses corresponding to the digits registered in the first and second route digit registers of the coder 1800. In the present example these route digits are the digits 45. The send sequence switch 1650 will then skip the third, fourth, fifth and sixth route digit registers in the coder 1800 and thereby advance its wipers into engagement with the contacts 7 in the associated contact banks. The operation of the send sequence switch 1650 now depends upon the operated condition of the TD, TC, TB and TA control relays R1875, R1880, R1885 and R1890 in the coder 1800.

Referring now to the coder 1800 it will be seen that in response to the operation of the TC and TB control relays R1880 and R1885 in the manner previously described these relays are locked in their operated positions to the grounded conductor C787 by way of the respective contacts 1881 and 1886. Upon operating, the relay R1880, at its contacts 1882, applies ground potential to the conductor C2167 extending to Fig. 21 thereby to complete a circuit for operating the two-digit code relay R2160 in the call recorder 2000. Furthermore, at its contacts 1883, the relay R1880 connects the conductor C1843 to the skip conductor C1831. The operation of the TB control relay R1885, however, disconnects the conductor C1839 from the skip conductor C1831, at its contacts 1887.

In view of the above, when the wipers of the send sequence switch 1650 are positioned into engagement with the contacts 7 in the associated contact banks, the wiper 1654 applied ground potential to the conductor C1837 extending to Fig. 18 and then by way of the contacts 1894 to the skip conductor C1831 thereby to control the magnet of the send sequence switch 1650 to automatically step the wipers from engagement with the contacts 7 into engagement with the contacts 8. In this manner, the digit 2 registered in the first code register 1520 is skipped by the send sequence switch 1650 thus preventing the transmission of impulses corresponding to the digit registered therein. With the wipers 1654 in engagement with contact 8 ground potential is applied to the conductor C1838 extending to Fig. 18 and then by way of the contacts 1893 to the skip conductor C1831 thereby to again control the stepping magnet of the send sequence switch 1650 to advance its wipers from the contacts 8 into engagement with the contacts 9. In this manner the second code register 1530 is skipped, thus preventing the transmission of impulses corresponding to the digit 4 registered therein.

The wiper 1654 now applies ground potential to the conductor C1839 extending to Fig. 18, but this conductor is disconnected from the skip conductor C1831, at the contacts 1887 of the operated TB control relay R1885. Accordingly, the sender switch 1660 will now transmit seven impulses corresponding to the digit 7 registered in the third code register 1540. It will be recalled that the digit 7 is the first or thousands digit of the numerical portion of the called subscriber directory number and is registered in the third code register 1540 instead of in the first numerical register 1610, due to the fact that the code digits of the called exchange comprise two digits instead of the usual three digits.

After the transmission of the digit 7 the send sequence switch 1650 advances its wipers into engagement with the contacts 10 in the associated contact banks thereby to apply ground potential to the conductor C1840 extending to Fig. 18. This ground potential is not applied to the skip conductor C1831 due to the fact that the TD control relay R1875 is not operated and the contacts 1876 thereof are open. Accordingly, the sender switch 1660 will now transmit the digit 2 registered in the first numerical register 1610 and at the conclusion of the transmission of the digit 2 the send sequence switch 1650 will advance its wipers into engagement with the contacts 11. A ground potential will now be applied to the conductor C1841 extending to Fig. 18, but since the contacts 1877 of the unoperated TD control relay R1875 are open, the skip conductor C1831 will not be grounded at the present time. The sender switch 1660 will now transmit three impulses corresponding to the digit 3 registered in the second numerical register 1620 and, at the conclusion thereof, the send sequence switch 1650 will advance its wipers into engagement with the contacts 12. In this position the wiper 1654 applies ground potential to the conductor C1842 extending to Fig. 18, but due to the fact that the contacts 1888 of the unoperated TD relay R1875 are open, the skip conductor C1831 will not be grounded when the wiper 1654 is in this position. The sender switch 1660 will now transmit the final digit 4 registered in the third numerical register 1630 and, at the conclusion thereof, the send sequence switch 1650 advances its wipers into engagement with the contacts 13. In this position the wiper 1654 now applies ground potential to the conductor C1843 extending to Fig. 18 and then by way of the contacts 1883 of the operated TC control relay R1880 to the skip conductor C1831 thereby to control the magnet of the send sequence switch 1650 to skip the fourth numerical register 1640 by automatically advancing its wipers into engagement with the contacts 14. In position 14 the wiper 1654 of the send sequence switch 1650 applies ground potential to the conductor C887 extending to Fig. 8, thereby to complete the circuit for operating the director release relay R780. In response to the operation of the director release relay R780 the various units of equipment comprising the director will automatically restore to normal in the manner previously described thereby to render the director available for use in the completion of other calls.

Referring now to the call recorder 2000 it should be understood that the two-digit code relay R2160 and the start relay R2230 are operated in accordance with the operated translator relay R1460 in the translator 1300. In reviewing this operation it should be noted that the contacts 30, 31 and 33 are closed in response to the operation of the translator relay R1460 in the translator 1300, whereby the TC and TB control relays R1880 and R1885 in the coder 1800 are operated over the grounded TC and TB conductors and whereby the start relay R2230 in the call recorder 2000 is operated over the grounded ABT conductor. The TC control relay R1880 in the coder 1800, in turn, at its contacts 1882, grounds the conductor C2167 thereby to complete the circuit for operating the two-digit code relay R2160 in the call recorder 2000.

If the call initiated by the calling subscriber at substation 401 is assumed to be from a private line subscriber station arranged for class 1 or class 2 service, the party relays R2010 to R2060, inclusive, in the call recorder 2000 remain in their unoperated positions, it being understood that the above-mentioned party relays are operated sequentially when a second, third or fourth subscriber on a party line extends a call. With the party relays in their restored positions, the detector start relay R2070 operates in response to the operation of the start relay R2230 to initiate the operation of the detector 1900 to search for the calling subscriber line. The detail operations whereby the detector 1900 determines the numerical digits of the directory number of the calling subscriber substation has been previously described and it will be assumed, for the purpose of this description, that the detector 1900 registers the calling station directory number in the WXYZ2 to WXYZ5 code storage relays of the call recorder 2000. Before the call recorder 2000 can perform any additional operations, a signal must be returned by a toll ticket repeater, such as the toll ticket repeater 2300, to indicate to the call recorder 2000 that it may transfer certain stored items of record information to the selected toll ticket repeater.

When the sender switch 1660 of the director transmits the first routing digit 4 to the primary selector 500, the selector will respond in the manner previously described and select an idle toll ticket repeater accessible over the fourth level of the associated primary selector banks. As soon as the toll ticket repeater is seized, a circuit is completed which includes the seizure relay R2410 in the toll ticket repeater 2300 and the code send relay R2140 in the call recorder 2000. The relay R2410 prepares the toll ticket repeater 2300 for further operations whereby the items of record information are transmitted, in code form, from the call recorder 2000 and are successively registered in the code storage register relays, in the toll ticket repeater 2300 under control of the code receiving switch 2610.

The operation of the code send relay R2140 in the call recorder 2000 initiates the operation of the code pulse relay R2159 whereby the code send switch 1950 successively transmits in code form the various items of record information registered in the call recorder 2000 and the call register 1500. The manner in which the various items of information are transmitted from the call recorder 2000 to the toll ticket repeater 2300 has been previously described. However, in the present example, the directory number of the called subscriber substation comprises two code digits and four numerical digits, that is, a total of six digits instead of the normal arrangement wherein the called subscriber directory number comprises seven digits. In order to indicate the fact that the called subscriber directory number comprises six digits, the two-digit code relay R2160 has been operated, as previously noted. At its contacts 2165, the relay R2160 applies ground potential to the X9 conductor terminating in the bank contact 1 accessible to the wiper 1955 of the code send switch 1950. When the wiper 1955 of the code send switch 1950 engages the grounded contact 1, during the cycle of operation whereby the items of information are transferred to the toll ticket repeater 2300, the wiper 2613 of the code receiving switch 2610 in the toll ticket repeater 2300 will also be in engagement with its bank contact 1. The grounded conductor X9 controls the mark relay R2210 and the last-mentioned relay completes a circuit for operating the two-digit code storage relay X9 in the toll ticket repeater 2300. The operation of the two-digit code relay X9 will register the fact that the directory number of the called subscriber substation is a six-digit number instead of a seven-digit number.

As a further result of the operation of the two-digit code relay R2160, at its contacts 2162, 2163 and 2164, it performs a switch-over operation whereby the conductor C986 is disconnected from contact 15, accessible to wiper 1953 of the code send switch 1950, and the conductor C972 has ground potential removed therefrom and is connected to the contact 15 accessible to the wiper 1953. The conductors C986 and C972 extend to Fig. 9 where they terminate respectively in the contacts 991 and 961 of the relays R990 and R960.

Since the call being described is a six-digit call, the relay R960 will be operated as soon as the sixth digit 4 of the called subscriber number has been registered in the third numerical register 1630 of the call register 1500. Since there is no seventh digit dialed, the fourth numerical register 1640 will not be operated and the associated fourth numerical send relay R990 will remain in its unoperated position. Accordingly, it is necessary to prevent the director from sending out the last digit of the called subscriber directory number until the call recorder 2000 has transferred all of the items of information to the ticket repeater 2300. In the case of a six-digit number the director is prevented from sending out the last digit of the called subscriber number until the previously noted conductor C972 has ground potential applied thereto. This ground potential is not applied to the conductor C972 until the wiper 1953 engages the contact 15 during the third cycle of rotation of the code send switch 1950. When this occurs the conductor C972 is grounded in substantially the same manner as has been described hereinbefore in connection with the operations of the director on a seven-digit call and in response to the application of ground to the conductors C972, the sender switch 1660 of the director will send out four impulses corresponding to the digit 4 registered in the third numerical register 1630. After the last digit 4 has been transmitted by the sender switch 1660, the send sequence switch 1650 then takes an additional step and thus causes the director to release in the manner previously described.

Finally, in response to the operation of the two-digit code relay R2160, ground potential is applied, at the contacts 2161, to the contacts 11 to 14 accessible to the wiper 1952 of the code send switch 1950. This ground potential is maintained on the contacts noted of the code send switch 1950 in order to maintain an operating circuit for the code pulse relay R2159 so that the code send switch 1950 and the code receiving switch 2610 in the ticket repeater 2300 may be simultaneously controlled to advance their wipers over the contacts noted. On a seven-digit call, ground potential is maintained on the conductor C987 in response to the operation of relay R990. Since no digit has been stored in the fourth numerical register 1640 of the call register 1500 on a six-digit call, the relay R990 is in its restored position and it is necessary to provide the contacts 2161 on the relay R2160 in order to complete the operations of the code send switch 1950.

The various items of information transferred from the call recorder 2000 to the code storage relays in the toll ticket repeater 2300 during the synchronous stepping of the wipers of the code send switch 1950 and the wipers of the code receiving switch 2610 are as follows:

| Code Send Switch 1950 | to Code Receiving Switch 2610 | Code Storage Designation | Information Transferred |
|---|---|---|---|
| Wiper 1954: | Wiper 2612: | | |
| 1 | 1 | W6 | Identity of director tens digit "1." |
| 2 | 2 | X6 | |
| 3 | 3 | Y6 | |
| 4 | 4 | Z6 | |
| 5 | 5 | W7 | Identity of director units digit "2." |
| 6 | 6 | X7 | |
| 7 | 7 | Y7 | |
| 8 | 8 | Z7 | |
| 9 | 9 | W8 | Class of calling line: Class 1, if not grounded; class 2, if grounded. |
| 10 | 10 | W17 | Charge rate units digit "5." |
| 11 | 11 | X17 | |
| 12 | 12 | Y17 | |
| 13 | 13 | Z17 | |
| 14 | 14 | W21 | Called station directory No., 1st digit "2." |
| 15 | 15 | X21 | |
| 16 | 16 | Y21 | |
| 17 | 17 | Z21 | |
| 18 | 18 | W22 | Called station directory No., 2nd digit "4." |
| 19 | 19 | X22 | |
| 20 | 20 | Y22 | |
| 21 | 21 | Z22 | |
| 22 | 22 | W23 | Called station directory No., 3rd digit "7." |
| 23 | 23 | X23 | |
| 24 | 24 | Y23 | |
| 25 | 25 | Z23 | |
| 26 | 26 | | Stepping pulse. |
| Wiper 1955: | Wiper 2613: | | |
| 1 | 1 | X9 | Six digit called No.: 7 digit No., if not grounded; 6 digit No., if grounded. |
| 2 | 2 | X10 | Detector failure, if grounded. |
| 3 | 3 | Y18 | Charge rate: Tens digit "0," if not grounded; tens digit "1," if grounded. |
| 4 | 4 | W1 | Calling station directory No., 3rd digit. |
| 5 | 5 | X1 | |
| 6 | 6 | Y1 | |
| 7 | 7 | Z1 | |
| 8 | 8 | W2 | Calling station directory No., 4th digit. |
| 9 | 9 | X2 | |
| 10 | 10 | Y2 | |
| 11 | 11 | Z2 | |
| 12 | 12 | W3 | Calling station directory No., 5th digit. |
| 13 | 13 | X3 | |
| 14 | 14 | Y3 | |
| 15 | 15 | Z3 | |
| 16 | 16 | W4 | Calling station directory No., 6th digit. |
| 17 | 17 | X4 | |
| 18 | 18 | Y4 | |
| 19 | 19 | Z4 | |
| 20 | 20 | W5 | Calling station directory No., 7th digit. |
| 21 | 21 | X5 | |
| 22 | 22 | Y5 | |
| 23 | 23 | Z5 | |
| 24 | 24 | W24 | Called station directory No., 4th digit "2." |
| 25 | 25 | X24 | |
| 26 | 26 | | Stepping pulse. |
| Wiper 1956: | Wiper 2614: | | |
| 1 | 1 | Y24 | Called station directory No., 4th digit "2." |
| 2 | 2 | Z24 | |
| 3 | 3 | W25 | Called station directory No., 5th digit "3." |
| 4 | 4 | X25 | |
| 5 | 5 | Y25 | |
| 6 | 6 | Z25 | |
| 7 | 7 | W26 | Called station directory No., 6th digit "4." |
| 8 | 8 | X26 | |
| 9 | 9 | Y26 | |
| 10 | 10 | Z26 | |
| 11 | 11 | W27 | Called station directory No., 7th digit (if 7 digit No.). |
| 12 | 12 | X27 | |
| 13 | 13 | Y27 | |
| 14 | 14 | Z27 | |

As soon as the called subscriber answers the call, the toll ticket repeater 2300 will be controlled in the manner previously described to initiate the operation of the timing equipment in the toll ticket repeater 2300 whereby the timing of the conversation will commence. At the In response to the transfer of the last item of information from the call recorder 2000, the sender switch 1660 is controlled in the manner noted above to send out the four impulses of the last switch setting digit 4 registered in the third numerical register 1630 thereby to control the connector or final selector to select the called subscriber line. The director and its various units of equipment, including the call recorder 2000, will then release in the manner previously described, thereby to transfer the connection of the calling subscriber line from the director to the primary selector in order to complete the connection to the called subscriber line.

end of the conversation, the release of the connection by the calling and the called subscribers will terminate the operation of the timing equipment thereby to register in the toll ticket repeater 2300 the units, tens and hundreds digits indicative of the elapsed conversation time. Finally, the toll ticket repeater 2300, although disconnected from the switching apparatus involved in the connection, is maintained busy until the various items of information stored therein may be transferred to the tabulator 2800. The manner in which the tabulator allotter 2801 associates an idle tabulator, such as the tabulator 2800, with the toll ticket repeater 2300 has been previously explained. Furthermore, upon the association of the tabular 2800 with the ticket repeater 2300 the various items of information stored in the toll ticket repeater 2300, including the conversation time, will now be transferred from the toll ticket repeater 2300 to the tabulator 2800 and stored in the various code storage register relays provided in the tabulator 2800. When the transfer of information has been completed, the toll ticket repeater 2300 restores to normal and is again made available for additional calls. Finally, the tabulator 2800 will control the ticket tape punch mechanism 2968 and the record tape punch mechanism 2967 to produce records of the various items of information stored in the code storage register relays of the tabulator 2800 on perforated tapes. The operation of the translator 2800 and the tape punch mechanisms to produce the perforated tapes containing the various items of information stored in the tabulator 2800 has been described.

Referring now to Fig. 3A of the drawings, a description will now be given of the above call as it is set up under control of the director to a called subscriber substation in the CHase exchange. When a calling subscriber in the FLorida 3 exchange removes his receiver, the connection is automatically completed by way of one of the line circuits 405A to 405D, depending upon the class of the calling line, to the finder 440A and then by way of the primary selector 500A, the director hunter 450A to the director 300A. The calling subscriber now dials the directory number of the called subscriber in the CHase exchange which, in the present example, is assumed to be CHase 7234. Accordingly, the digits 24-7234 are registered in the director 300A and in response to the registration of the first three digits, the translator 1300A is automatically associated with the director and translates the digits 247 into the digits 45 which are stored in the first and second route registers of the coder 1800. Also, the translator 1300A indicates to the director 300A that in setting up the connection it should transmit first and route digits 45 and then the last four digits of the called subscriber directory number, that is, the digits 7234. The translator 1300A also calls in the call recorder 2000A which, in turn, causes the detector 1900A to identify and register in the call recorder 2000A, the last five digits of the calling subscriber directory number.

The director transmits the switch setting impulses corresponding to the routing digits 45 and the last four digits of the called subscriber directory number, namely, the digits 7234. In response to the first digit 4, the primary selector 500A selects an idle toll ticket repeater, such as the toll ticket repeater 2300A. The ticket repeater selector 2700A is individually associated with the toll ticket repeater 2300 and, in response to the transmission of the second digit 5, the ticket repeater selector selects an idle repeater, such as the repeater 379 extending to the CHase exchange. As soon as the toll ticket repeater 2300A is selected in the above-described manner, it transmits a signal to the call recorder 2000A and, thus, initiates the operation of the call recorder to transfer to the toll ticket repeater the various items of information pertaining to the connection. The next digit 7 transmitted by the director over the primary selector 500A, the toll ticket repeater 2300A and the toll ticket repeater selector 2700A to the repeater 379 is now repeated over the interconnecting toll line to the repeater 380 in the CHase exchange thereby to operate the incoming selector 381 to select an idle local selector in the seventh level, such as the local selector 374. The remaining digits 2, 3 and 4 are transmitted by the director over the above-described path whereby the digit 2 controls the local selector 374 to select an idle connector, such as the connector 375, and the digits 34 control the connector 375 to complete the connection to the called subscriber substation 378, whose directory number is assumed to be CHase 7234.

During the setting up of the connection, the call recorder 200A has transferred all of the items of information to the toll ticket repeater 2300A and when the connection is completed to the called subscriber line, the director 300A and the call recorder 2000A are released from the connection and rendered available for additional calls. The talking path between the calling and the called subscriber substations is extended through the finder 440A, the primary selector 500A, and then by way of the toll ticket repeater 2300A and the previously described path to the called line. The remaining operations including the release of the connection and the control of the toll ticket repeater 2300A, the tabulator 2800A, and the record and ticket tape punch mechanisms 2967 and 2968 is the same as has been previously described.

The above-described connection between the calling subscriber in the FLorida 3 exchange and the called subscriber in the CHase exchange was established over a direct trunk route between the two exchanges. It will now be assumed that all of the trunks in the direct trunk route between the two exchanges are busy. In the event that all of the trunks in the direct trunk route between the two exchanges are busy, the connection will automatically be extended over an idle trunk in an alternative trunk route which may involve several exchanges in tandem. In the present system, if all of the direct trunks from the FLorida 3 exchange to the CHase exchange are busy, the translator 1300A will automatically control the director 300A to route the call over an alternative trunk route to the CHase exchange. For example, if there are ten direct trunks to the CHase exchange, ten repeaters, such as the repeater 379, will be accessible over the fifth level of the ticket repeater selector 2700A. As long as an idle trunk is available, the translator 1300A will register in the director 300A routing digits for selecting one of the idle trunks in that direct trunk group. However, when all of the trunks in this group are busy at the time a translator is controlled to register the routing digits in the director, the translator will automatically be informed of the busy condition and will register routing digits in the director corresponding to the alternative trunk route to the CHase exchange.

Referring now to the translator 1300 (Fig. 13) it will be seen that the alternative trunk route relay R1370 is normally connected to the conductor C1315, which conductor extends to a chain circuit of outgoing repeaters, such as repeater 379. For the purpose of this description it will be assumed that the chain circuit includes make contacts in each of the ten outgoing repeaters of the direct trunks extending to the CHase exchange. In other words, the ten repeaters, such as the repeater 379, each include a relay having a pair of make contacts which are closed as soon as the associated repeater is busy and when all of the ten repeaters are busy, a ground potential will be applied to the conductor C1315 thereby to complete an operated circuit for the alternative trunk route relay R1370. In this manner the relay R1370 will be operated when a trunk to the CHase exchange is not available in the direct trunk route and will thereby indicate to the translator 1300 that the next call to be extended to the CHase exchange must be complete over the alternative trunk route.

If it is assumed that the previously described call to the CHase exchange has been registered in the director 300A and that the translator 1300A has been called into use, the previously described circuit, whereby the translator relay R1460 was operated, will now be transferred, due to the fact that all of the direct trunks to the CHase exchange are busy, to the translator relay R1430. More specifically, the operated alternative trunk route relay R1370, at its contacts 1371 and 1372, disconnects the translator relay R1460 and connects the translator relay R1430. Accordingly, when the first three digits are registered in the first, second and third code registers of the call register 1500, the code switch 1100 will operate in the manner previously described to select the seventh contact in the fourth level of the bank accessible to the wiper 1201 and it will complete the circuit for operating the translator relay R1430, it being assumed that the calling subscriber is of the class 1 type.

The alternative trunk route relay R1370, at its contacts 1373, locks itself to the grounded chain conductor C1315, but as soon as the translator 1300 is seized and the relay R1380 operates in response to the seizure, the relay R1370 completes a locking circuit for itself which includes the contacts 1382 and 1374. In this manner the busy condition of the direct trunks to the CHase exchange will be maintained in the translator 1300 even though one or more of the direct trunks may become available immediately after the seizure of the translator 1300.

In view of the foregoing it will be seen that when a class 1 subscriber in the FLorida 3 exchange dials the directory number 24–7234 of a called subscriber in the CHase exchange, the alternate trunk route translator relay R1430 will be operated instead of the direct trunk translator relay R1460. The terminal block individually associated with the translator relay R1430 will be permanently wired in accordance with the routing digits 48776 and the units digit 5 of the rate 05 assigned for calls between the FLorida 3 exchange and the CHase exchange. The translator relay R1430 will also be permanently wired to ground the TB and TC control conductors and the ABT control conductor. With the translator relay R1430 permanently wired in the above-described manner the routing digits 48776 will be transferred, in the manner previously described, thereby to operate the first, second, third, fourth and fifth route registers WXYZ11 to WXYZ15, inclusive, in the coder 1800, to register respectively the digits 48776. The rate units digit 5 will be registered in the rate digit register WXYZ17 of the coder 1800; the TB and TC control relays R1885 and R1880 will be operated over the TB and TC conductors; and finally the ground potential applied to the ABT conductor will operate the start relay R2230 in the call recorder 2000 in the manner previously described.

All of the operations which have been described in connection with the calls from the FLorida 3 exchange to the CHase exchange over a direct trunk route are the same for the present call except that the director will first transmit the routing digits 48776 registered in the route digit registers of the coder 1800 instead of the digits 45. The TB and TC control relays R1885 and R1880 will then cause the sender switch 1660 to send out the digits 7234, comprising the numerical portion of the called subscriber directory number, registered in the call register 1500. Accordingly, it will be seen that in order to complete a connection over an alternate trunk route from a subscriber in the FLorida 3 exchange to a called subscriber in the CHase exchange, the director will transmit impulses corresponding to the digits 48776–7234.

Referring now to Fig. 3A of the drawings, it will be assumed that the director 300A transmits the first routing digit 4 to the primary selector 500A and that the primary selector 500A selects the toll ticketing repeater 2300A and associated ticket repeater selector 2700A in the manner previously described. The operations of the call recorder 2000A and the toll ticket repeater 2300A in transferring the information pertaining to the connection will now take place, as previously described. The second routing digit 8 transmitted by the director 300A now operates the ticket repeater selector 2700A to select an idle repeater, such as the repeater 305A terminating a trunk to the EMpire 1 exchange. The third routing digit 7 transmitted by the director 300A will be repeated by the repeater 305A over the interconnecting toll line 335 to the repeater 290 and to the incoming toll selector 205 in the EMpire 1 exchange. The selector 205 will respond to the third routing digit 7 and will select an idle outgoing repeater, such as the repeater 285, terminating a toll line to the STate 8 exchange. The fourth routing digit 7 transmitted by the director 300A over the above-traced path to the repeater 285 is repeated over the toll line to the STate 8 exchange, and the repeater 376 in the STate 8 exchange repeats the fourth digit 7 to the incoming toll selector 377. In response to the digit 7 the toll selector 377 selects an idle selector, such as the selector 368, in the STate 8 exchange. The director 300A now transmits the fifth routing digit 6 over the above-traced path to the selector 368 which, in response to the digit 6, selects an outgoing repeater, such as the repeater 371 extending to the CHase exchange. The director 300A now transmits the first digit 7 of the numerical portion of the called subscriber directory number, registered in the third code switch 1540 of the call register 1500, over the above-traced path to the repeater 371 in the STate 8 exchange. The digit 7 is repeated by the repeater 371 over the interconnecting toll line to the CHase exchange and the repeater 372 in the CHase exchange repeats the digit 7 to the selector 373. In response to the digit 7 the selector 373 selects an idle selector, such as the selector 374. The director 300A now transmits the second digit 2 of the numerical portion of the called subscriber directory number, registered in the first numerical register 1610 of the call register 1500, over the above-traced path to the selector 374 in the CHase exchange. In response to the digit 2 the selector 374 selects an idle final selector, such as the final selector or connector 375. The director 300A now transmits the last two digits 34, registered in the second and third numerical registers 1620 and 1630 of the call register 1500, over the above-traced path to the connector 375 in the CHase exchange. In response to the digit 3 the connector 375 raises its wipers to the third level of the associated contact banks and, in response to the final digit 4, the connector 375 selects the fourth set of contacts in the third level terminating the line of the called subscriber substation 378. The connector 375 now automatically operates to ring the called subscriber substation 378, whose directory number is CHase 7234. The director 300A and call recorder 2000A are released from the connection, in the manner previously described, and the talking connection between the calling and the called subscriber are completed over the above-traced path, excluding the disconnected director 300A and associated apparatus.

The various items of information pertaining to the connection which are registered in the toll ticket repeater 2300 involved in the connection are identical to the items of information which are stored in the repeater when the call is completed over a direct trunk to the CHase exchange. More specifically, insofar as the recording apparatus is concerned, there is no indication as to whether the call is completed over a direct trunk route or an alternative trunk route to the desired called exchange. Consequently, if the conversation time for the call is the same, the charge for the connection, whether completed over a direct trunk or an alternative trunk route, will be the same. The release of the connection and the control of the tabulator 2800A for the purpose of perforating tapes containing a record of the completed toll call, is the same as has been previously described and will not be repeated at this time.

Before concluding the description of operation of the apparatus to set up a call between a subscriber in the FLorida 3 exchange and a subscriber in the CHase exchange, it should be understood that if the call originates at a class 1 subscriber substation, that is a substation provided with extended service facilities, the class 1 relay in the translator 1300 will be operated in the manner explained so that the translator relay R1460 will be operated to register the proper routing digits in the coder 1800 and to register the charge rate 05 for the call, which may be less than the charge rate which is applied to the same call when it originates at a class 2 subscriber substation arranged for regular service. Thus, a different translator relay, such as the relay R1460, will be selected if the call originates at a class 2 calling subscriber substation which relay will register the same information in the coder 1800 as relay R1460 except that the charge rate may be 06 instead of 05. Furthermore, an additional translator relay, such as relay R1430, will be provided for alternative trunk routing between the FLorida 3 exchange and the CHase exchange and it will be individually selected if all direct trunks to the CHase exchange are busy when the call originates at a class 2 calling subscriber substation.

*Failure to dial*

In order to describe the operation of the apparatus in the event that a subscriber initiates a call but fails to dial any digits after the seizure of the equipment, it will be assumed that a calling subscriber in the FLorida 3 exchange has extended a call to the director 300A in the manner previously described. The dial tone signal is transmitted to the calling subscriber as a signal that the dialing of the called subscriber number shall be started.

Referring now to the code switch 1100 (Fig. 11) it will be seen that when the line relay R1140 operates over the calling subscriber line and causes the operation of the hold relay R150, impulses, at the rate of twelve per minute, will be transmitted over the conductor C1135, the contacts 1153, the wiper 1192 and engaged contact 1, and the winding of the minor switch stepping magnet RM1194, to battery. Consequently, the rotary magnet RM1194 of the timer 1190 will operate and restore in response to each time pulse transmitted over the conductor C1135. At the end of 15 seconds, that is the third pulse, the wiper 1191 of the timer 1190 applies ground potential to the conductor C1196 extending to Fig. 6 and then by way of the contacts 621 and 992, and the winding of the fault seizure relay R770, to battery. The fault seizure relay R770 now operates and locks itself, at its contacts 722, to ground at contacts 752. Upon operating, the relay R770, at its contacts, 771, interrupts the pulsing circuit over which the impulses of the dialed digits are normally registered in the call register 1500; at its contacts 773, it completes a circuit by way of the contacts 811, 783 and 662 for operating the assigner start relay R640; at its contacts 774 and 775 it disconnects the dial tone signal and prepares a point in the circuit for transmitting a busy tone signal to the calling subscriber; and finally, at its contacts 776, it completes a circuit for illuminating the fault seizure lamp 666 thereby to signal the exchange attendant that the director has been falsely seized.

In response to the operation of the assigner start relay R640 the translator assigner 1000 will automatically operate and associate the common translator 1300 with the calling director in the manner previously described thereby to prepare a circuit for operating one of the translator relays, such as the relay R1410, R1420, etc. Accordingly, a circuit will be completed from the translator assigner 1000 by way of the grounded contacts 1013 ad 1031, the winding of the translator test relay R1050, the contacts 1062, the wiper 1002, the conductor C1070 extending to Fig. 15 thereby to apply a ground potential to the wiper 1527 of the first code register 1520.

Inasmuch as the calling subscriber has failed to dial any digits, the wiper 1527 will be in engagement with its home contact position and the ground potential applied to the wiper 1527 will be extended over the conductor 1234 to the terminal T1235B on the terminal block TB1240 (Fig. 12). This terminal will be jumpered in the manner previously explained to the terminal block TB1250 and then by way of the contacts on one of the operated auxiliary class relays R1310, R1320 or R1330 to complete an operating circuit for one of the translator relays in the translator 1300. This particular translator relay is wired and arranged to transfer to the route digit registers of the coder 1800 the routing digits 50 whereby the sender switch 1660 of the director will automatically route the call to the intercepting operator position. The trunks at the intercepting operator position may be divided so that the intercepting operator will be informed as to the particular fault that has caused the call to be routed to her position. More specifically, one group of trunks terminating at the intercepting operator position may be assigned for use to intercept calls on which unassigned codes are dialed by the calling subscriber as previously noted and another group of trunks may be used for intercepting calls in which the calling subscriber has failed to dial any digits.

As soon as the translation has been completed and the routing digits have been registered in the coder 1800, the translation completion relay R810 is operated in the manner previously explained and a busy tone signal will be transmitted by way of its contacts 812 to the calling subscriber thus indicating to the calling subscriber that he should release the connection. If the calling subscriber fails to release the connection the director will continue its operation whereby the call will be extended, in the manner noted above, to the intercepting operator position. After the director has extended the call to the intercepting operator position, it will automatically release, in the manner previously described, under control of the operated director release relay R780 thereby to complete the connection between the calling subscriber substation and the intercepting operator position.

*Dialing an incomplete called number*

In the foregoing description of operation it was assumed that a calling subscriber failed to dial any digits after the director was seized. As a result thereof, the director transmitted a busy signal to the calling subscriber. If the calling subscriber failed to then release the connection, the call was automatically routed to an intercepting operator position. It will now be assumed that the calling subscriber has dialed the three code digits of a called exchange and that these digits have been registered in the first, second and third code registers 1520, 1530 and 1540 in the manner previously explained. In response to the registration of the three code digits of a called exchange, the translator assigner 1900, the translator 1300, the coder 1800 and the code switch 1100 of the seized director will operate in the manner previously explained whereby the route digits required to extend the call will be registered in the coder 1800. Furthermore, it will be assumed that the calling subscriber fails to dial one or more of the remaining numerical digits of the called subscriber directory number.

Referring again to the code switch 1100 (Fig. 11) it will be seen that at the end of approximately 15 seconds, the timer switch 1190 will have positioned its wiper 1191 into engagement with the contact terminating the conductor C1196 as previously noted. However, the previously described circuit for operating the fault seizure relay R770 is not completed in response to the present call due to the fact that at least one digit has been dialed by the calling subscriber and registered in the director. More specifically, in response to the first pulse of the first digit dialed, the line relay R1140 restores, and at its contacts 1141, it completes a circuit for operating the digit relay R1160. The relay R1160, upon operating, completes, at its contacts 1161, a circuit for operating the sequence control relay R830. The relay R830 upon operating, completes, at its contacts 832, a circuit for operating the tone control relay R620. The relay R620 upon operating, interrupts, at its contacts 621, the circuit over which the fault seizure relay R770 is operated at the end of approximately 15 seconds. Accordingly, the fault seizure relay R770 will not operate under control of the timer 1190 at the end of approximately 15 seconds, provided one or more impulses have been transmitted to the director.

Referring again to the code switch 1100 (Fig. 11) it will be seen that at the end of approximately 30 seconds, the timer switch 1190 will have positioned its wiper 1191 into engagement with the contact terminating the conductor C1197. The ground potential applied to the conductor C1197 will now be extended over the previously traced circuit in order to operate the fault seizure relay R770. This relay upon operating will immediately transmit a busy tone signal to the calling subscriber line inasmuch as the translation of the called office code has been completed and the translation complete relay R810 is now in its operated position. The circuit for transmitting the busy tone signal to the calling subscriber line may be traced from the busy tone conductor C836 and then by way of the contacts 812 and 774, the conductor C1136 extending to Fig. 11, condenser 1133 and then by way of the conductor C472 to the calling subscriber in the manner previously explained. The calling subscriber will now replace his receiver upon the switchhook of his associated telephone instrument, thereby interrupting the circuit of the line relay R1140. The relay R1140 will interrupt the circuit of the hold relay R1150 and upon releasing the relay R1150, at its contacts 1151, interrupts a circuit over conductor C1137 extending to Fig. 7 thereby to cause the restoration of the seizure relay R750. Upon restoring, the seizure relay R750 terminates further sending out of switch setting impulses by the director and completes the circuits for the director release relay R780 whereby the various operated relays and apparatus in the call register 1500, the code switch 1100, the coder 1800 and the controller 600 are restored to normal in the manner previously explained.

From the foregoing description of operation it will be understood that when the calling subscriber has dialed the first three code digits of the called subscriber number, the director will operate in a normal manner in attempting to complete the connection. However, if the subscriber fails to dial one or more of the remaining digits of the numerical portion of the called subscriber number within approximately 30 seconds, a busy tone signal will be automatically transmitted to the calling subscriber and the director and associated equipment will be automatically restored to normal as soon as the calling subscriber replaces his receiver upon the switchhook of his associated telephone instrument.

*Calling information operator position "113"*

For the purpose of this description it will be assumed that the calling subscriber has extended a call to the director in the previously described manner and has registered in the code registers of the call register 1500 portion of the director the digits "113" of the directory number of the information operator position. In response to the registration of the first digit 1 in the first code register 1520 the wiper 1527 thereof will be positioned into engagement with the contact 1 terminating the conductor C1221 extending to Fig. 12 and terminating in the contact NP1214 of the normal post springs of the code switch 1100. In response to the registration of the second digit 1 in the second code register 1530, the code switch 1100 will be controlled in the manner previously explained whereby the vertical magnet VM1210 positions the wiper one step in the vertical direction opposite the contacts in the first level. As soon as the wipers 1201 to 1208, inclusive, of the code switch 1100 are raised in a vertical direction, the contacts NP1215 are opened and the contacts NP1214 are closed thereby to transfer the wiper 1201 of the code switch 1100 from the circuit including the conductor C1222 to a circuit including the above-mentioned conductor C1221. In response to the registration of the third digit 3 in the third code register 1540 the rotary magnet RM1211 of the code switch 1100 will be operated three times in the manner previously explained thereby to rotate the wipers of the code switch into engagement with the third set of contacts in the first level.

At the end of the dialing of the third digit, the receiving sequence switch 1510 in the call register 1500 will position the wiper 1515 into engagement with the contact 3 in the associated contact bank and thus complete a circuit over the conductor C891 extending to Fig. 8 for operating the assigner start relay R640 in the manner previously explained. The assigner start relay R640 will initiate the operation of the translator assigner 1000 whereby the common translator 1300 will be automatically associated with the calling director in the manner previously explained. As soon as the association is completed, a circuit is completed over the conductor C1070 from the translator assigner 1000 and then by way of the wiper 1527 of the first code register 1520 the engaged contact 1, the conductor C1221 extending to Fig. 11, the normal post contacts NP1214, to the wiper 1201 which is now in engagement with the third contact in the first level of the associated contact bank.

This terminal in the bank of the code switch 1100 will be jumpered by way of terminals on the terminal block TB1240 and TB1250, to a contact of one of the auxiliary class relays R1310, R1320 or R1330. Depending upon the class of the calling subscriber line, one of the above-mentioned relays will be operated thereby to further extend the above-traced circuit by way of the terminal block TB1395 and TB1396 to a translator relay, such as the translator relays R1410, R1420, etc., which relay is wired in accordance with the routing digits necessary to route a call to the information operator position "113." Consequently, the above-mentioned circuit including the translator test relay R1050 in the translator assigner 1000 and the selected translator relay, wired and arranged in the manner noted above, will be operated in the manner previously described. In response to the operation of the translator relay the routing digit 5 will be registered in the first route digit register of the coder 1800 and the routing digit 3 will be registered in the second route digit register of the coder 1800. The remaining route digit registers 3 to 6, inclusive, will be unoperated since in the present call only the digits 53 are required to route the call from the calling subscriber line to the information operator position.

The units digit rate register of the coder 1800 will not be operated since no charge is to be made for connections extended to the information operator. Finally, the operated translator relay in the translator 1300 will ground the TD conductor extending to the coder 1800 thereby to complete an operating circuit for the TD control relay R1875. With the TA, TB and TC control relays R1890, R1885 and R1880 in their restored positions and the TD control relay R1875 in its operated position, the coder 1800 will control the send sequence switch 1650 of the call register 1500 to skip the seven registers of the call register 1500 and thus prevent the transmission of impulses corresponding to the digits dialed by the calling subscriber and registered in the registers noted.

Consequently, the send sequence switch 1650 and the sender switch 1660 will cooperate in the manner previously explained thereby to transmit impulses corresponding to the digit 5 registered in the first route digit register of the coder 1800; then to transmit the digit 3 registered in the second route digit register of the coder 1800; and then to skip all of the remaining route digit registers in the coder 1800, and all of the remaining registers in the call register 1500. In other words, the send sequence switch 1650 in positions 2 and 3 will transmit respectively the digits 53 stored in the coder 1800. In positions 4 to 13, inclusive, the send sequence switch 1650 is self-interruptedly operated thereby to successively step the wipers over the associated contact banks into engagement with the contacts 14. In position 14 the wiper 1654 completes a circuit for operating the director release relay R780 thereby to release the director and its associated equipment from the established connection in the manner previously explained. It may be well to mention at this time that since no record is to be made of the call being described, the selected translator relay in the translator 1300 will not be wired to ground the ABT conductor extending to the call recorder 2000. Consequently, the call recorder 2000 and the detector 1900 will not be utilized in calls which are to be completed to the information operator position "113."

When the director has completed its operations and has released from the established connection, the calling subscriber line will be extended through the calling subscriber line circuit, such as the line circuit 405, the line finder 440, the primary selector 500 in engagement with the fifth level, the special second selector 340 in engagement with the third level and then over an idle trunk in the third level to the information operator position "113." As soon as the information operator answers the call the connection between the calling subscriber and information operator position will be completed, and when the calling subscriber has obtained the necessary information, the connection will be released in the usual manner.

*Calling the long distance operator position "110"*

In the event that a calling subscriber should desire to establish a long distance toll call which cannot be completed over the telephone network by means of the director equipment provided in the calling exchange, the calling subscriber dials the digits "110" of the directory number of the long distance operator position. The establishment of a call from the calling subscriber line to the director on this type of call is substantially the same as has been described in connection with a call to the information operator position "113." In this case, however, the digits 110 are registered respectively in the first, second and third code registers 1520, 1530 and 1540 of the call register 1500. The code switch 1100 is operated in the same manner as has been previously explained whereby the selected wiper 1201 (selected by the first digit 1) is positioned into engagement with the tenth contact in the first level of the associated contact bank. At the end of the registration of the third digit 0 the previously described circuit will be completed, regardless of the class of service of the calling subscriber line, to a translator relay, such as the relay R1410, R1420, etc., in the translator 1300. This translator relay will be wired in the same manner as the translator relay required for routing calls to an information operator position except that it will be wired to register the routing digit 9 in the coder 1800 instead of the digits 53.

In view of the foregoing it should be understood that the director will transmit impulses corresponding to the digit 9 and then will skip all of the remaining route digit registers in the coder 1800 and all of the registers in the call register 1500 in the manner previously explained. The director will be released from the connection and the calling subscriber line will be connected through to the long distance operator position "110" over the 9th level of the primary selector 500A. The long distance operator will complete the connection over the usual long line toll trunks in the well known manner.

*Detector failure*

In response to a short haul toll call requiring ticketing, the call recorder 2000 is called into use by the operation of the start relay R2230 over the ABT conductor C2242. It will be understood from the previous description of operation that the conductor C2242 is grounded in response to the operation of a translator relay in the translator 1300, which relay is selected in accordance with the three digits of the called office code.

In addition to the above, it will be understood from the previous description of operation of the call recorder 2000 that the six call party identifying relays R2010 to R2060, inclusive, remain in their restored positions when the calling subscriber substation is an individual line of any class, or is the first station on a four-party line; that relays R2010 and R2020 are operated if the calling subscriber substation is the second station on a four-party line; that relays R2010, R2020, R2030 and R2060 are operated if the calling subscriber substation is the third station on a four-party line; and finally that the relays R2010 to R2060, inclusive, are all operated if the calling subscriber substation is the fourth station on the four-party line. These relays control the detector 1900 to detect the directory number of the calling subscriber line, to register the numerical portion of the directory number of the calling subscriber line in the code storage relays WXYZ2 to WXYZ5, inclusive, in the manner previously explained.

Furthermore the detector 1900 is called into use in response to the operation of the start relay R2230 as noted above and by the operation of the detector start relay R2070. During the course of operation of the detector 1900 the directory number of the calling substation is normally registered in the code storage relays as noted above, and in response to the completion of the detection of the calling subscriber number, the detection complete relay R2120 is operated to indicate that fact to the call recorder 2000. If, however, the detector 1900 should fail to make a complete identification of the calling subscriber directory number, it will operate in the manner previously described and cause the detector failure relay R2130 in the coil recorder 2000 to operate.

Referring now to the operation of the director, it will be recalled that when the translator 1300 operated in response to the registration of the first three digits of the called office code in the code registers 1520, 1530 and 1540 and the operation of the code switch 1100, certain routing digits were registered in the coder 1300 by the operated translator relay in the translator 1300. Thereafter the send sequence switch 1650 and the sender switch 1660 operated in the manner previously described to transmit the first routing digit to the primary selector 500 thereby to select an idle toll ticket repeater, such as the repeater 2300 and its associated ticket repeater selector 2700. As soon as the toll ticketing repeater 2300 is seized, it returns a signal to the call recorder 2000 whereby the relay R2140 is operated to initiate the transfer of stored items of information from the call recorder 2000 to the selected toll ticketing repeater 2300. When the code send relay R2140 in the call recorder 2000 is operated as an indication that the toll ticket repeater 2300 is included in the connection, it initiates the code sending operation of the call recorder 2000 by closing its contacts 2144 and the code pulse relay R2150 in cooperation with the mark relay R2210 transmits, in code form over the conductor C885, the various items of information which are marked in code form in the bank contacts accessible to the wiper 1954 of the code switch 1950. Accordingly, during the first cycle of rotation of the code send switch 1950, the tens and units digits identifying the director are transmitted to the toll ticket repeater 2300. Following the above items of information, the units digit of the rate at which the call is to be charged is then transferred to the toll ticket repeater and finally the first, second and third code digits of the called station directory number are then transmitted to the toll ticket repeater 2300.

The detector failure relay R2130 may be operated to register the failure of the detector 1900 to identify the numerical portion of the calling subscriber directory number. As soon as both the detector failure relay R2130 and the code send relay R1240 are in their operated positions, ground potential is extended by way of the contacts 2141 and 2134 to the conductor C886 extending to Fig. 8 and then to the conductor C468. As soon as the direct ground potential is applied to the above-noted conductor the pulsing circuit including the contacts 882 of the pulse relay R880 in the controller 600 is short-circuited thereby to prevent the director from sending any additional switch setting impulses. In this manner the director is prevented from sending further impulses for setting up a connection, as soon as the toll ticket repeater 2300 has been included in the connection and the detector failure relay R2130 in the call recorder 2000 has been operated. Accordingly, the establishment of a connection to the called subscriber substation will be prevented.

As a further result of the operation of the detector failure relay R2130, at its contacts 2135, it applies a marking ground potential to the X10 code marking lead terminating in the contact 2 of the bank accessible to the wiper 1955 of the code send switch 1950; at its contacts 2131, it applies a ground potential to the contacts 2 and 3 accessible to the wiper 1951 of the code send switch 1950; and finally, at its contacts 2133 it connects the contact 3 accessible to the wiper 1953 of the code send switch 1950 to the conductor C883 extending to Fig. 8. The above three circuits controlled by the relay R2130 are ineffective during the first cycle of rotation of the code send switch 1950 because the wiper 1954 is the only wiper that performs any circuit functions during the first cycle of rotation. At the end of the first cycle of rotation, the wipers of the code send switch 1950 are advanced from the contacts 25 into engagement with the contact position 26.

In this position, the second cycle auxiliary relay R2240 is operated in the manner previously explained. The pulse relay R2150 will now cause the code send switch 1950 to advance its wipers from the contact 26 position into engagement with the contacts 1 in the associated contact banks. When this occurs, the relay R2240 operates in series with the wiper switching relay R2170. In response to the operation of the relay R2170 the wiper 1954 of the code send switch 1950 is rendered ineffective and the wiper 1955 is now rendered effective to transfer to the toll ticket repeater 2300 the items of information which are marked in code form in the bank contacts accessible to the wiper 1955. As a further result of the operation of the relay R2170, at its contacts 2171 and 2172, it transfers the circuit for the code pulse relay R2150 from ground at the contacts 2261, to the wiper 1951 of the code send switch 1950. Accordingly, the pulse control exercised by the code pulse relay R2150 is dependent upon whether or not the wiper 1951 encounters ground potential on its associated contact banks as the wiper is advanced step-by-step. During the second cycle of rotation of the code send switch 1950, the wipers 1951, 1953 and 1955 are effective and the remaining wipers 1952, 1954 and 1956 are ineffective.

With the wiper 1955 in engagement with contact 1 a test is made of the X9 code marking conductor to determine whether or not the call being extended is to a called office having a two-digit code. Depending upon the operated or unoperated condition of the two-digit code relay R2160, the mark relay R2210 will be operated or restored. Also with the wiper 1951 in engagement with contact 1, a circuit is completed by way of the contacts 2221, 2172 and 2151 for reoperating the code pulse relay R2150. At its contacts 2152, the operated relay R2150 transmits a resistance ground pulse over the conductor C885 if the two-digit code relay R2160 is in its restored position, or it transmits a direct ground pulse over the conductor C885 if the mark relay R2210 has been operated under control of the two-digit code relay R2160. In this manner the call recorder 2000 transfers to the toll ticket repeater 2300 the item of information regarding the number of digits in the code of the called exchange. As soon as the code pulse relay R2150 restores to normal, that is at the end of the pulse, the code send switch 1950 advances its wipers from engagement with the contacts 1 into engagement with the contacts 2 in the associated contact banks.

When the wiper 1955 engages the contacts 2 in the associated contact banks, a test is made of the X10 code marking conductor to determine whether or not the detector has failed to identify the numerical portion of the directory number of the calling subscriber substation. At the present time it is assumed that the detector failure relay R2130 has operated and, at its contacts 2135, it now completes a circuit for operating the mark relay R2210. When the wiper 1951 of the code send switch 1950 engages the contact 2 the ground potential, applied thereto by the contacts 2131 of the operated detector failure relay R2130, is extended over the previously traced circuit for operating the code pulse relay R2150. At this time a direct ground pulse is transmitted by way of the contacts 2211, 2152 and 2236, over the conductor C885 thereby to transfer to the toll ticket repeater 2300 an item of information indicating that the detector has failed to detect the calling line. At the end of the pulse, the code pulse relay R2150 restores to normal and causes the code send switch 1950 to advance its wipers from engagement with the contacts 2 into engagement with contacts 3.

In this position of the code send switch 1950, the wiper 1955 makes a test of the Y18 code marking conductor to determine whether or not the tens digit rate relay R2270 has been operated. Also the wiper 1951, in engagement with its contact 3, completes the previously traced circuit for operating the code pulse relay R2150. At its contacts 2152, the code pulse relay R2150 will transmit a resistance ground pulse or a direct ground pulse depending upon the operated or non-operated condition of the mark relay R2210. The latter relay is operated only in the event that the tens digit rate relay has been operated to indicate that the tens digit of the rate applied to the call is the digit 1 instead of the digit 0. Finally, when the wiper 1953 engages the contact 3, it completes a circuit which may be traced from ground at the contacts 2173 of the operated switching relay R2170, the wiper 1953 and the engaged contact 3 in the associated bank, the contacts 2133 of the operated detector failure relay R2130 and then by way of the conductor C883 extending to Fig. 8 and the upper winding of the director release relay R780, to battery. At the end of the pulse the code pulse relay R2150 restores to normal and advances the wipers of the code send switch 1950 from engagement with the contacts 3 into engagement with the contacts 4 in the associated contact banks. In this position the wiper 1951 connects the code pulse relay R2150 to the multiply connected contacts 4 to 24, inclusive, but due to the fact that the detection has been a failure, the detection completion relay R2120 has not been operated to close its contacts 2121 and the code pulse relay R2150 remains in its restored position. Accordingly, the transfer of information from the call recorder 2000 to the toll ticketing repeater 2300 is terminated.

Figure 22:
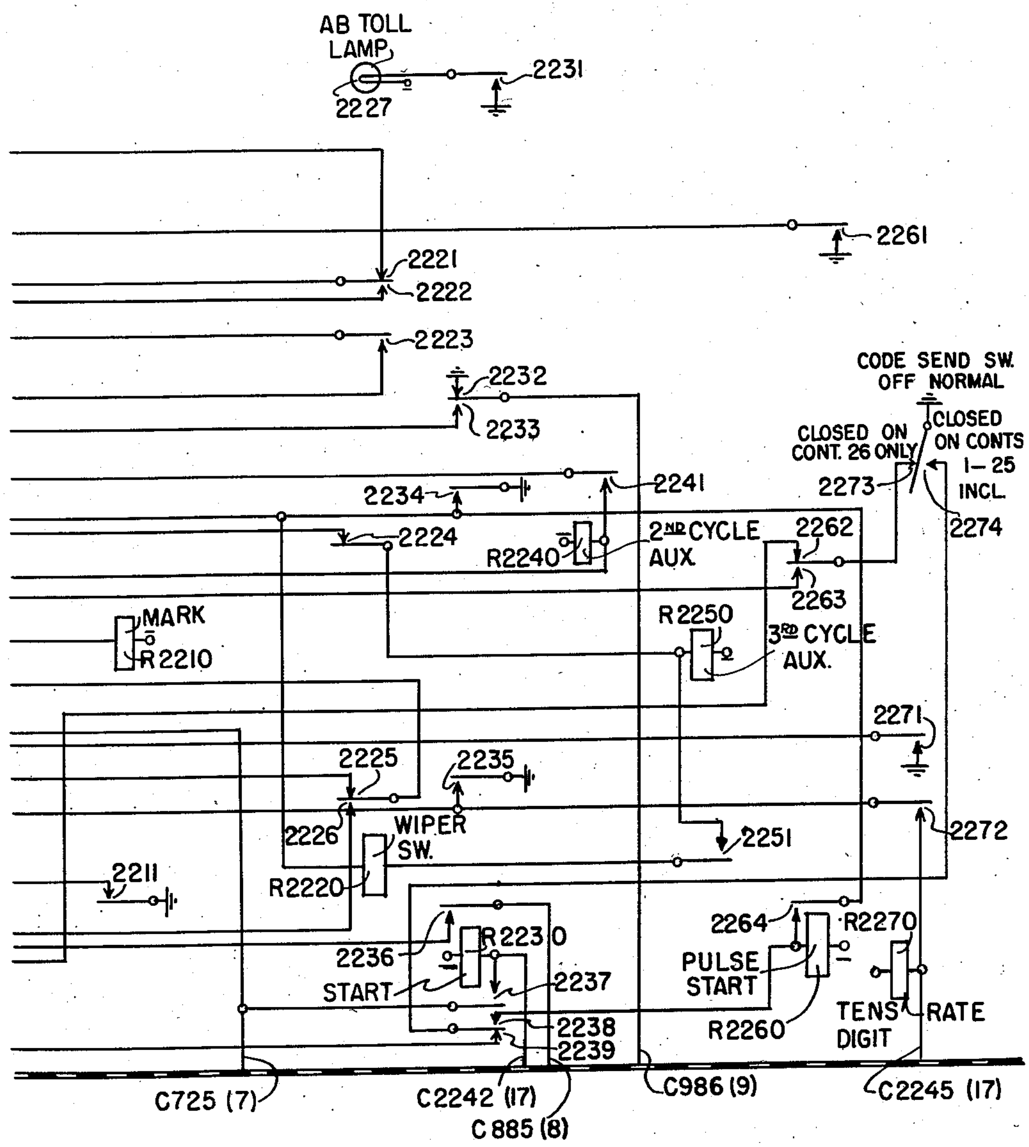
Figure 23:
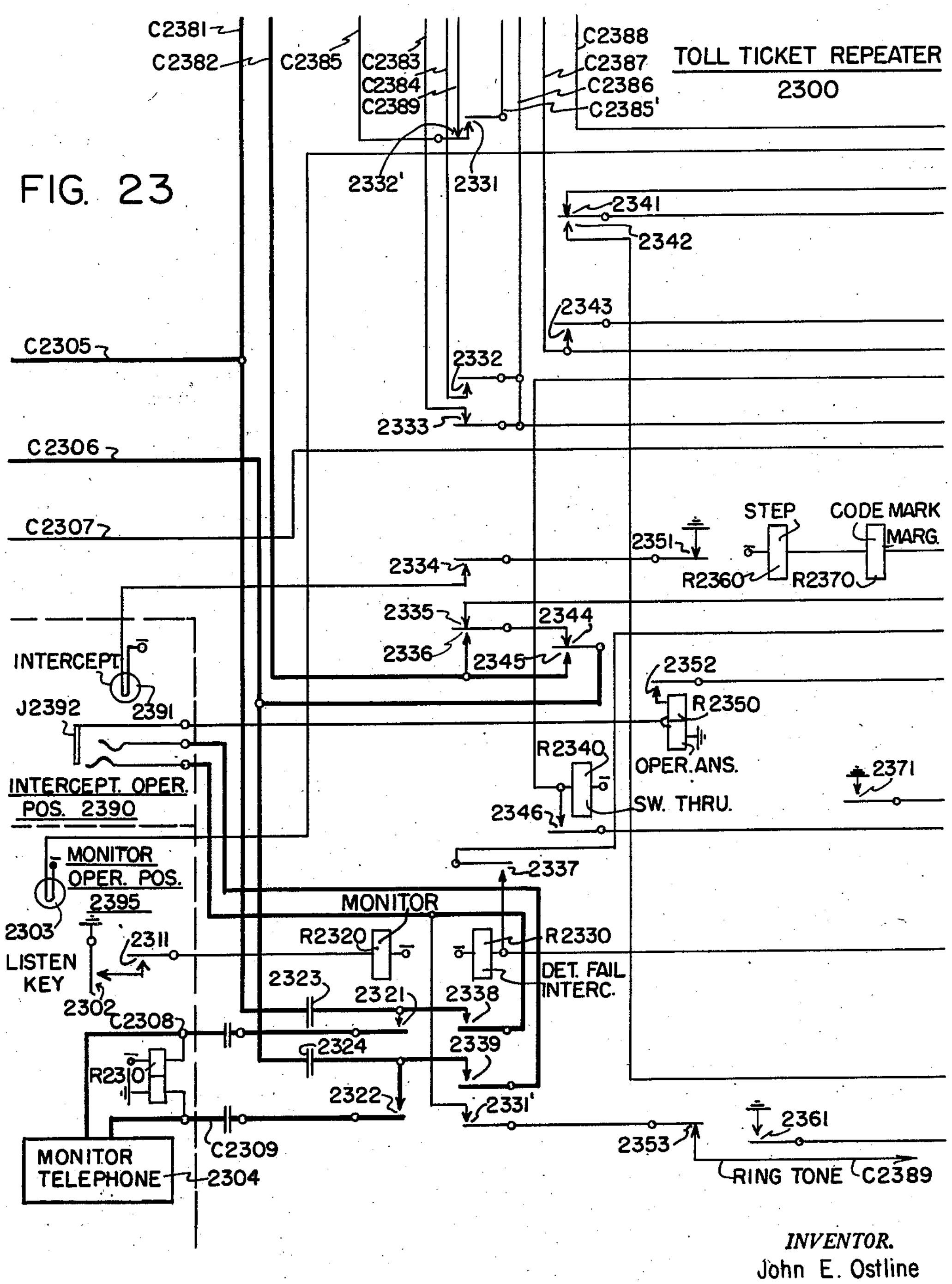
Figure 24:
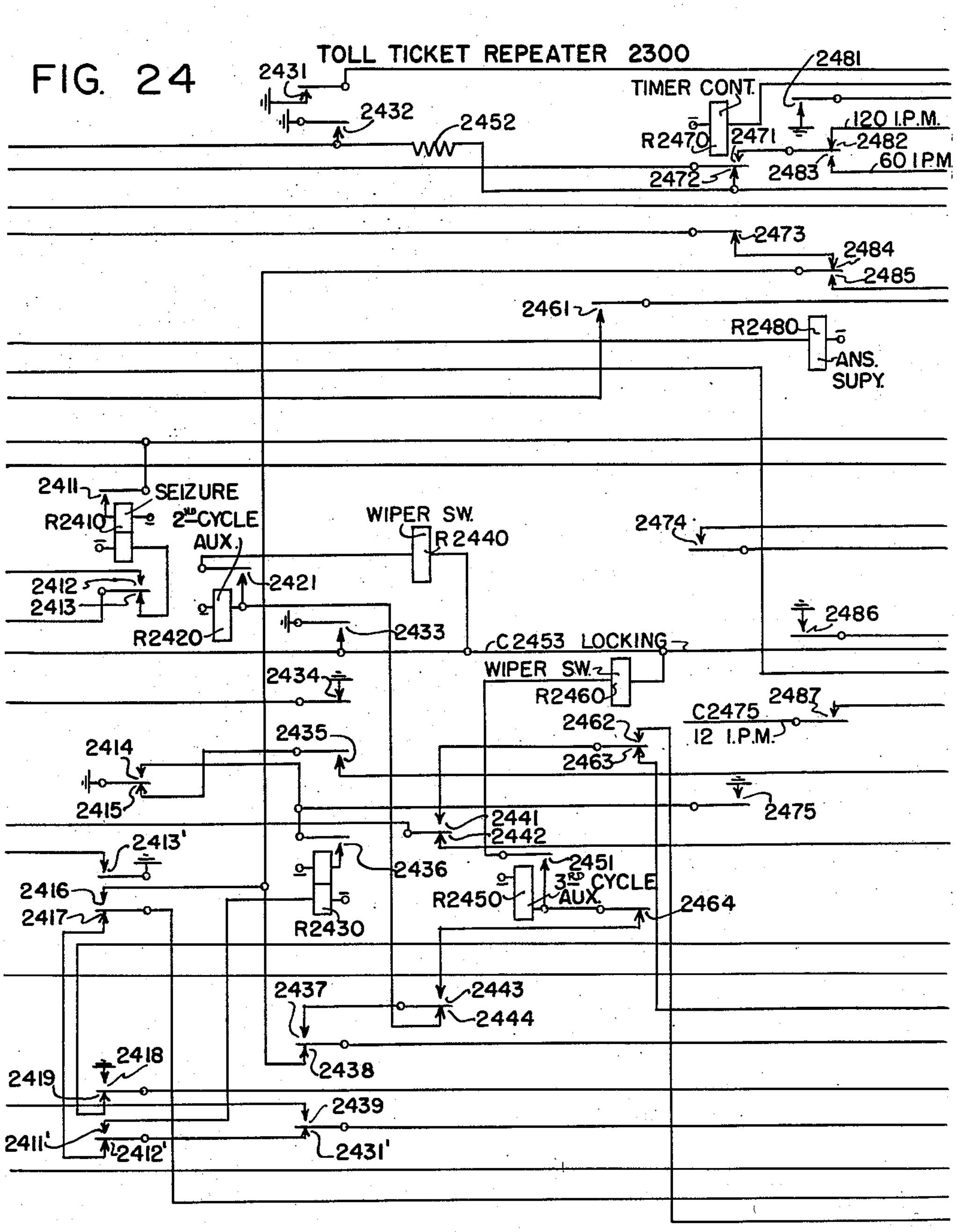
Figure 25:
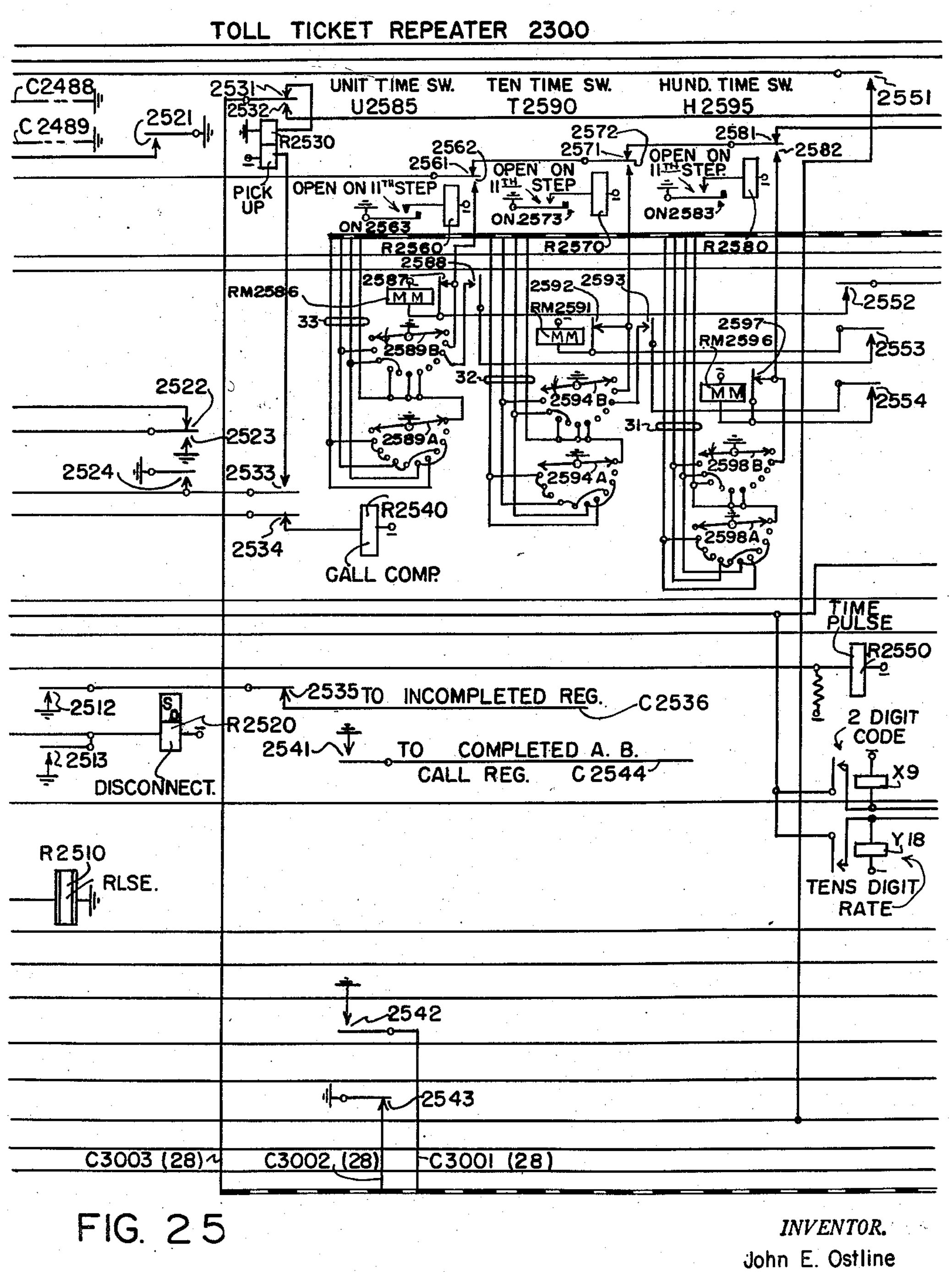
Figure 26:
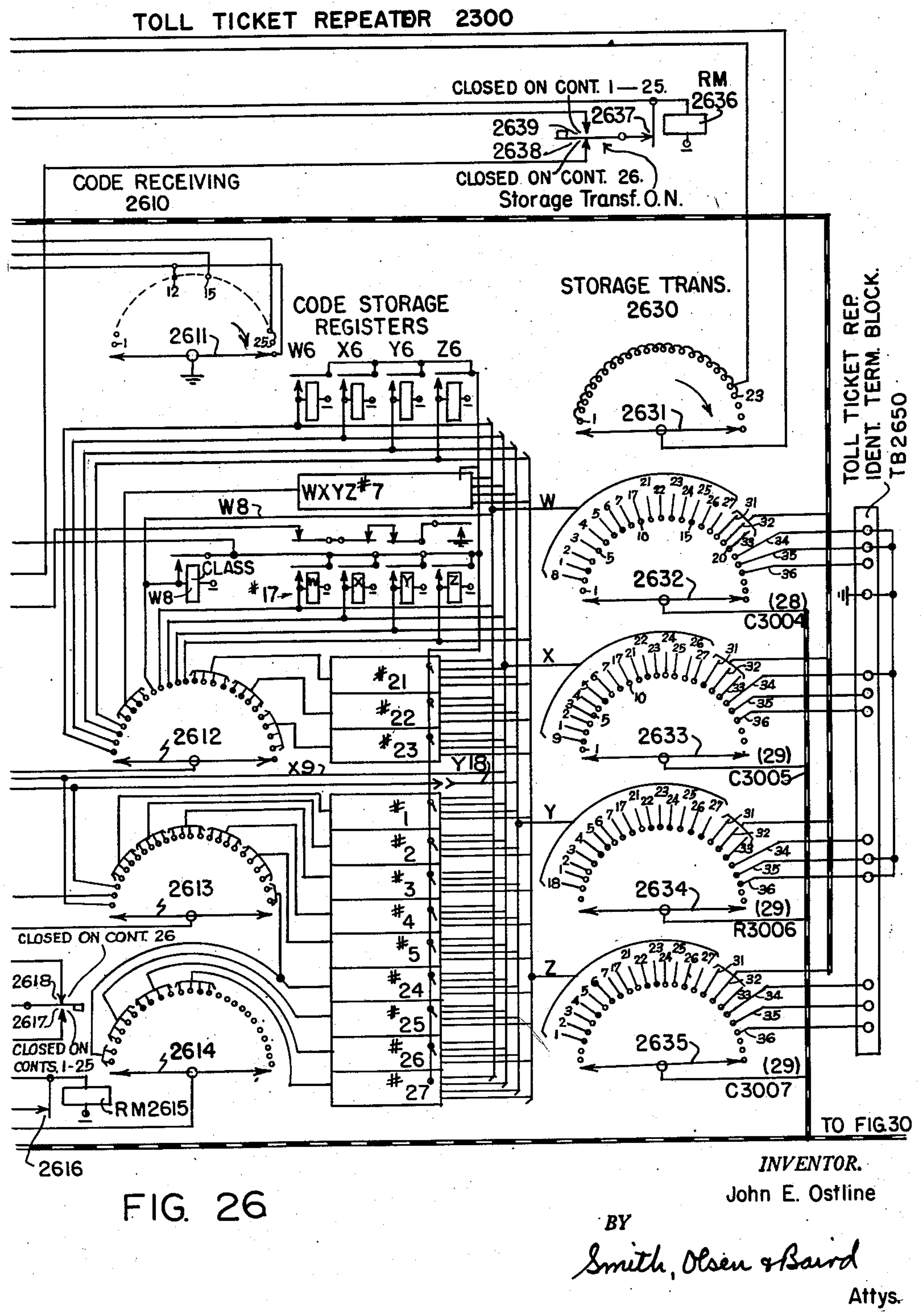

Referring now to the controller 600 (Figs. 6 to 9) portion of the director, it will be seen that the operation of the director release relay R780 causes the release of the director from the connection extended to the toll ticketing repeater 2300 and from the connection extended thereto from the calling subscriber line in the manner previously explained. During the course of the release of the director and the various units included therein the seizure relay R750 (Fig. 7) will be restored to normal and, at its contacts 757, it will remove a locking ground potential from the conductor C725 extending to Fig. 22 of the call recorder 2000. Referring now to Fig. 22 it will be seen that when ground potential is removed from the locking ground conductor C725, the start relay R2230 will restore to normal and any operated ones of the calling party identifying relays R2010 to R2060, inclusive, will restore to normal. In response to the restoration of the start relay R2230, ground potential is removed from the locking ground conductor C2244 thereby to cause the restoration of operated relays in the call recorder 2000 which have been locked to the conductor C2244, and, at contacts 2239, the circuit will be completed whereby the rotary magnet RM1957 of the code send switch 1950 is self-interruptedly operated to restore its wipers to their home contact positions 26. In the above-described manner the call recorder 2000 is automatically restored to normal after it has transmitted certain items of information, including the item of information regarding the failure of the detector, to the connected toll ticketing repeater 2300.

When the director is fully released, it is rendered available for additional calls in the manner previously described and, during the course of the releasing operation of the director, the calling subscriber line is switched-through to the connected toll ticketing repeater 2300 over the switch-path that includes the line circuit, such as the line circuit 405A, the finder, such as the finder 440A, the primary selector, such as the selector 500A to the connected toll ticketing repeater 2300A.

Referring now to the toll ticketing repeater 2300 (Figs. 23 to 26, inclusive) it will be recalled that when the toll ticket repeater 2300 is seized in response to the first digit transmitted by the director, the seizure relay R2410 is operated in series with the code send relay R2140 in the call recorder 2000 in the manner previously explained. The code send relay R2140 indicates to the call recorder 2000 that it may begin the transfer of information to the toll ticket repeater 2300. The operation of the seizure relay R2410 prepares the toll ticket repeater 2300 to register therein the various items of information transferred thereto from the call recorder 2000. It will be recalled that in the first cycle of operation of the code send switch 1950 in the call recorder 2000, the wiper 1954 thereof is effective to transfer the information marked in code form on the contacts accessible thereto. Also during the first cycle of operation, noted above, the wiper 2612 of the code receiving switch 2610 in the toll ticketing repeater 2300 is effective to register, in the code storage registers accessible over its associated contact bank, the items of information transmitted from the call recorder 2000. At the end of the first cycle of operation, the code receiving switch 2610 has its wipers in engagement with the contacts 26 and as a result thereof the second cycle auxiliary relay R2420 is operated. At the end of the next pulse, the wipers of the code receiving switch 2610 are advanced from the contact 26 position into engagement with the contact 1 thereby to permit the relay R2420 to be operated in series with the wiper switching relay R2440. The wiper switching relay R2440, at its contacts 2441 and 2442, disconnects the wiper 2612 and connects the wiper 2613 to the contacts of the marginal code relay R2370. In this manner the wiper 2613 is rendered effective to receive the items of information transmitted from the call recorder 2000 to the ticketing repeater 2300 during the second cycle of operation of the code send switch 1950 and the code receiving switch 2610. With the wiper 2613 in engagement with the contact 1, it prepares a circuit for the two-digit code storage relay X9, which relay is operated only in the event that the two-digit code relay R2160 in the call recorder 2000 has been operated to indicate that the called office code is a two-digit code instead of a normal three-digit code. The wipers of the code receiving switch 2610 are then advanced into engagement with the contacts 2 thereby to prepare a circuit for the detector failure intercepting relay R2330.

Since it has been assumed that the detector has failed to identify the calling subscriber line, the mark relay R2210 in the call recorder 2000 will transmit a direct ground pulse to the marginal code relay R2370 and the step relay R2360 in the repeater 2300, as has been previously explained. The marginal code relay R2370 operates and, at its contacts 2371, completes a circuit by way of the contacts 2441 and 2463, the wiper 2613 in engagement with the contact 2, and the winding of the detector failure intercepting relay R2330, to battery. The relay R2330 operates and, at its contacts 2337, locks itself to the locking ground conductor C2453. At the end of the above pulse transmitted from the call recorder 2000, the wipers of the code receiving switch 2610 are advanced from engagement with the contacts 2 into engagement with the contacts 3 thereby to prepare the circuit for the tens digit rate register relay Y18. This relay will be operated only in the event that the tens digit rate relay R2270 in the recorder 2000 has been operated to indicate that the tens digit for the rate of the call is the digit 1 instead of the digit 0. Since the further transmission of items of information from the call recorder 2000 to the toll ticket repeater 2300 has been terminated in the call recorder 2000, the wipers of the code receiving switch 2610 in the ticket repeater 2300 will, for the time being, remain in engagement with the contacts 4 in the associated contact banks.

The purpose of operating the detector failure intercepting relay R2330 at this time is to connect the calling subscriber to an intercepting operator position and thus prevent the completion of the call to the called subscriber line. Furthermore, it will prevent the toll ticket repeater 2300 from seizing a tabulator in the usual manner.

It will be assumed that at the time the detector failure intercepting relay R2330 is operated, the ticket repeater selector 2700, individual to the toll ticket repeater 2300, will be switched-through to an outgoing repeater. The position occupied by the ticket repeater selector 2700 is determined by the operation of both the detector failure relay R2130 and the code send relay R2140 in the call recorder 2000. More specifically, both of the above-named relays, when operated, complete the series circuit including the contacts 2141 and 2134 whereby the ground potential is applied to the conductor C886 to prevent transmission of further impulses by the pulse relay R880 in the controller 800 portion of the director. Thus, it will be seen that the pulses transmitted by the director to set the switches in the switch train cannot be terminated until at least one digit has been transmitted to include the toll ticket repeater 2300 in the connection. At this time the code send relay R2140 in the call recorder 2000 will be operated. If at this time the detector failure relay R2130 has been operated, no further impulses will be transmitted by the director to the ticket repeater selector 2700. If this condition exists, the selector 2700 will be seized and its relays R2720, R2730 and R2740 will be in their operated positions in the manner previously explained.

However, if the detector failure relay R2130 is not operated for a short interval of time after the operation of the code send relay R2140, the director may send out the next digit and, thus, operate the ticket repeater selector 2700 in a vertical and a rotary direction. In other words, the detector failure relay R2130 may operate and terminate the transmission of further impulses after the transmission of the second or subsequent digits by the director.

For the purpose of this description it will be assumed that the detector failure relay R2130 operated to indicate the detection failure immediately after the director has transmitted the second digit and has operated the ticket repeater selector 2700 accordingly. Further impulses from the director are terminated and the circuits including the call recorder 2000, the director and the toll ticket repeater 2300 operate, in the manner described above, with the final result that the detection failure intercepting relay R2330 has operated.

Since the ticket repeater selector 2700 has responded to the second digit transmitted by the director and has selected an idle outgoing repeater, the only relay in the selector 2700 which is in its operated position is the switch-through relay R2710. This relay is held in its operated position from a ground potential returned thereto over the wiper 2704, from the seized outgoing repeater in the manner previously described.

With the selector 2700 in the above-noted position, the detector failure intercepting relay R2330, upon operating, performs the following functions. At its X contacts 2337, the relay locks itself to the grounded conductor C2453, and, at its X contacts 2332, it applies an additional holding ground potential on the conductor C2307, in multiple with the normal holding ground circuit which includes the conductor C2386. The last-mentioned circuit may be traced from a holding ground potential supplied from the selected outgoing repeater to the wipers 2704, and then by way of the contacts 2781, the conductor C2384, the X contacts 2332, the contacts 2522 and the conductor C2307. This holding ground potential will be maintained on the conductor C2307 after the restoration of the switch-through relay R2710 in order to maintain the preceding switches in the switch train in their operated positions.

As a further result of the operation of the relay R2330, at its contacts 2333, it opens a point in the locking circuit for the lower winding of the switch-through relay R2710. This locking circuit may be traced from the grounded wipers 2704 and then by way of the contacts 2781 and 2716, the conductor C2386, the contacts 2333, the conductor C2383, the contacts 2796, VON2763 and 2717, and the winding of the relay R2710, to battery. Consequently, when the contacts 2383 are opened, the relay R2710 restores to normal and, at its contacts 2711 to 2714, inclusive, it disconnects the talking conductors C2381 and C2382 from the wipers 2701 and 2702 and connects these conductors to the circuits including the upper and lower windings of the line relay R2720. The line relay R2720 reoperates when the above-traced circuit is completed and, at its contacts 2721, completes an operating circuit for the hold relay R2730. As a result of the operation of the hold relay R2730, at its contacts 2731, ground potential is extended by way of the conductor C2386 and the contacts 2522 to the conductor C2307 in order to now supply a holding ground for maintaining the preceding switches in their operated positions from the ticket repeater selector 2700. It should be noted at this time that when the talking conductors C2381 and C2382 are disconnected from the outgoing repeater, the usual line relay and hold relay in the repeater restore to normal in the well-known manner. As soon as the slow-to-release hold relay in the outgoing repeater restores to normal, it removes ground potential from the wiper 2704, but this is without effect at this time because the holding ground potential for the conductor C2307 is now supplied from the contacts 2731 of the operated hold relay R2730. As a further result of the operation of the hold relay R2730, at its contacts 2736, it completes a circuit including the conductor C2385', the contacts 2331, the conductor C2385, the contacts VON2761, and the winding of the release magnet RM2780 to battery. The release magnet RM2780 now operates and causes the wipers 2701 to 2704, inclusive, to be restored to their normal resting positions in a conventional manner. The return of the wipers to their normal positions actuates the contacts VON2761 thereby to interrupt the above-traced circuit for the release magnet RM2780 which now restores to normal.

The line relay R2720 will first be operated from the direct ground applied to the conductor C886 (Fig. 8) by the call recorder 2000 and extended therefrom, by way of the conductor C468, over the previously traced path including the director hunter 450, the primary selector 500 and the conductor C2305. When the director is ultimately released from the connection, as previously noted, the line relay R2720 will be retained in its operated position over the loop circuit including the calling subscriber line.

At its contacts 2334, the relay R2330 completes an obvious circuit for illuminating the intercepting signal lamp 2391 at the intercepting operator position 2390 to indicate to the operator thereat that the connection extended to the toll ticket repeater 2300 should be intercepted. At this point it will be well to mention the fact that each toll ticket repeater in the system is individually provided with a signal lamp 2391 and a jack J2392 at the intercepting operator position 2390 so that the operator is informed of the identity of the particular toll ticketing repeater utilized in the call being intercepted.

At the contacts 2335 and 2336, the relay R2330 disconnects the conductor C2306 from the circuit including the step relay R2360 and the marginal code relay R2370 and connects the conductor C2306 by way of the contacts 2344 and 2336 to the conductor C2382 extending to the ticket repeater selector 2700, thus completing the circuit for the lower winding of the line relay R2720.

At its contacts 2338 and 2339, the relay R2330 connects the line conductors C2305 and C2306 by way of the talking condensers 2323 and 2324 to the tip and ring terminal of the jack J2392.

Finally, at its contacts 2331' the relay R2330 completes a circuit for transmitting a ringing tone signal, applied to the conductor C2389 and then by way of the contacts 2353, 2331' and 2338, the condenser 2323, and the conductor C2305, to the calling subscriber line. This ringing tone signal will indicate to the calling subscriber that the desired called subscriber is being signaled and the calling subscriber will assume that the called subscriber will subsequently answer the call.

The operator at the intercepting operator position 2390 will answer the call to be intercepted by inserting the plug of an answering cord at her position into the jack J2392 and when this operation is performed, the operator is connected to the calling subscriber line over the above-traced circuit including the conductors C2305 and C2306 in the well-known manner. As a further result of the insertion of the plug of the answering cord into the jack J2392 a circuit will be completed over the sleeve terminal of the jack for operating the operator answer relay R2350 over its high resistance lower winding. The operator answer relay R2350, upon operating, prepares, at its contacts 2352, a supervisory circuit whereby the intercepting operator will be signaled when the calling subscriber releases the connection and the toll ticket repeater 2300 has restored to normal. Also, at its contacts 2351, the relay R2350 interrupts the circuit for the lamp 2391; and, at its contacts 2353, it terminates the transmission of the ringing tone signal to the calling subscriber line. The operator at the intercepting operator position 2390 may now converse with the calling subscriber and obtain the calling subscriber directory number for record purposes. The operator will then instruct the subscriber to replace his receiver and redial the desired called subscriber. It should be noted that the talking current for the calling subscriber end of the connection is supplied through the winding of the line relay R2720 in the ticket repeater selector 2700.

The record made by the intercepting operator at position 2390 of the directory number of the intercepted calling subscriber line is for the purpose of determining whether the detector 1900 will fail to identify the calling line on subsequent calls. If the fault occurs a number of times, an order is given to the exchange attendant to check the operation of the detector 1900.

When the calling subscriber releases the connection by replacing his receiver on the switchhook of the associated telephone instrument, the loop circuit over which the line relay R2720 in the ticket repeater selector 2700 is maintained operated is interrupted, thereby to cause the relay to restore to normal. Upon restoring to normal, the relay R2720 interrupts, at its contacts 2721, the circuit of the hold relay R2730 which also restores to normal. Incident to the restoration of the relay R2730, at its contacts 2731 and 2732, it removes ground potential from the conductors C2386 and C2384 extending to the toll ticket repeater 2300.

Referring now to the toll ticket repeater 2300, it will be seen that when ground potential is removed from the above-noted conductors, the holding circuit for the upper winding of the seizure relay R2410 is thus interrupted and the relay restores to normal. Furthermore, the removal of ground potential from the conductors C2384 and C2386 removes the holding ground potential from the conductor C2307 extending to the primary selector 500, the line finder 440 and the line circuit individual to the calling subscriber line, such as the line circuit 405. Accordingly, the primary selector 500, the line finder 440 and the line circuit 405 restore to normal in the manner previously explained thereby to render the above-named circuits available for use in additional calls.

Referring again to the toll ticket repeater 2300 it will be noted that when the relay R2410 restores to normal, at its contacts 2415, it completes a momentary circuit by way of the contacts 2435 for operating the disconnect relay R2520. Also, at its contacts 2414, the relay R2410 opens the locking circuit for the upper winding of the auxiliary relay R2430 which also restores to normal. The remaining contacts on the seizure relay R2410 merely prepare circuits which will be completed subsequently to restore the code receiving switch 2610 to its normal position. Incident to the restoration of the auxiliary relay R2430, at its contacts 2432, it opens a point in the circuit of the signal lamp 2303 at the monitoring operator position 2495. At its contacts 2433, the relay R2430 removes the locking ground potential from the conductor C2453. The removal of ground from the conductor C2453 opens the locking circuit for the relay R2330 which now restores to normal; it opens the locking circuit for the relays R2420 and R2440 which also restore to normal; and finally, it opens the locking circuits for all of the operated code storage registers in the toll ticket repeater 2300 which also restore to normal. At its contacts 2434, the relay R2430 completes a circuit by way of the contacts 2352, the low resistance upper winding of the operator answer relay R2350, the sleeve of the jack J2392, and the cord circuit at the intercepting operator position 2390 thereby to indicate to the operator thereat that the intercepted call has been released. At its contacts 2435 the relay R2430 interrupts the previously traced circuit for the disconnect relay R2520 and, at its contacts 2438 and 2431', it completes the releasing circuit for the code receiving switch 2610.

As soon as the contacts 2431' of the relay R2430 are closed, a circuit will be completed which may be traced from ground by way of the winding of the release relay R2510, the contacts 2419, 2617, 2431', 2412', 2417 and 2616, and the winding of the rotary magnet RM2615, to battery. When the above-traced circuit is completed, the release relay R2510 operates in series with the magnet RM2615. Upon operating, the relay R2510, at its contacts 2512, applies ground potential to the conductor C2536 thereby to operate a register (not shown) to indicate the incomplete registration of the intercepted call. In this manner, the number of times that the toll ticket repeater 2300 has been taken into use but has not been utilized to record a call by transferring the information to a tabulator, may be counted. At its contacts 2513, the relay R2510 completes an additional point in the circuit for the relay R2520. In its operated position the relay R2520 maintains, at its contacts 2523, a ground potential on the conductor C2307 during the releasing operation of the toll ticket repeater 2300. The ground potential maintained on the conductor C2307 during this period prevents seizure of the ticketing repeater until it has fully released.

When the rotary magnet RM2615 operates in series with the release relay R2510, as noted above, it opens its operating circuit at its self-interrupting contacts 2616 and thus automatically continues the self-interrupting operation to advance the wipers of the code receiving switch 2610 step-by-step over the bank contacts until the wipers move to contact position 26. The stepping of the wipers into engagement with the contact position 26 automatically controls the off-normal contacts of the code receiving switch thereby to open the contacts 2617 and to close the contacts 2618. When this occurs, the above-traced circuit for the magnet RM2615 and the release relay R2510 is interrupted and the relay R2510 restores to normal. Incident to the restoration of the relay R2510 the circuit for the relay R2520 is opened whereupon the last-mentioned relay restores to normal and, at its contacts 2523, removes the busy marking ground potential from the conductor C2307. The toll ticket repeater 2300 has now fully restored to normal and is made available for additional calls.

When the intercepting operator at position 2390 receives the disconnect signal in the manner noted above, she will remove the plug of the cord circuit from the jack J2392 thereby to interrupt the circuit for the relay R2350 which restores to normal.

*Monitoring the toll ticket repeater 2300*

In the previous description of the operations of the toll ticket repeater 2300 it was pointed out that the signal lamp 2303 in the monitoring operator position 2395 (Fig. 23) is controlled to give different signal indications to the monitoring operator, corresponding to the various stages of operation of the toll ticket repeater 2300. More specifically, as soon as the toll ticket repeater 2300 is seized, the signal lamp 2303 is dimly illuminated over a circuit including the contacts 2332 and the resister 2452. When the called subscriber answers a call, the dimly illuminated lamp 2303 is changed to a bright lamp and is flashed sixty times per minute over a circuit including the conductor C2489 and the contacts 2483 and 2471. When the called subscriber disconnects, the lamp 2303 is flashed one hundred and twenty times per minute. When the toll ticket repeater 2300 has transferred all of the items of information registered therein to a tabulator, the lamp 2303 is changed from a flashing lamp to a steady bright lamp over a circuit including the contacts 2521 and 2472. Finally, when the toll ticket repeater 2300 has fully released and is available for another call, the lamp 2303 is extinguished.

Accordingly, the monitoring operator is informed of (1) the seizure of the toll ticket repeater 2300 by a steady dim lamp 2303; (2) the answering of a call by a called party by a slow flashing bright lamp 2303; (3) the release by the called party by a fast flashing bright lamp 2303; (4) the completion of the transfer of information from the toll ticket repeater 2300 to a tabulator by a steady bright lamp 2303; and (5) the fully released or idle condition of the toll ticket repeater 2300 by the dark lamp 2303.

In the present arrangement, the monitoring operator position 2395 is provided with an individual signal lamp, such as the lamp 2303, and an individual non-locking listening key, such as the key 2302, for each toll ticket repeater in the exchange. Also the monitoring operator position 2395 is provided with the well-known operator telephone circuit 2304 (schematically illustrated) and a monitoring line relay R2310 which are multiply connected to all of the toll ticket repeaters.

When the monitoring operator desires to monitor a particular toll ticket repeater, the monitor telephone 2304 is inserted into the usual switchboard jack in the well-known manner thereby to connect the monitoring operator telephone instrument to the talking conductors C2308 and C2309. In response to the foregoing, the monitor line relay R2310 operates and closes its contacts 2311 to prepare a point in the circuit for operating the monitor relay R2320 in the toll ticket repeater 2300. The last-mentioned circuit is completed when the listening key 2302 individual to the toll ticket repeater 2300 is operated. The remaining contacts (not shown) of the relay R2310 are also closed to prepare similar circuits for each of the remaining toll ticket repeaters (not shown). By observing the particular condition of the lamp 2303, the monitoring operator can determine the particular operating stage existing in the associated toll ticket repeater 2300, as noted above. The operator may now actuate the listening key 2302 and thus complete an obvious circuit for operating the monitor relay R2320. Upon operating, the relay R2320, at its contacts 2321 and 2322, connects the talking conductors C2308 and C2309 of the monitoring operator telephone 2304 across the talking conductors C2305 and C2306 included in the connection between a calling and a called subscriber line. The monitoring operator may listen in on the connection without disturbing the connected subscribers and may converse with the subscribers, if necessary. If the monitoring operator finds that the connection is satisfactory, the non-locking key 2302 is released thereby to restore the relay R2320 to normal and disconnect the monitoring operator from the connection including the toll ticket repeater 2300.

In view of the foregoing, it will be understood that the monitoring operator may actuate the listening key individual to any one of the toll ticket repeaters and thus monitor a connection included over the associated toll ticket repeater.

*Call from the FLorida-3 exchange to the SUperior-5 exchange*

It will now be assumed that a calling subscriber in the FLorida 3 exchange desired to establish a connection with a particular called subscriber in the SUperior 5 exchange. The rate applied to calls between the FLorida 3 exchange and the SUperior 5 exchange will be assumed to be the rate 03 for calling subscribers of the class 2 type, that is, regular subscribers, and the rate 02 for calling subscribers of the class 1 type, that is, extended service subscribers. When the calling subscriber removes his receiver, the line circuit individual to the calling line, for example, the line circuit 405, will operate in the previously described manner thereby, to initiate the operation of the finder having access thereto, for example the finder 440A. The finder will find the calling line and will extend the connection by way of the primary selector 500A and the director hunter 450A, to the director 300A in the manner previously described. The dial tone signal will be returned to the calling subscriber and the subscriber will then proceed to dial the directory number of the called station in the SUperior 5 exchange. The code digits corresponding to the SUperior 5 exchange are the digits 785 and they will be registered respectively in the first, second and third code registers 1520, 1530 and 1540 of the call register 1500 portion of the director in the manner previously described. The four numerical digits of the directory number, as dialed by the calling subscriber, will be registered respectively in the first, second, third and fourth numerical registers 1610, 1620, 1630 and 1640 of the call register 1500 as previously explained.

The remaining operations of the director are substantially the same as has been described hereinbefore with the ultimate result that the translator 1300 will be called into use to register the necessary routing digits for routing the connection to the SUperior 5 exchange. Generally stated, it will be understood that the code switch 1100 will operate its wipers in a vertical and then in a rotary direction in accordance with the second and third code digits 85 and the wiper 1206 thereof will be selected in accordance with the first code digit 7 stored in the first code register 1520 of the call register 1500. In response to the registration of the third code digit in the call register 1500, the translator assigner 1000 will be controlled in the manner previously explained to associate the common translator 1300 with the calling director and, when associated, a circuit will be completed by way of the wiper 1206 and the engaged contact 5 in the eighth level of the code switch 1100 whereby a particular translator relay, such as the relays R1410, R1420, etc., in the translator 1300, will be operated.

It should be understood that since two classes of calling lines may establish connections between the FLorida 3 exchange and the SUperior 5 exchange, two different translator relays will be provided in the translator 1300, each of which will be permanently wired to transfer to the coder 1800 of the director, the routing digits 4868; to operate the TB control relay R1885 in the coder 1800; to place a ground potential on the ABT conductor for the purpose of calling in a call recorder, such as the call recorder 2000; and to register the rate for the call in the units digit rate register in the coder 1800. One of these translator relays will be selected if the calling subscriber is of the class 1 type, that is an extended service subscriber, and it will be permanently wired to register the rate 02 in the units digit rate register of the coder 1800. The other of the translator relays will be selected if the calling subscriber is of the class 2 type, that is a regular subscriber and it will register the rate 03 in the units digit rate register of the coder 1800.

When the translator relay is selected, the relay operates, in the manner previously described, and it will transfer to the first, second, third and fourth route digit registers in the coder 1800 the digits 4868. It will also operate the units digit rate registers R1825 to R1828, inclusive, in accordance with the rate applicable to the class of the particular calling subscriber. It will also operate the TB control relay R1885 in the coder 1800 and thus determine that the director will first send out the routing digits 4868 and then send out the last 5 digits registered in the call register 1500, that is, the digit 5 registered in the third code register 1540 followed by the four digits of the numerical portion of the directory number registered in the first, second, third and fourth numerical registers of the call register 1500. Finally, the operated translator relay will apply ground potential to the ABT conductor extending to the call recorder 2000 thereby to operate the start relay R2230 to prepare the call recorder 2000 for further operation.

As soon as the foregoing information has been transferred from the operated translator relay in the translator 1300, the translator assigner 1800 automatically disassociates the translator 1300 from the calling director thereby to render the translator available for use by other calling directors.

The send sequence switch 1650 and the sender switch 1660 in the call register 1500 now operate in the manner previously explained thereby to transmit switch setting impulses corresponding to the digits 4868 registered in the route digit registers of the coder 1800 followed by the third digit 5 of the called office code registered in the third code register 1540, and then the four digits of the numerical portion of the directory number registered in the first, second, third and fourth numerical registers 1610, 1620, 1630 and 1640.

During the period of time that the sender switch 1660 and the send sequence switch 1650 are transmitting the impulses corresponding to the digits registered, as noted above, the call recorder 2000 operates in the manner previously explained to detect the directory number of the calling subscriber line. These digits are registered in the code storage relays WXYZ1 to WXYZ5, inclusive, in the call recorder 2000. The call recorder 2000 is now in condition to transfer the various items of information marked in code form in the banks of the code send switch 1950 accessible to the wipers 1954, 1955 and 1956.

Referring now to the trunking diagram (Fig. 3A) and assuming that the director illustrated therein is the calling director, the first digit 4 transmitted by the sender switch 1660 of the director will operate the primary selector 500A to its fourth level thereby to select an idle toll ticket repeater, such as the repeater 2300A and the ticket repeater selector 2700A individual thereto. The inclusion of the toll ticket repeater 2300A in the connection automatically transmits a signal to the call recorder 2000A thereby to control the call recorder to transfer the various items of information marked in code form in the banks of the code sending switch 1950 to the toll ticket repeater 2300A, in the manner previously explained. The second route digit 8 transmitted by the sending switch 1660 of the director will control the ticket repeater selector 2700A to select an idle outgoing repeater, such as the repeater 305, accessible in the eighth level of the selector banks.

The third routing digit 6 transmitted by the sender switch 1660 of the director will be transmitted over the above-traced path to the repeater 305 and repeated over the trunk 335 to the repeater 290 in the EMpire 1 exchange. The last-mentioned repeater is individually associated with the incoming toll selector 205 in the EMpire 1 exchange and it will repeat the third routing digit 6 to the selector 205 which will raise its wipers to the sixth level of the associated banks and select an outgoing trunk to the SUperior 5 exchange. It will be assumed that the toll selector 205 selected the outgoing repeater 280 extending to the SUperior 5 exchange over the interconnecting toll trunk line terminating in the incoming repeater 351 which is individual to the incoming toll selector 352 in the SUperior 5 exchange.

The fourth routing digit 8 now transmitted by the sender switch 1660 in the director over the above-traced path will control the incoming toll selector 352 to select an idle selector, such as the selector 353, in the eighth level of its banks. The third code digit 5 will now be transmitted by the sender switch 1660 to control the selector 353 in the SUperior 5 exchange to advance its wiper to the fifth level and then select an idle selector, such as the selector 354.

The sender switch 1660 will now transmit the four digits of the numerical portion of the called subscriber directory number which will automatically control the selector 354, the selector 355, and the connector 356 to complete the connection to the called subscriber substation such as the station 359. Although it has been assumed in the above description that the director has transmitted all of the digits to complete the connection to the called subscriber line, it will be recalled that the director cannot send the last or final digit of the called subscriber directory number until the call recorder 2000A has transferred all of the items of information to the toll ticket repeater 2300A in the manner previously explained.

In any event, when all of the information has been transferred by the call recorder and the director has completed the connection to the called subscriber line, the call recorder 2000A and the various units of equipment included in the director 300A will be disconnected from the connection in the manner previously explained whereby the calling subscriber line is connected over the above-described path to the called subscriber line. The timing of the conversation by the units, tens and hundreds time switch U2585, T2590 and H2595 in the toll ticketing repeater 2300 is initiated when the called subscriber answers the call and is terminated when the subscribers release the connection thereby to register the elapsed time of the conversation, as has been previously described.

The switching apparatus involved in the connection will automatically restore to normal when the subscribers hang up their receivers and the toll ticket repeater 2300 will be maintained busy to other calls until it has transferred the information stored in the code storage registers to the tabulator in the manner previously described. The tabulator, such as the tabulator 2800A, will be associated with the toll ticket repeater 2300A under control of the tabulator allotter 2801A in the manner previously explained and the tabulator will control the record tape punch and the ticket tape punch to make a permanent record on perforated tapes of the various items of information pertaining to the completed toll call.

*Call from the FLorida 3 exchange to the RUgby 2 exchange*

Referring to the telephone system illustrated schematically in Fig. 1 of the drawings, it will be seen that the STate 8, SUperior 5 and RUgby 2 exchanges are located in zone 78. Each of the above-named exchanges have the first and second code digits 78 corresponding to the first two letters in the exchange names. The third code digit in each case is the numerical digit designating the particular exchange thereby to complete the three-digit code which is dialed by a calling subscriber in order to extend a connection to a particular one of the three exchanges noted. For the purpose of this description it will be assumed that the SUperior 5 and RUgby 2 exchanges serve substantially adjacent areas, geographically speaking, and accordingly the rates applied to calls to either of the above-named exchanges are the same. For example, as described hereinbefore, the rate 02 was applied to class 1 calls from the FLorida 3 exchange to the SUperior 5 exchange and this same rate will be applied to calls from the FLorida 3 exchange to the RUgby 2 exchange. Furthermore, calls of the class 2 type from the FLorida 3 exchange to the SUperior 5 exchange were assigned the rate 03 and this same rate will be applied to calls from the FLorida 3 exchange to the RUgby 2 exchange.

Referring now to Figs. 2, 3A and 3B, it will be seen from the trunking diagram therein disclosed that calls from subscribers in the FLorida 3 exchange are extended over certain switch paths and trunk lines to the SUperior 5 exchange and that the same trunk paths are utilized in extending calls from the FLorida 3 exchange to the RUgby 2 exchange. The transfer of the connection from the tandemly related SUperior 5 exchange to the RUgby 2 exchange occurs in the selector 353 located in the SUperior 5 exchange.

In view of the foregoing, it will be understood that the routing digits required to extend a connection from the FLorida 3 exchange to the selector 353 in the SUperior 5 exchange will be the same for calls to either the SUperior 5 or the RUgby 2 exchanges. Accordingly, in extending a connection from the FLorida 3 exchange to the RUgby 2 exchange it is possible to utilize the same translator relays in the translator 1300 which were utilized in extending a connection from the FLorida 3 exchange to the SUperior 5 exchange.

When a calling subscriber completes the connection in the FLorida 3 exchange by way of the line circuit individual to the calling line, such as the line circuit 405, and then by way of the finder 440A, the primary selector 500A and the director hunter 450A to an idle director 300A the calling subscriber will then dial the three code digits 782 of the RUgby 2 exchange followed by the four numerical digits of the directory number of the called subscriber. These digits are registered respectively in the first, second and third code registers 1520, 1530 and 1540 and in the first, second, third and fourth numerical registers 1610, 1620, 1630 and 1640 in the call register 1500 portion of the director. In response to the registration of the first three code digits 782, the code switch 1100 wiper 1206 will be selected by the first digit 7 and the wipers of the switch will be raised in a vertical direction to the eighth level in accordance with the second digit 8 and the wipers will be rotated into engagement with the second contacts in the eighth level in accordance with the third code digit 2. In response to the registration of the three code digits noted, the translator assigner 1000 will associate the calling director with the common translator 1300, in the manner previously explained.

Since the two translator relays utilized in the previously described connection from the FLorida 3 exchange to the SUperior 5 exchange have permanently wired therein all of the code digits, the rate information, the control relay information and the fact that the call requires the use of a call recorder, the same two translator relays may be individually selected in order to establish a connection from the FLorida 3 exchange to the RUgby 2 exchange inasmuch as the same information is required in establishing the last-mentioned connection. Therefore, the wiper 1206 in engagement with the second contact in the eighth level of the code switch 1100 will be wired by way of the terminal blocks TB1240 and TB1250 to one of the contacts of both the class 1 relays and the class 2 relays. The one contact of the class 1 relay will complete a circuit by way of the terminal block TB1395 and TB1396, to one of the two previously mentioned translator relays and the one contact of the class 2 relay will complete a circuit by way of the terminal block noted to the other of the two translator relays. Depending upon the class of the calling line, the selected translator relay will register the four routing digits 4868 in the first, second, third and fourth route digit registers of the coder 1800, it will register the digit "2" (if class 1) or the digit "3" (if class 2) in the units digit rate registers of the coder 1800, it will operate the TB control relay R1885, and it will ground the ABT conductor thereby to cause the operation of the start relay R2230 in the call recorder 2000.

As soon as the above information has been transferred from the translator 1300 to the coder 1800 and to the call recorder 2000, the translator assigner 1000 will disconnect the translator 1300 from the calling director, thereby to render the translator 1300 available for translations required by other calling directors.

The call recorder 2000 will now operate in the manner previously described and call in the detector 1900 to detect and register the directory number of the calling subscriber station.

The director will transmit under control of the send sequence switch 1650 and the sender switch 1660, first the routing digits 4868, and then the third code digit 2 registered in the third code register 1540 and finally, the four numerical digits of the called subscriber directory number registered in the first, second, third and fourth numerical registers 1610, 1620, 1630 and 1640. It should be noted that after the transmission of the four routing digits 4868, the send sequence switch 1650 will skip the remaining route digit registers in the coder 1800 and it will skip the first and second code registers which have registered therein the first and second code digits 78 of the called exchange. The skipping of the first two code digits is brought about by the operation of the TB control relay R1885 in the coder 1800 in the manner previously described.

The digits 4868 transmitted by the director will complete the previously traced switch path including the primary selector 500A, the toll ticket repeater 2300A, the ticket repeater selector 2700A, the repeater 305, the toll line 335 extending to the EMpire 1 exchange, the repeater 290, the incoming toll selector 205, the repeater 280 and the associated toll line extending to the SUperior 5 exchange, the repeater 351, the selector 352, and the selector 353 in the SUperior 5 exchange. Thus, it will be seen that in response to the four routing digits 4868 transmitted by the director, the call which is to be extended to the RUgby 2 exchange has been completed over the same trunk route that the call previously described was completed to the SUperior 5 exchange, in response to the same routing digits.

The next digit 2 transmitted by the director, which is the third code digit of the called exchange code now determines the operation of the selector 353 in the SUperior 5 exchange. In response to the digit 2, the selector 353 raises its wipers to the second level and selects an idle repeater, such as the repeater 358, extending to the RUgby 2 exchange. It will be recalled that in the previously described connection to the SUperior 5 exchange, the selector 353 responded to the digit 5 and thus selected further switching apparatus in the local switch train of the SUperior 5 exchange. The remaining four numerical digits transmitted by the director are sent over the above-traced path to the repeater 358 in the SUperior 5 exchange where they are repeated over the interconnecting toll line to the repeater 361 in the RUgby 2 exchange. The repeater 361 repeats the first digit to the selector 362 which selects an idle selector, such as the selector 363; it repeats the next numerical digit to the selector 363, which will select an idle connector, such as the connector 364; and it will repeat the last two digits to the connector 364 thereby to complete the connection to the desired called subscriber substation, such as the station 365.

The remaining operations performed by the call recorder 2000A, the director and its associated units of equipment, the ticket repeater 2300A, the tabulator 2800A, and the record and ticket tape punch mechanisms 2967 and 2968 are the same as has been described above in connection with the extension of a call from the FLorida 3 exchange to the SUperior 5 exchange.

*Call from the FLorida-3 exchange to the STate-8 exchange*

Referring again to the telephone system illustrated schematically in Fig. 1 of the drawings, it will be seen that the STate 8, SUperior 5 and RUgby 2 exchanges are located in zone 78. Each of the above-named exchanges have the first and second code digits 78 corresponding to the exchange name and the third code digit in each case corresponds to the exchange digit designating the particular one of the three exchanges thereby to complete the three-digit code which is dialed by a calling subscriber in order to extend a connection to a particular one of the three exchanges noted. For the purpose of this description it will be assumed that the STate 8 exchange serves an area in zone 78 which is remotely located from the areas served by the SUperior 5 and the RUgby 2 exchanges and that the rates applied to calls from the FLorida 3 exchange to the STate 8 exchange are greater than the rates applied to calls from the FLorida 3 exchange to the SUperior 5 and RUgby 2 exchanges. In the present case, it will be assumed that the rates 03 and 04 will be applied respectively to class 1 and class 2 calls from the FLorida 3 exchange to the STate 8 exchange.

Referring now to Figs. 2, 3A and 3B of the drawings it will be seen from the trunking diagram therein disclosed that the calls from subscribers in the FLorida 3 exchange are extended over certain switch paths and trunk lines to the SUperior 5 exchange and that only a portion of these switch paths and trunk lines are utilized in extending calls from the FLorida 3 exchange to the STate 8 exchange. The transfer of the connection from the tandemly related EMpire 1 exchange to the STate 8 exchange occurs in the incoming toll selector 205 located in the EMpire 1 exchange. In view of the foregoing, it will be understood that the routing digits required to extend a connection from the FLorida 3 exchange to the STate 8 exchange will be different from the routing digits utilized in completing calls from the FLorida 3 exchange to the SUperior 5 exchange. Therefore, it will be necessary to provide two additional translator relays in the translator 1300 which will be selectively operated in accordance with the class of the calling line when the code digits 788 of the STate 8 exchange are dialed by the calling subscriber.

When a calling subscriber in the FLorida 3 exchange completes a connection by way of the line circuit, such as the line circuit 405, the finder 440A, the primary selector 500A and the director hunter 450A to an idle director, he may then dial the three code digits 788 of the STate 8 exchange followed by the four numerical digits of the numerical portion of the directory number of the called subscriber. These digits are registered respectively in the first, second and third code registers 1520, 1530 and 1540 and in the first, second, third and fourth numerical registers 1610, 1620, 1630 and 1640 in the call register 1500 portion of the director. In response to the registration of the three code digits 788 the code switch 1100 wiper 1206 will be selected by the first digit 7; the wipers of the switch will be raised to the 8th level in accordance with the second digit 8; and the wipers will be rotated into engagement with the contact 8 in the 8th level in accordance with the third digit 8 all in the manner previously described. In response to the association of the translator 1300 with the calling director the circuit will be completed by way of the wiper 1206 and the engaged contact 8 in the 8th level of the code switch 1100 whereby one of the two translator relays will be operated, such as the relays R1410, R1420, etc. in the translator 1300, which translator relay is individual to the code digits 788 of the called STate 8 exchange and the class of the calling line.

It should be understood that since two classes of calling lines may establish connections between the FLorida 3 exchange and the STate 8 exchange, one of the above-mentioned translator relays will be permanently wired to transfer to the coder 1800 the routing digits 487; to operate in the coder 1800, the units digit rate register relays in accordance with the rate 3 (class 1 calls); and to place a ground potential on the ABT conductor for the purpose of calling in a call recorder, such as the call recorder 2000A. The other of the two translator relays will be permanently wired to transfer to the coder 1800 the routing digits 487; to operate the units digit rate register in the coder 1800 to register the rate 4 (class 2 calls); and to apply a ground potential to the ABT conductor for the purpose of calling in a call recorder, such as the call recorder 2000A. It should be noted that the two translator relays, individual to the STate 8 exchange code, do not place a ground potential on the TA, TB, TC and TD conductors extending to the four control relays R1875, R1880, R1885, and R1890 in the coder 1800 and, accordingly, these relays are in their normal positions when calls are to be extended to the STate 8 exchange.

When the translator relay is thus operated, it will transfer to and register in the first, second and third route digit registers of the coder 1800 the digits 487; it will also operate and register in the units digit rate registers the digit 3 or the digit 4, depending upon whether a class 1 or a class 2 calling subscriber originated the call; and finally, it will apply ground potential to the ABT conductor extending to the call recorder 2000 thereby to operate the start relay R2230 and thus initiate operation of the call recorder 2000.

As soon as the above information has been transferred from the translator 1300 to the coder 1800 and the call recorder 2000, the translator assigner 1000 will disconnect the translator 1300 from the calling director, thereby to render the translator 1300 available for translations required by other calling directors.

The call recorder 2000 will now operate in the manner previously described and call in the detector 1900 to detect and register the directory number of the calling subscriber station.

The director will now transmit, under control of the send sequence switch 1650 and the sender switch 1660, switch setting impulses corresponding to the routing digits 487 and then the four digits of the numerical portion of the called subscriber directory number stored in the first, second, third and fourth numerical registers 1610, 1620, 1630 and 1640 of the call register 1500. It should be noted at this time that after the send sequence switch 1650 and the sender switch 1660 have transmitted the three routing digits 487, the send sequence switch 1650 will skip the remaining route digit registers in coder 1800 and it will skip the first, second and third code registers 1520, 1530 and 1540 in the call register 1500 which have registered therein the code digits 788 of the called exchange. The skipping of the three code digits is automatic when the TA, TB, TC and TD control relays R1890, R1885, R1880 and R1875 are in their normal positions.

More specifically, when the wiper 1654 of the send sequence switch 1650 engages the contacts 2 and 3, the ground potential applied to the conductors C1832 and C1833 cannot be extended through to the skip conductor C1831 due to the registration of the routing digits 487 in the first, second and third route digit registers of the coder 1800. However, when the wiper 1654 engages the fourth, fifth and sixth contacts, ground potential is successively applied to the conductors C1834, C1835 and C1836 in order to ground the skip conductor C1831 and cause the send sequence switch 1650 to skip the fourth, fifth and sixth route digit registers of the coder 1800. When the wiper 1654 successively engages the contacts 7, 8 and 9, ground potential is successively applied to the conductors C1837, C1838 and C1839 in order to ground the skip conductor C1831 and thus cause the send sequence switch 1650 to skip the first, second and third code registers 1520, 1530 and 1540 in the call register 1500. The circuits of the conductors C1837, C1838 and C1839 include normally closed contacts of the unoperated TA and TB control relays R1890 and R1885. Finally, the wiper 1654 engages the contacts 10, 11, 12 and 13 thereby to apply ground potential to the conductors C1840, C1841, C1842 and C1843. However, since the circuits over these conductors are opened at the contacts of the TD control relay R1875, the skip conductor will not be grounded and the digits registered in the four numerical registers of the code register 1500 will be transmitted by the sender switch 1660.

Referring now to the Fig. 3A of the drawings, it will be seen that the routing digits 487 transmitted by the director will control the primary selector 500A to select an idle toll ticketing repeater, such as the ticketing repeater 2300A, in the fourth level; it will control the ticket repeater selector 2700A to select an idle outgoing repeater, such as the repeater 305, in the eighth level; and it will control the incoming toll selector, such as the selector 205, in the EMpire 1 exchange to select a trunk to the STate 8 exchange in the seventh level. In this manner the transmission of the routing digits 487 by the director will complete a switch path circuit including the primary selector 500A, the toll ticket repeater 2300A, the ticket repeater selector 2700A, the repeater 305, the interconnecting toll line 335, the repeater 285 in the EMpire 1 exchange, the incoming toll selector 205, the repeater 285, the repeater 376 in the STate 8 exchange and the associated incoming toll selector 377. Accordingly, it will be seen that the routing digits 487 transmitted by the director has completed a connection from the FLorida 3 exchange to the STate 8 exchange. The director will now transmit the four digits of the numerical portion of the called subscriber directory number, as registered in the numerical registers of the call register 1500, thereby to control the incoming toll selector 377 in the STate 8 exchange, the local selector 369, and the connector 370 thereby to complete the connection to the desired called subscriber line.

The remaining operations performed by the call recorder 2000A, the director 300A and its associated units of equipment, the toll ticket repeater 2300A, the tabulator 2800A and the record and ticket tape punch mechanisms 2967 and 2968 are the same as has been described above in connection with the extension of a call from the FLorida 3 exchange to the SUperior 5 exchange.

*The EMpire 1 exchange apparatus*

Referring now to the trunking layout of the telephone system schematically illustrated in Figs. 2, 3A and 3B of the drawings it will be seen that the trunking apparatus in the EMpire 1 exchange is substantially the same as the exchange apparatus incorporated in the FLorida 3 exchange. More specifically, the line circuits 405, the line finder 440, the distributor 442, the primary selector 500, the director hunter 450, the director 300B (comprising the controller 600, the code switch 1100, the call register 1500, and the coder 1800), the translator assigner 1000B and the translator 1300, shown in Figs. 4 to 18, inclusive, are illustrative of the corresponding apparatus having the same designations followed by the letters A and B located respectively in the FLorida 3 exchange and the EMpire 1 exchange. In addition to the foregoing, the FLorida 3 exchange is provided with facilities for automatically producing a permanent record of short haul toll calls and, therefore, includes the call recorder 2000A, the detector 1900A, the toll ticketing repeater 2300A, the toll ticket selector 2700A, the tabulator 2800A, the tabulator assigner 2801A, the record tape punch mechanism 2967 and the ticket tape punch mechanism 2968. The detail circuits of the above-named apparatus are shown in Figs. 19 to 31, inclusive, of the drawings. It is assumed, however, that the EMpire 1 exchange is arranged for director operations but that facilities for automatically producing permanent records of short haul toll calls will be added to the exchange apparatus at some future time. Accordingly, all of the conductors interconnecting the call recorder 2000 (Figs. 19 to 22) and the director (Figs. 6 to 9, 11, 12 and 15 to 18) and the conductors interconnecting the call recorder 2000 (Figs. 19 to 22) and the translator 1300 (Figs. 13 and 14) may be omitted from the director and the translator.

In view of the foregoing it will be understood that all short haul toll calls which are originated in the EMpire 1 exchange will utilize the director and the translator in establishing connections with any of the other exchanges included in the telephone network, but no record will be produced of such calls. Furthermore, it will be understood that the calling subscribers in the EMpire 1 exchange will dial the two or three code digits designating the exchanges of the called subscriber substations, followed by the four numerical digits designating the numerical portion of the directory number of the wanted subscriber. Furthermore, it will be understood that the individual translator relays provided in the common translator of the EMpire 1 exchange will be permanently wired to translate the first three digits of the called office code into appropriate routing digits whereby the director can set up the connection over existing trunk routes and switching apparatus to the desired called exchange and to control the director to then transmit the digits of the called subscriber directory number as registered in the call register portion of the director. In other words, the operation of the director including the various units of equipment, such as the controller 600, the code switch 1100, the call register 1500, and the coder 1800, will operate in conjunction with the translator assigner 1000 and the translator 1300 in substantially the same manner as has been previously described whereby connections will be established from the calling subscribers in the EMpire 1 exchange to called subscriber substations in the FLorida 3, the STate 8, the SUperior 5, the RUgby 2 and the CHase exchanges over the trunk routes and switching apparatus provided in the various exchanges. Furthermore, local calls may be completed between subscribers in the EMpire 1 exchange and to subscribers in the EMpire 2 and EMpire 3 exchanges by class 1, class 2 and class 3 subscribers in the manner previously described, whereby the director is merely utilized in the connection to absorb the first two digits of the called office code and to repeat the third digit of the called office to the primary selectors. The only subscribers in the EMpire 1 exchange that are permitted to extend calls beyond zone 36 incorporating the EMpire 1, EMpire 2, and EMpire 3 exchanges are the class 1 subscribers of the extended service type. In the event that either class 2 or class 3 subscribers, that is subscribers provided with local service facilities and paystation facilities, attempt to extend calls beyond the area served by the EMpire 1, EMpire 2 and EMpire 3 exchanges, such calls will be automatically extended to the 0 operator position.

Referring now to the trunking layout of the EMpire 1 telephone exchange apparatus, it will be assumed that a calling subscriber in the EMpire 1 exchange desires to extend a local call to a called subscriber in the EMpire 2 exchange. It will further be assumed that the switch apparatus utilized by the calling subscriber is the same as that which is disclosed in detail in Figs. 4 to 14, inclusive, of the drawings. Before proceeding with the description of operation of the switching apparatus, it should be noted that the call register 1500 portion of the director 300B, which is provided in the EMpire 1 exchange, has the terminal block TB1528 wired for the office code digits 361, 362 and 363 designating the EMpire 1, EMpire 2 and EMpire 3 exchanges. More specifically the terminal 3 accessible to the wiper 1526 of the first code register 1520 is jumpered to the terminal 1562 in the manner illustrated in the drawing. The terminal 6 accessible to the wiper 1536 of the second code register 1530 is jumpered to the terminal 1561 terminating the first and second local digit conductor C888. Finally, terminals 1, 2 and 3 accessible to the wiper 1546 of the third code register 1540 are respectively jumpered to the terminal 1563 terminating the third digit local conductor C889.

In view of the foregoing, it will be understood that when a calling subscriber in the EMpire 1 exchange dials the called office code 362 of the EMpire 2 exchange, these digits will be registered respectively in the first, second and third code registers 1520, 1530 and 1540 of the code register 1500 portion of the director 300B. As a result of the foregoing, it will be understood that the wipers 1526 and 1536 of the first and second code registers will be positioned in engagement with contacts 3 and 6 in their respective banks whereby the ground potential applied to the wiper 1526 completes a circuit via the wiper 1536 and the conductor C888 extending to Fig. 8 thereby to complete the operation of the first and second digit local relay R840 in the manner previously explained. The operation of the relay R840 prepares the primary selector 500 to be operated by the third digit 2 registered in the third code register 1540 of the call register 1500. Consequently, when the third digit 2 is dialed, the wipers of the third code switch 1540 are positioned into engagement with the contacts 2 and the wipers of the primary selector 500 are raised to the second level of the associated contact banks and are automatically rotated over the contacts of the second level to select an idle outgoing repeater to the EMpire 2 exchange. As soon as the wiper 1546 of the third code register 1540 engages the contact 2 in its contact bank, ground potential will be applied to the conductor C889 extending to Fig. 8 thereby to operate the third digit local relay R850 and to operate the director release relay R780. It will be recalled that the third digit local relay R850, upon operating, prevents the translator assigner 1000 from associating the common translator with the calling director and that the operation of the director release relay R780 will cause the director to release itself from the calling line and the primary selector 500. Furthermore, the calling subscriber line will be connected by way of its individual line circuit 405, the finder 440 and the operated primary selector 500, to the outgoing repeater 275 extending to the EMpire 2 exchange.

The calling subscriber will now dial the four numerical digits of the directory number of the desired called subscriber in the usual manner in order to extend the connection to the called subscriber in the EMpire 2 exchange. Referring to Fig. 2 of the drawings, it will be seen that the repeater 275 will repeat the impulses constituting the four digits to the repeater 331 in the EMpire 2 exchange and the last-mentioned repeater will repeat the impulses to the switches in the local switch train of the EMpire 2 exchange. More specifically, the first digit of the numerical portion of the directory number will be repeated to the selector 332, the second digit will be repeated to the selector 333, and the third and fourth digits will be repeated to the connector 334 in the well-known manner thereby to complete the connection to the called subscriber.

The general description of the operation of the switching apparatus employed in the EMpire 1 exchange in completing local calls is the same regardless of the class of the calling subscriber lines. In other words, the system is wired and arranged so that class 1 extended service subscriber lines, class 2 local subscriber lines and class 3 paystation lines may complete local calls to subscribers in the EMpire 1, EMpire 2 and EMpire 3 exchanges in the manner described above. From the foregoing description it will be understood that the director is merely employed in the connection to discriminate between local calls and short haul toll calls and when the director ascertains that the call is a local call, it is automatically released from the connection and rendered available for additional calls and the control of the switch train is placed under control of the dial of the calling subscriber. In the case of short haul toll calls, however, the director will be employed to register the called office code and the numerical portion of the directory number of the called subscriber and to transmit impulses corresponding to the routing digits and certain of the registered directory number digits to the switch train thereby to complete the connection to the called subscriber. On all short haul toll calls the translator 1300 will be utilized to register in the coder 1800 portion of the director, the necessary routing digits to extend the connection to the called exchange in the event the call is originated from a class 1 extended service subscriber line. However, if the call is extended from either a class 2 local subscriber line or a class 3 paystation line, the translator 1300 will register in the coder 1800 the necessary routing digits to extend the call to the "0" operator position.

*Call from the EMpire 1 exchange to the SUperior 5 exchange*

It will now be assumed that a class 1 extended service subscriber has initiated a call and has registered the code digits 785 of the SUperior 5 exchange plus the four numerical digits of a called subscriber in the code and numerical registers of the call register 1500 portion of the director. In response to the registration of the digits 785 of the called office code, the code switch 1100 (Fig. 12) will be operated in the manner previously described whereby its wipers will be positioned into engagement with the fifth contact in the eighth level of the associated contact banks in response to the registration of the second and third code digits 85 in the call register 1500. Also in response to the first code digit 7 registered in the first code register, the wiper 1206 will be selected in order to place a ground potential on the contact 85. Furthermore, in response to the registration of the three code digits of the called office code, the translator 1300 will be associated with the calling director under control of the translator assigner 1000 in the manner previously explained. Since the call was originated by a class 1 subscriber, the class 1 relays R1340 and R1310 in the translator 1300 will be operated thereby to complete a circuit to a translator relay, such as the relays R1410, R1420, etc., which is individual to the called office code digits 785 of the SUperior 5 exchange. The operation of the translator relay will transfer to the coder 1800 the routing digits 685 which are registered in the first, second and third route digit registers of the coder 1800 in the manner previously explained. Since the EMpire 1 exchange has not been arranged to produce a record of short haul toll calls, the operated translator relay will not be permanently wired in accordance with the rate applicable to the short haul toll call nor will it be wired to call in a call recorder. Finally, the operated translator relay will not operate any of the control relays R1875, R1880, R1885 and R1890 in the coder 1800.

In view of the foregoing, it will be understood that the director will now transmit the route digits 685 registered in the first, second and third route digit registers of the coder 1800 followed by the four digits of the numerical portion of the called subscriber number registered in the first, second, third and fourth numerical registers 1610, 1620, 1630 and 1640. The remaining route digit registers in the coder 1800 and the code registers in the call register 1500 will be skipped by the send sequence switch 1650 of the director in the manner previously explained. After all of the digits have been transmitted by the director, the director release relay R780 will be operated thereby to release the director, and the connection from the calling subscriber line will now be completed to the called subscriber line in the SUperior 5 exchange in the manner previously explained. The switch path over which the connection is completed extends from the calling subscriber substation in the EMpire 1 exchange by way of the line circuit 405E, individual to the calling extended service subscriber line and then by way of the line finder 440B, the primary selector 500B and the sixth level thereof terminating in the outgoing repeater 280, and then over the interconnecting toll trunk to the repeater 351, the selectors 352, 353, 354 and 355 and then by way of the connector 356 to the called subscriber line.

When the conversation between the calling and the called subscribers is terminated, the switching apparatus noted above will automatically restore to normal in the conventional manner.

It may be well to mention at this time that in the event that the call described above originated on a class 2 or a class 3 line, the class 2 relays R1350 and R1320, or the class 3 relays R1360 and R1330 in the translator 1300 would have been operated instead of the class 1 relays R1340 and R1310. In either event the translator relay in the translator 1300 which would be operated will be permanently wired to register the single digit 0 in the first route digit register of the coder 1800 and it would be permanently wired to operate the TD control relay R1875 in the coder 1800. In this manner the translator 1300 would be arranged to control the director to route calls for the SUperior 5 exchange, which are attempted by either class 2 or class 3 subscribers in the EMpire 1 exchange to the "0" operator position.

In response to the registration of the single digit 0 in the first route digit register in the coder 1800, the director will transmit the digit 0 to the primary selector (Fig. 2) and the selector will automatically select an idle trunk to the "0" operator position. The operation of the TD control relay R1875 in the coder 1800 will cause the send sequence switch 1650 to skip the seven registers of the call register 1500 and then release the director in the manner previously described.

When the connection is completed to the "0" operator position, the operator may complete the call to the desired called subscriber in the SUperior 5 exchange and make out a toll ticket chargeable against the calling subscriber in the conventional manner, if the subscriber is of the class 2 type, and will require the deposit of the necessary coins at the paystation, if the subscriber is of the class 3 paystation type.

*Call from the EMpire 1 exchange to the RUgby 2 exchange*

In order to complete a short haul toll call from a class 1 extended service subscriber substation in the EMpire 1 exchange to a called subscriber in the RUgby 2 exchange, the calling subscriber will dial the digits 782 of the RUgby 2 exchange followed by the four digits of the numerical portion of the directory number of the called subscriber. These digits are registered in the seven registers of the call register 1500 portion of the director; the code switch 1100 will be operated in the manner previously explained to position its wipers into engagement with the second contact in the eighth level and the wiper 1206 will be selected in the manner previously explained; the translator relay individual to the RUgby 2 exchange called office code digits 782 will be operated; and the routing digits 682 will be registered in the first, second and third route digit registers of the coder 1800 in the manner previously explained. The selected translator relay in the translator 1300 will not register any rate applicable to the call in the coder 1800; it will not call in a call recorder, and it will not operate any of the control relays R1875, R1880, R1885 and R1890 in the coder 1800. Consequently, the send sequence switch 1650 of the director will transmit the routing digits 682 followed by the four digits of the numerical portion of the called subscriber number registered in the four numerical registers of the call register 1500.

Referring now to Figs. 2 and 3, it will be seen that the director, such as the director 300B, will transmit the first routing digit 6 to the primary selector 500B thereby to extend a connection to the repeaters 280 and 351 and to the incoming selector 352 in the SUperior 5 exchange. The second routing digit 8 transmitted by the director 300B will control the incoming selector 352 to extend the connection to the selector 353. The third routing digit 2 transmitted by the director 300B will control the selector 353 thereby to select the repeaters 358 and 361 interconnecting the SUperior 5 and the RUgby 2 exchanges. The four digits of the numerical portion of the directory number of the called subscriber registered in the four numerical registers of the call register 1500, will now be transmitted successively by the director 300B to the selector 362, the selector 363, and the connector 364 in the manner previously explained, thereby to complete the connection to the desired called subscriber in the RUgby 2 exchange. At the conclusion of the transmission of the switch setting digits, the director 300B will be released from the connection in the manner previously explained thereby completing the talking connection from the calling class 1 extended service subscriber line to the desired called subscriber. At the conclusion of the conversation, the subscribers will release the switching apparatus involved in the connection in the usual manner.

In the event that a class 2 local service subscriber substation or a class 3 paystation attempts to complete a connection to the RUgby 2 exchange by dialing the called office code digits 782, followed by the digits of the numerical portion of the called subscriber directory number, the class 2 and class 3 relays in the translator 1300 will automatically cause the selection of the translator relay in the translator 1300 which will cause the director 300B to route the call to the "0" operator position in the manner previously explained.

*Call from the EMpire 1 exchange to the CHase exchange*

If a calling class 1 extended service subscriber desired to complete a connection to a called subscriber in the CHase exchange, the digits 24 constituting the office code digits of the CHase exchange will be registered in the first and second code digit registers of the call register 1500 portion of the director 300B and the four digits constituting the numerical portion of the directory number of the called subscriber will be registered respectively in the third code register 1540, the first, second and third numerical registers 1610, 1620 and 1630 of the call register 1500 in the manner previously explained. For the purpose of this description it will be assumed that the first digit of the numerical portion of the called subscriber directory number is the digit 7. As a result of the registration of the first three digits 247 in the call register 1500, the wiper 1201 of the code switch 1100 will be selected in accordance with the first digit 2 and the wipers will be positioned into engagement with the seventh contacts in the fourth level of the associated contact banks in accordance with the second and third digits 47 in the manner previously explained. The translator 1300 will be associated with the director under control of the translator assigner 1000 and the class 1 relays R1340 and R1310 will be operated thereby to complete a circuit to the translator relay individual to the CHase exchange code digits 24 and the third digit 7 constituting the first digit of the numerical portion of the directory number of the called subscriber substation in the CHase exchange. This translator relay will be operated in the manner previously described and will register in the first, second and third route digit registers of the coder 1800 the routing digits 776. This translator relay will not be wired in accordance with the rate applicable to the call in question nor will it be wired to call in a call recorder. However, the operation of this translator relay will cause the operation of the TB and TC control relays R1835 and R1830 in the coder 1800 thereby to indicate to the director 300B that the called subscriber number is a six-digit number instead of the usual seven digits and to control the send sequence switch 1650 to skip the digits registered in the first and second code registers 1520 and 1530 and to skip the fourth numerical register 1640 which is not operated when a six digit number is registered in the call register 1500.

The director 300B will now transmit the routing digits 776 stored in the first, second and third route digit registers of the coder 1800, then the digit 7 stored in the third code register 1540 (the first digit of the numerical portion of the called subscriber directory number), and then the remaining three digits of the numerical portion of the called subscriber number as registered in the first, second and third numerical registers 1610, 1620 and 1630 of the call register 1500. The director 300B will then release in the manner previously explained in order to complete the talking connection between the calling class 1 extended service subscriber line and the desired called subscriber line in the CHase exchange.

Referring now to Figs. 2 and 3 it will be seen that the routing digits 776 transmitted by the director 300B will complete a path by way of the primary selector 500B, the repeater 285, the repeater 376, the incoming toll selector 377, the selector 368, the repeaters 371 and 372 to the selector 373 in the CHase exchange. The next digit "7," which is the first digit of the numerical portion of the called subscriber number controls the selector 373 in the CHase exchange to further extend the connection to the selector 374. Finally, the last three digits of the called subscriber directory number control the selector 374 and the connector 375 in the manner previously explained thereby to complete the talking connection between the calling subscriber in the EMpire 1 exchange and the called subscriber in the CHase exchange. The release of the connection upon the termination of the call causes the switching apparatus involved in the connection to be restored to normal in the conventional manner.

If either a class 2 local subscriber line or a class 3 paystation subscriber attempts to extend a connection to the CHase exchange in the manner described above, the class 2 relays R1350 and R1320 or class 3 relays R1360 and R1330 will select a translator relay in the translator 1300 whereby the call will be automatically routed to the "0" operator position in the manner previously described. In this manner class 2 and class 3 subscribers in the EMpire 1 exchange are prevented from making free calls to the CHase exchange.

*Call from the EMpire 1 exchange to the STate 8 exchange*

When the calling subscriber of the class 2 extended service type dials the code digits 788 of the STate 8 exchange followed by the four digits of the numerical portion of the directory number, these digits are registered in the call register 1500 in the manner previously explained. The code switch 1100 operates to position its wipers into engagement with the eighth contact in the eighth level and to select the wiper 1206 in accordance with the code digits 788 in the manner previously explained. As a result of the registration of the code digits 788 in the call register 1500 the translator 1300 is associated with the director 300B and a translator relay individual to the code digits 788 is operated as has been previously described. The operated translator relay is wired to register the single digit 7 in the first digit register of the coder 1800 but it is not wired to register the rate applicable to the call, to call in a call recorder or to operate any of the control relays in the coder 1800.

In response to the registration of the single route digit 7 in the first route digit register of the coder 1800, the director 300B, under control of the send sequence switch 1650, will transmit the routing digit 7 followed by the four digits of the numerical portion of the directory number registered in the first, second, third and fourth numerical registers 1610, 1620, 1630 and 1640 in the manner previously explained. After the transmission of the foregoing digits, the director 300B will disconnect itself from the calling subscriber line and the associated primary selector 500B and it will complete the talking connection from the calling class 1 extended service subscriber line to the desired called subscriber in the STate 8 exchange.

Referring now to Figs. 2 and 3 of the drawings, it will be seen that the first digit 7 transmitted by the director 300B will operate the primary selector 500B to the seventh level thereby to select a direct trunk including the repeater 285 and 376 to the STate 8 exchange. The four numerical digits of the called subscriber directory number will operate the incoming toll selector 377, the selector 369 and the connector 370 in the STate 8 exchange thereby to complete the connection to the called subscriber line in the manner previously explained. When the subscribers have terminated the connections by replacing their receivers on the switchhooks of their associated telephone instruments, the switching apparatus involved in the connection will be restored to normal in the conventional manner.

In the foregoing description it was assumed that the connection between the calling class 2 extended service subscriber in the EMpire 1 exchange and the called subscriber in the STate 8 exchange was completed over a direct trunk group interconnecting the two exchanges. If alternative trunking facilities are provided in the EMpire 1 exchange to complete calls to the STate 8 exchange when all of the trunks in the direct trunk group are busy, the outgoing repeaters 285 in the EMpire 1 exchange will be provided with a chain circuit whereby the conductor C1315 (Fig. 13) will be grounded and thus cause the operation of the alternate trunk route relay R1370. In other words, the normal circuit whereby a translator relay in the translator 1300 is operated when the wiper 1206 of the code switch 1100 engages the contact 88 will include the normally closed contacts 1371 of an alternate trunk route relay, such as the relay R1370. However, when the relay is in an operated condition indicative of the fact that all the direct trunks to the STate 8 exchange are busy, the circuit for selecting the translator relay for routing the call over the direct trunks is transferred at the contacts 1372 of the relay R1370 to a translator relay which will be permanently wired in accordance with the routing digits 688. The routing digits 688 will be indicative of the alternative trunk route for completing calls from the EMpire 1 exchange to the STate 8 exchange. Consequently, when this translator relay is operated, the routing digits 688 instead of the single routing digit 7 will be registered in the first, second and third route digit registers of the coder 1800. This particular translator relay will not be permanently wired in accordance with the rate applicable to the call, it will not call in a call recorder, and it will not operate any of the control relays in the coder 1800.

The director 300B will now transmit the three routing digits 688 registered in the route digit registers of the coder 1800, followed by the four digits of the numerical portion of the called subscriber directory number as registered in the first, second, third and fourth numerical registers of the call register 1500. The director will then disconnect itself from the connection and thereby connect the calling subscriber line through to the called subscriber line.

Referring now to Figs. 2 and 3 of the drawings, it will be seen that the routing digits 688 transmitted by the director 300B will extend the connection via the primary selector 500B, the repeater 280, the repeater 351, the selector 352, the selector 353, the repeater 357, and the repeater 366, to the incoming selector 367 in the STate 8 exchange. The four numerical digits of the called subscriber directory number are now transmitted by the director 300B to the incoming selector 367, the selector 369 and the connector 370 in the manner previously described thereby to complete the connection to the called subscriber in the STate 8 exchange. It should be noted that the connection between the calling class 1 extended service subscriber line and the called subscriber in the STate 8 exchange has been completed over the alternative trunk route including the tandemly related SUperior 5 exchange. When the subscribers have completed the connection and have replaced their receivers on the switchhooks of the associated telephone instruments, the switching apparatus involved in the connection will be restored to normal in the conventional manner.

If a class 2 local subscriber or a class 3 paystation subscriber attempts to complete a call to a subscriber in the STate 8 exchange in the manner described above, the class 2 relays R1350 and R1320 or the class 3 relays R1360 and R1330 will complete circuits whereby a translator relay in the translator 1300 will be operated to register the single routing digit 0 in the coder 1800 and to prevent the director from transmitting any of the digits registered in the seven registers of the call register 1500. The director then will transmit the single routing digit 0 to the primary selector 500B whereby the call is extended to the "0" operator position. In this manner class 2 and class 3 subscribers are prevented from making free calls to subscribers in the STate 8 exchange. However, the operator at the "0" operator position is provided with facilities for making a toll ticket to charge the calling subscriber for the call or for collecting the coins deposited by the class 3 paystation subscriber. The "0" operator may then complete the call to the desired called subscriber in the STate 8 exchange and supervise the connection in accordance with conventional manual practice.

While one embodiment of the invention has been disclosed, it will be understood that various modifications may be made therein which are within the true spirit and scope of the invention.

What is claimed is:

1. In a telephone system, a register sender having a plurality of digit registers, a called exchange having an individual code designation, means for transmitting to said sender a series of digits corresponding to the code designation of said called exchange, means for registering said digits in successive ones of said digit registers, a translator, a translator assigner, means operated responsive to the registration of said digits in said digit register for controlling said assigner to connect said translator to said sender, a route register in said sender, a switch in said sender, means controlled in accordance with the digits registered in said digit registers for selectively operating said switch in accordance with said digits, means in said translator controlled over a circuit including one of said digit registers and said operated switch for controlling said translator to transfer to said route register and to register therein a routing digit or digits corresponding to a route to said called exchange, means for controlling said translator assigner to disconnect said translator from said sender, and means in said sender for transmitting said registered routing digit or digits to extend said connection from said sender to said called exchange.

2. In a telephone system, a register sender having a plurality of digit registers and a control switch, means for successively operating said digit registers to register plural digit numbers identifying called exchange, means for selectively operating said control switch in response to the operation of each of said digit registers, a translator having an individual translating device corresponding to each called exchange, means operated responsive to the registration in said digit registers of a plural digit number identifying one of said called exchanges for selectively operating said control switch and for associating said translator and all of said individual translating devices with said register sender, means including one of said digit registers and said operated control switch for selectively operating the one of said individual translating devices corresponding to said called exchange, means in said register sender selectively controlled in accordance with said one operated translating device for registering one or more routing digits corresponding to a trunk route to said called exchange, and means for disconnecting said translator and said operated translating device from said register sender and for transmitting said registered routing digits to extend a connection over said trunk route to said called exchange.

3. In a telephone system, a register sender having a plurality of digit registers and a control switch, means for successively operating said digit registers to register plural digit numbers identifying particular called exchanges, means for selectively operating said control switch in accordance with each digit of said plural digit number, a translator having a plurality of translating devices, each of said devices being individual to a called exchange and having registered therein one or more routing digits for routing a call from said register sender to the corresponding called exchange over a particular trunk route, means operated responsive to the registration in said digit registers of a plural digit number identifying one of said called exchanges for associating said translator and all of said translating devices with said register sender, means controlled in response to the operation of each of said digit registers for selectively operating said control switch to control the one of said translating devices corresponding to said one called exchange, means in said register sender controlled by said one translating device for registering the routing digit or digits registered in said one translating device, means for thereafter disconnecting said translator and all of said translating devices from said register sender, and means in said register sender for transmitting said routing digit or digits to extend a connection from said register sender to said one called exchange over a particular trunk route.

4. In a telephone system, a register sender having a plurality of digit registers, means for successively operating said digit registers to register plural digit numbers identifying particular called exchanges, a translator having a plurality of translating devices, each of said translating devices being individual to a called exchange and having registered therein one or more routing digits for routing a call from said register sender to the corresponding called exchange over a particular trunk route, means operated responsive to the registration in said digit registers of a plural digit number identifying one of said called exchanges for associating said translator and all of said translating devices with said register sender, a control switch in said register sender having a plurality of wipers, means operated responsive to the registration of said plural digit number in said digit register for operating said control switch to position all of said wipers and to select a particular one of said wipers, means including said selected wiper and one of said digit registers for operating the one of said translating devices corresponding to said one called exchange, means in said register sender controlled by said operated translating device for registering the routing digit or digits registered in said operated translating device, means for thereafter disconnecting said translator and all of said translating devices from said register sender, and means in said register sender for transmitting said routing digit or digits to extend a connection from said register sender to said one called exchange over a particular trunk route.

5. In a telephone system, a register sender having a plurality of digit registers, means for successively operating said digit registers to register plural digit numbers identifying particular called exchanges, a translator having a plurality of translating device, each of said translating devices being individual to a called exchange and having registered therein one or more routing digits for routing a call from said register sender to the corresponding called exchange over a particular trunk route, means operated responsive to the registration in said digit registers of a plural digit number identifying one of said called exchanges for associating said translator and all of said translating devices with said register sender, a control switch having a plurality of wipers and a like plurality of sets of contact banks, means operated responsive to the registration of said plural digit number in said registers for operating said control switch to position each of said wipers into engagement with a particular contact in its associated set of contact banks and for selecting a particular one of said wipers, means controlled over a circuit including said selected wiper and engaged contact for operating the one of said translating devices corresponding to said one called exchange, means in said register sender controlled by said operated translating device for registering the routing digit or digits registered in said operated translating device, means for thereafter disconnecting said translator and all of said translating devices from said register sender, and means in said register sender for transmitting said routing digit or digits to extend a connection from said register sender to said one called exchange over a particular trunk route.

6. In a telephone system, a register sender having a plurality of digit registers, means for successively operating said digit registers to register plural digit numbers identifying particular called exchanges, a translator having a plurality of translating devices, each of said translating devices being individual to a called exchange and having registered therein one or more routing digits for routing a call from said register sender to the corresponding called exchange over a particular trunk route, means operated responsive to the registration in said digit registers of a plural digit number identifying one of said called exchanges for associating said translator and all of said translating devices with said register sender, a two motion control switch having a plurality of wipers and a like plurality of sets of contact banks, means operated in response to the registration of said plural digit number in said digit registers for operating said control switch in each of said two motions to position each of said wipers into engagement with a particular contact in its associated set of contact banks and for selecting a particular one of said wipers, means for operating one of said translating devices corresponding to said one called exchange over a circuit including said selected wiper and engaged contact, means in said register sender controlled by said operated translating device for registering the routing digit or digits registered in said operated translating device, means for thereafter disconnecting said translator and all of said translating devices from said register sender, and means in said register sender for transmitting said routing digit or digits to extend a connection from said register sender to said one called exchange over a particular trunk route.

7. In a telephone system, a register sender having a plurality of digit registers, means for transmitting to said register sender a series of digits, means for registering said digits in successive ones of said digit registers, a translator, means operated responsive to the registration of a predetermined number of digits in said series for associating said translator with said register sender, means operated in accordance with said predetermined number of digits for controlling said translator to translate said predetermined number of digits into one or more routing digits and a control marking, means in said translator operated responsive to said last-mentioned means for registering in said register sender said routing digit or digits and said control marking, a route register and a control marking register in said register sender operated to register respectively said routing digit or digits and said control marking, means controlled by said operation of said route register and said control marking register for controlling said associating means to disassociate said translator from said register sender, means governed in accordance with said control marking registered in said control marking register for selecting certain ones of said digit registers, and means in said register sender for transmitting first said routing digit or digits registered in said route register and then the digit or digits registered in said selected ones of said digit registers.

8. In a telephone system, a called exchange identified by a plural digit code designation, a register sender comprising a plurality of digit registers, means for transmitting to said register sender a predetermined series of digits corresponding to said code designation identifying said called exchange, means for registering the digits in successive ones of said digit registers, a translator, means operated responsive to the registration of said predetermined series of digits in said digit registers for associating said translator with said register sender, means governer in accordance with said predetermined series of digits registered in said digit registers for transmitting an individual control signal to said translator, a route register and a selection register in said register sender, a translate relay in said translator operated in accordance with said individual control signal for registering in said route register one or more routing digits and for registering in said selection register the identity of selected ones of said digit registers, means for thereafter releasing said translator for use by other register senders, and means for transmitting from said register sender first said routing digit or digits registered in said route register and then the digits registered in said selected ones of said digit registers.

9. In a telephone system, a calling line, a called line, switching apparatus operative to set up a connection from said calling line to said called line, a primary register, a translator, means included in said primary register for registering therein digits transmitted over said calling line, additional means included in said primary register for determining in accordance with a predetermined number of digits registered in said primary register whether said translator must be utilized to control said primary register, means governed in response to said determination by said determining means that said translator is to be utilized for associating said translator with said primary register, means in said translator operated in accordance with the digits in said predetermined number of digits for determining the route over which said connection must set up, means included in said primary register for registering the route determined by said route determining means, and means governed in accordance with said registered route and the digits registered in said primary register for controlling said switching apparatus to set up said connection over said determined route from said calling line to said called line.

10. In a telephone system, a calling line, called lines, switching apparatus operative to set up a connection from said calling line to one of said called lines, a primary register, a translator, means included in said primary register for registering therein a first group of digits and a second group of digits identifying one of said called lines transmitted over said calling line, routing means included in said translator having permanently registered therein routing digits corresponding to selectable routes over which connections must be set up to said called lines, additional means included in said primary register for determining in accordance with the registered digits of said first group whether said translator must be utilized to control said primary register, means governed in the event said determining means is operated for associating said translator with said primary register, further means included in said primary register governed in accordance with the value of each of the registered digits of said first group for selecting a particular one of said routing means, additional registering means included in said primary register controlled by said one selected routing means for registering the routing digits corresponding to said selected particular routing means, and means in said primary register for controlling said switching apparatus in accordance with said registered routing digits and said registered first group of digits and said registered second group of digits to set up a connection from said calling line to said one called line over said selected route.

11. In a telephone system, a calling line, called lines, a plurality of primary registers, a translator common to said primary registers, means operated responsive to a call on said calling line for associating an idle one of said primary registers with said calling line, means in said one primary register for registering therein digits identifying one of said called lines transmitted over said calling line, additional means included in said primary register for determining in accordance with a predetermined number of digits registered therein whether said translator must be utilized to control said one primary register, means governed in response to said determining means determining that said translator must be utilized for temporarily associating said translator with said one primary register, means in said translator operated in accordance with the digits in said predetermined number of digits for determining the route over which said connection must be set up, means included in said primary register and operated during the temporary associating of said translator with said one primary register for registering the determined route, and means included in said one primary register governed in accordance with said registered route and the digits registered in said primary register for controlling said switching apparatus to set up said connection from said calling line to said called line via said determined route.

12. In a telephone system, a first exchange, a plurality of second exchanges, switching apparatus operative to set up a connection between said first exchange and any one of said second exchanges, a register mechanism, means for successively registering in said register mechanism a series of digits transmitted thereto and designating a particular one of said second exchanges, a code switch, means for operating said code switch in accordance with the digits registered in said register mechanism, a translator, a plurality of translating devices in said translator, each of said translating devices corresponding respectively to a different one of said second exchanges, each of said devices having registered therein one or more routing digits designating a route over which a connection is to be established to its corresponding second exchange, means operated responsive to the registration of said series of digits in said register mechanism for associating said translator with said code switch, a route register, means for selecting a particular one of said translating devices in accordance with the operation of said code switch, means controlled by said selected translating device for registering in said route register the one or more routing digits registered in the said selected translating device to establish a particular route between said first exchange and said particular second exchange, means for thereafter disconnecting said translator from said register mechanism, and means in said register mechanism for transmitting to said switching apparatus the routing digit or digits registered in said route register.

13. In a telephone system, a first line, a second line, an operator position, switching apparatus operative to set up a connection from said first line to said second line or to said operator position, a register sender, means operated responsive to a call on said first line for connecting said first line to said register sender, means in said register sender for registering one or more digits sent over said first line, a translator normally disconnected from said register sender, connecting means operated responsive to the registration of a predetermined first digit in said register sender for connecting said translator to said register sender, a first translating relay in said translator operated responsive to said connection of said translator with said register sender, a route register in said register sender, contacts controlled by said operated first translating relay for registering one or more digits corresponding to a route to said operator position in said route register, means in said register sender controlled by said digits registered in said route register for operating said switching apparatus to set up a connection from said first line to said operator position, means governed in the event said first digit registered in said register sender is other than said predetermined digit for preventing operation of said connecting means until a predetermined number of digits have been registered in said register sender, a code switch in said register sender, means operated responsive to the registration of said predetermined number of digits for operating said code switch and for operating said connecting means to connect said translator to said register sender, a second translating relay in said translator, a circuit completed by way of said operated code switch for operating said second translating relay, and contacts controlled by said operated second translating relay for registering one or more digits corresponding to a route to said second line in said route register in order to control said register sender operating means to operate said switching apparatus to set up a connection from said first line to said second line.

14. In a telephone system, a first line, a second line, an operator position, switching apparatus operative to set up a connection from said first line to said second line or to said operator position, a plurality of register senders, means operated responsive to a call on said first line for connecting said first line to an idle one on said register senders, means in said one register sender for registering one or more digits sent over said first line, a translator common to said plurality of register senders, connecting means operated responsive to the registration of a predetermined first digit in said one register sender for connecting said translator and said one register sender, means in said translator operated responsive to said connection for controlling said register sender to operate said switching apparatus to set up a connection from said first line to said operator position, means operated in the event said first digit registered in said one register sender is other than said predetermined digit for preventing operation of said connecting means until a predetermined number of digits have been registered in said register sender, means operated responsive to the registration of said predetermined number of digits for operating said connecting means to connect said translator to said one register sender, and means in said translator operated responsive to said last mentioned connection for controlling said register sender to operate said switching apparatus to set up a connection from said first line to said second line.

15. In a telephone system, a first line, a second line, an operator position, switching apparatus operative to set up a connection from said first line to said second line or to said operator position, a plurality of register senders, means operated responsive to a call on said first line for connecting said first line to an idle one on said register senders, means in said one register sender for registering one or more digits sent over said first line, a translator common to said plurality of register senders, connecting means operated responsive to the registration of a predetermined first digit in said one register sender for connecting said translator and said one register sender, a first relay in said translator operated responsive to said connection for controlling said register sender to operate said switching apparatus to set up a connection from said first line to said operator position, means operated in the event said first digit registered in said one register sender is other than said predetermined digit for preventing operation of said connecting means until a predetermined number of digits have been registered in said register sender, means operated responsive to the registration of said predetermined number of digits for operating said connecting means to connect said translator to said one register sender, and a second relay in said translator operated responsive to said last mentioned connection for controlling said register sender to operate said switching apparatus to set up a connection from said first line to said second line.

16. In a telephone system, a first line, a second line, an operator position, switching apparatus operative to set up a connection from said first line to said second line or to said operator position, a plurality of register senders, means operated responsive to a call on said first line for connecting said first line to an idle one of said register senders, means in said one register sender for registering one or more digits sent over said first line, a translator common to said plurality of register senders, connecting means operated responsive to the registration of a predetermined first digit in said one register sender for connecting said translator and said one register sender, means in said translator operated responsive to said connection and governed in accordance with said predetermined digit for registering a first routing in said register sender, means in said register sender operated in accordance with said registered first routing for controlling said switching apparatus to set up a connection from said first line to said operator position, means operated in the event said first digit registered in said register sender is other than said predetermined digit for preventing operation of said connecting means until a predetermined number of digits have been registered in said register sender, means operated responsive to the registration of said predetermined number of digits for operating said connecting means to connect said translator and said one register sender, means in said translator operated responsive to said last mentioned connection and governed in accordance with the digits of said predetermined number of digits for registering a second routing in said register sender, and means in said register sender operated in accordance with said registered second routing for controlling said switching apparatus to set up a connection from said first line to said second line.

17. In a telephone system, a first exchange provided with lines of first and second classes, a second exchange, a register mechanism in said first exchange, means controlled from said first class calling line or from said second class calling lines for registering a call to said second exchange in said register mechanism, an operator position, a translator, a first translating device and a second translating device in said translator, said first translating device having registered therein one or more routing digits corresponding to a first route over which a connection may be established to said second exchange, said second translating device having registered therein one or more routing digits corresponding to a second route over which a connection may be established to said operator position, means operated responsive to the registration of said call to said second exchange in said register mechanism for associating said translator with said register mechanism, a route register, means controlled in accordance with the registration of said call to said second exchange for selectively operating said first or said second translating device depending upon the class of said calling line, switching apparatus, means controlled by said operated translating device for registering the routing digits of said first or said second route in said route register, means for disconnecting said translator from said register mechanism, and means governed by the registration of said first route in said route register for controlling the operation of said switching apparatus to establish a connection from said first class calling line in said first exchange to said second exchange and governed by the registration of said second route in said route register for controlling the operation of said switching apparatus to establish the connection from said second class calling line to said operator position.

18. In a telephone system provided with calling lines of first and second classes, a called line, switching apparatus, a register sender, means included in said register sender for registering a series of digits transmitted over a calling one of said lines identifying said called line, a route mechanism including a first route register and a second route register, said first route register having permanently registered therein digits corresponding to a first route, said second route register having permanently registered therein digits corresponding to a second route, an operator position, means operated responsive to the registration of certain of the digits identifying said called line for associating said route mechanism with said register sender, means in said route mechanism governed jointly by the class of said calling line and the registration of said certain called line identifying digits for selecting said first or said second route register, means in said register sender operated in accordance with the selected first or second route register for registering either said first route digits or said second route digits, and means in said register sender for controlling said switching apparatus to set up a connection to said called line via said first route in the event said first class line is calling or for controlling said switching apparatus to set up a connection said operator position via said second route in the event said second class line is calling.

19. In a telephone system provided with calling lines of first and second classes, a called line, switching apparatus, a register sender, means included in said register sender for registering a series of digits transmitted over a calling one of said lines identifying said called line, a route mechanism including a first route register and a second route register, said first route register having permanently registered therein digits corresponding to a first route, said second route register having permanently registered therein digits corresponding to a second route, an operator position, means operated responsive to the registration of certain of the digits identifying said called line for associating said route mechanism with said register sender, means controlled in response to the registration of said certain called line identifying digits for preparing a circuit for operating either one of said route registers, means in said route mechanism operated in accordance with the class of said calling line for completing said circuit to operate the one of said route registers corresponding to the particular class of said calling line, means in said register sender operated in accordance with said operated first or said operated second route register for registering either said first route digits or said second route digits, and means in said register sender for controlling said switching apparatus to set up a connection to said called line via said first route in the event said first class line is calling or for controlling said switching apparatus to set up a connection to said operator position via said second route in the event said second class line is calling.

20. In a telephone system provided with calling lines of first and second classes, a called line, switching apparatus, a register sender, means included in said register sender for registering a series of digits transmitted over a calling one of said lines identifying said called line, a route mechanism including a first route register and a second route register, said first route register having permanently registered therein digits corresponding to a first route, said second route register having permanently registered therein digits corresponding to a second route, an operator position, means operated responsive to the registration of certain of the digits identifying said called line for associating said route mechanism with said register sender, means in said register sender controlled in response to the registration of said certain called line identifying digits for selecting said route registers, means in said route mechanism governed in accordance with the class of said calling line for operating either said first route register or said second route register, means in said register sender operated in accordance with the operated first or second route register for registering either said first route digits or said second route digits, and means in said register sender for controlling said switching apparatus to set up a connection to said called line via said first route in the event said first route register is operated by a first class calling line or for controlling said switching apparatus to set up a connection to said operator position via said second route in the event said said second route register is operated by a second class calling line.

21. In a telephone system provided with calling lines of first and second classes, a called line, switching apparatus, a register sender, means included in said register sender for registering a series of digits transmitted over a calling one of said lines identifying said called line, a route mechanism including a first route register and a second route register, said first route register having permanently registered therein digits corresponding to a first route, said second route register having permanently registered therein digits corresponding to a second route, an operator position, means operated responsive to the registration of certain of the digits identifying said called line for associating said route mechanism with said register sender, a switch mechanism selectively operated in accordance with the registration of said certain called line identifying digits for selecting said route registers for operation, means in said route mechanism selectively operated in accordance with the class of said calling line for operating one of said selected route registers, means in said register sender operated in accordance with the operated route register for registering the corresponding route digits, and means in said register sender for controlling said switching apparatus to set up a connection to said called line via said first route in the event said first route register is operated by a first class calling line or for controlling said switching apparatus to set up a connection to said operator position via said second route in the event said second route register is operated by a second class calling line.

22. In a telephone system, a calling office, a first class calling line, a second class calling line, a called office, an operator position, a first group of trunks extending to said called office, a second group of trunks extending to said operator position, switching apparatus in said calling office having access to said groups of trunks, a plurality of register senders, means for associating one of said register senders with a calling one of said lines, means in said one register sender controllable from said one calling line for registering code digits designating said called office, a translator common to all of said register sender, a first route relay and a second route relay in said translator, means operated responsive to the registration of said called office code digits for associating said translator with said one register sender, means in said translator operated in accordance with the class of said one calling line for selecting said first route relay or said second route relay, means in said one register sender operated in accordance with said registered called office code digits for operating the said selected route relay, route register means in said one register sender operated by said selected route relay for registering one or more routing digits, means for thereafter releasing said translator to render the same available for use by another one of said register senders, and means in said one register sender for controlling said switching apparatus in accordance with the registered route digit or digits to extend a connection over said first trunk group to said called office in the event said one calling line is said first class line or for extending a connection over said second trunk group to said operator position in the event said one calling line is said second class line.

23. In a telephone system, a calling line, a called exchange, switching apparatus operative to set up a connection from said calling line to said called exchange, a register sender, a register translator, means included in said register sender for registering therein digits transmitted over said calling line, additional means for determining whether one or more of the digits registered therein are to be translated, translating means included in said register translator permanently registering translations of one or more of the digits registered in said register sender, means included in said register sender for selecting one of said translating means corresponding to one or more of the digits registered therein, means in said register sender controlled by the said one translating means for registering said permanently registered translation, further means included in said register sender for sending both said translated digits and the one or more non-translated digits registered in said register sender, and means responsive to the digits sent from said register for operating said switching apparatus to set up the connection from said calling line to said called line.

24. In a telephone system, a first exchange, a plurality of second exchanges identified by individual code designations, switching apparatus operative to route a call from said first exchange to said second exchanges, a register sender in said first exchange having a plurality of digit registers and a route register, a code switch in said register sender having a plurality of wipers and a set of bank contacts accessible to each of said wipers, means in said register sender controlled from a calling line in said first exchange for registering in said digit registers a series of digits corresponding to the code designation of one of said second exchanges, means controlled by said registration of said digits in said digit registers for selectively controlling said code switch to position each of said wipers into engagement with a particular contact in its associated set of bank contacts and for selecting a particular one of said wipers, a translator including a plurality of translate relays, a plurality of route marking conductors common to each of said translate relays, each of said translate relays corresponding respectively to a different one of said second exchange code designations and being operative to mark said route marking conductors in code form in accordance with routing digits indicative of a predetermined route over which a connection is to be routed from said first exchange to the corresponding second exchange, additional means controlled by said registration of said digits corresponding to said code designation of said one second exchange for connecting said plurality of route marking conductors to said register sender and for connecting said translate relays in said translator to predetermined contacts in said sets of bank contacts of said code switch, whereby the particular translate relay corresponding to said code designation of said one second exchange is operated over a circuit including said selected wiper in said code switch and the particular contact in the associated set of bank contacts engaged thereby, means controlled in response to said operation of said particular translate relay for marking said route marking conductors in code form in accordance with the routing digits indicative of the particular route over which said connection to said one second exchange is to be completed, thereby to operate said route register in said register sender to register said routing digits marked in code form on said route marking conductors, means controlled incident to said registration of said routing digits in said route register for controlling said additional means to disconnect said route marking conductors from said register sender and for disconnecting said translate relays from said bank contacts of said code switch, and means in said register sender for controlling said switching apparatus in accordance with said routing digits registered in said route register to route said connection from said first exchange to said one second exchange identified by said code designation registered in said digit registers of said register sender.

25. In a telephone system, a calling line, a register sender having a called exchange code register and a called line register, a called exchange identified by a plural digit code designation, a called line terminating in said called exchange identified by a plural digit line number, a code switch in said register sender having a plurality of wipers and a set of bank contacts accessible to each of said wipers, a translator having a plurality of translating relays and a plurality of route marking conductors common to each of said translating relays, each of said translating relays corresponding respectively to a different called exchange code designation and operative to mark said marking conductors in code form in accordance with predetermined routing digits, means controlled over said calling line for operating said register sender to register said plural digit code designation identifying said called exchange in said called exchange code register and to register said plural digit line number in said called line register, means controlled by said registration of said digits in said called exchange code register for selectively operating said code switch to position each of said wipers into engagement with a particular contact in its associated set of contact banks and for selecting a particular one of said wipers, a circuit completed by way of said selected wiper and its engaged bank contact to operate the particular translating relay in said translator corresponding to said called exchange code designation registered in said called exchange code register, a route register in said register sender, contacts controlled by said operation of said particular translating relay for marking said route marking conductors in accordance with said predetermined routing digits in order to operate said route register to register said routing digits, and means in said register sender for transmitting said routing digits registered in said route register and then to transmit said digits registered in said called exchange code register and in said called line register to complete a connection from said calling line to said second exchange called line.

26. In a telephone system, a first exchange, a second exchange, a third exchange, a first group of trunks and a second group of trunks respectively interconnecting said first and said second exchanges and said first and said third exchanges, switching apparatus in said first exchange operative to route a call from said first exchange to an idle trunk in said first group of trunks and to an idle trunk in said second group of trunks, a register sender in said first exchange having a plurality of digit registers and a route register, a code switch in said register sender having a plurality of wipers and a set of bank contacts accessible to each of said wipers, a translator having first and second translating relays and a plurality of route marking conductors common to each of said translating relays, said first and said second translating relays corresponding respectively to said first and said second groups of trunks and independently operative to mark said marking conductors in code form in accordance with predetermined routing digits for routing a call to said first group of trunks or to said second group of trunks, means controlled in response to the transmission to said register sender of a plural digit code designation identifying said second exchange for registering said second exchange code digits in said digit register, means controlled by said registration of said second exchange code digits in said digit register for selectively operating said code switch to position each of said wipers into engagement with a particular contact in its associated set of contact banks and for selecting a particular one of said wipers, a circuit completed by way of said selected wiper and its engaged bank contact to operate said first translating relay provided an idle trunk is available in said first group of trunks to said second exchange or to operate said second translating relay provided all of said trunks in said first group of trunks are busy, contacts controlled by said operation of said first translating relay for marking said route marking conductors in code form in accordance with routing digits indicative of said first group of trunks and contacts controlled by operation of said second translating relay for marking said route marking conductors in accordance with routing digits indicative of said second group of trunks in order to operate said route register to register said routing digits, and means in said register sender controlled in accordance with the routing digits registered in said route register for operating said switching apparatus to select an idle trunk in said first group of trunks or for selecting an idle trunk in said second group of trunks, whereby a connection intended for said second exchange is extended from said first exchange to said second exchange directly over an idle trunk in said first group of trunks or is extended from said first exchange to said third exchange over an idle trunk in said second group of trunks depending upon the operation of said first or said second translating relays.

27. In a telephone system, a first exchange, a second exchange, a third exchange, a first group of trunks and a second group of trunks respectively interconnecting said first and said second exchanges and said first and said third exchanges, a register sender in said first exchange having a called exchange code register and called line register and a route register, a code switch in said register sender having a plurality of wipers and a set of bank contacts accessible to each of said wipers, a translator having a plurality of translating relays and a plurality of route marking conductors common to each of said translating relays, a first of said translating relays corresponding to the called exchange code designation identifying said second exchange and a second translating relay corresponding to the called exchange code designation identifying said second exchange, said first translating relay being operative to mark said marking conductors in code form in accordance with a first series of predetermined routing digits indicative of said first group of trunks and said second translating relay being operative to mark said marking conductors in code form in accordance with a second series of predetermined routing digits indicative of said second group of trunks, means in said register sender controlled by a series of digits constituting the exchange code of said second exchange and a series of digits designating a called line in said second exchange for registering said second exchange digits in said called exchange code register and for registering said digits designating said called line in said called line register, means controlled by said registration of said digits in said called exchange code register for selectively operating said code switch to position each of said wipers into engagement with a particular contact in its associated set of contact banks and for selecting a particular one of said wipers, means in said translator normally selecting said first translating relay in the event a trunk is available in said first group of trunks and operated to select said second translating relay in the event all of said trunks in said first group are busy, a circuit completed by way of said selected code switch wiper and its engaged bank contact for operating either said first or said second translating relay depending upon the idle or busy condition of said first group of trunks, means controlled by said operated first or second translating relay for marking said route marking conductors in accordance with routing digits indicative respectively of said first or said second group of trunks, circuits including said marking conductors for operating said route register in said register sender to register the routing digits indicative of said first group of trunks in the event said first translating relay is operated and to register said routing digits indicative of said second group of trunks in the event said second routing relay is operated, and means in said register sender controlled by said routing digits registered in said route register for selecting an idle trunk in said first group of trunks or an idle trunk in said second group of trunks and for then transmitting over the selected idle trunk said digits registered in said called exchange code register and the digits registered in said called line register.

28. In a telephone system, a first exchange, a calling line in said first exchange, a called exchange identified by a plural digit code designation, a first choice trunk route including a plurality of trunks extending from said first exchange to said called exchange, a second choice trunk route including a plurality of trunks extending from said first exchange to said called exchange via a tandem exchange, switching apparatus in said first exchange operative to route a call from said first exchange to said second exchange over said first choice or said second choice trunk routes, a register sender in said first exchange having a plurality of digit registers and a route register, a code switch in said register sender having a plurality of wipers and a set of bank contacts accessible to each of said wipers, a translator having a first and a second translating relay and a plurality of route marking conductors common to each of said translating relays, said first and said second translating relays corresponding respectively to said first choice and said second choice trunk routes and independently operative to mark said marking conductors in code form in accordance with predetermined routing digits, means in said register sender controlled from said calling line for registering said plural digit code designation identifying said called exchange in said digit register, means operated in response to said registration of said called exchange code digits in said digit register for connecting said route marking conductors to said route register and for selectively operating said code switch to position each of said wipers into engagement with a particular contact in its associated set of contact banks and for selecting a particular one of said wipers, a circuit completed by way of said selected wiper and its engaged associated bank contact for operating said first translating relay only in the event an idle trunk is available in said first choice trunk route and for operating said second translating relay only in the event all of said trunks in said first choice trunk route are busy, contacts controlled by said operation of said first translating relay to mark said route marking conductors in code form to register in said route register said predetermined routing digits indicative of said first choice trunk route, contacts controlled by said operation of said second translating relay to mark said route marking conductors in code form to register in said route register said predetermined routing digits indicative of said second choice trunk route, means controlled by said route register in response to the registration therein of said routing digits for disconnecting said route marking conductors from said route register, and means in said register sender for operating said switching apparatus to select an idle trunk in said first choice or in said second choice trunk route as determined by said routing digits registered in said route register.

29. In a telephone system, a first exchange, a calling line in said first exchange, a called exchange identified by a plural digit code designation, a first choice trunk route including a plurality of trunks extending from said first exchange to said called exchange, a second choice trunk route including a plurality of trunks extending from said first exchange to said called exchange via a tandem exchange, switching apparatus in said first exchange operative to route a call from said first exchange to said second exchange over said first choice or said second choice trunk routes, a register sender in said first exchange having a plurality of digit registers and a route register, a code switch in said register sender having a plurality of wipers and a set of bank contacts accessible to each of said wipers, a translator having a first and a second translating relay and a plurality of route marking conductors common to each of said translating relays, said first and said second translating relays corresponding respectively to said first choice and said second choice trunk routes and independently operative to mark said marking conductors in code form in accordance with predetermined routing digits, means in said register sender controlled from said calling line for registering said plural digit code designation identifying said called exchange in said digit register, means operated in response to said registration of said called exchange code digits in said digit register for connecting said route marking conductors to said route register and for selectively operating said code switch to position each of said wipers into engagement with a particular contact in its associated set of contact banks and for selecting a particular one of said wipers, a circuit normally completed by way of said selected wiper and its engaged associated bank contact for operating said first relay in the event an idle trunk is available in said first choice trunk group, means in said translator controlled responsive to an all trunks busy condition in said first choice trunk group for disconnecting said first translating relay from said circuit and for connecting said second translating relay to said circuit so that said second translating relay instead of said first translating relay is operated in the event all of said trunks in said first choice route are busy at the time said circuit is completed, contacts controlled by said operation of said first translating relay for marking said route marking conductors in code form to register in said route register predetermined routing digits indicative of said first choice trunk route, contacts controlled by said operation of said second translating relay for marking said route marking conductors in code form to register in said route register predetermined routing digits indicative of said second choice trunk route, means controlled by said route register in response to the registration therein of routing digits for disconnecting said route marking conductors from said route register, and means in said register sender for operating said switching apparatus to select an idle trunk in said first choice or in said second choice trunk route as determined by said routing digits registered in said route register.

30. In a telephone system, a first exchange, a plurality of second exchanges identified by individual code designations, switching apparatus operative to route a call from said first exchange to said second exchanges, a register sender in said first exchange having a plurality of digit registers and a route register and a rate register, a code switch in said register sender having a plurality of wipers and a set of bank contacts accessible to each of said wipers, means in said register sender controlled from a calling line in said first exchange for registering in said digit registers a series of digits corresponding to the code designation of one of said second exchanges, means controlled by said registration of said digits in said digit registers for selectively controlling said code switch to position each of said wipers into engagement with a particular contact in its associated set of bank contacts and for selecting a particular one of said wipers, a translator including a plurality of translate relays, a plurality of route marking conductors and a plurality of rate marking conductors common to each of said translate relays, each of said translate relays corresponding respectively to a different one of said second exchange code designations and being operative to mark said route marking conductors in code form in accordance with routing digits indicative of a predetermined route over which a connection is to be routed from said first exchange to the corresponding second exchange and to mark said rate marking conductors in accordance with the rate digit indicative of a predetermined charge rate for a connection from said first exchange to said second exchange, additional means controlled by said registration of said digits corresponding to said code designation of said one second exchange for connecting said plurality of route marking conductors and said plurality of rate marking conductors to said route register and to said rate register respectively in said register sender and for connecting said translate relays in said translator to predetermined contacts in said sets of bank contacts of said code switch, whereby the particular translate relay corresponding to said code designation of said one second exchange is operated over a circuit including said selected wiper in said code switch and the particular contact in the associated set of bank contacts engaged thereby, means controlled in response to said operation of said particular translate relay for marking said route marking conductors in code form in accordance with the routing digits indicative of the particular route over which said connection to said one second exchange is to be completed, in order to operate said route register to register said routing digits marked in code form on said route marking conductors and for marking said rate marking conductors in code form in accordance with the rate digit indicative of the charge rate for said connection to said second exchange in order to operate said rate register to register said rate digit, means controlled incident to said registration of said routing digits in said route register for controlling said additional means to disconnect said route marking conductors from said register sender and for disconnecting said translate relays from said contacts of said code switch, and means in said register sender for controlling said switching apparatus in accordance with said routing digits registered in said route register to route said connection from said first exchange to said one second exchange identified by said code designation registered in said digit registers of said register sender.

31. In a telephone system, a calling line, a register sender having a called exchange code register and a called line register, a called exchange identified by a plural digit code designation, a called line terminating in said called exchange identified by a plural digit line number, a code switch in said register sender having a plurality of wipers and a set of bank contacts accessible to each of said wipers, a translator having a plurality of translating relays and a plurality of route marking and rate marking conductors common to each of said translating relays, each of said translating relays corresponding respectively to a different called exchange code designation and operative to mark said route marking conductors in code form in accordance with predetermined routing digits and to mark said rate marking conductors in code form in accordance with predetermined digits indicative of the charge rate for connections to the different called exchanges, means controlled over said calling line for operating said register sender to register said plural digit code designation identifying said called exchange in said called exchange code register and to register said plural digit line number in said called line register, means controlled by said registration of said digits in said called exchange code register for selectively operating said code switch to position each of said wipers into engagement with a particular contact in its associated set of contact banks and for selecting a particular one of said wipers, a circuit completed by way of said selected wiper and its engaged bank contact to operate the particular translating relay in said translator corresponding to said called exchange code designation registered in said called exchange code register, a route register and a rate register in said register sender, contacts controlled by said operation of said particular translating relay for marking said route marking conductors in accordance with said predetermined routing digits in order to operate said route register to register said routing digits and for marking said rate marking conductors in accordance with the predetermined rate digit of a call to said second exchange in order to operate said rate register to register said rate digit, and means in said register sender for transmitting said routing digits registered in said route register and then to transmit said digits registered in said called exchange code register and in said called line register to complete a connection from said calling line to said second exchange called line.

32. In a telephone system, a first exchange, a second exchange, a third exchange, a first group of trunks and a second group of trunks respectively interconnecting said first and said second exchanges and said first and said third exchanges, switching apparatus in said first exchange operative to route a call from said first exchange to an idle trunk in said first group of trunks and to an idle trunk in said second group of trunks, a register sender in said first exchange having a plurality of digit registers and a route register and a rate register, a code switch in said register sender having a plurality of wipers and a set of bank contacts accessible to each of said wipers, a translator having first and second translating relays, a plurality of route marking conductors and a plurality of rate marking conductors common to each of said translating relays, said first and said second translating relays corresponding respectively to said first and said second groups of trunks and independently operative to mark said route marking conductors in code form in accordance with predetermined routing digits for routing a call to said first group of trunks or to said second group of trunks and to mark said rate marking conductors in accordance with a rate digit indicative of a predetermined charge rate for a connection from said first exchange to said second exchange, means controlled in response to the transmission to said register sender of a plural digit code designation identifying said second exchange for registering said second exchange code digits in said digit register, means controlled by said registration of said second exchange code digits in said digit register for selectively operating said code switch to position each of said wipers into engagement with a particular contact in its associated set of contact banks and for selecting a particular one of said wipers, a circuit completed by way of said selected wiper and its engaged bank contact to operate said first translating relay provided an idle trunk is available in said first group of trunks to said second exchange or to operate said second translating relay provided all of said trunks in said first group of trunks are busy, contacts controlled by said operation of said first translating relay for marking said route marking conductors in code form in accordance with routing digits indicative of said first group of trunks and for marking said rate markng conductors in code form in accordance with a predetermined rate digit indicative of a predetermined charge rate for said connection to said second exchange, contacts controlled by operation of said second translating relay for marking said route marking conductors in accordance with routing digits indicative of said second group of trunks and for marking said rate marking conductors with said predetermined rate digit indicative of said connection to said second exchange, said route register operated to register said routing digits marked on said route marking conductors and said rate register operated to register said rate digit marked on said rate marking conductors, and means in said register sender controlled in accordance with the routing digits registered in said route register for operating said switching apparatus to select an idle trunk in said first group of trunks or for selecting an idle trunk in said second group of trunks, whereby a connection intended for said second exchange is extended from said first exchange to said second exchange directly over an idle trunk in said first group of trunks or is extended from said first exchange to said third exchange over an idle trunk in said second group of trunks depending upon the operation of said first or said second translating relays and whereby the same charge rate digit is utilized in establishing a charge for said second exchange connection extended over said first or said second group of trunks.

33. In a telephone system, a first exchange, a second exchange, a third exchange, a first group of trunks and a second group of trunks respectively interconnecting said first and said second exchanges and said first and said third exchanges, a register sender in said first exchange having a called exchange code register and called line register and a route register and a rate register, a code switch in said register sender having a plurality of wipers and a set of bank contacts accessible to each of said wipers, a translator having a plurality of translating relays and a plurality of route marking conductors and a plurality of rate marking conductors common to each of said translating relays, a first of said translating relays corresponding to the called exchange code designation identifying said second exchange and a second translating relay corresponding to the called exchange code designation identifying said second exchange, said first translating relay being operative to mark said route marking conductors in code form in accordance with a first series of predetermined routing digits indicative of said first group of trunks and to mark said rate marking conductors in code form in accordance with a predetermined rate digit indicative of a predetermined charge rate for a connection from said first exchange to said second exchange, said second translating relay being operative to mark said marking conductors in code form in accordance with a second series of predetermined routing digits indicative of said second group of trunks and to mark said rate marking conductors in code form in accordance with said predetermined rate digit indicative of said predetermined charge rate for a connection from said first exchange to said second exchange, means in said register sender controlled by a series of digits constituting the exchange code of said second exchange and a series of digits designating a called line in said second exchange for registering said second exchange digits in said called exchange code register and for registering said digits designating said called line in said called line register, means controlled by said registration of said digits in said called exchange code register for selectively operating said code switch to position each of said wipers into engagement with a particular contact in its associated set of contact banks and for selecting a particular one of said wipers, means in said translator normally selecting said first translating relay in the event a trunk is available in said first group of trunks and operated to select said second translating relay in the event all of said trunks in said first group are busy, a circuit completed by way of said selected code switch wiper and its engaged bank contact for operating either said first or said second translating relay depending upon the idle or busy condition of said first group of trunks, means controlled by said operated first or second translating relay for marking said route marking conductors in accordance with routing digits indicative respectively of said first or said second group of trunks and for marking said rate marking conductors in accordance with said predetermined rate digit indicative of said predetermined charge rate for a connection from said first to said second exchange, circuits including said route marking conductors for operating said route register in said register sender to register the routing digits indicative of said first group of trunks in the event said first translating relay is operated and to register said routing digits indicative of said second group of trunks in the event said second routing relay is operated, additional circuits including said rate marking conductors for operating said rate register in said register sender to register said predetermined rate digit indicative of said charge rate from said first exchange to said second exchange, and means in said register sender controlled by said routing digits registered in said route register for selecting an idle trunk in said first group of trunks or an idle trunk in said second group of trunks and for then transmitting over the selected idle trunk said digits registered in said called exchange code register and the digits registered in said called line register in order to complete said connection to said second exchange over said first or said second group of trunks.

34. In a telephone system, a first exchange, a calling line in said first exchange, a called exchange identified by a plural digit code designation, a first choice trunk route including a plurality of trunks extending from said first exchange to said called exchange, a second choice trunk route including a plurality of trunks extending from said first exchange to said called exchange via a tandem exchange, switching apparatus in said first exchange operative to route a call from said first exchange to said second exchange over said first choice or said second choice trunk routes, a register sender in said first exchange having a plurality of digit registers and a route register and a rate register, a code switch in said register sender having a plurality of wipers and a set of bank contacts accessible to each of said wipers, a translator having a first and a second translating relay, a plurality of route marking conductors and a plurality of rate marking conductors common to each of said translating relays, said first and said second translating relays corresponding respectively to said first choice and said second choice trunk routes and independently operative to mark said route marking conductors in code form in accordance with predetermined routing digits indicative respectively of said first and said second choice routes and to mark said rate conductors in code form in accordance with the same rate digit indicative of the same charge rate for a call to said called exchange, means in said register sender controlled from said calling line for registering said plural digit code designation identifying said called exchange in said digit register, means operated in response to said registration of said called exchange code digits in said digit register for connecting said route marking conductors to said route register and for connecting said rate marking conductors to said rate register and for selectively operating said code switch to position each of said wipers into engagement with a particular contact in its associated set of contact banks and for selecting a particular one of said wipers, a circuit completed by way of said selected wiper and its engaged associated bank contact for operating said first translating relay only in the event an idle trunk is available in said first choice trunk route and for operating said second translating relay only in the event all of said trunks in said first choice trunk route are busy, contacts controlled by said operation of said first translating relay to mark said route marking conductors in code form to register in said route register said predetermined routing digits indicative of said first choice trunk route and to mark said rate marking conductors in code form to register in said rate register said predetermined rate digit indicative of said charge rate for a call to said called exchange, contacts controlled by said operation of said second translating relay to mark said route marking conductors in code form to register in said route register said predetermined routing digits indicative of said second choice trunk route and to mark said rate marking conductors in code form to register in said rate register said predetermined rate digit indicative of said charge rate for a call to said called exchange, means controlled by said route register in response to the registration therein of said routing digits for disconnecting said route marking conductors from said route register and said rate marking conductors and from said rate register, and means in said register sender for operating said switching apparatus to select an idle trunk in said first choice or in said second choice trunk route as determined by said routing digits registered in said route register.

35. In a telephone system, a first exchange, a calling line in said first exchange, a called exchange identified by a plural digit code designation, a first choice trunk route including a plurality of trunks extending from said first exchange to said called exchange, a second choice trunk route including a plurality of trunks extending from said first exchange to said called exchange via a tandem exchange, switching apparatus in said first exchange operative to route a call from said first exchange to said second exchange over said first choice or said second choice trunk routes, a register sender in said first exchange having a plurality of digit registers and a route register and a rate register, a code switch in said register sender having a plurality of wipers and a set of bank contacts accessible to each of said wipers, a translator having a first and a second translating relay and a plurality of route marking conductors and a plurality of rate marking conductors common to each of said translating relays, said first and said second translating relays corresponding respectively to said first choice and said second choice trunk routes and independently operative to mark said route marking conductors in code form in accordance with predetermined routing digits indicative respectively of said first and said second choice routes and to mark said rate marking conductors in code form in accordance with the same rate digit indicative of the same charge rate for a call to said called exchange, means in said register sender controlled from said calling line for registering said plural digit code designation identifying said called exchange in said digit register, means operated in response to said registration of said called exchange code digits in said digit register for connecting said route marking conductors to said route register and for connecting said rate marking conductors to said rate register and for selectively operating said code switch to position each of said wipers into engagement with a particular contact in its associated set of contact banks and for selecting a particular one of said wipers, a circuit normally completed by way of said selected wiper and its engaged associated bank contact for operating said first translating relay in the event an idle trunk is available in said first choice trunk group, means in said translator controlled responsive to an all trunks busy condition in said first choice trunk group for disconnecting said first translating relay from said circuit and for connecting said second translating relay to said circuit so that said second translating relay instead of said first translating relay is operated in the event all of said trunks in said first choice route are busy at the time said circuit is completed, contacts controlled by said operation of said first translating relay to mark said route marking conductors in code form to register in said route register said predetermined routing digits indicative of said first choice trunk route and to mark said rate marking conductors in code form to register in said rate register said predetermined rate digit indicative of said charge rate for a call to said called exchange, contacts controlled by said operation of said second translating relay to mark said route marking conductors in code form to register in said route register said predetermined routing digits indicative of said second choice trunk route and to mark said rate marking conductors in code form to register in said rate register said predetermined rate digit indicative of said charge rate for a call to said called exchange, means controlled by said route register in response to the registration therein of said routing digits for disconnecting said route marking conductors from said route register and said rate marking conductors from said rate register, and means in said register sender for operating said switching apparatus to select an idle trunk in said first choice or in said second choice trunk route as determined by said routing digits registered in said route register and for charging said call at the same charge rate whether extended over said first or said second choice trunk route.

References Cited in the file of this patent

UNITED STATES PATENTS

| Number | Name | Date |
|---|---|---|
| 1,646,262 | Schwartz | Oct. 18, 1927 |
| 1,811,146 | Richardson | June 23, 1931 |
| 1,862,549 | Raymond et al. | June 14, 1932 |
| 1,903,019 | Wright | Mar. 28, 1933 |
| 1,963,929 | Baker | June 19, 1934 |
| 2,006,438 | Carpenter | July 21, 1935 |
| 2,030,419 | Williams | Feb. 11, 1936 |
| 2,056,265 | Germanton | Oct. 6, 1936 |
| 2,282,564 | Crocker | May 12, 1942 |
| 2,385,228 | Ostline | Sept. 18, 1945 |
| 2,409,063 | Ostline | Oct. 8, 1946 |
| 2,413,131 | Voss | Feb. 18, 1947 |
| 2,426,981 | Blake | Sept. 9, 1947 |
| 2,518,210 | Wicks | Aug. 8, 1950 |